United States Patent
Winters

(10) Patent No.: US 11,741,408 B2
(45) Date of Patent: *Aug. 29, 2023

(54) METHOD AND SYSTEM FOR MANAGING BUSINESS DEALS

(71) Applicant: salesforce.com, inc., San Francisco, CA (US)

(72) Inventor: Jason Winters, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,162

(22) Filed: Jul. 7, 2022

(65) Prior Publication Data
US 2023/0012538 A1    Jan. 19, 2023

Related U.S. Application Data

(63) Continuation of application No. 16/947,356, filed on Jul. 29, 2020, now Pat. No. 11,416,790, which is a continuation of application No. 16/542,070, filed on Aug. 15, 2019, now Pat. No. 10,769,563, which is a continuation of application No. 15/457,612, filed on Mar. 13, 2017, now Pat. No. 10,423,909, which is a
(Continued)

(51) Int. Cl.
*G06Q 10/0631* (2023.01)
(52) U.S. Cl.
CPC .......... *G06Q 10/063114* (2013.01); *G06Q 10/06311* (2013.01)
(58) Field of Classification Search
CPC .......................................... G06Q 10/00–50/00

USPC .............................................. 705/7.11–7.42
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |

(Continued)

OTHER PUBLICATIONS

Force.com Connect: Five Paths to Integration Success (Copyright 2007, http://www.salesforce.com/assets/pdf/misc/06.2328 WPApexConnect_2.pdf).

(Continued)

*Primary Examiner* — Alan S Miller
(74) *Attorney, Agent, or Firm* — Weaver Austin Villeneuve & Sampson LLP

(57) ABSTRACT

In accordance with embodiments, there are provided mechanisms and methods for managing business deals. The mechanisms and methods for managing business deals may enable embodiments to provide a dynamic and interactive user-interface including any combination of contacts, accounts, opportunities, allowing users to create tasks, events, leads (e.g., from Data.com), reports, dashboards, instant messenger, external deal spaces, email service (e.g., Outlook), a cloud-based productivity suite for businesses that allows work on any device (e.g., Google apps), mobile access, private messaging, lead management, mass email templates, social media monitoring (e.g., from Radian6), role-based sharing and security, and/or additional storage, for example. In an embodiment, the number of contacts may be unlimited.

20 Claims, 115 Drawing Sheets

Related U.S. Application Data continuation of application No. 13/836,390, filed on Mar. 15, 2013, now Pat. No. 9,626,637.

(60) Provisional application No. 61/702,418, filed on Sep. 18, 2012.

(56) References Cited

U.S. PATENT DOCUMENTS

| | | | |
|---|---|---|---|
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,930,764 | A * | 7/1999 | Melchione ............. G06Q 30/02 705/7.29 |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 * | 1/2001 | Raffel .................... G06Q 10/10 345/475 |
| 6,178,425 | B1 | 1/2001 | Brodersen et al. |
| 6,189,011 | B1 | 2/2001 | Lim et al. |
| 6,216,133 | B1 | 4/2001 | Masthoff |
| 6,216,135 | B1 | 4/2001 | Brodersen et al. |
| 6,233,617 | B1 | 5/2001 | Rothwein et al. |
| 6,236,978 | B1 | 5/2001 | Tuzhilin |
| 6,266,669 | B1 | 7/2001 | Brodersen et al. |
| 6,288,717 | B1 | 9/2001 | Dunkle |
| 6,295,530 | B1 | 9/2001 | Ritchie et al. |
| 6,324,568 | B1 | 11/2001 | Diec |
| 6,324,693 | B1 | 11/2001 | Brodersen et al. |
| 6,336,137 | B1 | 1/2002 | Lee et al. |
| D454,139 | S | 3/2002 | Feldcamp |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,411,949 | B1 | 6/2002 | Schaffer |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Logmans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker et al. |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 6,907,566 | B1 | 6/2005 | McElfresh et al. |
| 7,047,206 | B1 * | 5/2006 | Schultze ............ G06Q 30/0201 705/7.29 |
| 7,062,502 | B1 | 6/2006 | Kesler |
| 7,069,231 | B1 | 6/2006 | Cinarkaya et al. |
| 7,069,497 | B1 | 6/2006 | Desai |
| 7,100,111 | B2 | 8/2006 | McElfresh et al. |
| 7,181,758 | B1 | 2/2007 | Chan |
| 7,269,590 | B2 | 9/2007 | Hull et al. |
| 7,289,976 | B2 | 10/2007 | Kihneman et al. |
| 7,340,410 | B1 * | 3/2008 | Vaillancourt .. G06Q 10/063114 705/7.29 |
| 7,340,411 | B2 | 3/2008 | Cook |
| 7,340,484 | B2 * | 3/2008 | S .......................... G06Q 10/109 709/204 |
| 7,356,482 | B2 | 4/2008 | Frankland et al. |
| 7,373,599 | B2 | 5/2008 | McElfresh et al. |
| 7,401,094 | B1 | 7/2008 | Kesler |
| 7,406,501 | B2 | 7/2008 | Szeto et al. |
| 7,412,455 | B2 | 8/2008 | Dillon |
| 7,454,509 | B2 | 11/2008 | Boulter et al. |
| 7,508,789 | B2 | 3/2009 | Chan |
| 7,599,935 | B2 | 10/2009 | La et al. |
| 7,603,331 | B2 | 10/2009 | Tuzhilin et al. |
| 7,603,483 | B2 | 10/2009 | Psounis et al. |
| 7,620,655 | B2 | 11/2009 | Larsson et al. |
| 7,644,122 | B2 | 1/2010 | Weyer et al. |
| 7,668,861 | B2 | 2/2010 | Steven |
| 7,698,160 | B2 | 4/2010 | Beaven et al. |
| 7,730,478 | B2 | 6/2010 | Weissman |
| 7,747,648 | B1 | 6/2010 | Kraft et al. |
| 7,752,207 | B2 * | 7/2010 | Buzsaki ............. G06F 16/24547 709/226 |
| 7,779,039 | B2 | 8/2010 | Weissman et al. |
| 7,779,475 | B2 | 8/2010 | Jakobson et al. |
| 7,827,208 | B2 * | 11/2010 | Bosworth ............. G06F 16/955 707/802 |
| 7,853,881 | B1 | 12/2010 | Aly et al. |
| 7,945,653 | B2 | 5/2011 | Zuckerberg et al. |
| 8,005,896 | B2 | 8/2011 | Cheah |
| 8,014,943 | B2 | 9/2011 | Jakobson |
| 8,015,495 | B2 | 9/2011 | Achacoso et al. |
| 8,019,632 | B2 * | 9/2011 | Niheu ............... G06Q 10/06314 717/102 |
| 8,032,297 | B2 | 10/2011 | Jakobson |
| 8,073,850 | B1 | 12/2011 | Hubbard et al. |
| 8,082,301 | B2 * | 12/2011 | Ahlgren ................ G06F 16/951 709/204 |
| 8,095,413 | B1 | 1/2012 | Beaven |
| 8,095,531 | B2 | 1/2012 | Weissman et al. |
| 8,095,594 | B2 * | 1/2012 | Beaven ................ H04L 67/306 709/204 |
| 8,103,611 | B2 | 1/2012 | Tuzhilin et al. |
| 8,140,615 | B2 * | 3/2012 | Miller .................... G06Q 10/06 709/202 |
| 8,145,678 | B2 * | 3/2012 | Ramsay, Jr. ........... G06Q 10/10 707/802 |
| 8,150,913 | B2 | 4/2012 | Cheah |
| 8,209,308 | B2 | 6/2012 | Rueben et al. |
| 8,209,333 | B2 | 6/2012 | Hubbard et al. |
| 8,275,836 | B2 | 9/2012 | Beaven et al. |
| 8,296,380 | B1 * | 10/2012 | Kelly .................... H04L 51/216 709/224 |
| 8,316,386 | B2 * | 11/2012 | Kumar ................... G06F 9/546 709/218 |
| 8,332,767 | B1 * | 12/2012 | Beil ...................... G06F 16/532 715/764 |
| 8,423,088 | B2 * | 4/2013 | Ickman ................. H04L 41/22 455/566 |
| 8,457,545 | B2 | 6/2013 | Chan |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,045 | B2 | 8/2013 | Rueben et al. |

(56) References Cited

U.S. PATENT DOCUMENTS

| | | |
|---|---|---|
| 8,510,664 B2 | 8/2013 | Rueben et al. |
| 8,549,417 B2 * | 10/2013 | Waite .................. G06F 8/38 |
| | | 715/760 |
| 8,560,946 B2 * | 10/2013 | Fugitt .................. G06Q 10/10 |
| | | 715/963 |
| 8,566,301 B2 | 10/2013 | Rueben et al. |
| 8,646,103 B2 | 2/2014 | Jakobson et al. |
| 8,660,852 B2 * | 2/2014 | Law .................... G06F 16/25 |
| | | 705/345 |
| 8,700,738 B2 * | 4/2014 | Moore ................ H04L 67/565 |
| | | 709/219 |
| 8,701,039 B2 * | 4/2014 | Audet ................ G06F 3/04817 |
| | | 715/764 |
| 8,756,254 B2 * | 6/2014 | Parker, III ............ G06Q 30/01 |
| | | 709/248 |
| 8,756,500 B2 * | 6/2014 | Harris ................ G06F 16/9535 |
| | | 715/273 |
| 8,839,209 B2 * | 9/2014 | Gallagher ........... G06F 11/3612 |
| | | 717/130 |
| 8,887,035 B2 | 11/2014 | McDonald et al. |
| 9,626,637 B2 | 4/2017 | Winters |
| 10,423,909 B2 | 9/2019 | Winters |
| 10,769,563 B2 | 9/2020 | Winters |
| 11,416,790 B2 | 8/2022 | Winters |
| 2001/0044791 A1 | 11/2001 | Richter et al. |
| 2002/0065671 A1 * | 5/2002 | Goerz, Jr. ............ G06Q 10/06 |
| | | 705/1.1 |
| 2002/0072951 A1 | 6/2002 | Lee et al. |
| 2002/0082892 A1 | 6/2002 | Raffel et al. |
| 2002/0120462 A1 * | 8/2002 | Good .................... G06Q 10/10 |
| | | 705/1.1 |
| 2002/0129352 A1 | 9/2002 | Brodersen et al. |
| 2002/0140731 A1 * | 10/2002 | Subramaniam ....... G06F 3/0481 |
| | | 715/762 |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0103019 A1 * | 5/2004 | Reid .................... G06Q 10/063 |
| | | 705/310 |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0243547 A1 * | 12/2004 | Chhatrapati ........ G06Q 10/1093 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0216111 A1 * | 9/2005 | Ooshima ............ G06Q 10/06 |
| | | 700/99 |
| 2005/0223022 A1 * | 10/2005 | Weissman ........... G06F 16/2264 |
| | | 707/999.102 |
| 2006/0015584 A1 * | 1/2006 | Ocko .................... H04L 69/40 |
| | | 709/219 |
| 2006/0116896 A1 * | 6/2006 | Fowler ................ G06Q 10/10 |
| | | 705/1.1 |
| 2006/0153246 A1 * | 7/2006 | Aoki .................... H04L 43/50 |
| | | 370/508 |
| 2006/0195781 A1 * | 8/2006 | Jatavallabha ........ G06Q 10/10 |
| | | 715/208 |
| 2007/0192157 A1 * | 8/2007 | Gooch ................ G06Q 10/10 |
| | | 705/7.41 |
| 2007/0245238 A1 * | 10/2007 | Fugitt ................ G06F 3/0481 |
| | | 715/700 |
| 2007/0265903 A1 * | 11/2007 | Blair .................. G06Q 10/109 |
| | | 705/7.19 |
| 2007/0282812 A1 * | 12/2007 | Johnson ................ G06Q 10/10 |
| 2008/0010243 A1 * | 1/2008 | Weissman ......... G06F 16/24575 |
| 2008/0046471 A1 * | 2/2008 | Moore .................. H04L 67/56 |
| 2008/0056071 A1 * | 3/2008 | Burtner ................ G06Q 10/109 |
| | | 368/28 |
| 2008/0086479 A1 * | 4/2008 | Fry ...................... G06F 16/27 |
| 2008/0091448 A1 * | 4/2008 | Niheu ................ G06Q 10/063 |
| | | 705/301 |
| 2008/0126333 A1 * | 5/2008 | Bezar .................. G06F 16/275 |
| | | 707/999.005 |
| 2008/0249972 A1 | 10/2008 | Dillon |
| 2008/0294663 A1 * | 11/2008 | Heinley .............. G11B 27/34 |
| | | 715/764 |
| 2008/0297513 A1 * | 12/2008 | Greenhill ............ G06Q 99/00 |
| | | 345/589 |
| 2009/0030906 A1 * | 1/2009 | Doshi .................. G06F 16/27 |
| | | 707/999.009 |
| 2009/0037828 A1 * | 2/2009 | Waite .................. G06F 8/38 |
| | | 715/760 |
| 2009/0055729 A1 * | 2/2009 | Audet .................. G06F 3/0485 |
| | | 715/243 |
| 2009/0063415 A1 | 3/2009 | Chatfield et al. |
| 2009/0100342 A1 | 4/2009 | Jakobson |
| 2009/0172565 A1 * | 7/2009 | Jackson .............. H04L 67/10 |
| | | 715/753 |
| 2009/0177744 A1 | 7/2009 | Marlow et al. |
| 2009/0187413 A1 * | 7/2009 | Abels .................. G06Q 10/10 |
| | | 705/1.1 |
| 2009/0187849 A1 * | 7/2009 | Rhee .................. H04M 1/72451 |
| | | 707/999.005 |
| 2009/0187970 A1 * | 7/2009 | Mower ................ H04L 67/025 |
| | | 709/225 |
| 2009/0234706 A1 * | 9/2009 | Adams ................ G06Q 30/08 |
| | | 705/37 |
| 2009/0320035 A1 * | 12/2009 | Ahlgren .............. H04L 51/52 |
| | | 718/104 |
| 2010/0057682 A1 * | 3/2010 | Ramsay, Jr. ........ G06Q 10/10 |
| | | 709/204 |
| 2010/0076946 A1 * | 3/2010 | Barker ................ G06F 16/176 |
| | | 715/255 |
| 2010/0185474 A1 * | 7/2010 | Frank ................ G06Q 10/063114 |
| | | 705/7.15 |
| 2010/0192067 A1 * | 7/2010 | Casalaina .......... G06F 16/24573 |
| | | 715/752 |
| 2010/0235505 A1 * | 9/2010 | Gupta ................ G06Q 10/107 |
| | | 709/225 |
| 2010/0250712 A1 * | 9/2010 | Ellison ................ G06F 3/0481 |
| | | 709/224 |
| 2010/0257457 A1 * | 10/2010 | De Goes ............ H04L 65/1093 |
| | | 707/E17.007 |
| 2011/0021250 A1 * | 1/2011 | Ickman ................ G06F 3/0482 |
| | | 715/764 |
| 2011/0113057 A1 * | 5/2011 | Lee .................... G06F 16/1873 |
| | | 707/769 |
| 2011/0113071 A1 * | 5/2011 | Lee .................... G06Q 50/01 |
| | | 709/206 |
| 2011/0137940 A1 * | 6/2011 | Gradin ................ G06F 16/972 |
| | | 707/769 |

(56) References Cited

U.S. PATENT DOCUMENTS

| | | | | |
|---|---|---|---|---|
| 2011/0196883 | A1* | 8/2011 | Brooks | G06F 16/27 707/812 |
| 2011/0202508 | A1* | 8/2011 | Brooks | G06F 16/176 707/687 |
| 2011/0202911 | A1* | 8/2011 | Brooks | H04L 63/1433 717/174 |
| 2011/0214086 | A1* | 9/2011 | Narayanan | G06F 3/0482 715/784 |
| 2011/0218958 | A1 | 9/2011 | Warshavsky et al. | |
| 2011/0247051 | A1 | 10/2011 | Bulumulla et al. | |
| 2011/0258561 | A1* | 10/2011 | Ladouceur | H04L 51/52 715/753 |
| 2011/0283224 | A1* | 11/2011 | Ramsey | G06F 3/04855 715/781 |
| 2011/0283266 | A1* | 11/2011 | Gallagher | G06F 11/3409 717/130 |
| 2011/0314142 | A1* | 12/2011 | Newton | G06F 16/951 709/224 |
| 2011/0314404 | A1* | 12/2011 | Kotler | G06Q 10/109 715/772 |
| 2012/0016805 | A1* | 1/2012 | Graupner | G06Q 10/06 705/342 |
| 2012/0042218 | A1 | 2/2012 | Cinarkaya et al. | |
| 2012/0066061 | A1* | 3/2012 | Clement | G06Q 50/16 705/14.49 |
| 2012/0072855 | A1* | 3/2012 | Baldwin | H04L 51/043 715/752 |
| 2012/0078917 | A1* | 3/2012 | Gradin | G06F 16/23 707/E17.084 |
| 2012/0078981 | A1* | 3/2012 | Gradin | G06F 16/90 707/812 |
| 2012/0089610 | A1* | 4/2012 | Agrawal | G06Q 50/01 707/741 |
| 2012/0096046 | A1* | 4/2012 | Kucera | G06F 16/21 707/802 |
| 2012/0143817 | A1* | 6/2012 | Prabaker | H04L 63/105 707/825 |
| 2012/0143917 | A1* | 6/2012 | Prabaker | G06F 16/00 707/E17.107 |
| 2012/0173985 | A1* | 7/2012 | Peppel | G06F 16/90328 715/730 |
| 2012/0191507 | A1* | 7/2012 | Bramworth | G06Q 10/103 705/7.36 |
| 2012/0216130 | A1* | 8/2012 | Porro | G06Q 50/01 715/753 |
| 2012/0233137 | A1 | 9/2012 | Jakobson et al. | |
| 2012/0290407 | A1 | 11/2012 | Hubbard et al. | |
| 2013/0018956 | A1* | 1/2013 | McConnell | H04L 51/216 709/204 |
| 2013/0024452 | A1* | 1/2013 | Defusco | G06Q 10/103 707/E17.089 |
| 2013/0066677 | A1* | 3/2013 | Killoh | G06Q 30/0277 705/7.29 |
| 2013/0185347 | A1* | 7/2013 | Romano | H04L 12/1818 709/203 |
| 2013/0212497 | A1 | 8/2013 | Zelenko et al. | |
| 2013/0218888 | A1* | 8/2013 | Seligmann | G06Q 50/01 707/E17.058 |
| 2013/0218948 | A1 | 8/2013 | Jakobson | |
| 2013/0218949 | A1 | 8/2013 | Jakobson | |
| 2013/0218966 | A1 | 8/2013 | Jakobson | |
| 2013/0247216 | A1 | 9/2013 | Cinarkaya et al. | |
| 2013/0304763 | A1* | 11/2013 | Esposito | G06F 16/00 707/783 |
| 2014/0081690 | A1* | 3/2014 | Winters | G06Q 10/06311 705/7.15 |
| 2014/0359537 | A1 | 12/2014 | Jackobson et al. | |
| 2015/0006289 | A1 | 1/2015 | Jakobson et al. | |
| 2015/0007050 | A1 | 1/2015 | Jakobson et al. | |
| 2015/0095162 | A1 | 4/2015 | Jakobson et al. | |
| 2015/0142596 | A1 | 5/2015 | Jakobson et al. | |
| 2015/0172563 | A1 | 6/2015 | Jakobson et al. | |
| 2015/0178858 | A1* | 6/2015 | Agrawal | G06Q 50/01 705/319 |
| 2018/0005165 | A1 | 1/2018 | Winters | |
| 2019/0370727 | A1 | 12/2019 | Winters | |
| 2020/0356939 | A1 | 11/2020 | Winters | |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

Sales Cloud datasheet (DS_SalesCould_2011-08-03, Copyright 2011, salesforce.com Inc. (as retrieved from https://web.archive.org/web/2011 0614044328/http://www.salesforce.com/crm/sales-force-automation/)).

Salesforce Template (Copyright 2009 Blue Mango Learning Systems, http://salesforce.screensteps.com/).

Salesforce.com website (various pages from 2011, as retrieved from https://web.archive.org/web/20110208014507/ http://www.salesforce.com/).

U.S. Final Office Action dated Jun. 26, 2015 issued in U.S. Appl. No. 13/836,390.

U.S. Notice of Allowance dated Apr. 30, 2020 issued in U.S. Appl. No. 16/542,070.

U.S. Notice of Allowance dated Apr. 4, 2022, in U.S. Appl. No. 16/947,356.

U.S. Notice of Allowance dated Dec. 6, 2016 issued in U.S. Appl. No. 13/836,390.

U.S. Notice of Allowance dated May 15, 2019 issued in U.S. Appl. No. 15/457,612.

U.S. Office Action dated Apr. 15, 2020 issued in U.S. Appl. No. 16/542,070.

U.S. Office Action dated Dec. 23, 2014 issued in U.S. Appl. No. 13/836,390.

U.S. Office Action dated Dec. 8, 2021 issued in U.S. Appl. No. 16/947,356.

U.S. Office Action dated Jun. 13, 2016 issued in U.S. Appl. No. 13/836,390.

U.S. Office Action dated Nov. 14, 2018 issued in U.S. Appl. No. 15/457,612.

Visual Workflow datasheet (OS_VisualWorkflow_2011-04-13, Copyright 2011, salesforce.com Inc. (as retrieved from https ://web.archive.org/web/20 11 0915144402/ http://www.salesforce.com/ assets/pdf/datasheets/ Visuai_Process_Manager_DataSheet.pdf).

* cited by examiner

Client side method of managing business deals

FIG. 93

Universal - 500 Units
Deal | 9303 | 9303 | Universal Atlantic, USA | Hillary Williams | Neighboring
9303    9304    9305
9390

9302

Deal Details

Owner
Madison Rigsby

Owner Phone Number
415-567-8765

Name
Universal Atlantic Corporation

Primary contact
John Amos

Website
www.universalco.com

Primary contact email
jamos@universal.com

Previous sales total
$10.7M

Primary contact phone number
415-657-6565

Last Sale
5000 Units - $1.2M

Name
Universal Atlantic Corporation

Primary contact
John Amos

9301
9305
9307
9309
9311
9313
9321

METHOD AND SYSTEM FOR MANAGING BUSINESS DEALS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to methods and system for managing business deals in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Many small businesses use disorganized ways of tracking contacts and deals, such as, through a combination of spreadsheets and a low-end crm product. Methods are needed for small businesses to track and organize bigger deals at a reasonable budget.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The rapid, secure, easy to use, and efficient retrieval of accurate information and subsequent delivery of this information to the user system in a manner that is easy to understand has been, and continues to be, a goal of administrators of database systems.

Unfortunately, the user of conventional database approaches for managing business deals might be slow and inefficient.

Accordingly, it is desirable to provide techniques enabling a user to manage business deals in a multitenant database system to improve performance, security, efficiency, and the ease of use of the database system.

BRIEF SUMMARY

In accordance with embodiments, there are provided mechanisms and methods for managing business deals. The mechanisms and methods for managing business deals may enable embodiments to provide a dynamic and interactive user-interface including unlimited contacts, accounts, opportunities, allowing users to create tasks, events, leads (e.g., from Data.com), reports, dashboards, instant messenger, external deal spaces, email service (e.g., Outlook), a cloud-based productivity suite for businesses that allows work on any device (e.g., Google apps), mobile access, private messaging, lead management, mass email templates, social media monitoring (e.g., from Radian6), role-based sharing and security, and additional storage. The ability of embodiments to provide interaction with social media, email, and other business apps may enable the user to more efficiently manage business deals. Many small businesses use disorganized ways of tracking contacts and deals, such as, through a combination of spreadsheets and a low-end crm product. Methods are needed for small businesses to track and organize bigger deals at a reasonable budget. In an embodiment (and by way of example), a method for managing business deals in a multi-tenant environment is provided. The method includes receiving a request for a subscription associated with managing business deals. In response to receiving the request, a dynamic and interactive user-interface is sent from a host machine. A request to add on-demand system features and social communication tools is received. In response, on-demand system features and social communication tools are added by the host machine. A request to set user-defined operability is received. In response, user-defined operability is set by the host machine (the machine has a processor and a memory for storing the user-defined operability).

Although in an embodiment the managing of business deals is implemented via an on-demand multitenant database, the managing of business deals is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIGS. 74-96 are screenshots illustrating an example user interface screen for using a method of managing business deals after it has been set up in an embodiment.

DETAILED DESCRIPTION

General Overview

Systems and methods are provided for a method of managing business deals.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing methods of managing business deals will be described with reference to example embodiments.

The following detailed description will first describe systems and methods of managing business deals in accordance with aspects and embodiments. Methods of using the system and methods of managing business deals are then detailed. Screenshots showing aspects of the systems and methods of managing business deals are then detailed. Following the description of screenshots, the system for using the methods is described.

FIGS. 1-8 illustrate bock diagrams of representative systems for methods of managing business deals in an embodiment.

Figure 1:
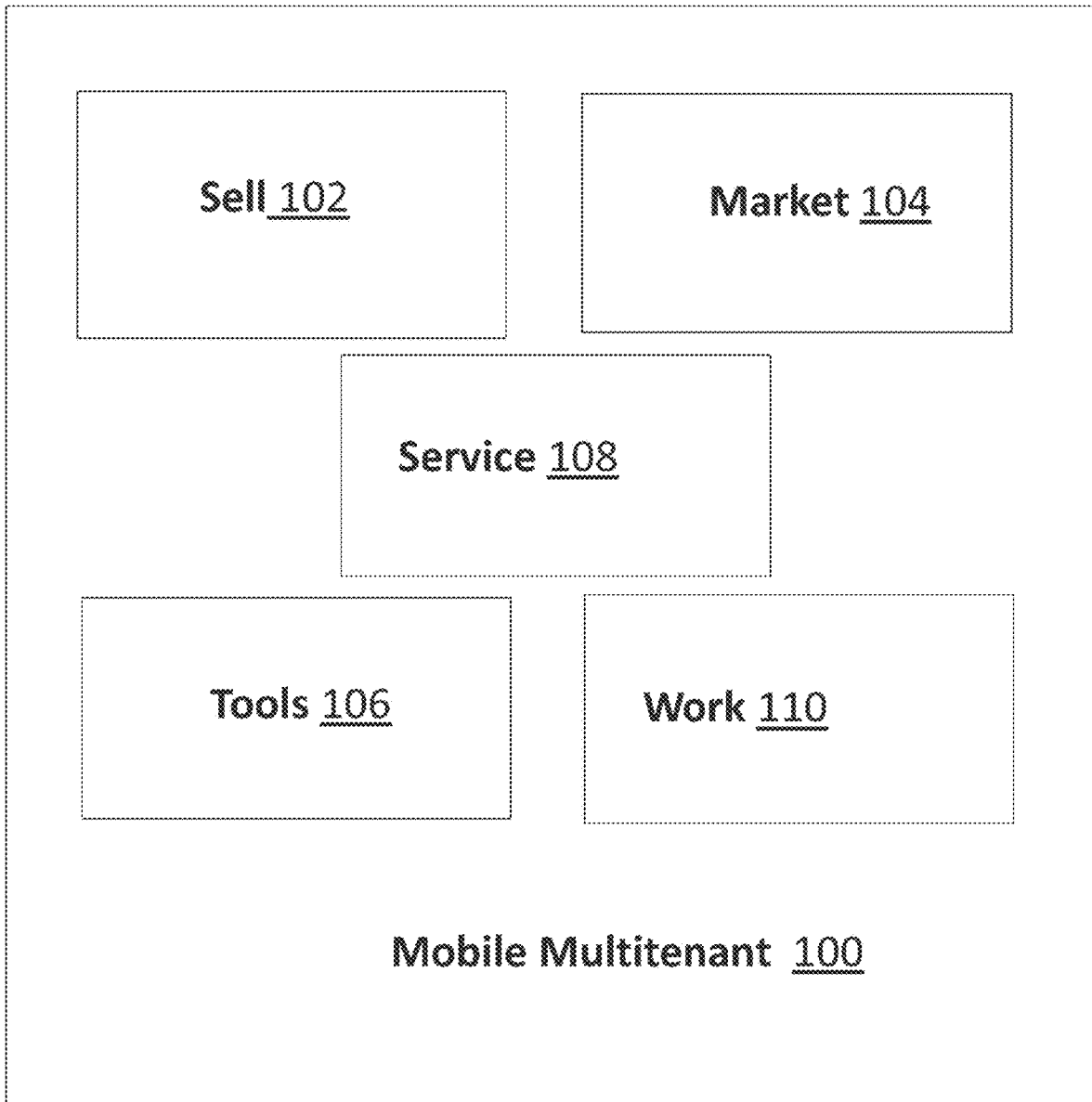
FIG. 1 illustrates a block diagram of an example of a mobile multitenant environment wherein a system and method for managing business deals using an on-demand database service might be used.

FIG. 1 illustrates a block diagram of an embodiment of a mobile multitenant system 100 for methods of managing business deals which may include embodiments of sell 102, market 104, tools 106, service 108 and work 110. The elements previously listed will be discussed in detail subsequently in the specification. In other embodiments, system 100 may not have all of the elements or components listed above and/or may have other elements or components instead of or in addition to those listed.

In at least one embodiment, the mobile multitenant database includes tools for business deal management that provides tools and functions related to selling, marketing, tools, service, and work. These functions may interact to create a strong business environment.

Sell 102 provides tools that allow a user or business using the multitenant database to keep track of sales to customers, to identify possible customers (e.g., leads), to calendar customer meetings, and other functions related to selling a product or service.

Market 104 provides tools that allow a user or business using the multitenant database to market their business. Marketing tools include advertising, email templates, branding, trademarks, and other functions related to marketing.

Tools 106 provides miscellaneous business tools and functions that allow the user or business using the multitenant database to sell, market, produce, and protect a product or service. Business tools 106 may include platform developer, administration, etc.

Service 108 provides functions that help a user or business using the multitenant database with customer relationships. Tools for customer relationships may include call center, and help desk.

Work 110 provides functions that allow a user or business using the multitenant database to find services for work productivity. Work productivity functions may include apps for human resources, accounting, management, etc. (e.g., work.com).

Figure 2:
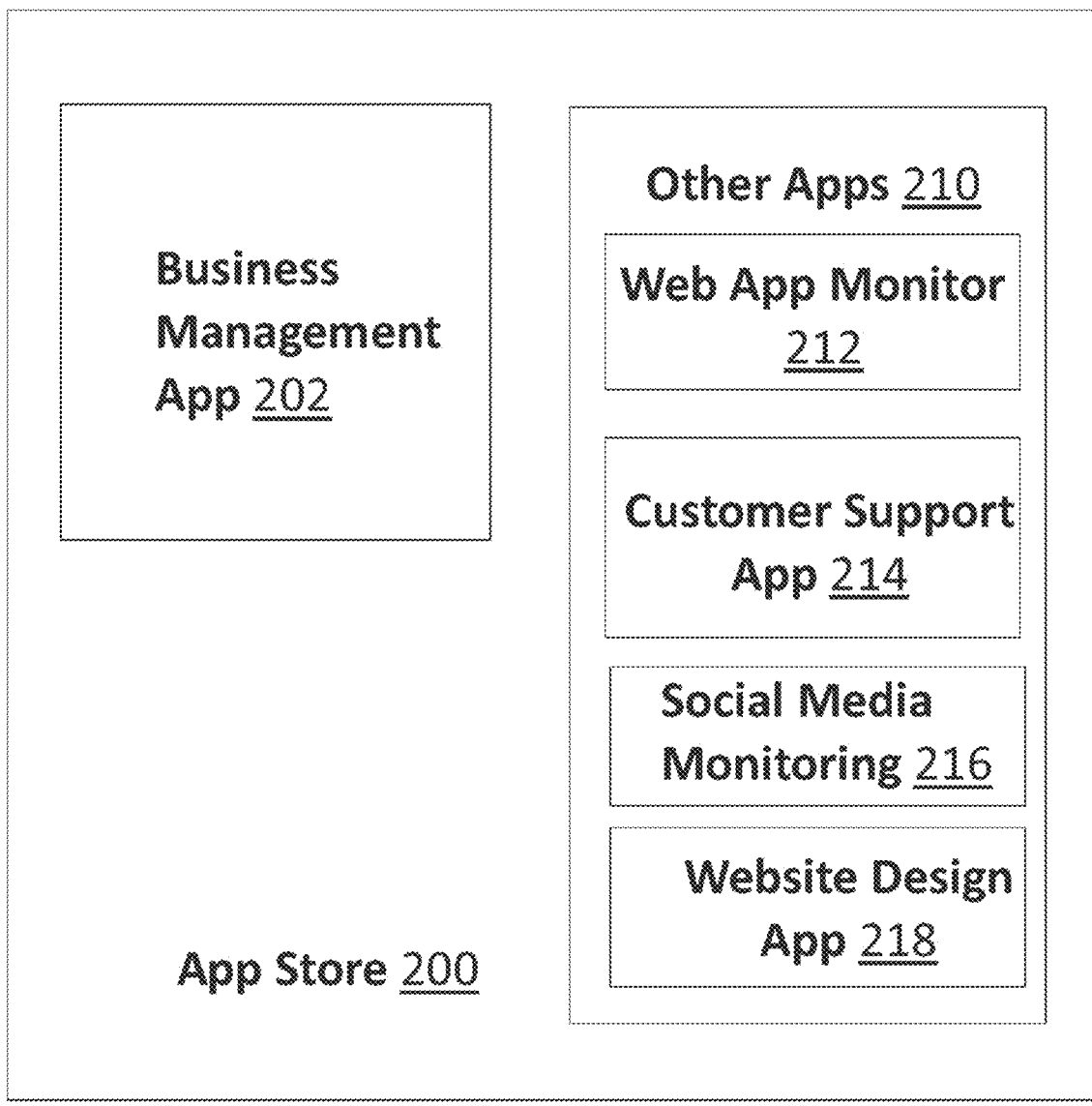
FIG. 2 illustrates a block diagram of an example of an app store for a system and method for managing business deals using an on-demand database service.

FIG. 2 illustrates a block diagram of an embodiment of a system for selling apps 200 for methods of managing business deals which may include embodiments of business management app 202, and other apps 210, including: web app monitor app 212, customer support app 214, social media monitoring app 216, and website design app 218. The elements previously listed will be discussed in detail subsequently in the specification. In other embodiments, system 200 may not have all of the elements or components listed above and/or may have other elements or components instead of or in addition to those listed.

As part of the user-defined operability of methods and systems for managing business deals the user may choose the applications associated with the user's account. The system for selling apps 200 functions to provide a user with a choice of these applications that, when used together, or alone provide a dynamic and interactive user-interface for a business, including but not limited to, business management, customer support, social media monitoring, and website production.

Business management app 202 functions to track, plan and/or close a user's deals. In at least one embodiment, the business management app 202 is a dealpath app. Business management app 202 provides functionality for systems and methods of managing business deals by providing a dynamic and interactive user-interface including unlimited contacts, accounts, opportunities, allowing users to create tasks, events, leads (e.g., from Data.com), reports, dashboards, instant messenger, external deal spaces, email service (e.g., Outlook), a cloud-based productivity suite for businesses that allows work on any device (e.g., Google apps), mobile access, private messaging, lead management, mass email templates, social media monitoring (e.g., from Radian6), role-based sharing and security, and additional storage. In at least one embodiment, a developer for the parent company (e.g., salesforce) may test applications (e.g., using sandbox). In addition to the business management app 202 (e.g., the dealpath app), the user may choose other apps 220 to create the user-defined operability of the method.

In at least one embodiment, the other apps 210 may be any apps in addition to those listed below that may provide tools and functions involved in the management of business deals.

Web app monitor app 212 is an application that allows the user to monitor web applications in real time. In at least one embodiment, the web app monitor app is loggr. In at least one embodiment, the monitor app (e.g., loggr) provides tools and functions via a control panel with event logging, user monitoring, analytics, notifications and the ability to track performance metrics.

Customer support app 214 provides tools and functions for the user and/or a small business to grow support teams and create customer support such as call center, multilingual help, helpdesk, a blog, and a library of information about customer support. In at least one embodiment, customer support app 214 is Desk.com.

Social media monitoring app 216 provides tools and functions for social media monitoring, engaging and sharing tools, social marketing and tracking. In at least one embodiment, social media monitoring app 216 is Radian6.

Website design app 218 provides tools and functions for content management, the ability to design and publish websites, the ability to design social pages, and mobile experiences. In at least one embodiment, website design app 218 is Site.com.

In at least one embodiment, any of the apps 202-218 may be purchased and/or downloaded from an app store. In at least one embodiment, any of the apps 202-218 may be previewed via a video to allow a user to decide if the user wants to download the app. FIGS. 15-20 provide examples of other apps and how to download them from an app store.

Figure 3:
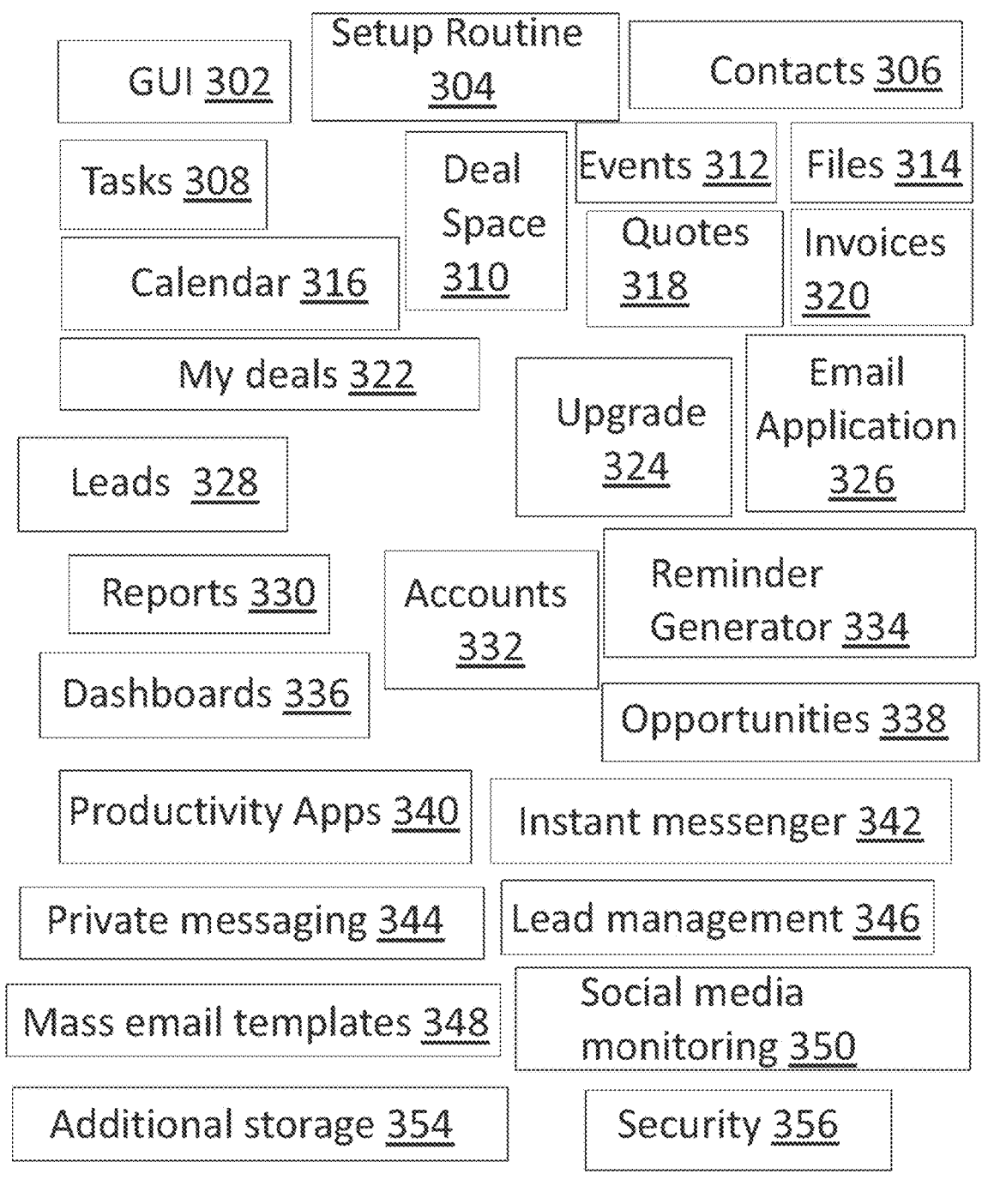
FIG. 3 illustrates a block diagram of an example of a business management app (e.g., dealpath app) for a system and method for managing business deals using an on-demand database service.

FIG. 3 illustrates a block diagram of an embodiment of a business management app 300 (e.g., a dealpath app) for methods of managing business deals (see also 202 in FIG. 2), which may include embodiments of GUI 302, setup routines 304, contacts 306, tasks 308, Deal Space 310, events 312, files 314, calendar 316, quotes 318, invoices 320, my deals 322, upgrade 324, email application 326, leads 328, reports 330, accounts 332, reminder generator 334, dashboards 336, opportunities 338, productivity apps 340, instant messenger 342, private messaging 344, lead management 346, mass email templates 348, social media monitoring 350, additional storage 354, and security 356. The elements previously listed will be discussed in detail subsequently in the specification. In other embodiments, system 300 may not have all of the elements or components listed above and/or may have other elements or components instead of or in addition to those listed.

The graphical user interface (GUI) 302 functions to provide a user interface for a system and methods for managing business deals. The GUI is explained in more detail in FIG. 5

Figure 28:
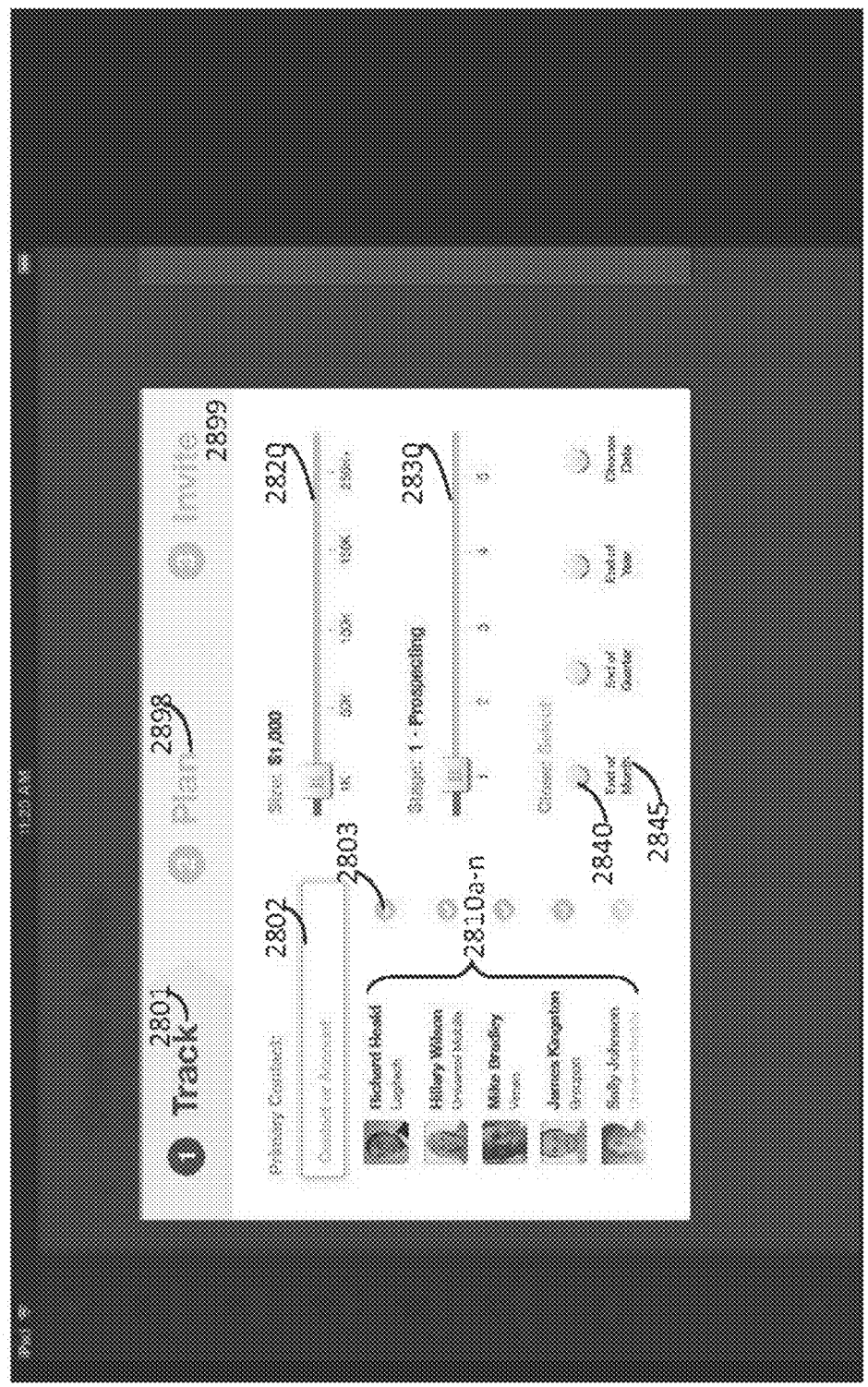
Figure 29:

Setup routines 304 function to set up one or more deals, and setup routines 304 may include routines for tracking a deal, inviting participants to a deal and planning meetings, tasks, etc for a deal. Setup routines 304 is explained in more detail in FIG. 4 and examples of setup routine screenshots are shown in FIGS. 28-29 (track), FIGS. 30-31 (Plan) and FIGS. 32-33 (invite).

Contacts 306 may include leads for making deals, customers, team members, persons working on a deal with the user, and any contacts taken from any of the user's social media or email sites. The contacts link 306 in the business management app (e.g., a dealpath app) functions to send the user to a contacts page where the user may edit, add, or remove contacts. The user may also pull in contact information from a user's phone, email, and/or social networking sites. The contacts from social networking sites may be accessed by the system with the user's consent. Contacts may be a link in a navigation bar, a button on a webpage and/or a field. Contacts 306 may be accessed in a variety of ways, including but not limited to the side navigation bar in the business management app (e.g., a dealpath app), when sharing a file or sending an email (contacts are discussed in further detail in FIGS. 6, and 10).

Tasks 308 provides a method for a user to set up tasks to be completed for a given deal or deals. The types of tasks 308 may include calling, reviewing, following up, asking, working on, etc. For example, calling may involve setting up a task for one or more team members to call the primary contact at another company involved in a deal by a certain date. Tasks may be set up by accessing a link in a navigation bar, a button on a webpage and/or a field. Tasks are explained further with reference to FIGS. 6, 10, 76 and 95. The tasks may be set up by the user or a team member to be completed by one or more team members and/or the user.

Figure 70:
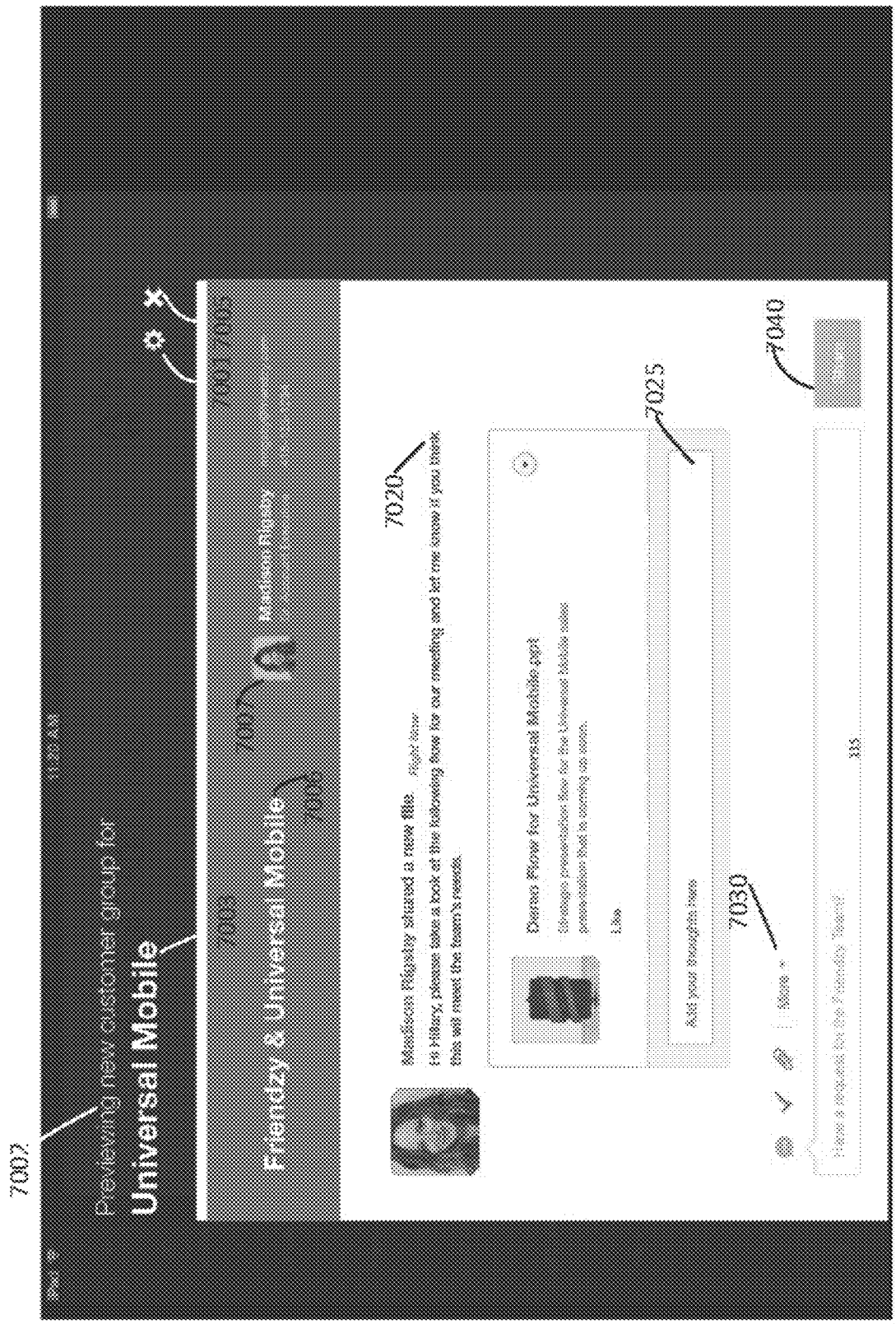

Deal space 310 may be a secure site for the user and a customer to work out a deal. Deal space may be a secure, brandable, private website for communicating directly with the customer involved in the deal. Thus, there may be multiple deal spaces for each user that are associated with different deals and/or with different customers. Deal space 310 provides storage and functions for managing one or more deals. In at least one embodiment, the deal space is secure and may be shared with one or more members of a team, customers, or outside venders for a given deal. Deal space 310 may include a webpage, which may automatically be generated by sharing a file with a customer. In at least one embodiment, after the deal space page is generated, the deal space may be altered by the user to fit the user's needs. FIG. 70 provides an example of a deal space page.

Events 312 functions to set up events to be completed for a given deal or deals by the user and/or team members. The types of events 312 that may be set up may include meetings, site visits, pitches, presentations, reviewing or analyzing files, budgets, or any type of activity that might be involved in managing a deal. Events may be a link in a navigation bar, a button on a webpage and/or a field (see also FIGS. 8 and 11). The events may be set up and/or may be completed by team members, managers, contacts, primary contacts, and users. The events may be set up by selecting an events button (e.g., by tapping on the event button in a navigation bar, by selecting a previous event in a list of posts, by selecting a reminder post, or by searching for events. The events may be set up by any one, or all, of the user, the customer, a team member, and/or a member of the business the user is doing a deal with and/or outside people (e.g., a service provider, a speaker, etc.).

Files 314 is a collection of files stored by the users and/or others. Files 314 may be included in a post, event, comment, or task by activating the file button in a navigation bar. Activating a "files" button, sends the user to a page on which the user may create a post that includes one or more files. Files may be any type of media, including but not limited to, pictures, videos, presentations, written documents, and audio. Files may be posted to all team members or contacts or may be shared with specific team members or contacts. Files may be posted with explanations or with only a file name or title. The file may be shared with one or more team members or contacts. In at least one embodiment, a deal space may also be shown to those team members and/or contacts that are indicated to see the file.

The calendar 316 may include a timeline, any deadlines or due dates, the start of the deal, projected dates, event dates, task dates, and any dates that are pertinent to a particular deal. The user may choose to pull in dates from outside calendars that are pertinent to the deal. Pulling in dates may be accomplished during the set up of the business management app (e.g., dealpath app). In at least one embodiment, the app will automatically ask the user if the user wants the business management app to access the user's calendar. The user may choose to allow the system to access the user's calendar and then choose to accept or delete any dates that are included.

Quotes 318 may be a database table, and may store information about any type of monetary quote that has been given to a client for any product or service. The quote 318 may include the maximum or minimum limit on quantity and price. Quotes 318 may be accessed by selecting the quotes link or button on a navigation bar or on a page (see, for example, "more" on the side or cross navigation bars in FIGS. 6 and 8).

Figure 96:
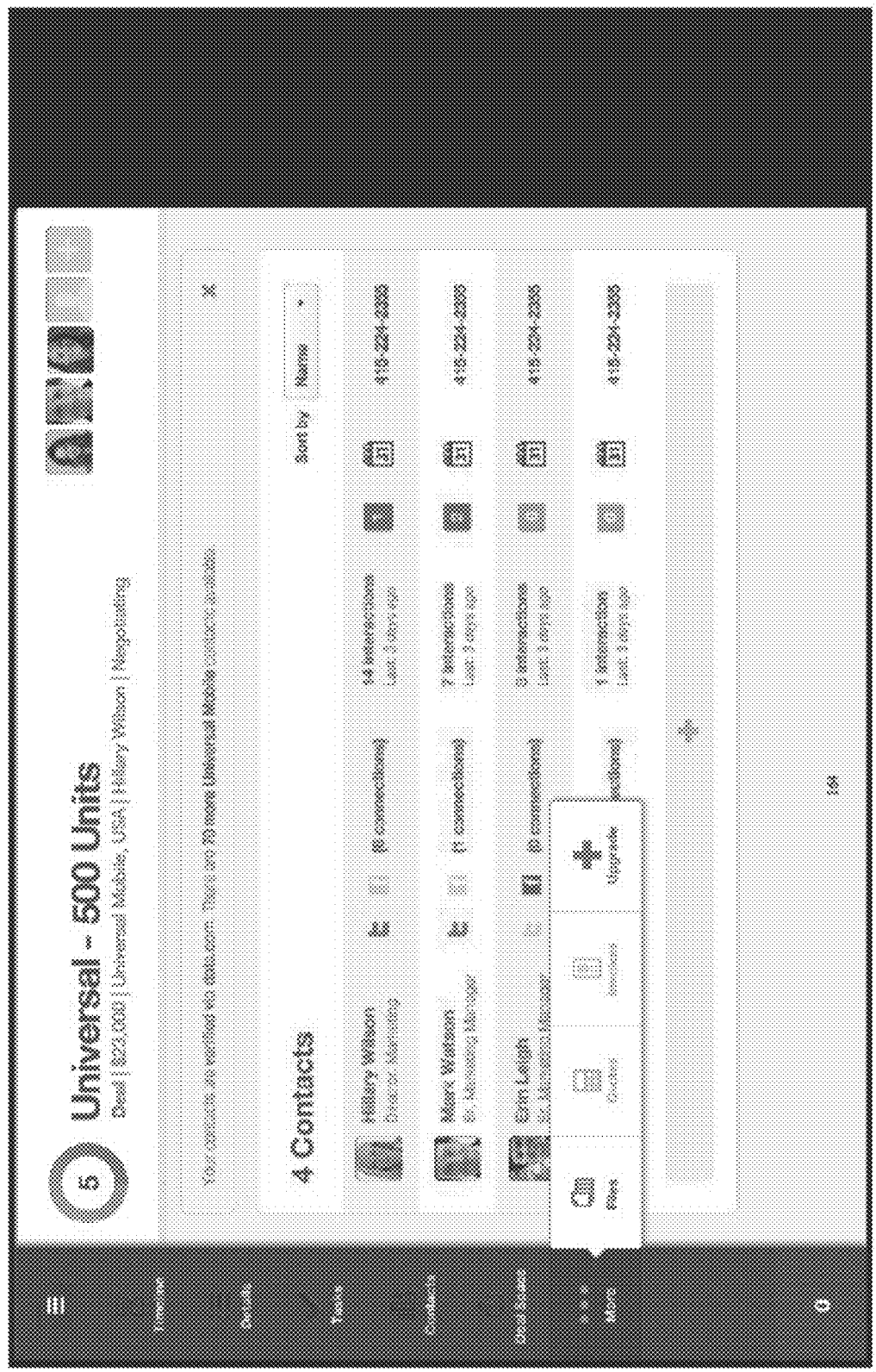

Invoices 320 may be accessed via the side navigation bar (such as the more link in FIG. 96). Invoices are bills and/or methods of charging and keeping track of payment for goods and services. Invoices may include information such as the company or person to be billed, the biller, the goods or services, unit price, quantities, dates of service, total price, etc.

In at least one embodiment, my deals 322 is a link that sends the user to a page where the user may manage one or more deals that the user is involved in. My deals provides the user with a snapshot of the revenue, activities, and tasks that are currently occurring for a particular deal. The user may review the deal, set up events, set up tasks, and get detailed information about sales, revenues and/or the team from the my deals page. FIGS. 76-83 provide embodiments of screenshots showing leaderboard links, calendar, deal graph, activities or events, and tasks. The user may navigate to the my deals page 322 from the side navigation bar, the and/or by searching for the my dealspage.

Upgrade 324 functions to send the user to the upgrade page (see e.g., FIG. 111) where the user may find out about upgrades associated with the business management app (e.g., the dealpath app). The upgrades will provide the user with more features and apps. In at least one embodiment, the basic package (also called the free package) provides the user with the following: 1. unlimited contacts, accounts, opportunities 2. Create tasks and events, 3. ten leads from Data.com, 4. basic reports, and dashboards, 5. instant messenger, 6. five external deal spaces, 6. outlook and google apps, and 7. mobile access. This package might be all that is necessary for a single person or a very small business. Upgrade 324 may be accessed by selecting the upgrades link or button on a navigation bar or on a page (see, for example, "more" on the side or cross navigation bars in FIGS. 6 and 8).

E-mail application 326 provides the user with an email application that may come from the parent company (the company that makes the business management app—e.g., Salesforce). Alternatively, the email application may come from a separate email source to be used within the business management app (e.g., dealpath app). For example, a user might be using a Yahoo!®, Gmail®, Comcast®, or other email source and have a need to send an email through the business management app (e.g., dealpath app) to a customer, contact, or team member.

Leads 328 may be a database table that stores information about leads. Leads 328 may include names, companies and/or any type of source for customers. The leads in leads 328 may be potential customers. Leads may be obtained from an app or website. In at least one embodiment, the information for leads 328 may be obtained from another application or may be another application, such as Data.com, which provides access to business data. Leads 328 may includes lists and information about customers, businesses, and companies worldwide. The information from leads 328 (e.g., data.com) provides the user with leads.

Reports 330 provides a functionality to produce reports based on the business information having to do with one or more deals in the business management app. The reports may include information about tasks, activities, accomplishments, revenue and sales information (e.g., leaderboard) information, the timeline, comments, events, revenues, sales revenues, calendared due dates, etc.

Accounts 332 provides a functionality to keep track of customer accounts. Accounts 332 may be an array of tables for tracking customer accounts, including records, sales, deals, etc.

Reminder generator 334 functions to remind a user about tasks, events, meetings, etc. that have deadlines and/or need to be completed by a specified date, by generating reminders. Reminder generator 334 may be set up to remind a user once or multiple times before a deadline. Reminder generator 334 may be set up to remind a user at specified times before a deadline, at regular intervals until the deadline or a default choice may be used. The reminder may be set up for the person performing the task, the team and/or the person involved in the event. For example, reminder generator 334 may remind the user to make sales calls, check on customers, set up events, set up tasks, etc.

Dashboards 336 may be included as part of the graphical user interface (GUI) to provide links for various functions. Dashboard 336 may be a user interface that may somewhat resemble an automobile's dashboard. Dashboards 336 may organize and present information in a way that is easy to read. Dashboards 336 may provide a summary of the status of various activities that are being performed and/or tracked by the business management app. In at least one embodiment clicking on various features of the dashboard 336 brings the user to the portion of the application where that feature is handled. In at least one embodiment, icons and buttons are used on the dashboard in such a way that the user instantly recognizes the similarity to other dashboards used in other GUI's or apps.

Opportunities 338 may be a table storing information about any type of deal. Thus, the terms "opportunities" and "deals" are interchangeable. Deals may come from leads, sales, business activities, networking, and/or social media. Opportunities 338 may be an array of tables for tracking opportunities, including records, sales, leads, etc.

Productivity apps 340 may be a collection of any type of productivity application forming a productivity suite for businesses. In at least one embodiment, productivity apps 340 may be Google apps—or another cloud-based productivity suite for businesses and helps the user and the user's team connect and get work done from anywhere on any device. In an embodiment, productivity apps 340 is simple to set up, use and manage, and results in the user being able to work smarter and focus on other matters.

Instant messaging 342 provides instant messaging (IM) within teams, to customers, and to any contacts associated with a business deal. Instant messaging 342 is a form of communication over the Internet that offers quick transmission of text-based messages from sender to receiver. Instant messaging 342 may include enhanced modes of communication, such as live voice or video calling, video chat and inclusion of hyperlinks to media. In at least one embodiment, instant messaging 342 is an app provided by the parent company (e.g., salesforce).

Private messaging (PM) 344 functions to send instant messages to one or more people without others knowing.

Lead management 346 provides a functionality to manage leads in a business environment. Lead management includes keeping track of lead information, which leads have been contacted, what the result was, which leads are interested in what aspect of the business, who contacted the leads, how much the lead purchased, etc.

Mass email templates 348 are templates that provide the user with an easy way to send mass emails about any aspect of the business. Mass email templates 348 may work with any email application.

Social media monitoring app 350 was explained, above in conjunction with FIG. 2 (216), but in short, social media monitoring app (e.g., radian 6) is an application that works with the business management app for social media monitoring, engaging and sharing tools, social marketing and tracking. Social media monitoring 350 involves harnessing the power of social media to meet business needs. Social media may be monitored by using a social media monitoring app such as radian6. The social media may include, but is not limited to, facebook, twitter, myspace, linked in, and other social media programs.

Additional storage 354 may include any type of storage on the system. Depending on the size of the business, different amounts of storage may be needed. Therefore, the amount of storage may be related to the type of package a business purchases (see, for example, FIG. 111).

Security 356 is a module that provides security for the business management app. In an embodiment, security 356 provides role-based sharing and security. Security 356 may provide role-based access to different aspects of the business management, such as sharing and security. The users may differ in their respective capacities, and the capacity of a particular user might be entirely determined by permissions (permission levels) for the current user. For example, a salesperson may have different access from an administrator. In systems with a hierarchical role model, users at one permission level may have access to applications, data, and database information accessible by a lower permission level user, but may not have access to certain applications, database information, and data accessible by a user at a higher permission level. Different users may have different capabilities with regard to information, depending on a user's security or permission level.

The business management app may also include Sandbox 358 a developer instance of the parent company (e.g., salesforce) to text applications. The parent company may be the company that produces and sells the business management app.

Figure 4:
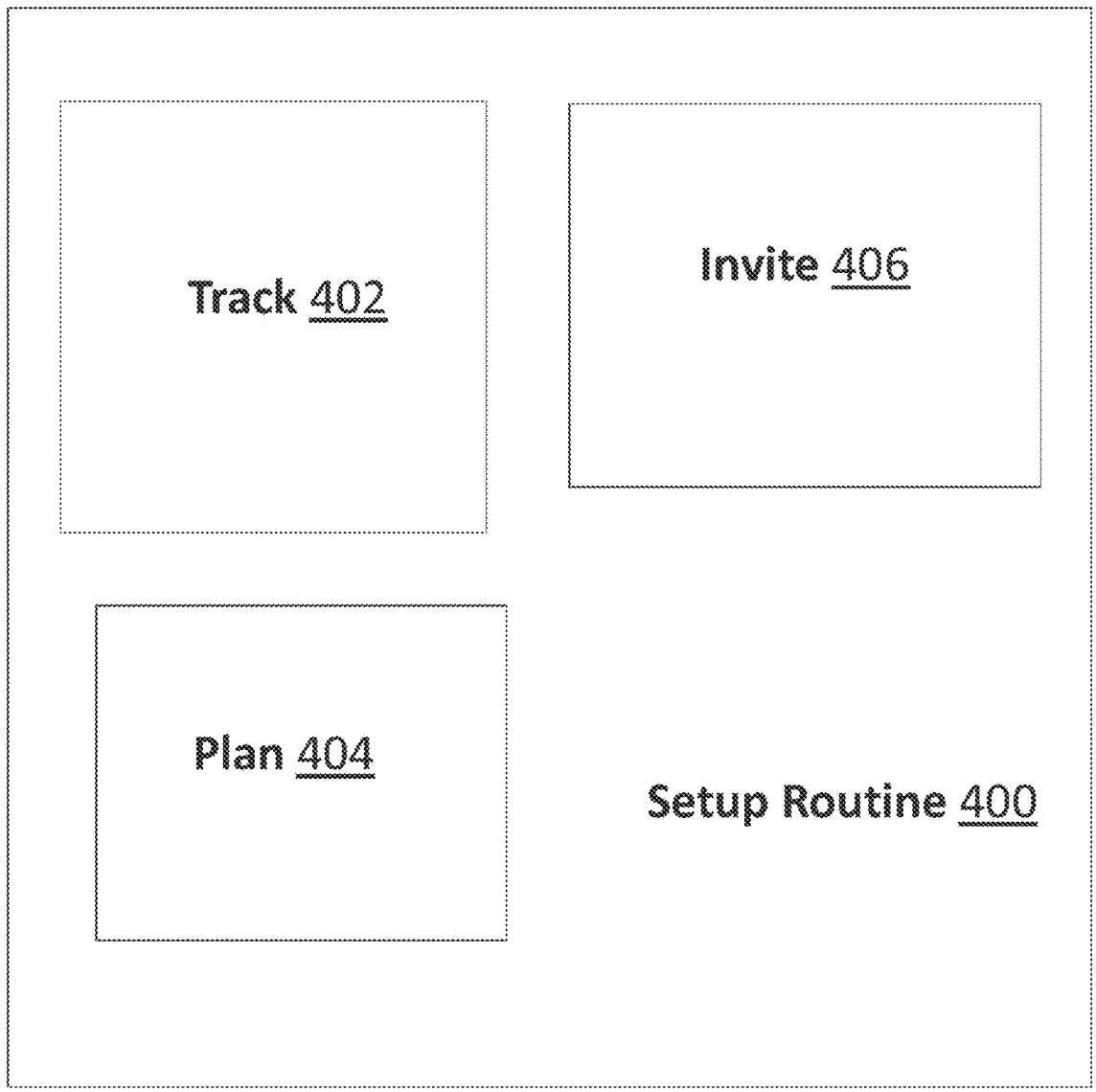
FIG. 4 illustrates a block diagram of an example of a set-up routine for a system and method for managing business deals using an on-demand database service.

FIG. 4 illustrates a block diagram of an embodiment of a setup routine system 400 for methods of managing business deals (see also 304 in FIG. 3) which may include embodiments of track 402, plan 404, and invite 406. In other embodiments, setup routine system 400 may not have all of the elements or components listed above and/or may have other elements or components instead of or in addition to those listed.

Setup routine system 400 functions to set up one or more deals and includes tracking, inviting and planning. Setup routine system 400 is explained in more detail in FIG. 4 and examples of setup routine screenshots are shown in FIGS. 28-29 (track), FIGS. 30-31 (Plan) and FIGS. 32-33 (invite).

Figure 26:
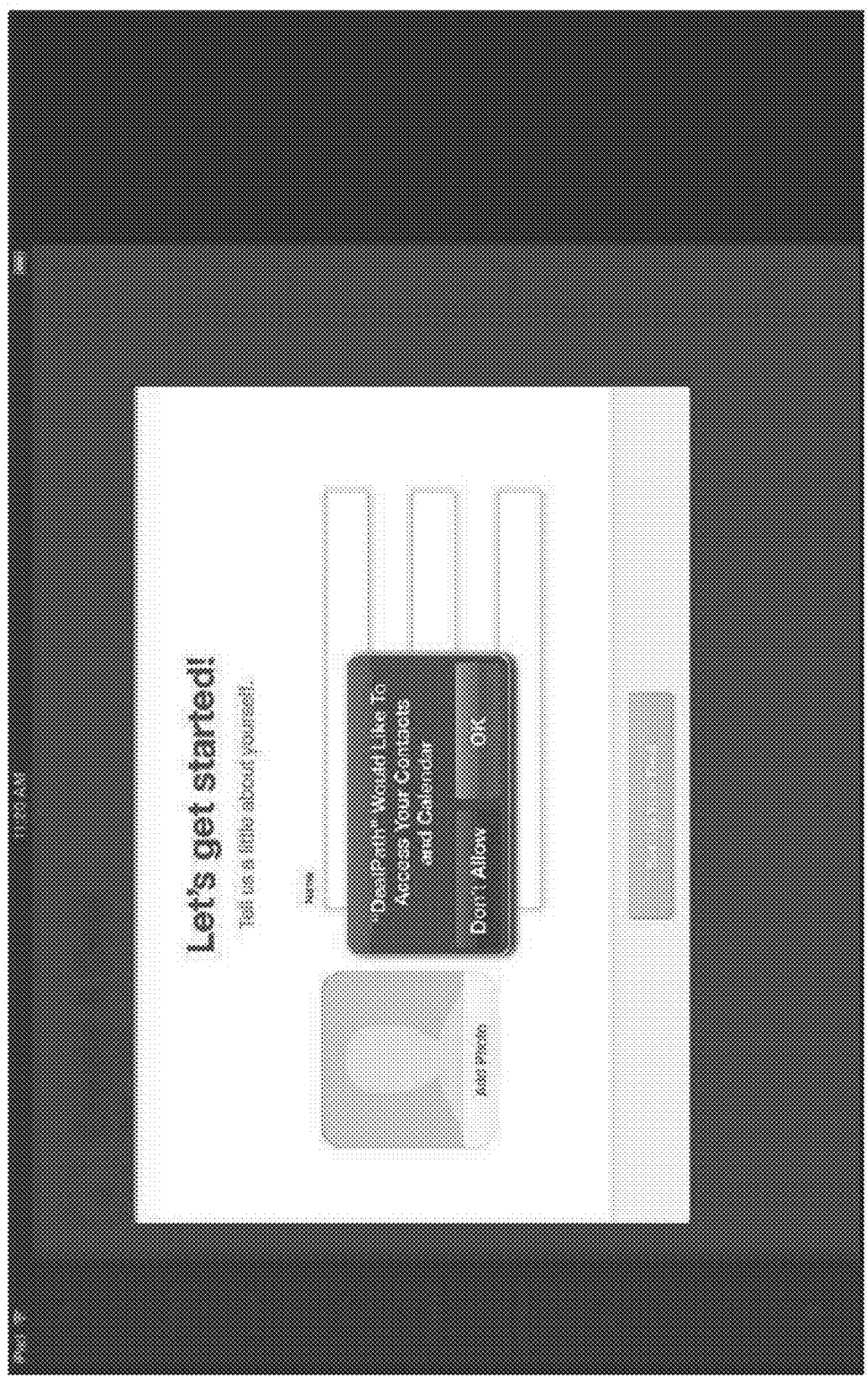

Tracking 402 includes adding contacts and choosing a primary contact, setting the size of the deal, setting the status (e.g., stage) of the deal, and setting the close date (see also FIGS. 28 and 29). The action of accessing the user's email and calendar by the system may occur before the step of tracking, planning and/or inviting (FIG. 26 provides an example of tracking).

Planning 404 may include setting up the additional contacts associated with a deal and setting up meetings associated with a deal. The contacts may include contacts chosen from within the user's company and/or from another company or other companies associated with the deal. Contacts may also be from other sources. Contacts may include team members within the user's company. Some of the contacts and/or meetings may come from the system accessing the user's email and calendar. Optionally, the user may input the contacts and meetings associated with the deal. Some steps involved in (planning 404 will be discussed further in conjunction with FIGS. 30 and 31).

Figure 30:
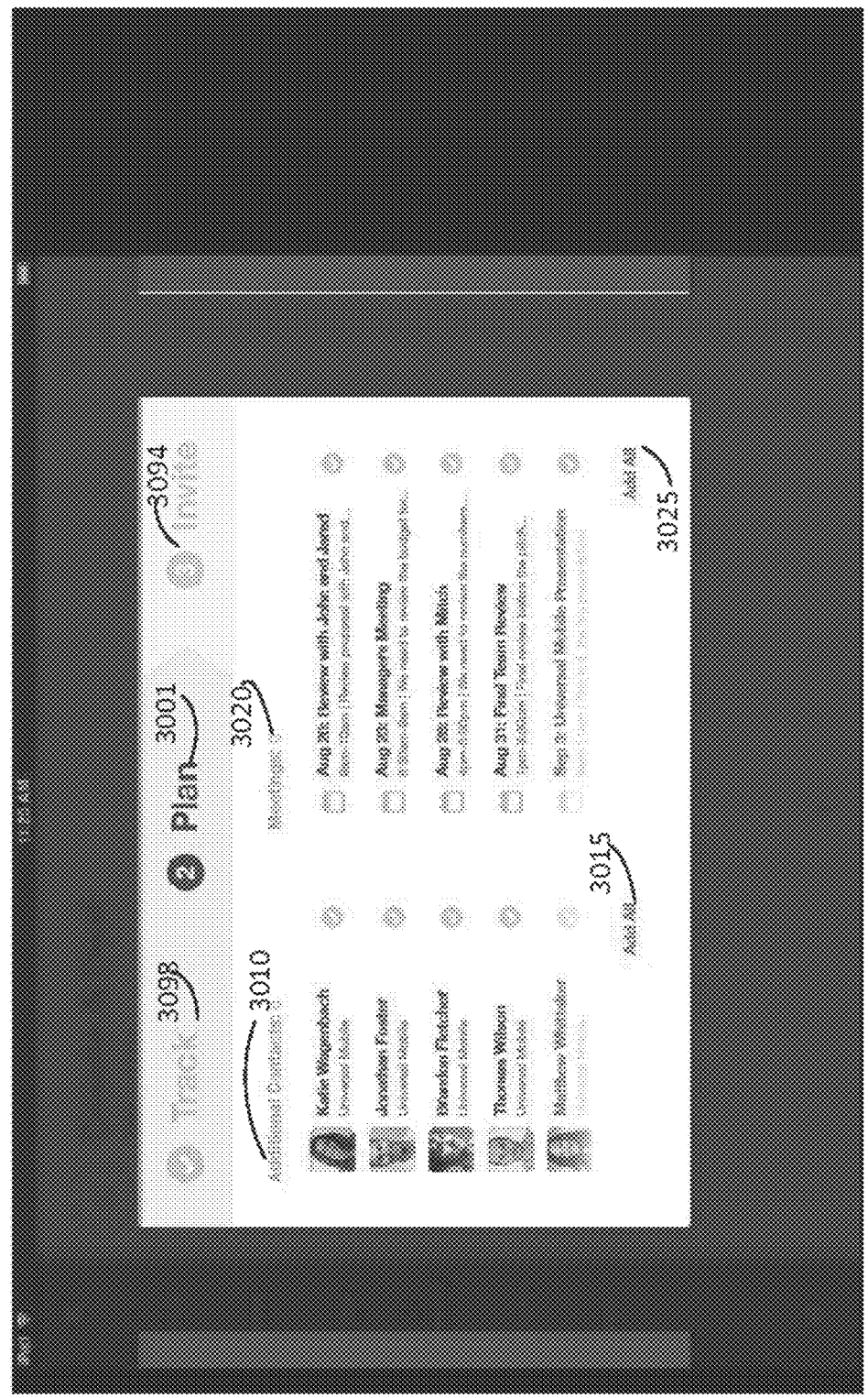
Figure 31:
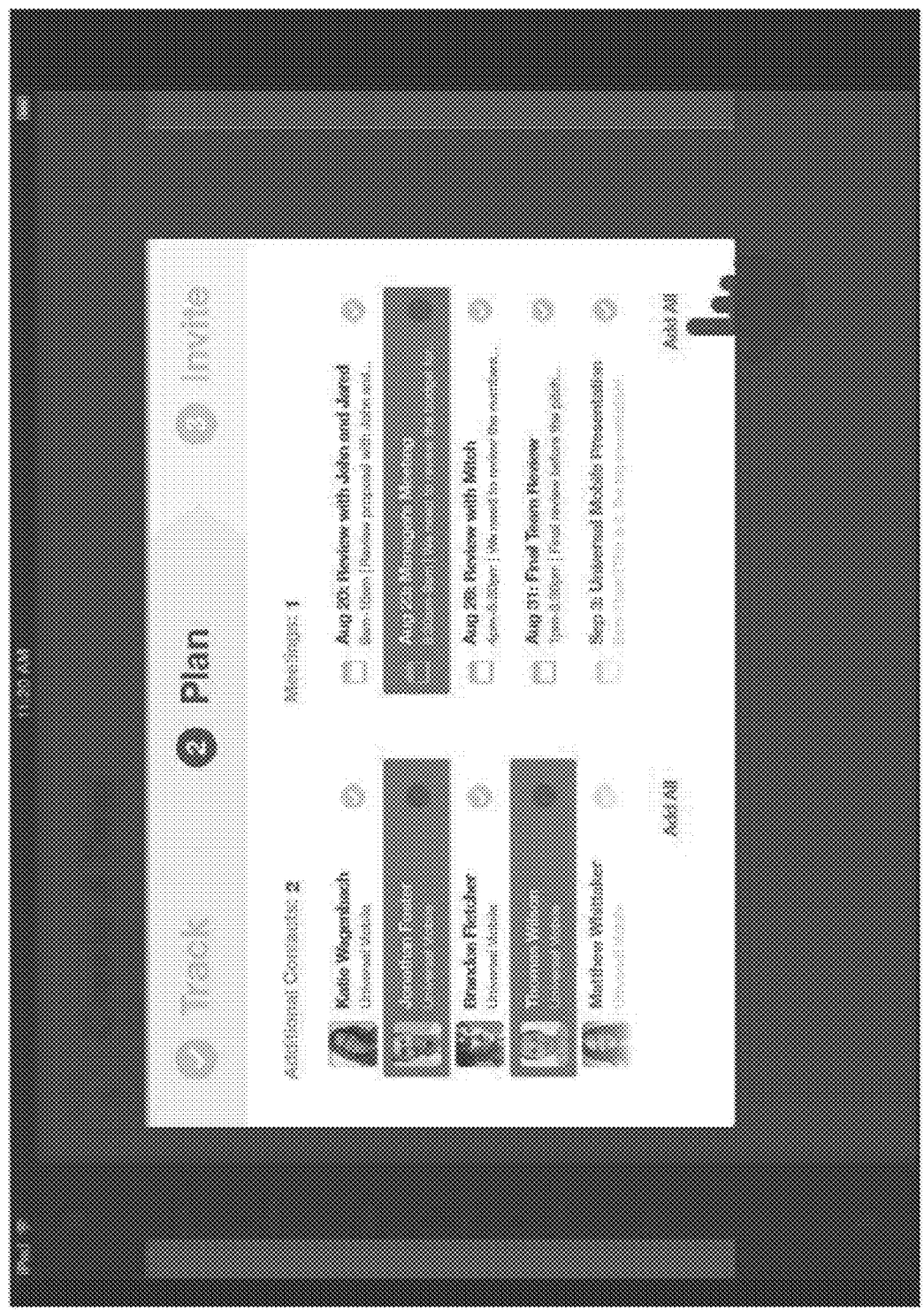
Figure 32:
Figure 33:
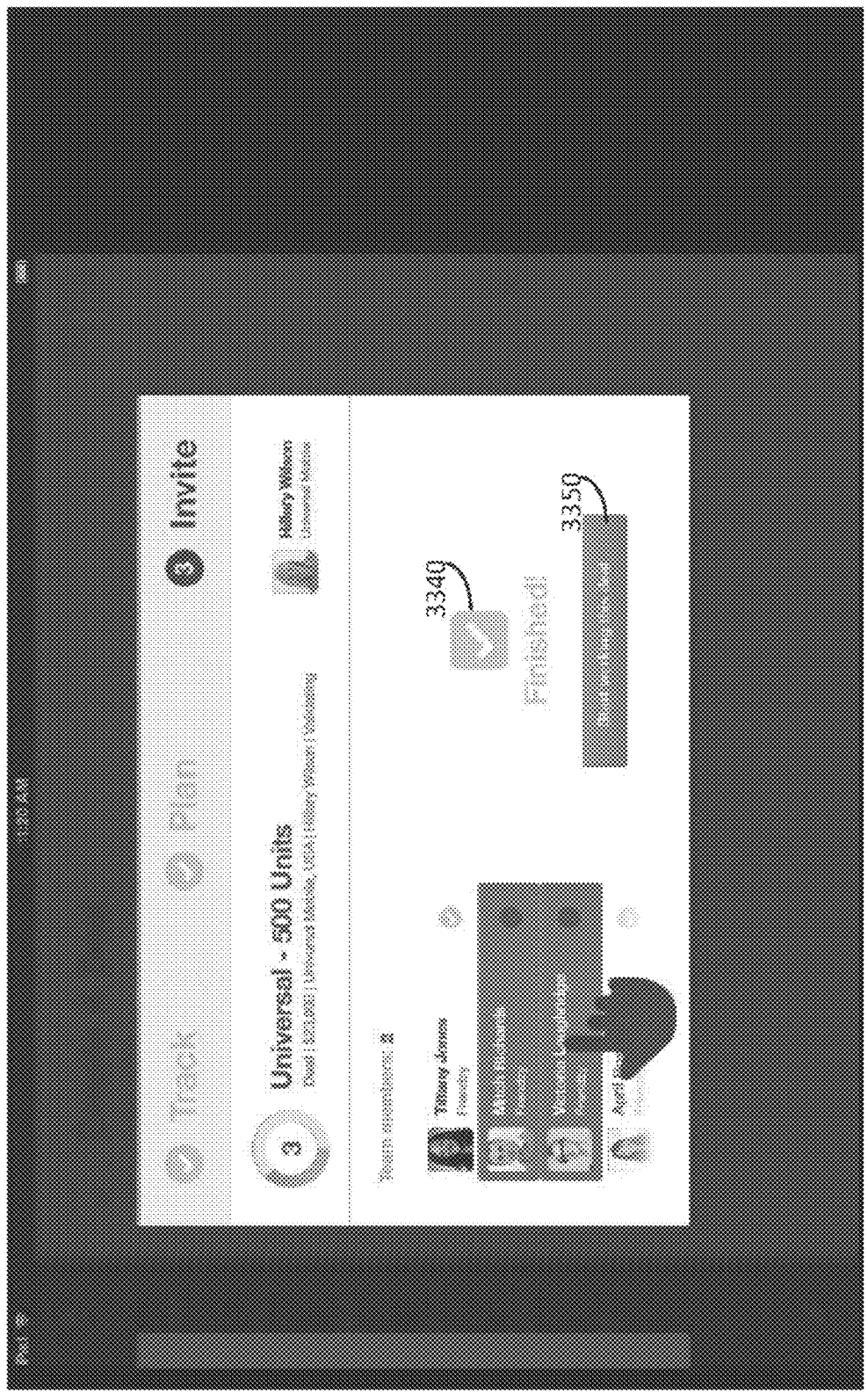

Inviting 406 includes choosing team members from a list or adding team members to a list that will be associated with a deal, including the primary contact (see also FIGS. 32 and 33). The team members may be any contacts Some of the team members may come from the system accessing the user's email and calendar. Optionally, the user may input the contacts and meetings associated with the deal (FIGS. 30 and 31 provide examples of inviting).

Figure 5:
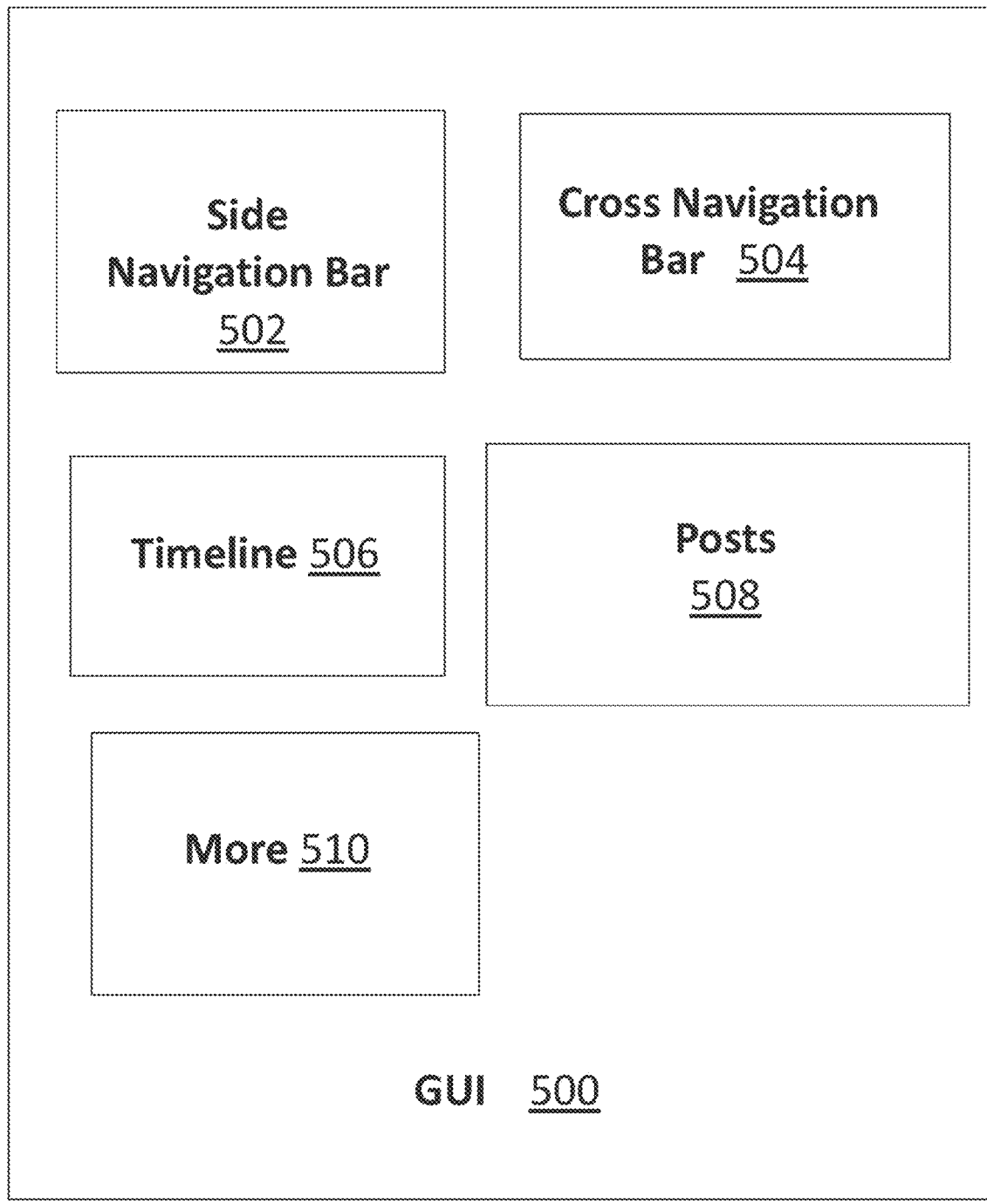
FIG. 5 illustrates a block diagram of an example of a graphic user interface (GUI) for a system and method for managing business deals using an on-demand database service.

FIG. 5 illustrates a block diagram of an embodiment of a graphical user interface (GUI) 500 for methods of managing business deals (see also 302 in FIG. 3) which may include embodiments of side navigation bar 502, cross navigation bar 504, timeline 506, posts 508 and more 510. The elements previously listed will be discussed in detail subsequently in the specification. In other embodiments, GUI 500 may not have all of the elements or components listed above and/or may have other elements or components instead of or in addition to those listed.

Side navigation bar 502 functions to send the user to pages where the user may add events, add tasks, review a timeline, review information about one or more deals, etc. Side navigation bar 502 may be a bar vertically situated on the page with links identified by an icon and/or text explaining what the link allows the user to do or what page the user will be sent to. Side navigation bar will be further discussed below in conjunction with FIG. 6.

The cross navigation bar 504 provides a user with links to pages where the user may access different functions associated with deals. Cross navigation bar 504 may be a bar horizontally situated on the page having links identified by an icon and/or text explaining what the link allows the user to do or what page the user will be sent to upon activation the button. The cross navigation bar may include links to add a comment, create a task, schedule an event, create a file, log a call, send a message, share contacts, get apps, etc. The cross navigation bar will be discussed further in more detail in conjunction with FIG. 8.

The vertical timeline 506 may be a timeline view and may function to provide a user with a summary of events, tasks, etc. situated on a timeline to show deadlines, due dates, closing dates, etc. The vertical timeline 506 may include activity feeds with a history, showing what has been done on the deal so far. Vertical timeline 506 may include a function that schedules future deadlines, projected dates for the completion of tasks, and events. The vertical timeline 506 may give a magnified view of what is scheduled, including the start date for the deal and ending with the projected ending date for the deal. In an embodiment, the vertical timeline 506 provides colored dots and/or icons with the color being associated with the specific functions. In at least one embodiment, the dots are placed on the timeline on the date they are scheduled and/or the due date/deadline. For example, a deadline in August that shows a dark purple dot may be associated with the dark purple icon for an event.

Posts 508 may be any timed function related to managing business deals. In at least one embodiment, posts are any emails, tasks, events, meetings, files, stages, deadlines, and information sent between team members, contacts, and anyone involved in the deal. Posts may be shown with the type of post clearly indicated. Posts may be shown in the order of the time the posts were posted and/or the due date. Posts 508 may include options to find out more information about the sender, the team member, the company, the file, or any aspect of the post. Posts will be discussed further in conjunction with FIG. 34. In addition to the side navigation bar 502, the cross navigation bar 504, the timeline 506, and the posts 508, other aspects of a deal may be included by viewing the links under the more button, pulldown, or bar 510. The more button or pulldown may also be tailored to the specific business that is using the GUI and may include specific functions for that business (e.g., a law firm might have an "USPTO" link or a link to customers that have sued the law firm).

Figure 6:
FIG. 6 illustrates a block diagram of an example of a side navigation bar for a system and method for managing business deals using an on-demand database service.

FIG. 6 illustrates a block diagram of an embodiment of a side navigation bar 600 for methods of managing business deals which may include embodiments of my deals 602, timeline 604, tasks 606, contacts 608, deal space 610, and more 620, including files 622, quotes 624, invoices 626, and upgrade 628. The elements previously listed will be discussed in detail subsequently in the specification. In other embodiments, side navigation bar 600 may not have all of the elements or components listed above and/or may have other elements or components instead of or in addition to those listed.

Side Navigation bar 600 may be a vertical bar on the side of a page (e.g., the left side) that contains a number of useful links for managing business deals. The links may include an icon and/or text explaining the purpose of the link. The links may include links for a timeline page, details, tasks, contacts, deal space, and miscellaneous.

My deals 602 may be activated through a button on a page or a link on a navigation bar. The link or button may include an icon for my deals 602 having three horizontal bars (e.g., an equal sign with an extra bar). The my deals link or button functions to send a user to the my deals page containing information about one or more deals. The information shown for the deal may include, but is not limited to, activities related to the deal, tasks related to the deal, events related to the deal, and a graphical representation of revenues related to the deal, including the amount of revenues brought in by each team member (e.g., a leaderboard). My deals 602 will be discussed further in more detail in conjunction with FIG. 76.

Figure 94:
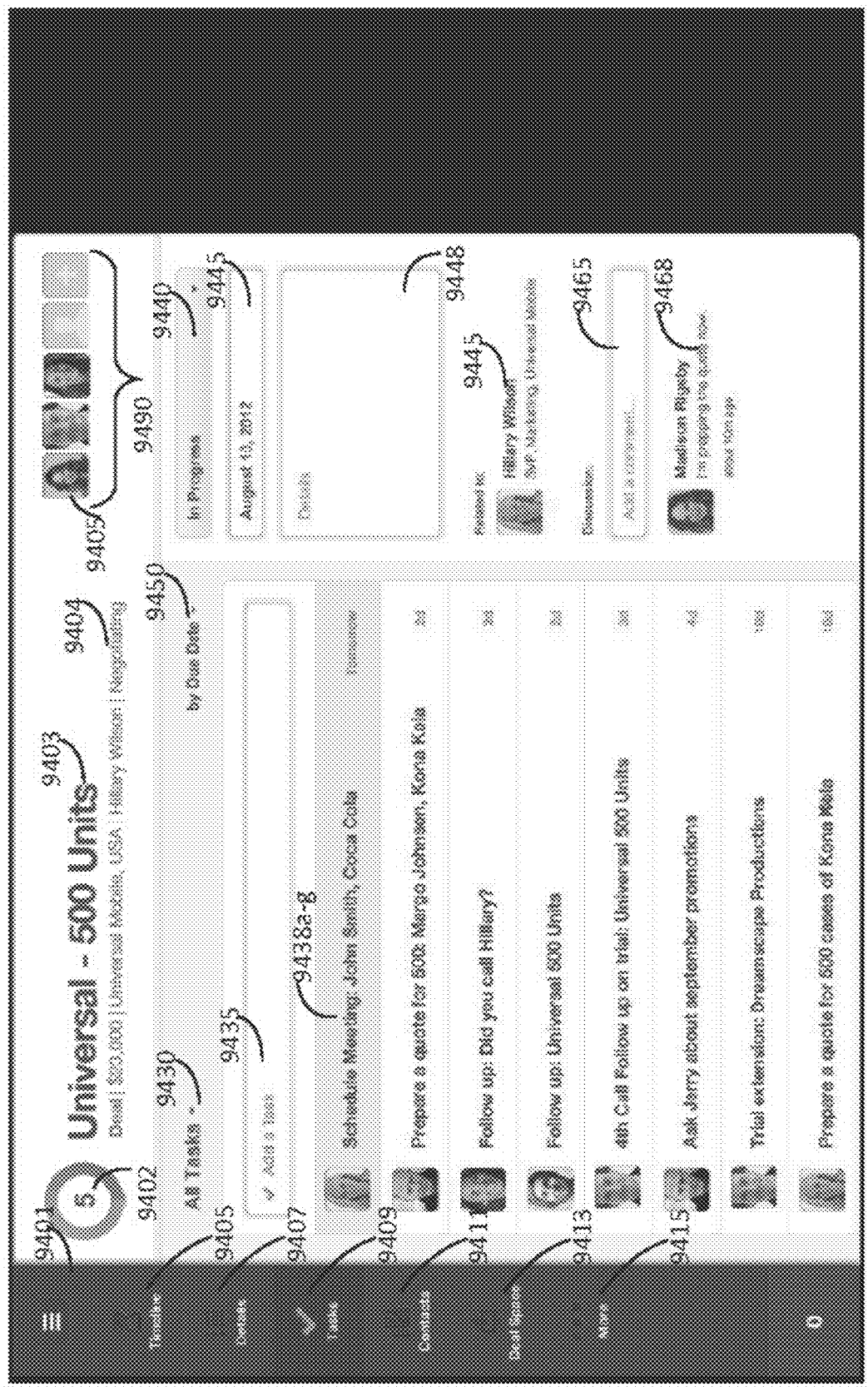
Figure 95:
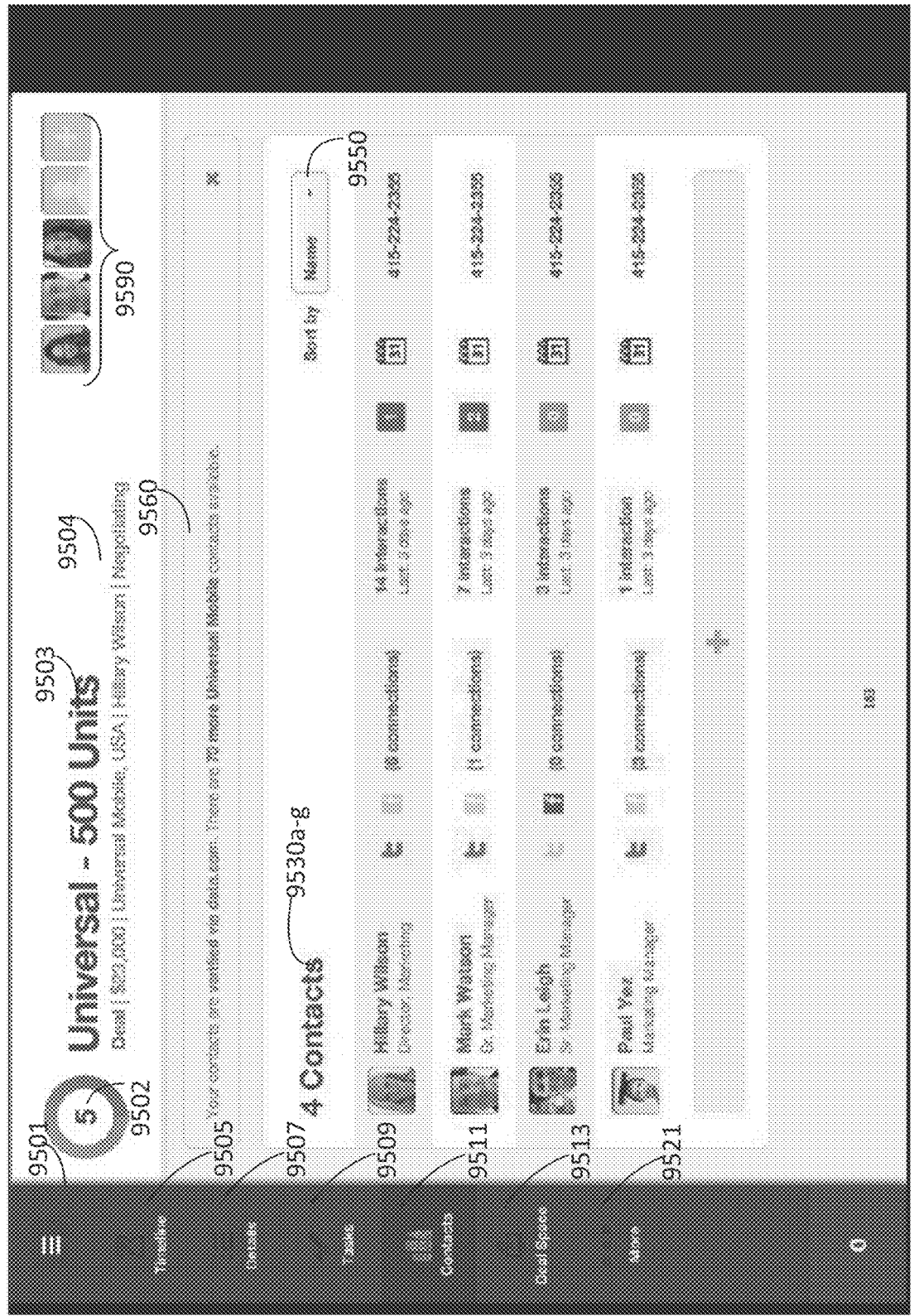

Timeline 604 may be activated through a button on a page or a link on a navigation bar. The link or button may include an icon for timeline 604 having an hourglass (a timer using sand). Timeline 604 may send the user to a page that provides a vertical timeline, posts, and navigation bars that provide a user with tools to manage a deal. Vertical timeline may be a timeline icon at the side of the page, starting with the start of the deal and ending with the projected final date, with dots of various colors showing tasks, files, events, comments, etc. as a function of the due date or post date. See also FIG. 5, 506 for a description of vertical timeline. The timeline 604 may also include posts or activity feeds with a history, showing what has been done on the deal so far and may be used to schedule what is going to happen on the deal in the future. The vertical timeline gives a magnified view of this. An example of a timeline page may be viewed with respect to FIG. 34. In parallel with the timeline 604, various posts may be included that show details of each of the tasks, files, events, comments, etc. A user may select a colored dot on the timeline 604 to view details of each post Tasks 606 may be any piece of work assigned related to the deal. Tasks 606 may be activated through a button on a page or a link on a navigation bar. The link or button may include a checkmark icon for tasks 606. Tasks 606 may send the user to a page that provides a template to set up one or more tasks. The tasks 606 having to do with a deal may be assigned by the user, by a team member, or by the team leader. Tasks 606 may be assigned and calendared by accessing the tasks link in the side navigation bar 502 or cross navigation bar 504. Optionally, tasks 606 may be viewed or edited by selecting the task icon (a checkmark) next to a task post or the light purple dot on the timeline Examples of alternate ways to access the tasks may be found in FIGS. 34 and 94.

Contacts 608 may be an embodiment of contact 308, which was discussed in conjunction with FIG. 3 and in conjunction with track 402 and invite 406 of FIG. 4. Contacts 608 may be activated through a button on a page or a link on a navigation bar. The link or button may include an icon for contacts 608 having the image or drawing of skyscrapers. The contacts 608 link may send the user to a page where the user may add, edit, or delete contacts. Contacts 608 are set up using the set up pages (setting up contacts will be discussed further with conjunction with FIGS. 26-31). Contacts 608 may be added thereafter by adding the contact in the event or task field or by accessing the contacts link in the navigation bars (contacts link will be discussed further in conjunction with FIG. 95).

Deal space 610 provides storage and functions for managing one or more deals. Deal space 610 may be activated through a button on a page or a link on a navigation bar. The link or button may include an icon for deal space 610 having a rectangle with an arrow through it. In at least one embodiment, the user gets deal space 610 for a specific number of deals (e.g., a single deal) free, but pays a fee for a higher number deals (e.g., 2 or more deals)_. In at least one embodiment, there may be multiple levels of each providing more deals for more money. For example, the user may upgrade from a single deal to 25 deals, 50 deals, 100 deals and unlimited deals.

More 620 may include other aspects of deal making that may not yet be accessed, via the top or side navigation bars or specific buttons on one or more webpages. The links under more 620 may be activated through a button on a page or a link on a navigation bar. The link or button may include an icon for more 620 having 3 dots (signifying etc.). Examples of the other aspects or links under more 620 include, but are not limited to, files, quotes, invoices, upgrades, etc. (FIG. 96 provides an example of how the more links might work).

Files 622 may be accessed via the side navigation bar (files 622 will be discussed further in conjunction with the more link in FIG. 96), the cross navigation bar (see the button with the image of a piece of paper with a plus sign on it), or by activating the files icon next to the posts or on the timeline (see the blue icon). Files 622 sends a user to a page where the user may add a file to a post, post a file, share a file, and/or comment on a file.

Quotes 624 may be accessed via the side navigation bar 502 (quotes 624 is discussed further in conjunction with FIG. 96). Quotes 624 provides the user with a way to keep track of quotes for goods or services and/or to post or share a quote for goods or services.

Invoices 626 may be accessed via the side navigation bar 502 (invoices 626 will be discussed further in conjunction with FIG. 96). Invoices 626 provide storage for previous invoices that were sent to clients, sent within the user's company, and/or provides the user with one or more templates for invoices. Invoices 626 may include the company or person to be billed, the biller, the goods or services, unit price, quantities, dates of service, total price, etc.

Upgrade 628 may be accessed via the side navigation bar (see under the more link in FIG. 96). Upgrades 628 provides storage and functions for any upgrades to the business management app (e.g., dealpath) and/or the business app or parent app (e.g., salesforce) that a user desires. In at least one embodiment, the business app or parent app is the app from the company that makes and/or sells the business management app. In at least one embodiment, the user may select the upgrade link to access a page that describes the price and type of upgrades the user may purchase (see for example, FIG. 111). How the user navigates to the side navigation bar will discussed further in conjunction with FIG. 34.

Figure 7:
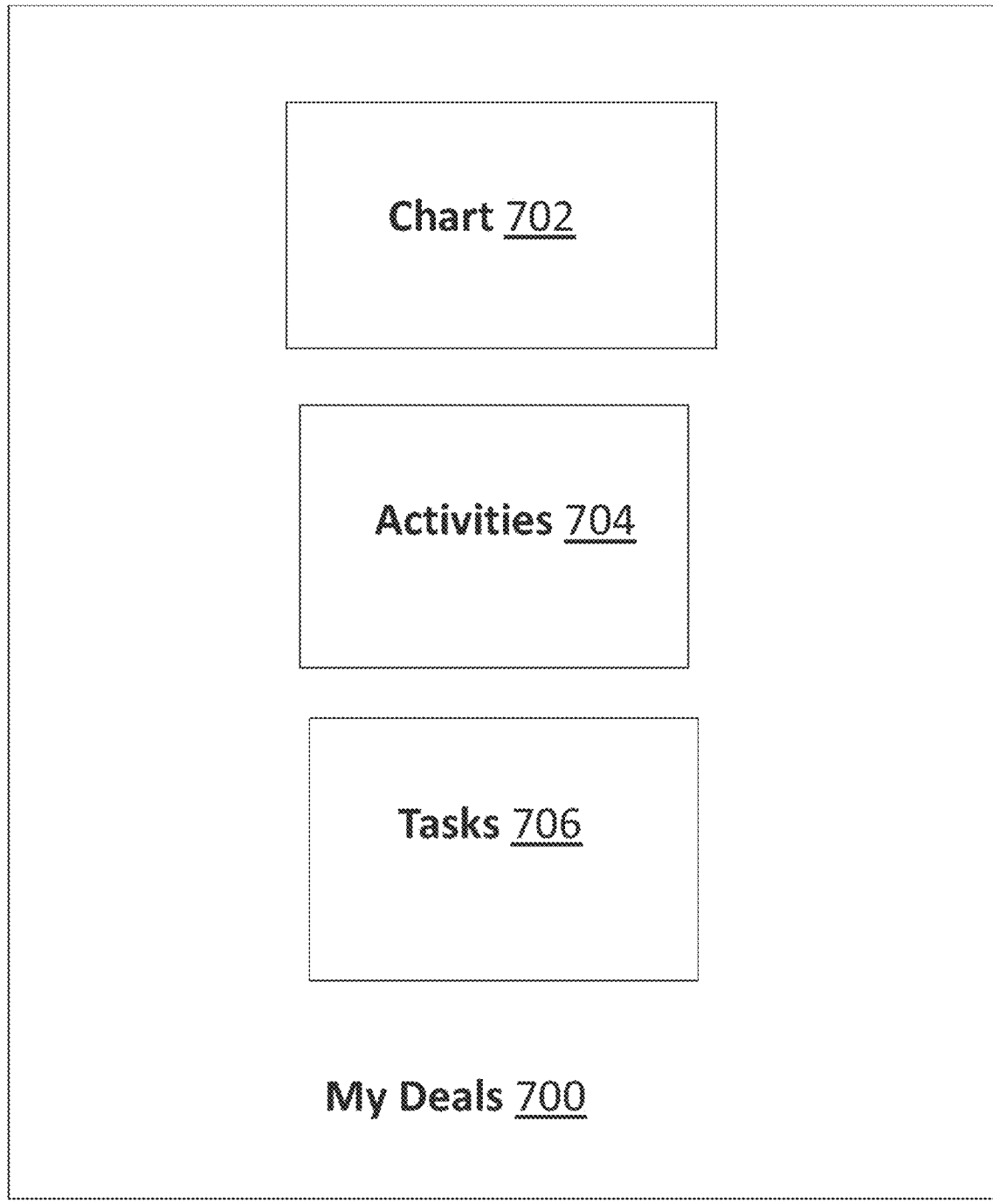
FIG. 7 illustrates a block diagram of an example of a my deals function for a system and method for managing business deals using an on-demand database service.

FIG. 7 illustrates a block diagram of an embodiment of my deals 700 for methods of managing business deals which may include embodiments of chart 702, activities 704, and tasks 706. The elements previously listed will be discussed in detail subsequently in the specification. In other embodiments, my deals 700 may not have all of the elements or components listed above and/or may have other elements or components instead of or in addition to those listed.

My deals 700 may be an embodiment of my deals 322, which was also discussed in conjunction with FIG. 3. Chart 702 may provide information based on the sales and/or revenue with respect to a particular deal. The chart 702 may contain actual and/or projected sales or revenue and may include goals or quotas for one or more salespersons or team members. The chart or graph may also be a leaderboard that separates data into specifics such as which salespersons or team members obtained which sales and/or how much revenue each obtained. The chart or graph may be based on time or any other aspect of the deal.

Activities 704 may include any events, meetings, projects, or comments that occurred in reference to the deal, who was involved, a summary of what occurred a date or deadline, and other information related to the activity. The activities 704 may be identical to the posts (activities 704 will be discussed further in conjunction with FIG. 34).

Tasks 706 may include any tasks 706 that were set up using the tasks link in a navigation bar. Tasks 706 may include such jobs as follow-ups, calls, finding out information, extensions, etc. Tasks 706 will be discussed further in conjunction with FIGS. 76-83).

Figure 8:
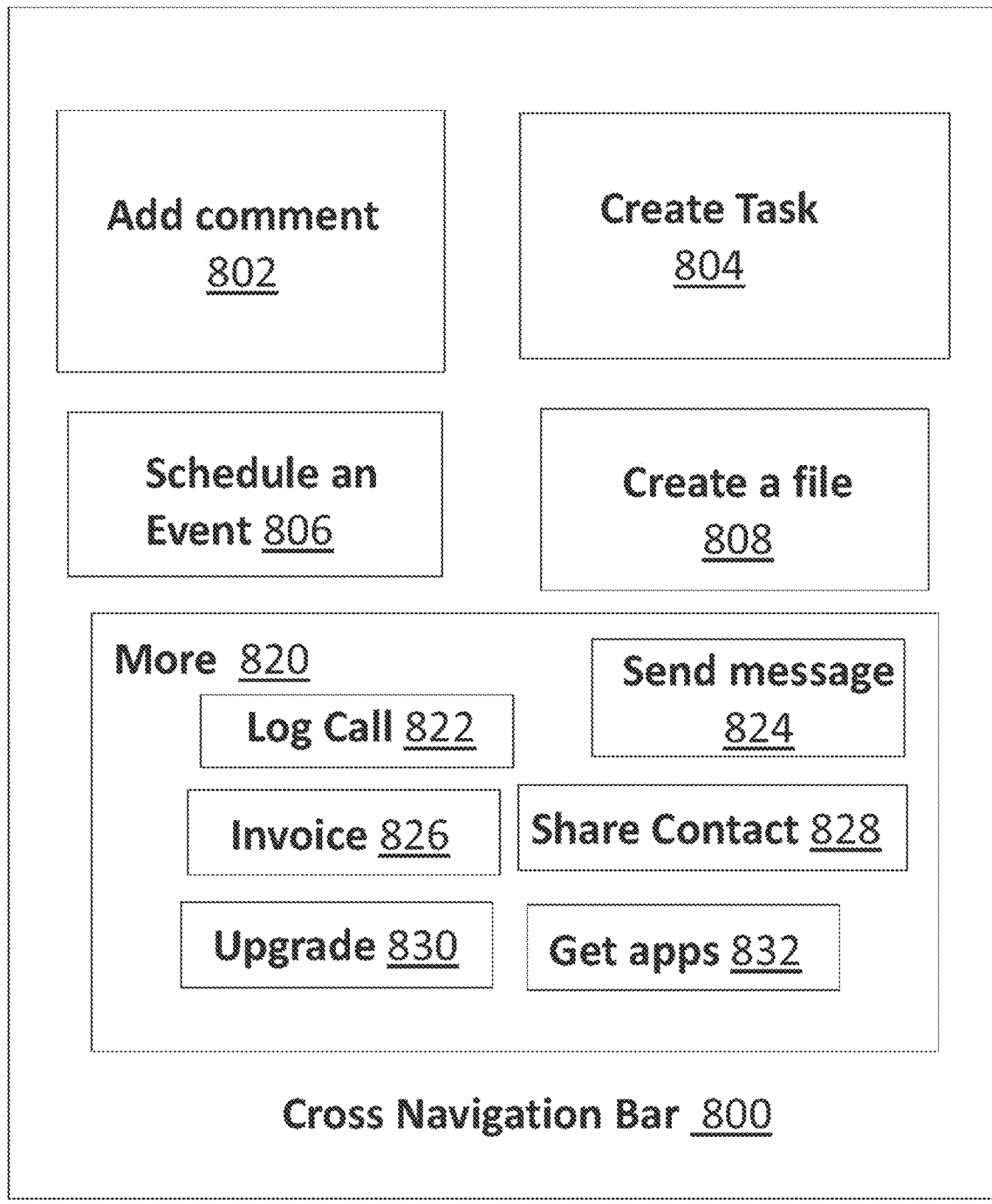
FIG. 8 illustrates a block diagram of an example of a cross navigation bar for a system and method for managing business deals using an on-demand database service.

FIG. 8 illustrates a block diagram of an embodiment of a cross navigation bar system 800 for methods of managing business deals which may include embodiments of add comment 802, create task 804, schedule an event 806, create a file 808, and more 820, which includes log call 822, send message 824, invoice 826, share contact 828, upgrade 830, and get apps 832. The elements previously listed will be discussed in detail subsequently in the specification. In other embodiments, system 800 may not have all of the elements or components listed above and/or may have other elements or components instead of or in addition to those listed.

The add comment 802 link functions to send a user to a page where the user may add a comment about any aspect of a deal. The comment may be shared with anyone involved in the deal. The comment may be linked to a specific post (e.g., a task, file, event, etc.) or the comment may stand alone and may be displayed in its own post. The add comment icon may be a conversation balloon, which optionally may appear similar to as those that are used in a comic strip. Optionally, a user may add a comment to a specific post by selecting the post and entering the comment into afield.

The create task link 804, when selected, navigates the user to a page where the user may create a task. In at least one embodiment, the create task link 804 looks like a checkmark and the task icon looks like a light purple dot with a checkmark inside (e.g., in white). Activating the create task link 804 (by selecting the create task line 804) may send the user to an add-a-task page. The page may include fields for the task, the person assigned to the task, the due date, and may include a link or a field to add a description of the task (a create a task page is further discussed below in conjunction with FIGS. 45-48). In at least one embodiment, by default the person assigned to the task may be the user creating the task. After the task is created (or added), the task may be included in the posts on the deal homepage (an example of a post of a task is discussed further below in conjunction with FIGS. 47 and 48). The task may also be included in the timeline.

The schedule an event 806 link navigates the user to a page where the user may create and/or schedule an event. In at least one embodiment, the schedule an event 806 link may look like a calendar with a plus sign inside and the event icon may look like a dark purple dot with the calendar image inside (in white). Activating the schedule an event link by selecting the schedule an event link sends the user to an add an event page. The page may include fields for the event, the place where the event takes place, the person or people to notify about the event, the date of the event, and may include a link or a field to add a description of the event (a schedule an event 806 link is discussed further below in conjunction with FIGS. 37-42. After the event is scheduled (e.g., created or added), the event may be included in the posts on the deal homepage (a homepage with an event scheduled is discussed further below in conjunction with FIGS. 41 and 42). The event may also be included in the timeline.

The create a file 808 link navigates the user to a page where the user may add or create a file. The create a file 808 link may be a button and may include an image of a piece of paper with a plus sign on the paper. The create a file link 808 sends the user to a page where the user may add a file to a post, post a file, share a file, and/or comment on a file.

Any links that are not included on the cross navigation bar may be included under the more pulldown 820 shown by an arrowhead. This may include log call, send email, share contact, invoice, quote, upgrade, and get apps. The user may choose an icon or a link for one of the functions, which will navigate to the page where the user may perform the function. For example, if the user chooses send email, the user will be given a page where the user may send an email.

If the user chooses the log call link 822 under "more," the user is navigated to a page where the user may log a call. The call will then be included in the timeline. The log a call page may include fields for the name of the caller, the job title of the caller, the subject, the time, the date, and the phone number.

If the user chooses the send message link 824 under "more," the user is navigated to a page where the user may send a message. In at least one embodiment, the user is sent to a page associated with the user's email.

If the user chooses the invoice link 826, under "more," the user is navigated to a page where the user may produce an invoice. The invoice page may include one or more templates for invoices that the user may choose to use (invoices were previously discussed in conjunction with FIG. 3)

If the user chooses the share contact link 828, under "more," the user is navigated to a page where the user may share a contact. For example, the user may be prompted to provide an address and/or an identifier of another user, group of users, or organization to which to send information about a contact.

If the user chooses the upgrade link 830 under "more," the user is navigated to a page where the user may upgrade to a higher level of service of the business management app (dealpath). The levels of dealpath will be discussed in more detail with respect to FIG. 111.

If the user chooses the get apps link 832 under "more," the user is navigated to a page where the user may purchase and/or download other apps. See FIG. 2 for a more detailed discussion of other apps. See also FIG. 34 for a discussion of how the user navigates to the cross navigation bar.

FIGS. 9-14 are flow diagrams illustrating a technique for methods of managing business deals in an embodiment.

Figure 9:
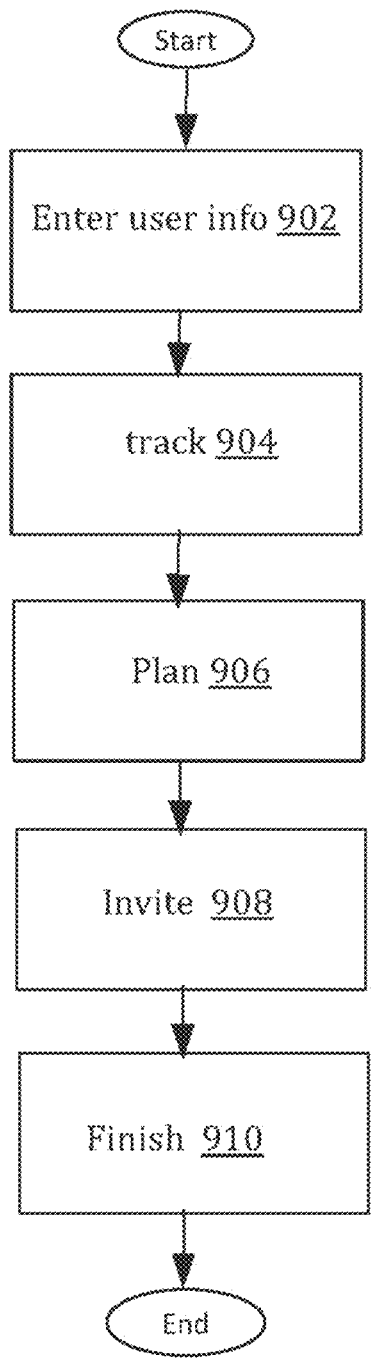
FIG. 9 is an operational flow diagram illustrating a method of setting up a method of managing business deals in an embodiment.

FIG. 9 a flowchart of an embodiment of a method of setting up a method for managing business deals.

In step 902, the user information is entered. For example and without limitation, step 902 may include entering basic user information, such as the user's name, address, email, company, job title, and telephone numbers. In at least one embodiment, user information may be entered when the server accesses the user's contacts and calendar (e.g., the email and calendar applications). When the calendar and/or contacts are accessed, the user information may be imported along with the user's contact and calendar information into dealpath (entering contact information will be discussed further below in conjunction with FIGS. 25-27).

In step 904, the information for tracking a deal may be entered. By way of example and without limitation, step 904 may include adding more contacts (e.g., in addition to those from the user's contacts and calendar), choosing a primary contact, setting the size of the deal, setting the current status (or stage) of the deal, and setting the close date (setting a close date will be discussed further below in conjunction with FIGS. 28 and 29). In at least one embodiment, the accessing of the user's email and calendar by the server may occur before the tracking, planning, and/or inviting.

In step 906, a plan is established for closing the deal. In at least one embodiment, the plan may include setting up the additional contacts associated with a deal and setting up meetings associated with negotiating a deal.

In step 908, others are invited to join the deal space from within the user's company (e.g., team members). In at least one embodiment, step 908 may include setting up the team members associated with a deal (Examples of the step of inviting 908 may be seen in FIGS. 32 and 33). The team members may be chosen from the contacts and may include contacts from within the users company and/or the other company or companies associated with the deal. Team members may also be from other sources. Some of the team members may come from the system accessing the user's email and calendar.

In step 910, the setting up of the method of managing business deals (e.g., dealpath) is completed. In at least one embodiment, this may include reviewing the information, contacts and calendar information, which was added by accessing the user's contacts and calendar. Further, more information, contacts, and calendar items may be added by the user by inputting the information into the field at which point the method may end.

In an embodiment, each of the steps of method 900 is a distinct step. In at least one embodiment, although depicted as distinct steps in FIG. 9, step 902-910 may not be distinct steps. In other embodiments, method 900 may not have all of the above steps and/or may have other steps in addition to or instead of those listed above. The steps of method 900 may be performed in another order. Subsets of the steps listed above as part of method 900 may be used to form their own method.

Figure 10:
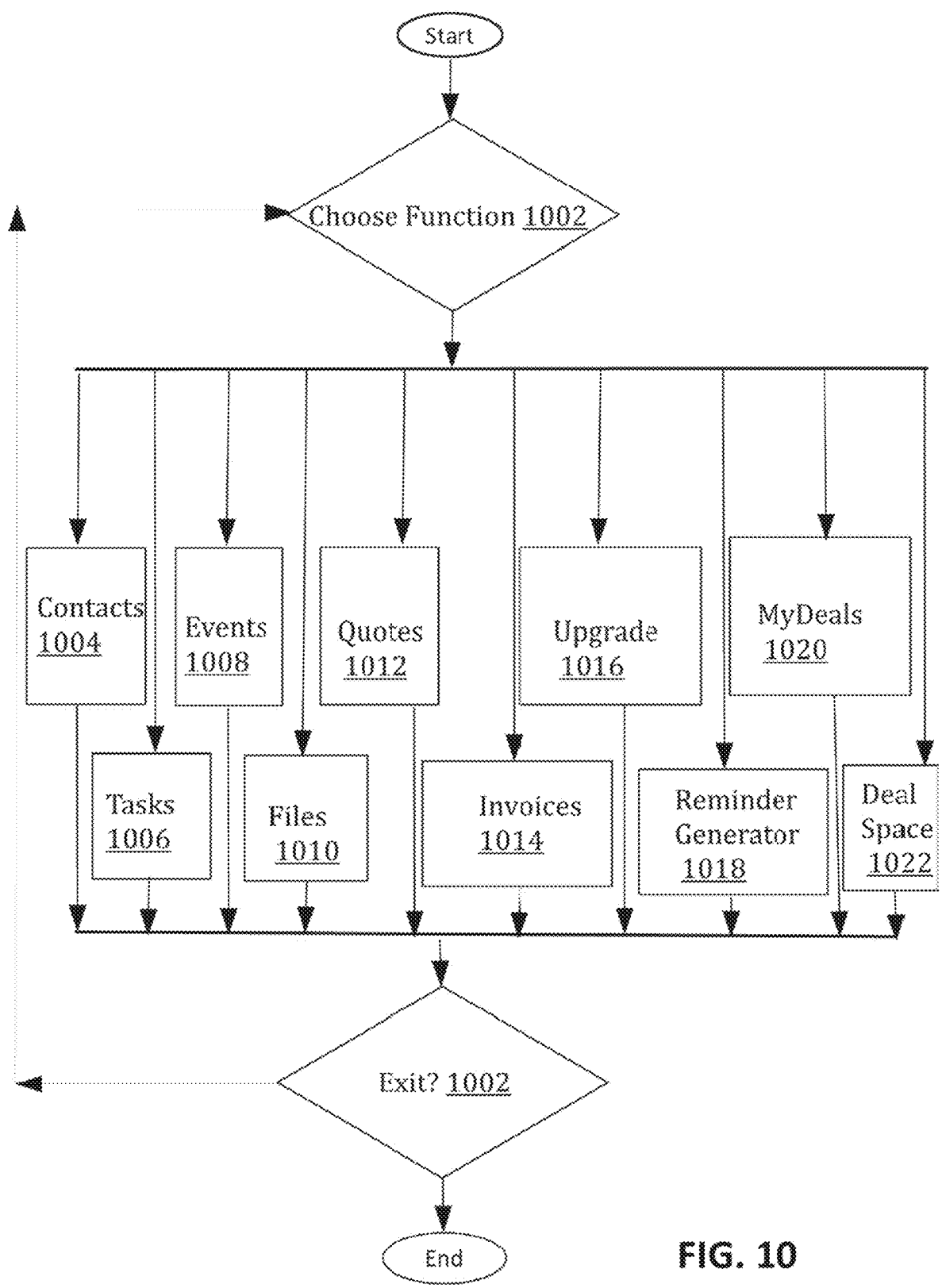
FIG. 10 is an operational flow diagram illustrating a method of using a method of managing business deals in an embodiment.

FIG. 10 is flowchart of an embodiment of a method of managing business deals in an embodiment, showing how a user may choose the functions the user wants to further set up and negotiate a deal.

In step 1002, a function is chosen. For example and without limitation, this may include setting up any of the functions associated with steps 1004-1022.

In step 1004, contacts are added. By way of example and without limitation, this may include leads, customers, team members, persons working on a deal with the user, and any contacts taken from any of the user's social networking or email sites. The contacts links or buttons function to send the user to a page where the user may access previous contacts or add new contacts. The user's contacts information may be accessed by the system during the set up process. The user's contact information may be accessed from a user's phone, email, and/or social networking sites. The contacts page may be accessed via a link in a navigation bar, a button on a webpage and/or a field (see the side navigation bar in the dealpath app). The contacts page may also be accessed when sharing a file or sending an email.

In step 1006 tasks are scheduled. In at least one embodiment, this may include calling, reviewing, following up, asking, working on, etc. The tasks link function to send the user to a page where the user may set up tasks to be completed for a given deal or deals. Tasks may be set up by accessing a link in a navigation bar, a button on a webpage and/or a field (see also FIGS. 6, and 10). The tasks may be set up by the user, a team member, a manager, or the primary contact, or any user that has access to the dealpath app. The task may be set up to be completed by one or more team members, managers, primary contacts, or any user that has access to the dealpath app. Examples of methods of setting up tasks using the dealpath app will be discussed in conjunction with FIGS. 43-48.

In step 1008, events are created. In at least one embodiment, step 1008 may include setting up meetings, site visits, pitches, presentations, reviewing or analyzing files, budgets, or any type of activity that might be involved in managing a deal. Events may be set up and/or viewed by accessing an events link in a navigation bar, an events button on a webpage and/or an events field (see also FIG. 8) Events will be discussed further in conjunction with FIG. 11. The events may be set up to be completed by team members, managers, contacts, primary contacts, and users. The events may be set up by selecting the event button in a navigation bar, by selecting a previous event in a list of posts, by selecting a reminder post, or by searching for events. Examples of methods of setting up events using the dealpath app will be discussed in conjunction with FIGS. 36-42.

In step 1010, files are accessed, shared, uploaded, and/or created. In at least one embodiment, files may include any type of media, including but not limited to, pictures, videos, presentations, written documents, and audio. Files may be sent with explanations or may be sent with only a file name or title. The file may be shared with one or more team members or contacts. In at least one embodiment, the file will only be shown to those team members and/or contacts that are indicated to see the file. Files may be included in emails, shared posts, etc., such as by activating a file button on a navigation bar. Activating a file button sends the user to a page on which the user may create a post that includes one or more files. Files may also be included by selecting a post and replying or sharing the post with contacts.

In step 1012, quotes are created and/or edited. In at least one embodiment, quotes may include any type of monetary quote that has been given to a client for any product or service. Step 1012 may include setting the maximum or minimum limit on quantity and price. Step 1012 may be activated, via any quote link or button on a navigation bar or on a webpage. When step 1012 is activated, the user may be sent to a page on which the user may find previous quotes for specific customers, quote information, and methods of quantifying, setting up, and/or editing quotes (see e.g., under the more link in FIG. 96).

In step 1014, invoices are accessed. In at least one embodiment, step 1014 may include bills and/or methods of charging and keeping track of payments for goods and services. Invoices may include information such as the company or person to be billed, the biller, the goods or services, unit price, quantities, dates of service, total price, etc. Previous invoices, invoice templates, and invoice information may be accessed via the side navigation bar (invoices will be discussed further later in conjunction with the more link in FIG. 96).

In step 1016, the system is upgraded. The upgrades provide the user or company using dealpath with more features and functions. In step 1016, the user is sent to the upgrade page (upgrading is discussed further below in conjunction with FIG. 111) where the user may find out about upgrades associated with the dealpath app (see also FIG. 3 for specifics on different packages).

In step 1018, details of reminders are viewed, set-up and/or edited. In at least one embodiment, step 1018 may include viewing reminders reminding a user about tasks, events, meetings, etc. that have deadlines and/or need to be completed by a specified date. Step 1018 may involve setting up to reminders that remind a user once or multiple times before a deadline. Reminder generator may be set up to remind a user at specified times before a deadline, at regular intervals until the deadline or a default choice may be used. The reminder may be set up for any person performing the task, the team, any person involved in the event.

In step 1020, My Deals are set up and/or managed by accessing a my deals page. In at least one embodiment, this may include a page where the user may manage one or more deals that the user is involved in. My deals provides the user with a snapshot of the revenue, activities, and tasks that are currently occurring for a particular deal. The user may review the deal, set up events, set up tasks, and get detailed information about sales, revenues and/or the team from the my deals page. FIGS. 76-83 provide embodiments of screenshots showing leaderboard links, calendar, deal graph, activities or events, and tasks. The user may navigate to the my deals page 322 from the side navigation bar, the and/or by searching for the my deals page.

In step 1022, a Deal space is set up for a deal. In at least one embodiment, this may include a secure, branded customer deal space that will be created for each user and each deal providing the user with a way to track the user's customer interactions (see also FIGS. 34 and 93). The deal space may be set up by sharing a file with a contact, by adding a contact to a deal, by setting up a meeting or task with a contact, and/or by activating a deal space link.

After any of step 1004-1022, the method proceeds to step 1024, where a decision is made, based on user input, whether to return to 1002 for the next selection or to end the method. In at least one embodiment, this may include choosing more functions related to negotiating a deal or at this point the method of choosing functions may end.

In an embodiment, each of the steps of method 1000 is a distinct step. In at least one embodiment, although depicted as distinct steps in FIG. 10, step 1004-1024 may not be distinct steps. In other embodiments, method 1000 may not have all of the above steps and/or may have other steps in addition to or instead of those listed above. The steps of method 1000 may be performed in another order. Subsets of the steps listed above as part of method 1000 may be used to form their own method.

Figure 11:
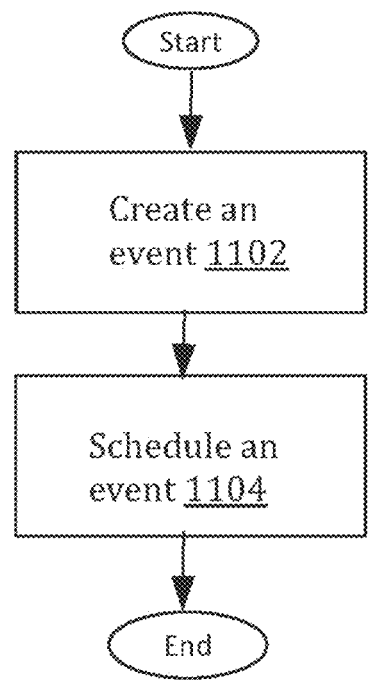
FIG. 11 is an operational flow diagram illustrating a method of creating and scheduling an event in a method of managing business deals in an embodiment.

FIG. 11 is a flowchart of an embodiment of a method of creating an event. FIG. 11 provides more details for the events step in FIG. 10 (1008).

In step 1102, an event is initially created. For example and without limitation, events may include meetings, site visits, pitches, presentations, reviewing or analyzing files, budgets, or any type of activity that might be involved in managing a deal. Events may set up and/or viewed by accessing an events link in a navigation bar, an events button on a webpage and/or an events field (see also FIGS. 8 and 11). The information about the event may be entered, including adding the information describing the event, choosing a place for the event, choosing a date and time for the event, and adding people to notify about the event. Adding the information describing the event may include providing a title for the event, adding a description of the event, including information about the deal, including information about the location, and/or including information about the purpose. The people to notify about the event may include team members, managers, contacts, primary contacts, and users. The people to notify may be the people that need to complete the event. The place for the event may include a meeting room, an off site location, a telephonic meeting, a video meeting, etc. In at least one embodiment, choosing a date and time for the event may include setting a time for the event to occur. The events may be set up by selecting the event button in a navigation bar, by selecting a previous event in a list of posts, by selecting a reminder post, or by searching for events. FIGS. 36-42 provide examples of methods of setting up events using the dealpath app.

In step 1104, the event is scheduled. The event is scheduled by submitting the event. Submitting the event may include selecting the checkmark button on the page, sending an email inviting the event members (e.g., people to notify), and pressing the enter button on the keyboard after filling out all of the event information. Once the event is scheduled, the event will appear on the timeline at the appropriate time and a post will appear providing more information about the event. After the event has been created and scheduled, the method of creating an event may end.

In an embodiment, each of the steps of method 1100 is a distinct step. In at least one embodiment, although depicted as distinct steps in FIG. 11, step 1102-1104 may not be distinct steps. In other embodiments, method 1100 may not have all of the above steps and/or may have other steps in addition to or instead of those listed above. The steps of method 1100 may be performed in another order. Subsets of the steps listed above as part of method 1100 may be used to form their own method.

Figure 12:
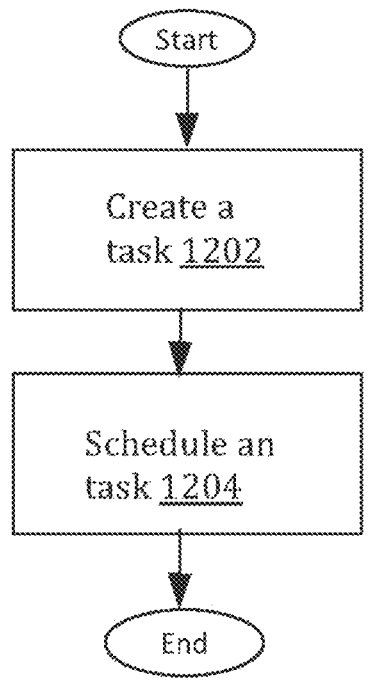
FIG. 12 is an operational flow diagram illustrating a method of creating and scheduling a task in a method of managing business deals in an embodiment.

FIG. 12 shows a flowchart of an embodiment of a method of creating a task including creating a task and scheduling a task.

Create a task (block 1202) may include entering information about the task, including a title for the task, who the task is assigned to (e.g., the person or persons), the due date, and adding a description of the task. Tasks may include calling, reviewing, following up, asking, working on, etc. The title and/or information describing the task may include information about the deal, the task, the due date, the person(s) involved in the task, and/or the purpose of the task. The person(s) assigned to the task may be any of the contacts, team members, managers, and/or outside service or support people. The due date may be any date and/or time for which the task should be completed. The tasks link functions to send the user to a page where the user may set up tasks to be completed for a given deal or deals. Tasks may be set up by accessing a link in a navigation bar, a button on a webpage and/or a field (see also FIGS. 6, and 10). The tasks may be set up by the user or a team member to be completed by one or more team members. FIGS. 43-48 provide examples of methods of setting up tasks using the dealpath app.

In step 1204, the task is scheduled by submitting the information entered about the task. Submitting the task may include selecting the checkmark button on the page, sending an email inviting the task members (e.g., people the task is assigned to), and pressing the enter button on a keyboard after filling out all of the task information. Once the task is scheduled, the task will appear on the timeline at the appropriate time and a post will appear providing more information about the task. After the task has been created and scheduled, the method of creating a task may end.

In an embodiment, each of the steps of method 1200 is a distinct step. In at least one embodiment, although depicted as distinct steps in FIG. 12, step 1202-1204 may not be distinct steps. In other embodiments, method 1200 may not have all of the above steps and/or may have other steps in addition to or instead of those listed above. The steps of method 1200 may be performed in another order. Subsets of the steps listed above as part of method 1200 may be used to form their own method.

Figure 13:
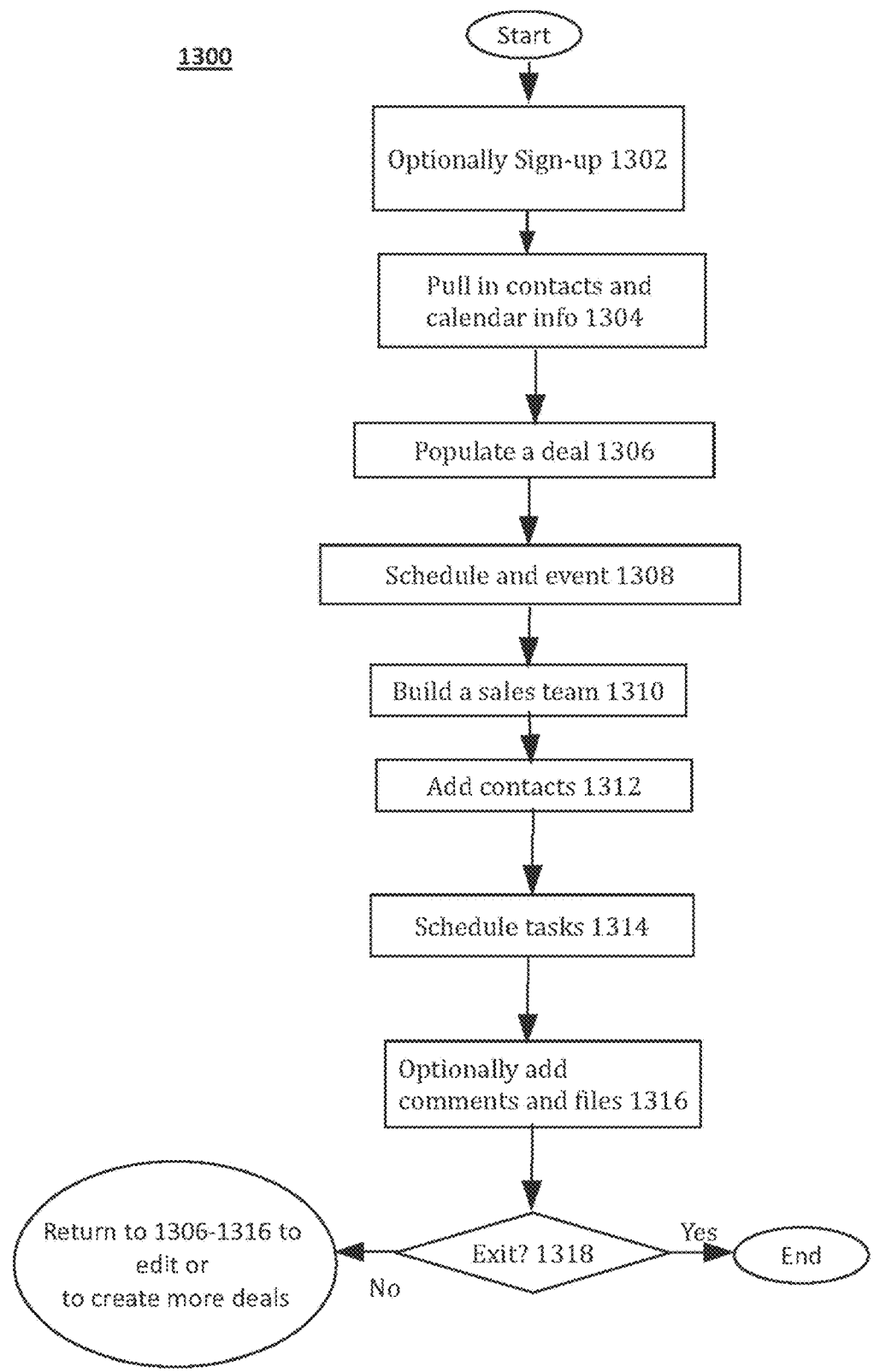
FIG. 13 is an operational flow diagram illustrating a client side method of managing business deals in an embodiment.

FIG. 13 is a flow diagram of an embodiment of a client side method of managing business deals.

Figure 25:
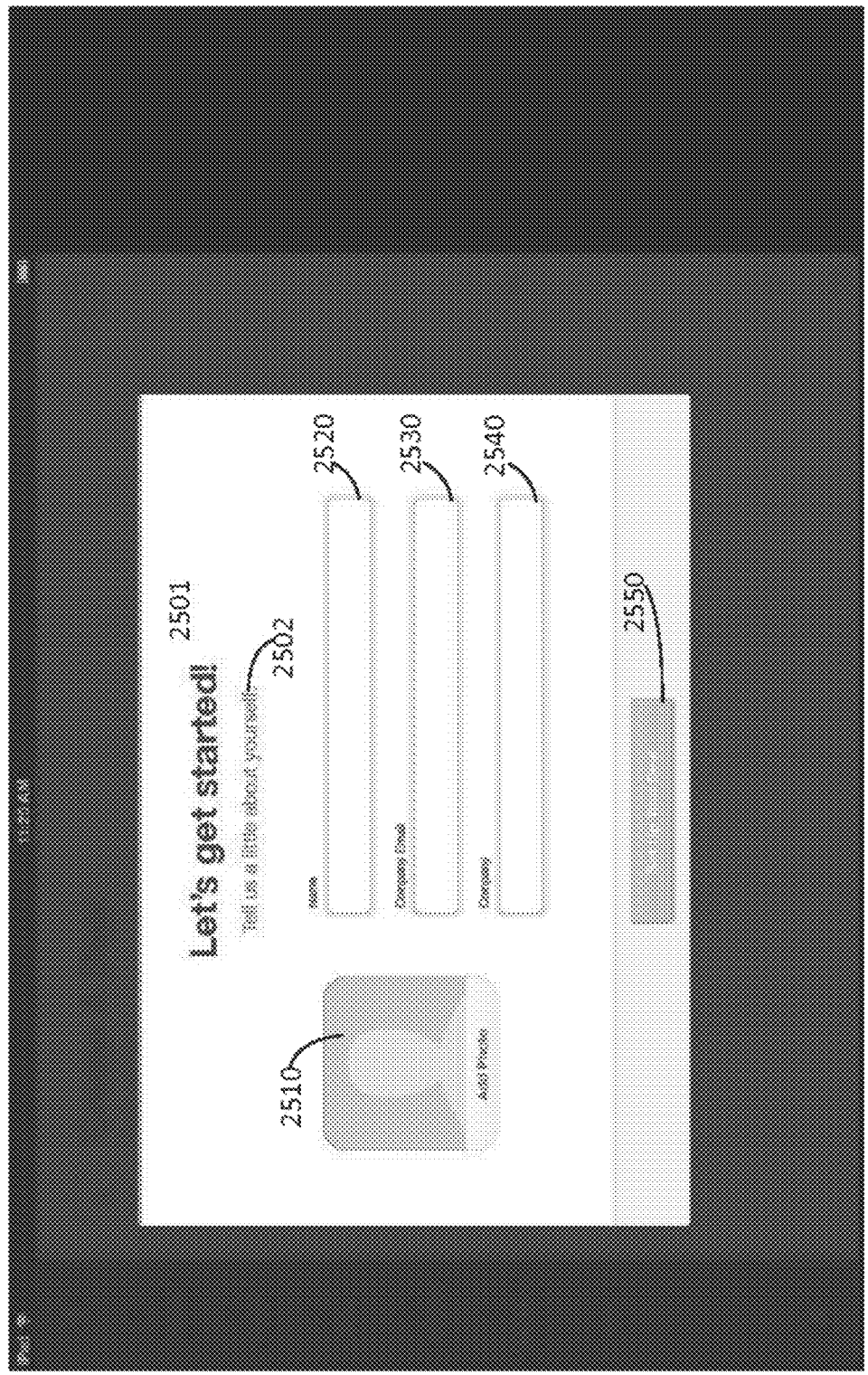
FIGS. 25-33 are screenshots illustrating an example user interface screen for setting up a method of managing business deals in an embodiment.

In step 1302, the user signs-up for one or more services. For example and without limitation, this may include downloading one or more apps for managing business deals such as business management apps (e.g., dealpath), web monitor apps (e.g., loggr), customer support apps (e.g., desk.com), social media monitoring apps (e.g., radian6), and website design apps (e.g., site.com). The step of signing up may also include choosing a plan that fits the size and needs of the business (see upgrade in FIG. 8 and FIG. 111 for an itemization of plans). The sign-up may also include providing the user's information and/or allowing the system to pull in calendar and/or contact information. In step 1304, contacts and calendar information may be pulled in from a multitenant database and/or another service. By way of example and without limitation, the contacts and calendar may be pulled in by allowing the system to access contacts and calendar information and/or manually inputting information having to do with the user, contacts and calendar items. FIGS. 25-26 provide examples of pulling in calendar information.

In step 1306, a deal is populated. In at least one embodiment, this may include providing all of the information related to a deal, such as the team, the companies, the revenue, the size of the deal, the stage of the deal, the primary contact, meetings, tasks, events, etc. Populating the deal may also include tracking, planning and inviting. FIGS. 28-33 provide examples of populating a deal. In step 1308, an event is scheduled. In at least one embodiment, this may include accessing a page that provides the user with functions and tools to set up and schedule an event. FIGS. 36-42 provide examples of scheduling an event. In step 1310 a sales team is built. In at least one embodiment, the team may be built by accessing a page that provides the user with functions and tools to set up a sales team.

In step 1312, contacts are added. In at least one embodiment, this may include accessing a page that provides the user with functions and tools to add contacts and/or allowing the system to access a user's contacts in email, social networking sites, etc.

In step 1314 a task is scheduled. In at least one embodiment, this may include accessing a page that provides the user with functions and tools to set up and schedule an task. FIGS. 43-48 provide examples of setting up a task.

Figure 34:
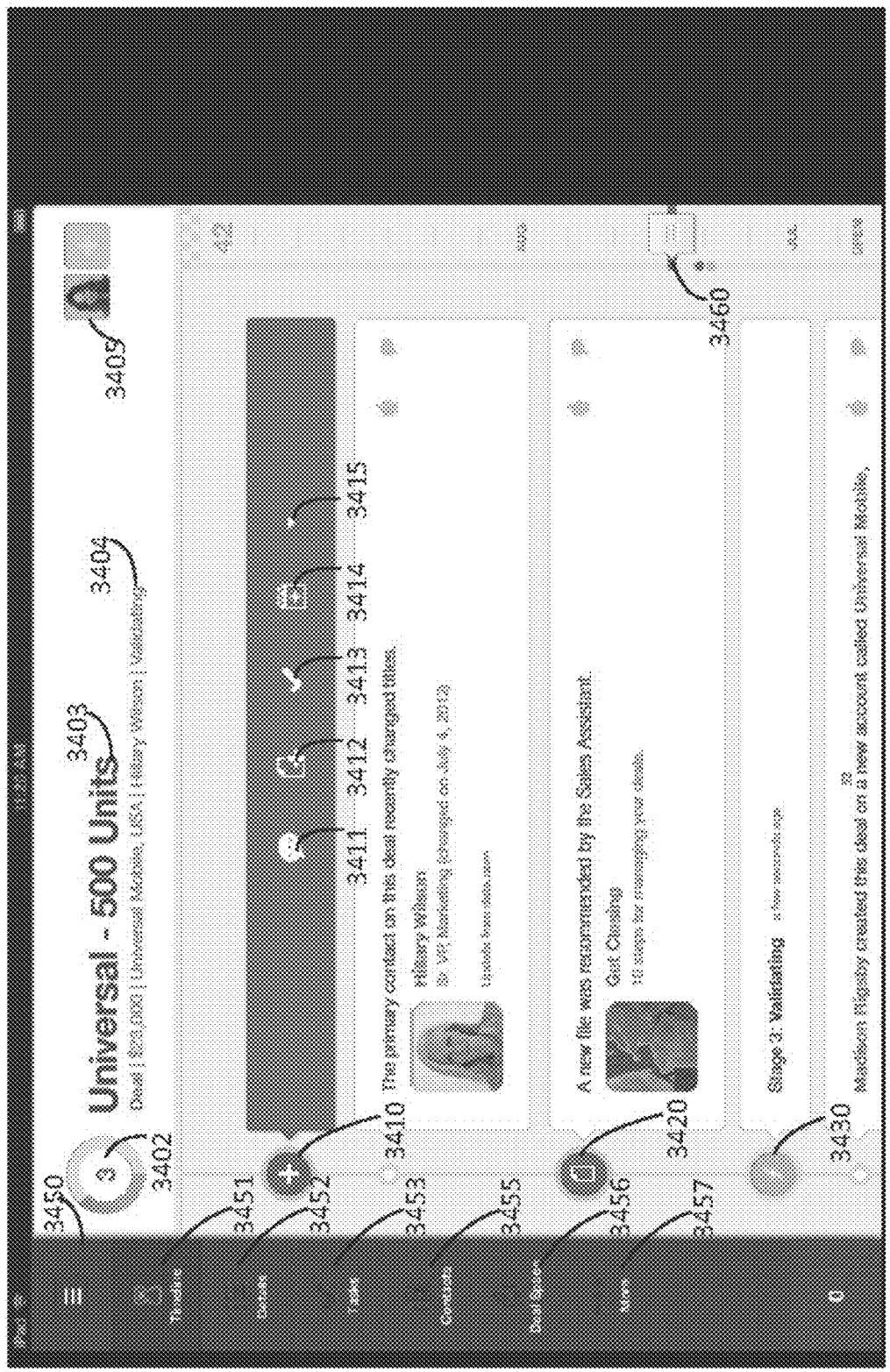
FIGS. 34-42 are screenshots illustrating an example user interface screen for adding an event for a method of managing business deals in an embodiment.

In optional step 1316, comments and/or files are added. In at least one embodiment, this may include accessing a page that provides the user with functions and tools to add a comment or file. FIG. 34 provides an example of adding a file.

In step 1318, a determination is made whether to exit method 1300. If yes, the client side method of managing business deals may end (step 1306). If no, method 1300 returns to steps 1306-1316 to create and/or edit more deals. In at least one embodiment, this may result in a deal being set up and closing the file. In at least one embodiment, the user may go back to step 1304 or 1302 and set up another deal. In at least one embodiment, when the user opens the dealpath app in the future, the user may add, edit, or remove any parts of the deal management that was set up in FIG. 13.

In an embodiment, each of the steps of method 1300 is a distinct step. In at least one embodiment, although depicted as distinct steps in FIG. 13, step 1302-1318 may not be distinct steps. In other embodiments, method 1300 may not have all of the above steps and/or may have other steps in addition to or instead of those listed above. The steps of method 1300 may be performed in another order. Subsets of the steps listed above as part of method 1300 may be used to form their own method.

Figure 14:
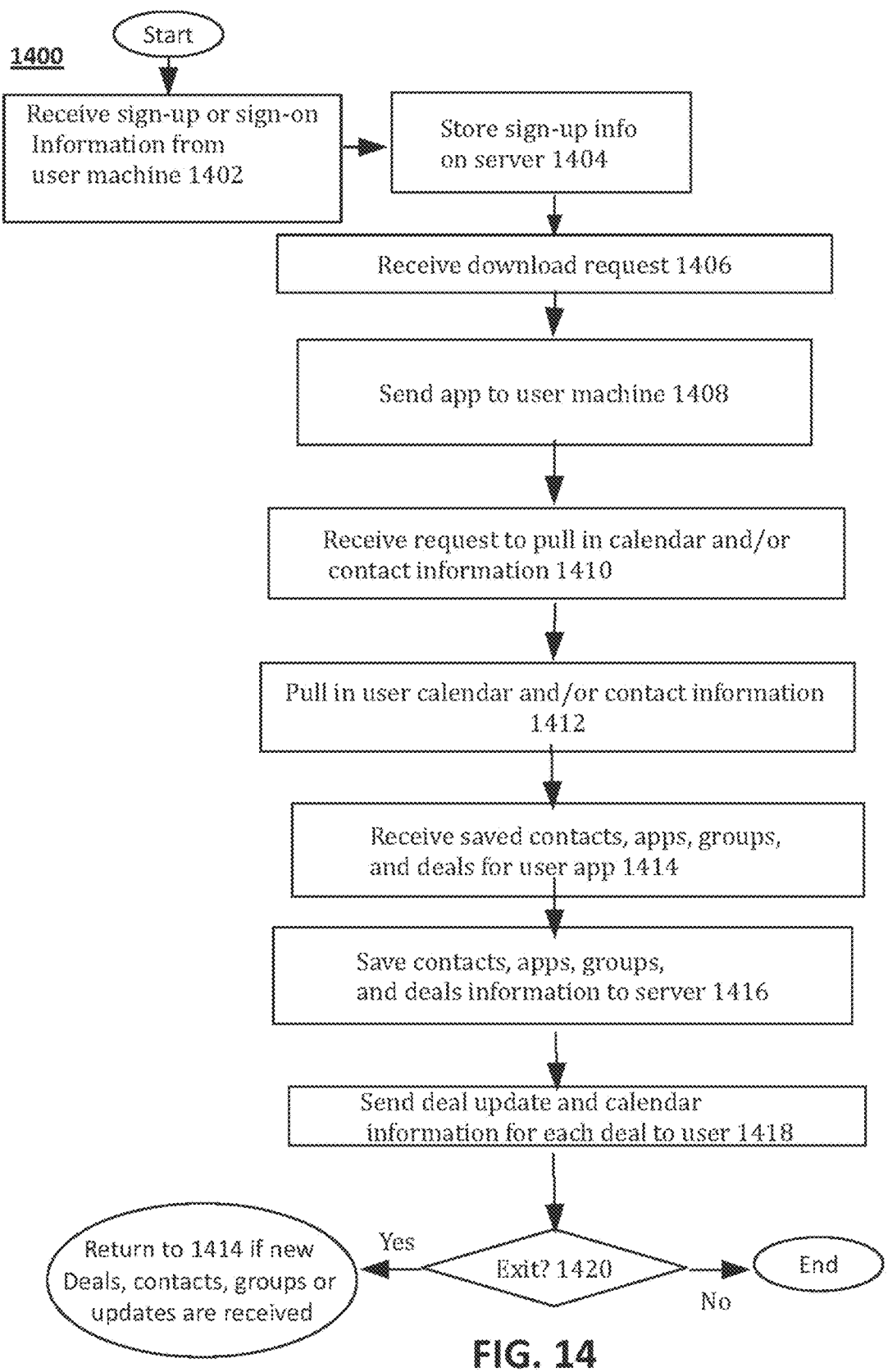
FIG. 14 is an operational flow diagram illustrating a server side method of managing business deals in an embodiment.

FIG. 14 shows a flow diagram of an embodiment of a server side method 1300 of managing business deals.

In step 1402, sign-up or sign-on information is received from a user machine. For example and without limitation, step 1402 may include sending a page having fields to be filled in by the user for the sign-in or sign-on information, or asking the user if the server may access the user's contacts and calendar. Allowing the server to access the user's contacts and calendar may include receiving the information from the server asking the user to allow the server to access the information, and/or receiving from the server an agreement by the user to allow the server to access the calendar and/or contact information, and/or, filling any empty fields with the information from the calendar or contact information.

Store sign-up information on the server (block 1404). By way of example and without limitation, storing sign-up information on the server may include storing the information as the user's information to be used for security purposes and/or sign-in purposes (FIGS. 25-26 provide examples of sign-up information). Steps 1404 and 1406 may happen simultaneously and/or 1406 may happen before 1404.

Receive download request (block 1406). In at least one embodiment, receiving a download request may include a request to download one or more apps associated with a method of managing business deals (see also FIG. 13). The apps may include business management apps (e.g., dealpath), web app monitoring apps (e.g., loggr), customer support apps (e.g., desk.com), social media monitoring apps (e.g., radian6), and website design apps (e.g., site.com). The step of signing up may also include choosing a plan that fits the size and needs of the business (FIG. 8 and FIG. 111 discuss upgrades and give examples of itemization with various upgrades).

Send app(s) to user machine (block 1408). In at least one embodiment, sending app(s) to a user machine may include sending a GUI and functions to the user's machine to provide the user with functions and tools to use a method of managing business deals.

Receive request to pull-in calendar and/or contact information (block 1410). In at least one embodiment, receiving a request to pull-in calendar and/or contact information may include sending a request to the user that the system may access the user's calendar and/or contact information. If the user says yes, accessing the user's contacts and calendar information (FIGS. 25-26 provide an example of a request to pull-in calendar or contact information) and/or obtaining any information that is manually inputted by the user, including information having to do with the user, contacts and calendar items. Step 1410 may occur simultaneously with steps 1404 and 1406 or may occur before or after any of the steps.

Pulling in user calendar and/or contact information (optionally) (block 1412) may include identifying which contact and/or calendar information is needed and populating the fields with the information. Pulling in user calendar and/or contact information may also include providing the user with an opportunity to review the information that was pulled in and/or to edit that information.

Receiving saved contacts, apps, groups, and deals for user application (block 1414) may include receiving a request from the user to add contacts, apps, groups, and deals and associating the contacts, apps and deals with the specific user.

Saving contacts, apps, groups, and deals information to the server for the user (block 1416) may include associating the information obtained from the user in steps 1402-1414 with the user and the deal. The information may be saved by the server on any type of storage.

Send deal update and calendar information for each deal to user and groups associated with the deal (block 1416) may include keeping track of the deal in association with a timeline and providing the user with the timeline, reminders, and deadlines as the dates appear.

Exit? (block 1420). If no, the server side method of managing business deals may end. If yes, return to 1414 if new deals, contacts, groups or updates are received.

In an embodiment, each of the steps of method 1400 is a distinct step. In at least one embodiment, although depicted as distinct steps in FIG. 14, step 1402-1420 may not be distinct steps. In other embodiments, method 1400 may not have all of the above steps and/or may have other steps in addition to or instead of those listed above. The steps of method 1400 may be performed in another order. Subsets of the steps listed above as part of method 1400 may be used to form their own method.

Screenshots

Figure 15:
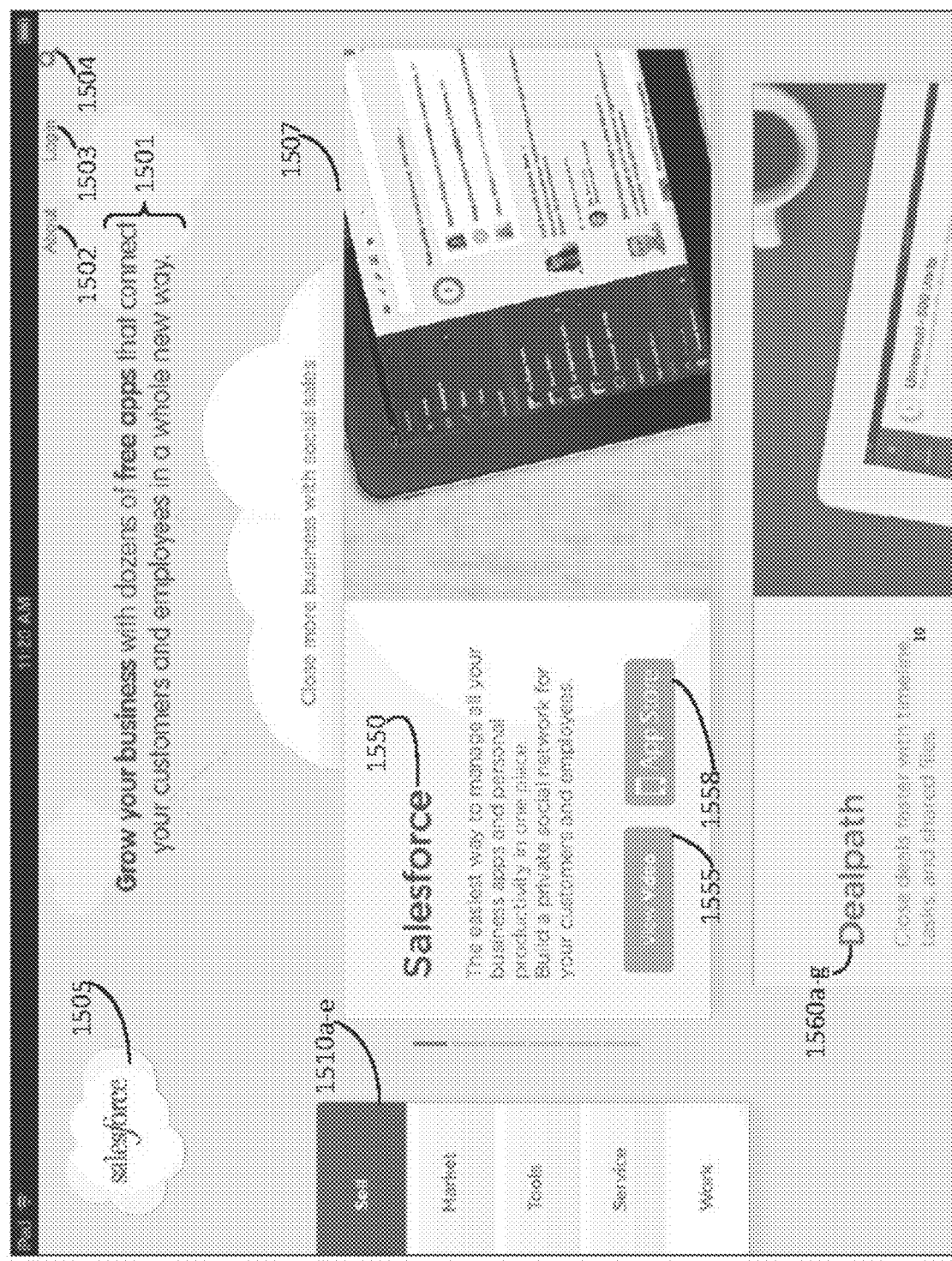
FIGS. 15-20 are screenshots illustrating an example user interface screen for downloading apps for a method of managing business deals in an embodiment.
Figure 99:
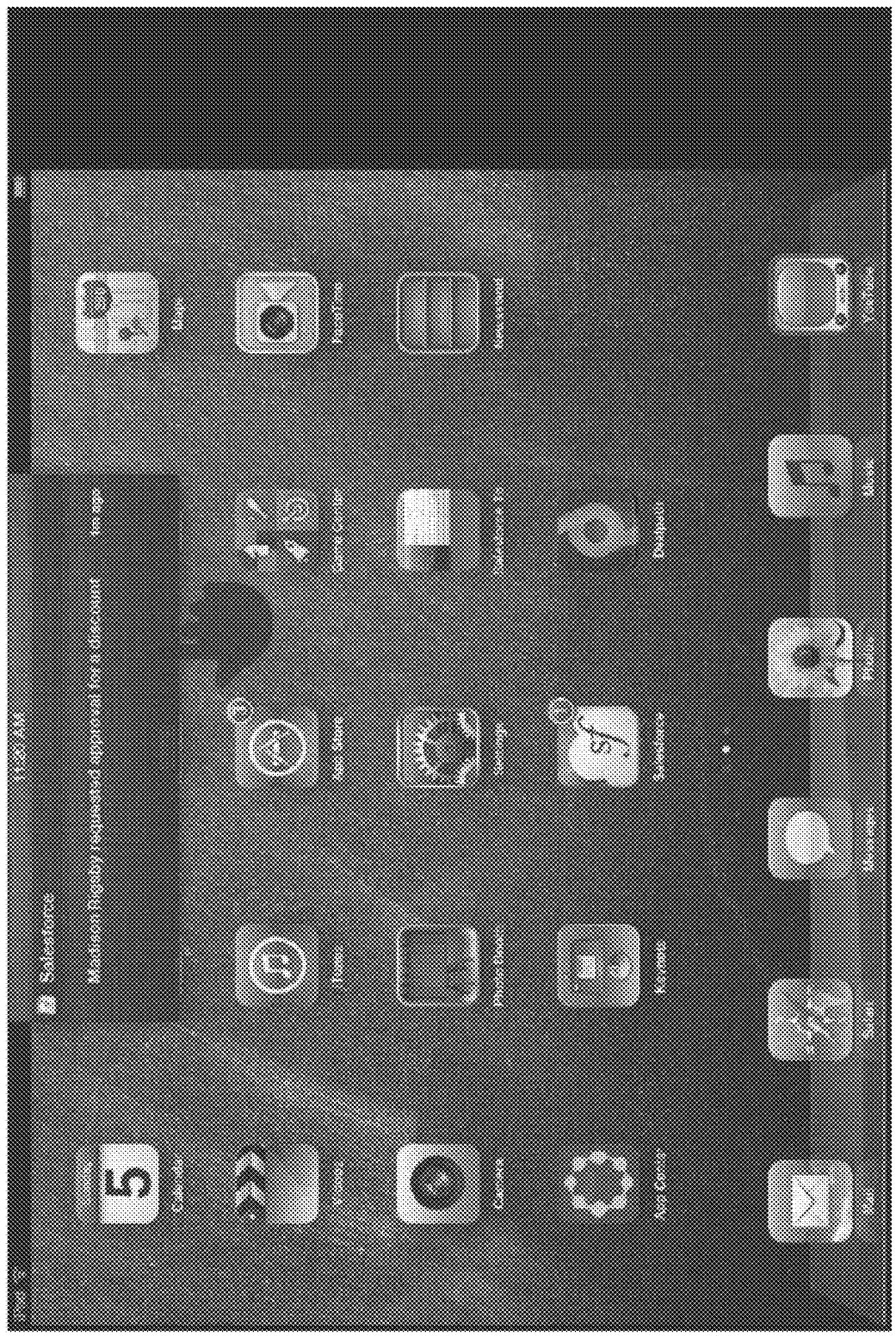

FIGS. 15-126 show screenshots of embodiments of webpages of a user interface for providing systems and methods for managing business deals. The screenshots use as an example, a deal between Universal and Friendzy to illustrate how the dealpath app and the other apps interwork to provide a method of managing a business deal (see e.g., FIG. 2). The methods provide a dynamic and interactive user-interface that interacts with social communication tools and provides the user with functions and tools to set the user's own choice of user-defined operability. In the following descriptions, first a brief explanation of how FIGS. 15-126 relate to one another is presented which is followed by a more detailed explanation of FIGS. 15-126. FIGS. 15-20 show screenshots of embodiments of webpages that may be used to set up and download methods for managing business deals by incorporating a number of apps related to different parts of the business process. FIGS. 21-99 show screenshots showing embodiments of webpages used for implementing the process after the apps are downloaded and the dealpath app is opened. See FIG. 2 for an introduction to the dealpath app. FIGS. 100-126 show screenshots of embodiments of webpages used for implementing the process after a business deal has been set up and the user activates his or her ipad or other device.

FIGS. 15-22 show examples of app categories from a home page. The user may choose, view, try out, and purchase apps from these pages. The apps are different ways to access and contribute data to the same database. Each app is optimized for specific tasks. The cloud menu (see FIG. 101 left panel) gives the user a way to jump between apps without using the device home screen. In at least one embodiment, FIGS. 15-20 are a single page that the user may scroll or swipe down to view the different apps. All of the apps may have the cloud menu to work between apps (see FIG. 101 left side panel). The cloud menu gives the user a way to jump between apps without using the device home screen.

FIG. 15 shows an example of a screenshot of an embodiment of a App store webpage 1500 that is shown to a user upon opening a webpage for downloading apps for a method and system for managing business deals. App store webpage 1500 may include embodiments of webpage explanation 1501, about button 1502, login button 1503, find button 1504, icon 1505, webpage statement or title 1507, mobile multitenant links 1510a-g, app link 1550, view video button 1555, app store button 1558, and other apps 1560a-g. In other embodiments, app store webpage 1500 may not have all of the elements or components listed above and/or may have other elements or components instead of or in addition to those listed.

Explanation 1501 functions to explain to the user what the apps may do (see "Grow your business with dozens of free apps that connect your customers and employees in a whole new way).

The about button 1502 sends the user to a page that explains the parent company (e.g., Salesforce) as well as some of the apps that are available through the parent company (e.g., Salesforce).

The login button 1503 transports a user that has already signed up for the parent company (e.g., Salesforce) to sign in.

The find button 1504 finds a word or phrase (e.g., boolean) to find a specific function, deal, video, app, or any aspect of the parent company (e.g., Salesforce).

The icon 1505 provides a pictorial view of the parent company. The icon shown in FIG. 15 is a cloud with the word "Salesforce" inside. In at least one embodiment, an icon for the specific app is shown on the page. If the user clicks on the cloud icon, the underlying parent company's (e.g., Salesforce) platform is revealed and shows the user that the user has access to links for all of the parent company's (e.g., Salesforce) apps and default productivity tools.

The webpage statement or title 1507 functions to quickly explain to the user the function of the page or screen functions. For example, in FIG. 15, the webpage statement is "close more business deals with social sales."

The mobile multitenant links 1510a-g include Sell, Market, tools, service, and work and will be discussed in more detail with reference to FIG. 1.

The app field 1550 provides a space for the information about the primary app (Salesforce) including the name of the app, the information about the app (see "The easiest way to manage all your business apps and personal productivity in one place. Build a private social network for your customers and employees."), a video link, and an app store link.

The view video button 1555, when activated, sends the user to a page where the user may view a video that explains, summarizes and/or tutors the user on the specific app.

The app store button 1558, when activated, sends the user to a page where the user may purchase the specific app (e.g., Salesforce).

Other apps 1560a-g may be any app that may be used may be any app that may be used with the parent company (e.g., Salesforce). Other apps are shown above and/or below the primary app on each page. Thus, dealpath is shown in the background on the the parent company's (e.g., Salesforce) page.

Figure 16:
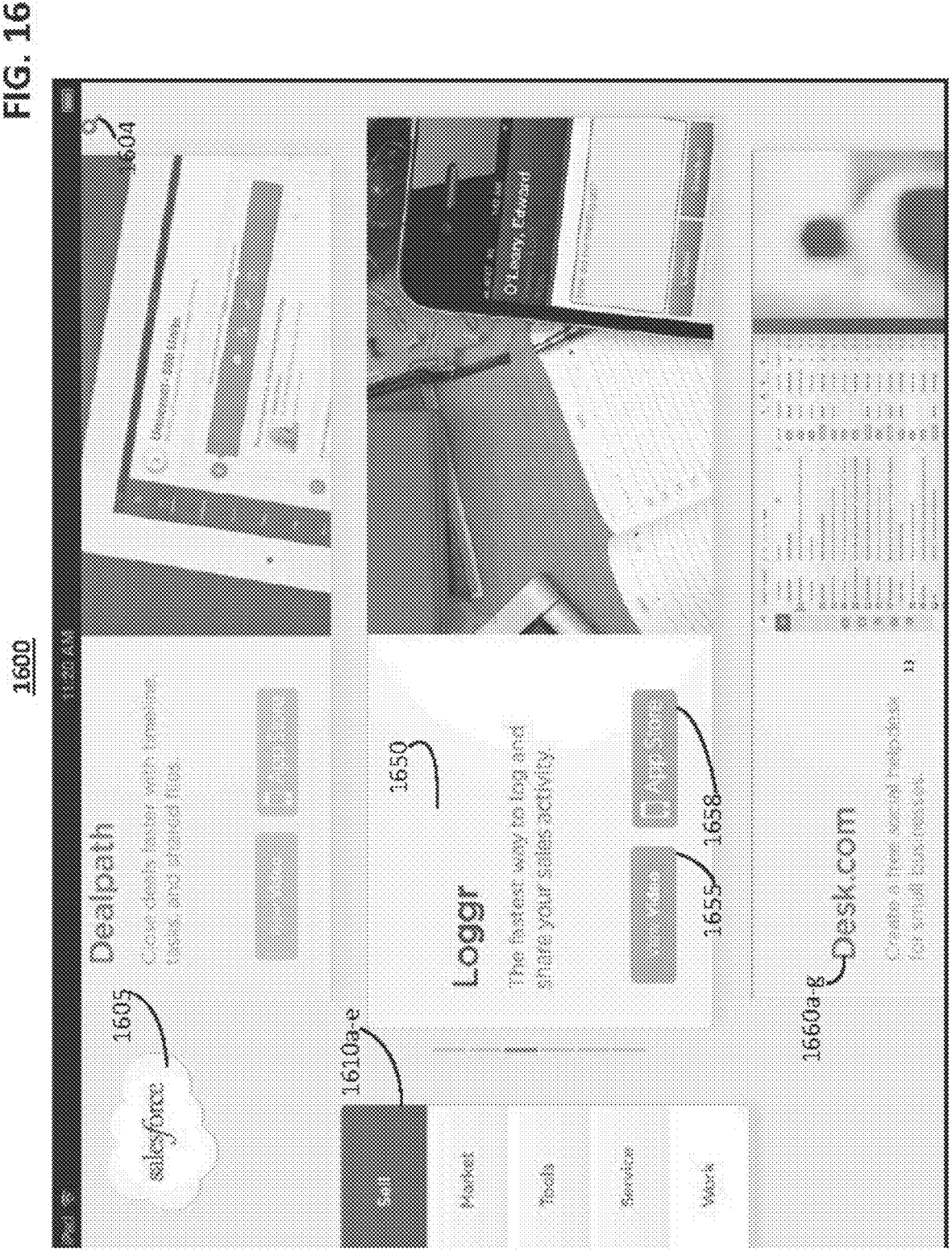

FIG. 16 shows an example of a screenshot of an embodiment of App store webpage 1600 that is shown to a user upon scrolling down from the webpage 1500 shown in FIG. 15. App store webpage 1600 may include embodiments of find button 1604, icon 1605, mobile multitenant links, app link 1650, view video button 1655, app store button 1658, and other apps 1660. In other embodiments, app store webpage 1600 may not have all of the elements or components listed above and/or may have other elements or components instead of or in addition to those listed.

Find button 1604, icon 1605, and mobile multitenant links have been explained with reference to FIG. 15.

App link 1650 functions to provide a link for users to download Web app monitoring app (e.g., loggr) and to give a brief explanation of the app (see "The fastest way to log and share your sales activity").

When the view video button 1655 associated with Web app monitoring app (e.g., loggr) is chosen, the user is sent to a webpage that plays a short video explaining and/or teaching the user about the Web app monitoring app (e.g., loggr).

When the app store button 1658 associated with the web app monitoring app (e.g., loggr) is chosen, the user may buy and/or download the web app monitoring app (e.g., loggr).

Other apps 1660a-g provides a preview of other apps that may be viewed and/or downloaded. These apps may be activated by scrolling up or down until the app is no longer in the background.

Figure 17:
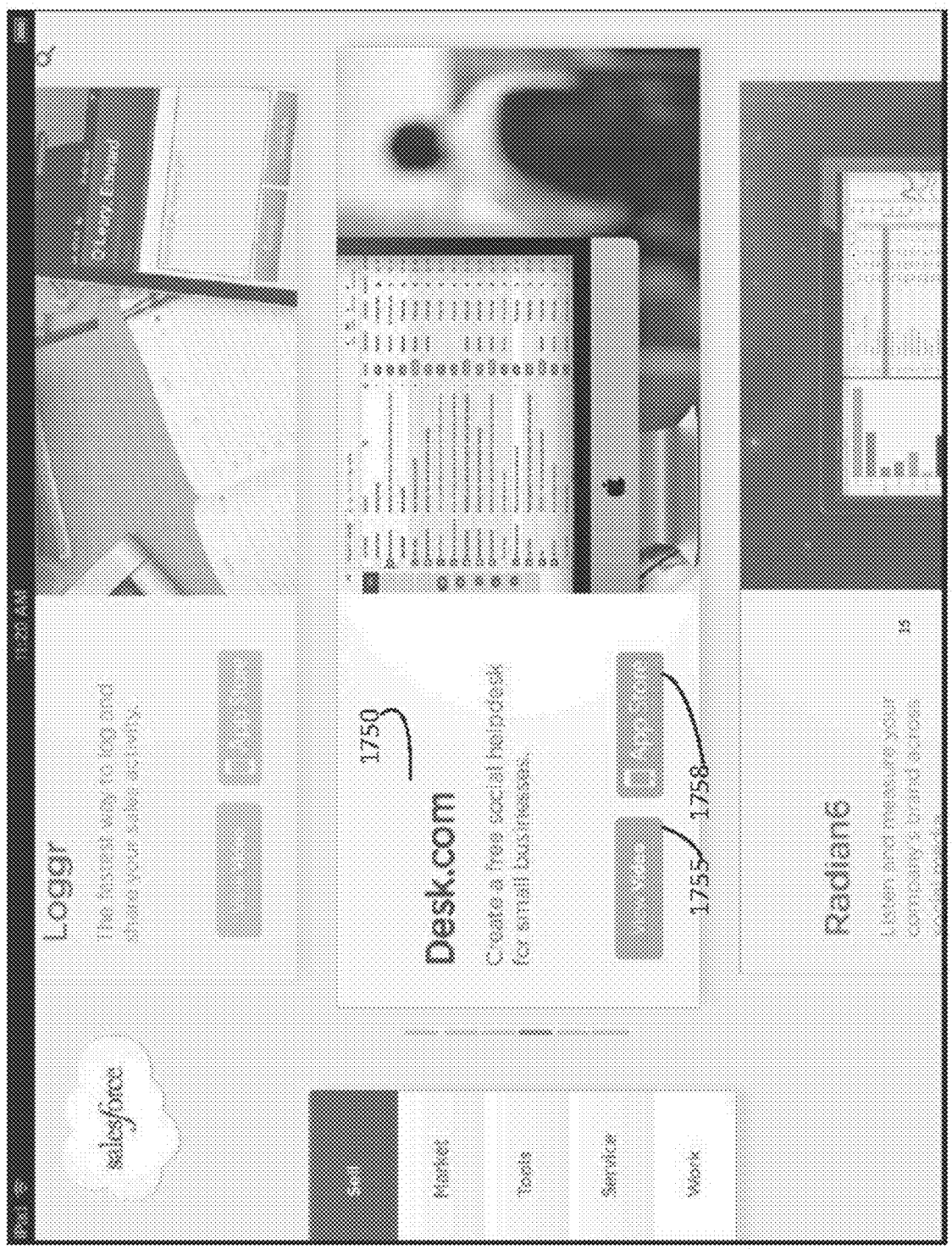

FIG. 17 shows an example of a screen of an embodiment of a App store webpage 1700 that is shown to a user upon scrolling down from the webpage 1500 shown in FIG. 15. App store webpage 1700 may include embodiments of app link 1750, view video button 1755, app store button 1758, and other apps 1760a-g. In other embodiments, app store webpage 1700 may not have all of the elements or components listed above and/or may have other elements or components instead of or in addition to those listed.

App link 1750 functions to provide a link for users to download a customer support app (e.g., Desk.com) and to give a brief explanation of the customer support app (see "Create a free social helpdesk for small businesses").

When the view video button 1755 associated with a customer support app is chosen, the user is sent to a webpage that plays a short video explaining and/or teaching the user about the app (e.g., Desk.com).

When the app store button 1758 associated with the customer support app (e.g., desk.com) is chosen, the user may buy and/or download the customer support app (e.g., desk.com) app.

Other apps 1760*a-g* provides a preview of other apps that may be viewed and/or downloaded (see Loggr above Desk.com and Radian6 below Desk.com). These apps may be activated by scrolling up or down until the app is no longer in the background.

Figure 18:
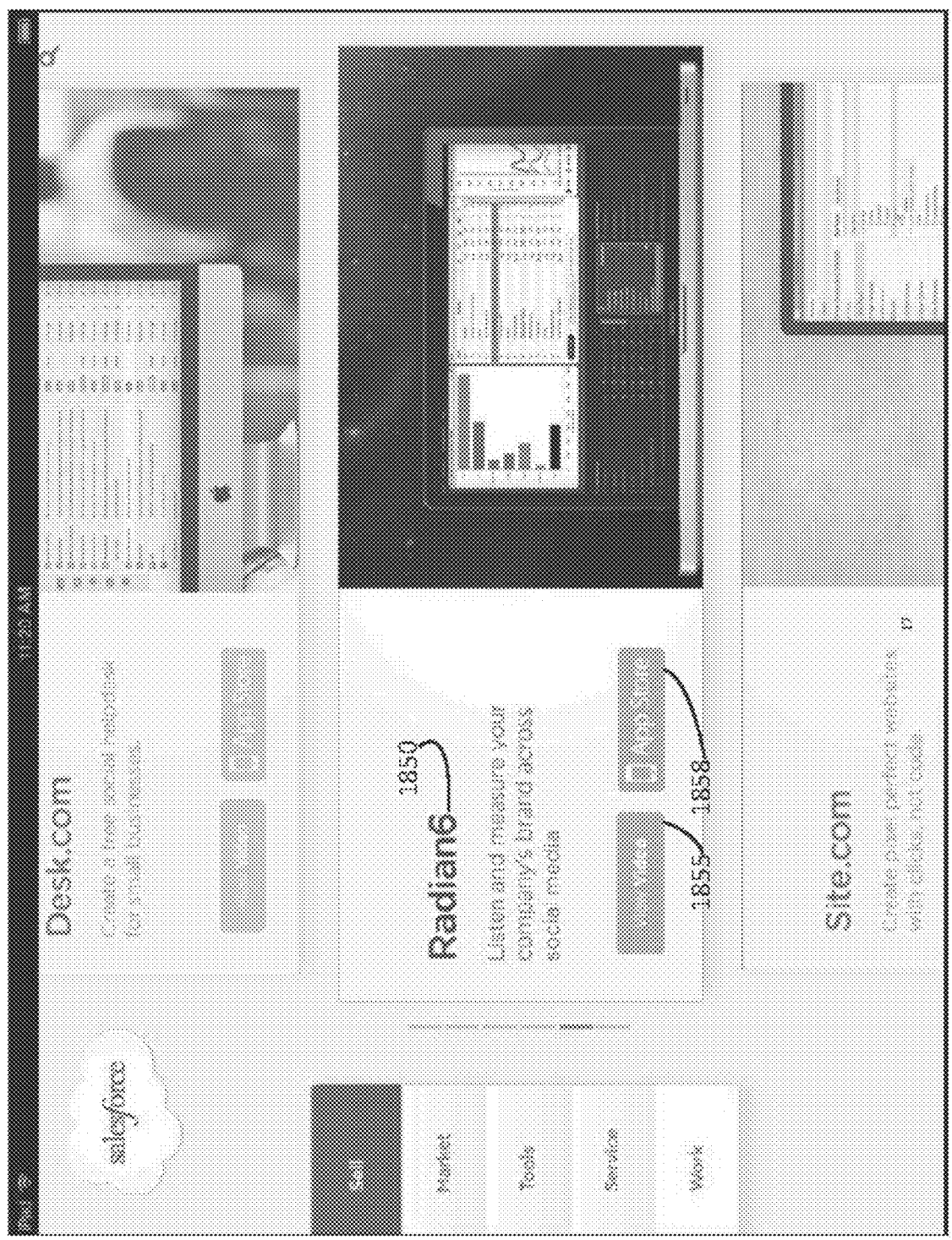

FIG. 18 shows an example of a screen of an embodiment of a App store webpage 1800 that is shown to a user upon scrolling down from the webpage 1500 shown in FIG. 15. App store webpage 1800 may include embodiments of app link 1850, view video button 1855, app store button 1858, and other apps 1860*a-g*. In other embodiments, app store webpage 1800 may not have all of the elements or components listed above and/or may have other elements or components instead of or in addition to those listed.

App link 1850 functions to provide a link for users to download one or more social media monitoring app(s) (e.g., Radian6) and to give a brief explanation of the app FIG. 18 provides the app name "Radian6" as the app link with the information "Listen and measure your company's brand across social media" below the name of the app. The user may select the Radian6 app by clicking on the name of the app.

When the view video button 1855 associated with Radian6 is chosen, the user is sent to a webpage that plays a short video explaining and/or teaching the user about the social media monitoring app (e.g., Radian6).

When the app store button 1858 associated with Radian6 is chosen, the user may buy and/or download the Radian6 app.

Other apps 1860*a-g* provides a preview of other apps that may be viewed and/or downloaded (see Desk.com above Radian6 and Site.com below Radian6). These apps may be activated by scrolling up or down to the desired app and selecting the app. In at least one embodiment, the app is activatable once the app name enters the user's view. In at least one embodiment, the user scrolls until the app is no longer in the background.

Figure 19:
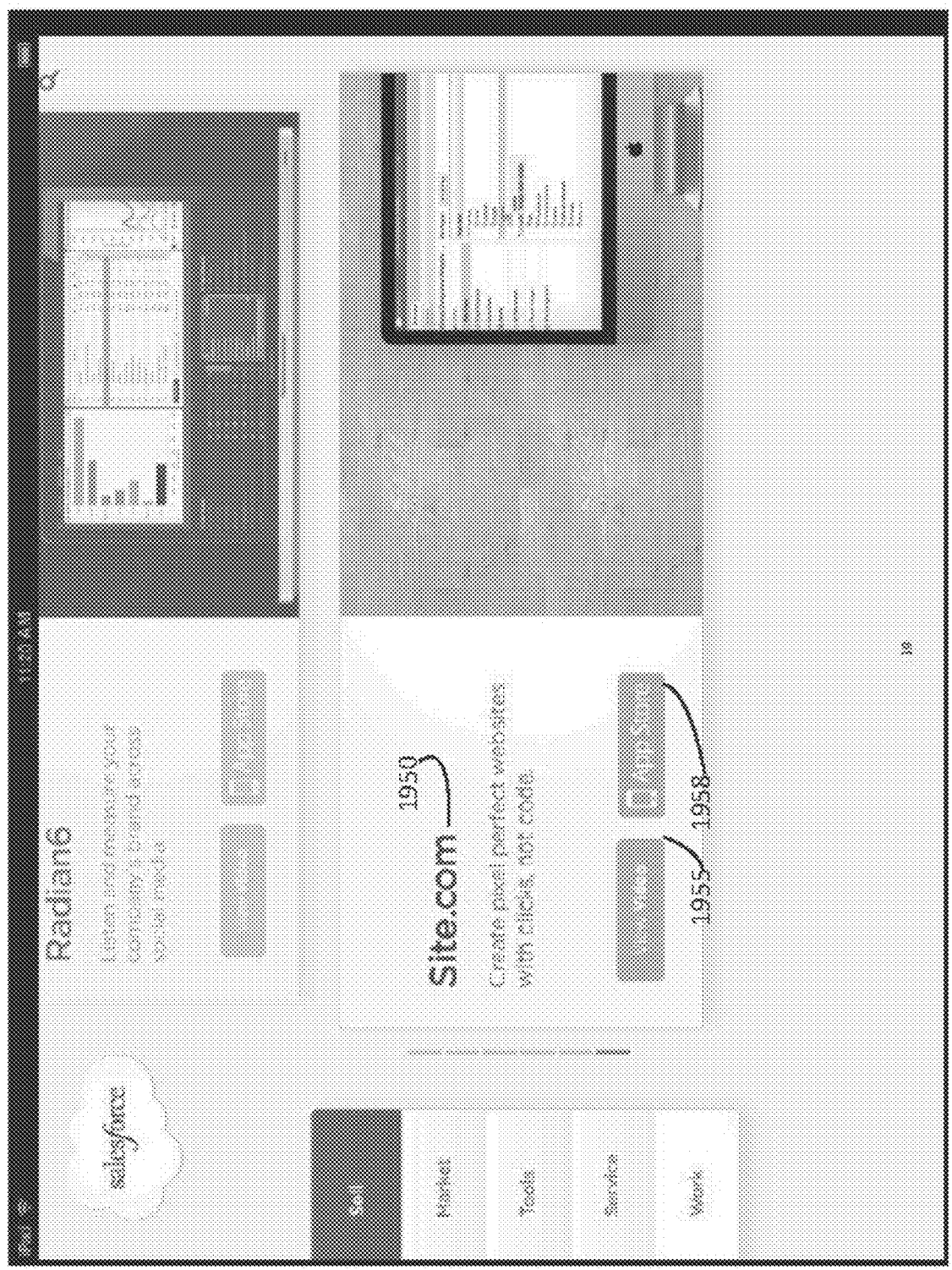

FIG. 19 shows an example of a screen of an embodiment of a App store webpage 1900 that is shown to a user upon scrolling down from the webpage 1500 shown in FIG. 15. App store webpage 1900 may include embodiments of app link 1950, view video button 1955, app store button 1958, and other apps 1960*a-g*. In other embodiments, app store webpage 1900 may not have all of the elements or components listed above and/or may have other elements or components instead of or in addition to those listed.

App link 1950 functions to provide a link for users to download an app to design websites (e.g., Site.com) and to give a brief explanation of the app (see "Create pixel perfect websites with clicks, not code").

When the view video button 1955 associated with an app to design websites (e.g., Site.com) is chosen, the user is sent to a webpage that plays a short video explaining and/or teaching the user about the app (e.g., Site.com).

When the app store button 1958 associated with the website design app (e.g., Site.com) is chosen, the user may buy and/or download the app.

Other apps 1960*a-g* provides a preview of other apps that may be viewed and/or downloaded (see Radian6 above Site.com). These apps may be activated by scrolling up or down until the app is no longer in the background.

Figure 20:
Figure 21:
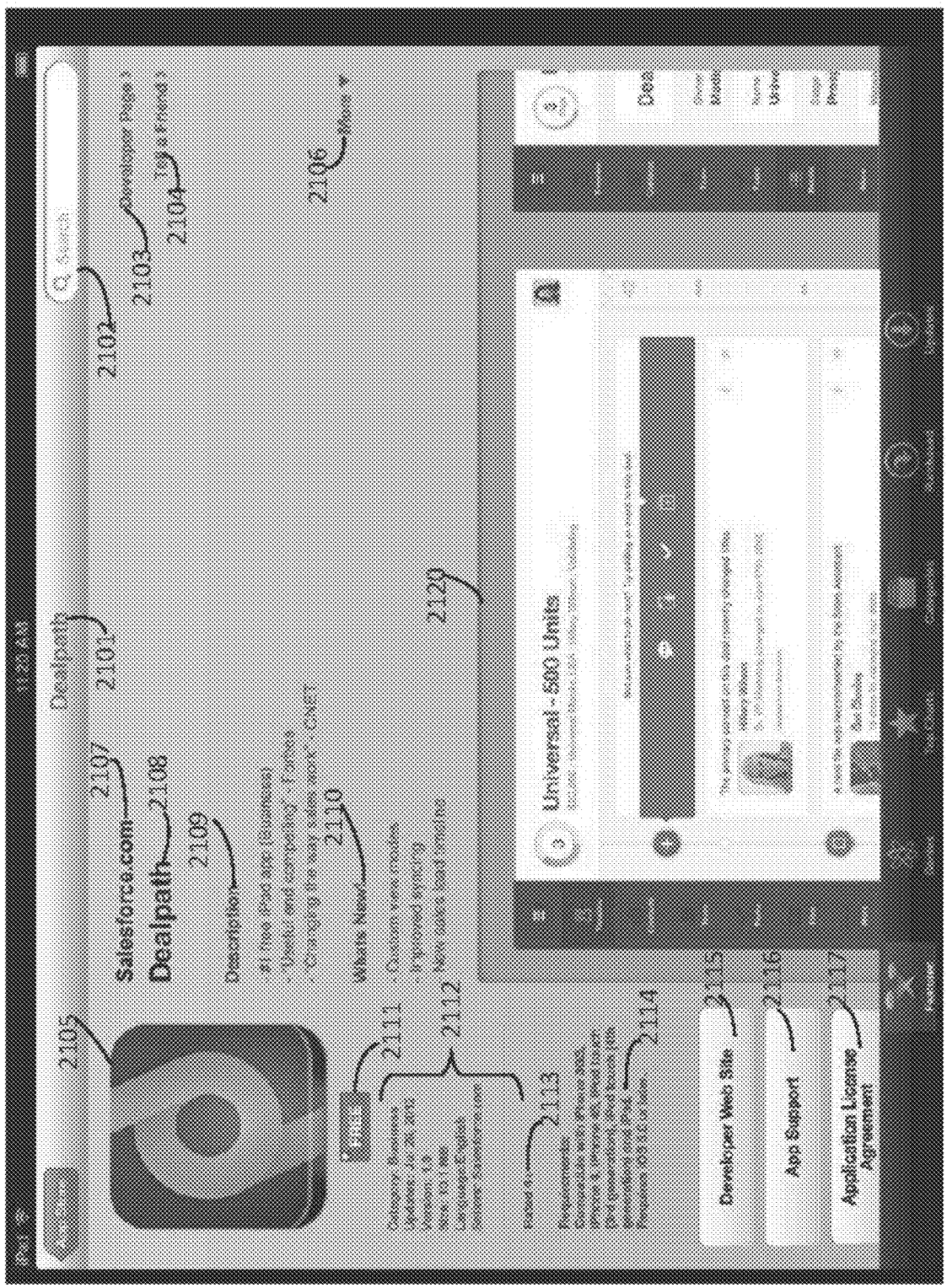
FIGS. 21-22 are screenshots illustrating an example user interface screen for downloading a dealpath app for a method of managing business deals in an embodiment.

FIG. 20 shows an example of a screen of an embodiment of a App store webpage 2000 that is shown to a user upon scrolling down from the webpage 1500 shown in FIG. 15. App store webpage 2000 may include embodiments of app link 2050, view video button 2055, app store button 2058, and other apps 2060*a-g*. In other embodiments, app store webpage 2000 may not have all of the elements or components listed above and/or may have other elements or components instead of or in addition to those listed.

App link 2050 functions to provide a link for users to download a business management app (e.g., dealpath app) (see FIG. 2) and to give a brief explanation of the app (see "Close deals faster with timeline, tasks, and shared files").

When the view video button 2055 associated with business management app (e.g., dealpath) is chosen, the user is sent to a webpage that plays a short video explaining and/or teaching the user about the business management app (e.g., dealpath app).

When the app store button 1958 associated with the business management app (e.g., dealpath app) is chosen, the user may buy and/or download the app. The user may be sent to a page that gives more detail about the different packages and prices that might apply to the specific needs of the business and/or the user (see, e.g., FIG. 111).

Other apps 2060*a-g* provides a preview of other apps that may be viewed and/or downloaded (see Salesforce above dealpath, and loggr below). These apps may be activated by scrolling up or down until the app is no longer in the background.

Figure 22:
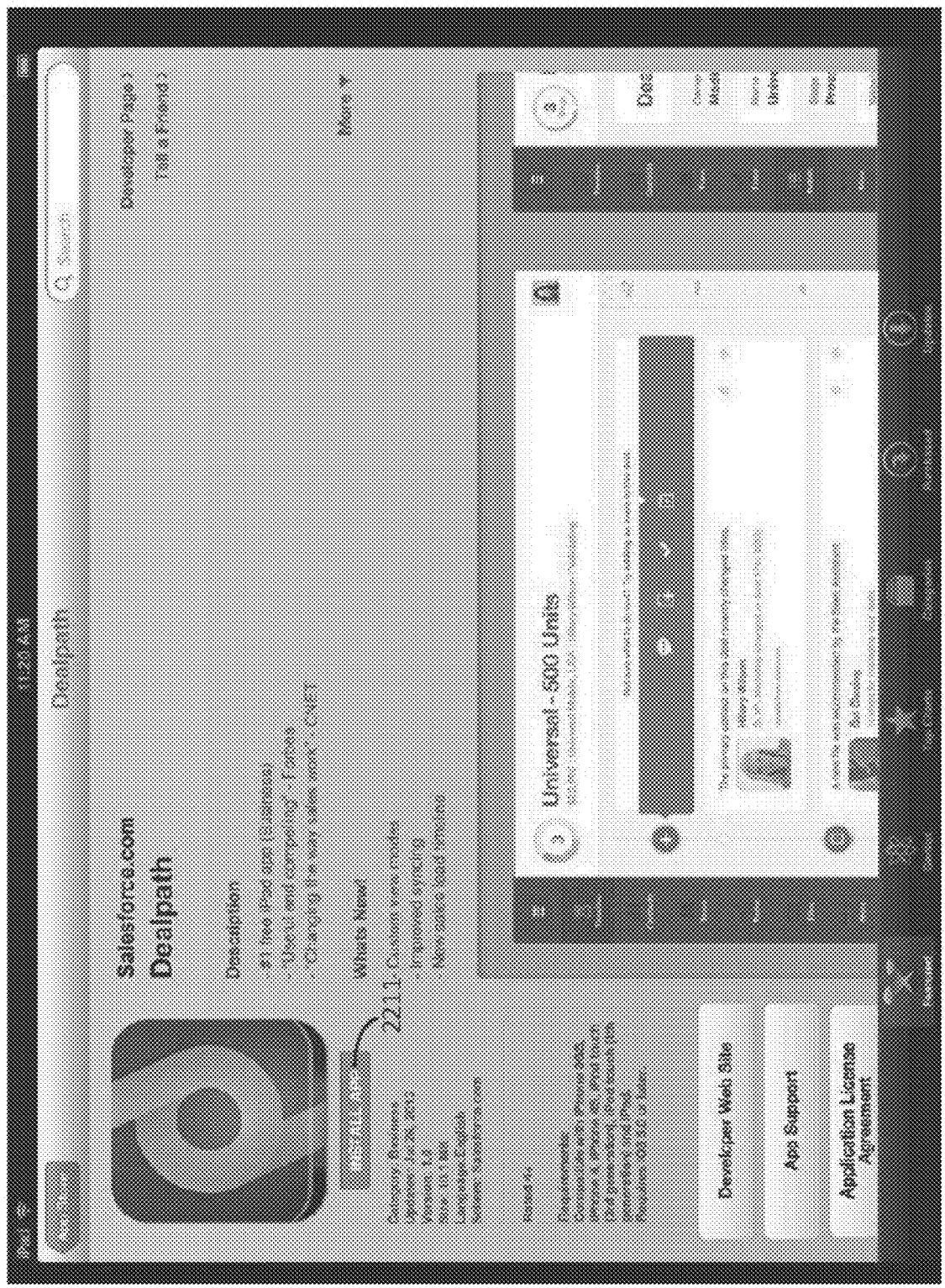

FIGS. 21 and 22 show examples of a screen of embodiments of App store webpages 2100 that are shown to a user upon activating the button for App store for any of the Apps in FIGS. 15-20 and an example of a screenshot that is shown to a user upon activating the free button in FIG. 21. App store webpage 2100 may include embodiments of app page heading 2101, search field 2102, developer page link 2103, tell a friend link 2104, icon 2105, more 2106, website title 2107, app title 2108, app description 2109, explanation of new feature in app 2110, purchase button 2111, app info 2012, app rating 2113, app requirements 2114, developer web site link 2115, app support link 2116, application license agreement 2117, app preview 2120, app store bar 2150, featured 2151, genius 2152, top charts 2153, categories 2154, purchased 2105, and updates 2106. In other embodiments, app store webpage 2100 may not have all of the elements or components listed above and/or may have other elements or components instead of or in addition to those listed.

App page heading 2101 conveys the purpose of the page. In the case of FIG. 21, the app page heading 2101 is the app that the user has chosen to purchase (dealpath).

The search field 2102 provides a fillable field to search for a word or phrase within the webpage.

Developer page link 2103 functions to develop a GUI that fits the specific needs of a specific business.

The tell a friend link 2104 functions to send a user to a page where the user may easily send a prewritten message about the app to one or more friends via email.

The icon 2105 may be an icon specific to the app that is being purchased and/or may be the website icon.

More link or pulldown 2106 may include any functions or actions that are not covered by the bottom navigation bar, the links on the page, and the buttons on the page having to do with purchasing and choosing apps to download.

Website title 2107 provides the information about what website the app is being purchased from—Salesforce.com (or any on demand and/or multitenant database).

App title 2108 provides the information about what app is being purchased. In the case of FIG. 21, the app is dealpath.

App description 2109 may be headed "Description" and may include information about the app, such as "—#1 free iPad app (Business); —Useful and compelling"—Forbes; —"Changing the way sales work"—CNET.

Explanation of new feature in app 2110 functions to tell a user what types of features have been added recently to the app. The Explanation is headed "What's New!" For example, in FIG. 21, the new features include: "—Custom view modes; —Improved syncing; —New sales lead timeline."

Purchase button 2111 functions to send the user to a page that provides the user with functions and tools to purchase the app. In the case of the dealpath app, the purchase price is "FREE" as shown on the button in FIG. 21. However, in at least one embodiment, the purchase price may be shown on the button or provided upon activating the purchase button. Purchase button 2111 may function to send the user to a page that provides the user with functions and tools to enter the information needed to purchase the app (e.g., name, address, credit card info, etc.).

App info 2012 provides information about the app, such as category (Business), last update date (Jul. 26, 2012), version (1), size (10.1 MB), language (English), and seller (Salesforce.com).

The app rating 2113 provides information about the rating of the app. Users may try the apps out and rate the apps according to various parameters. Parameters of difficulty, popularity, fun, usefulness, quality, etc. The ratings may be summarized by a single numerical rating (e.g., 4+).

The app requirements 2114 provides information about what is needed on the users computer in order for the app to run correctly. Requirements may include compatibility with electronic devices and requirement for other programs or apps. (see: compatible with iPhone 3GS, iPhone 4, iPhone4S, iPod touch (3rd generation), iPod touch (4th generation) and iPad. Requires iOS 5.0 or later.)

The developer web site link 2115 sends the user to a page that provides the user with functions and tools to develop a web site or GUI that is specific to the business.

The app support link 2116 sends the user to a page that provides the user with functions and tools to find frequently asked questions, to email app support with a specific question, and/or to download instructions.

The application license agreement button 2117 sends the user to a page that provides a detailed report of the license agreement and provides the user with functions and tools to indicate that the user has read and agrees with the license agreement.

The app preview 2120 provides a photographic preview of a screenshot of the app. The app preview gives the potential buyer an idea of what the graphical user interface (GUI) of the app.

The app store bar 2150 was discussed above with reference to FIG. 15.

However, with reference to FIG. 21, the app store also provides tabs that are typically available on a device such as an iphone. The tabs on the bottom of FIG. 21 provide such features as the featured link 2151, the genius link 2152, the top charts link 2153, the categories link 2154, the purchased link 2155, and the updates link 2156. These links are explained in more detail below.

The featured link 2151 may be found on the bottom navigation bar and functions to show the user which app is featured that day. The featured app may provide the user with a free trial and/or may include information on how to purchase the app. The featured app may have some promotion associated with purchase of the app (e.g., a discount, a coupon, etc.).

The genius link 2152 may be found on the bottom navigation bar and functions to show the user which app is particularly innovative. Which app(s) are innovative may be decided by the company that makes the phone (e.g., Apple) or by a vote of users.

The top charts link 2153 may be found on the bottom navigation bar and functions to show the user which app is the most popular as decided by the users and/or purchasers.

The categories link 2154 may be found on the bottom navigation bar and functions to provides the user with the ability to browse the apps according to categories. For example, if the user wants an app based on the category the app is in, the category browser allows the user to see how many apps are available and which ones the user might want to buy.

The purchased link 2155 may be found on the bottom navigation bar and shows the user which apps the user has purchased.

The updates link 2156 may be found on the bottom navigation bar and functions to provide the user with functions and tools to download updates to the already purchased apps. Upgrades provide the user with more features and functions for the apps or with better functioning variations.

In FIG. 22, as a result of the purchase, the purchase button 2111 reads "INSTALL APP". Thus, the user may install the app the user purchased by selecting the button 2111 and following the directions provided.

Figure 23:
FIGS. 23-24 are screenshots illustrating an example user interface screen for opening a dealpath app from an electronic device for a method of managing business deals in an embodiment.

FIG. 23 shows an example of a screen of an embodiment of a webpage 2300 that is shown to a user upon turning on the user's electronic device after downloading dealpath 2300. The webpage 2300 shows the Dealpath icon and name included with other apps the user has downloaded onto the user's device.

Figure 24:
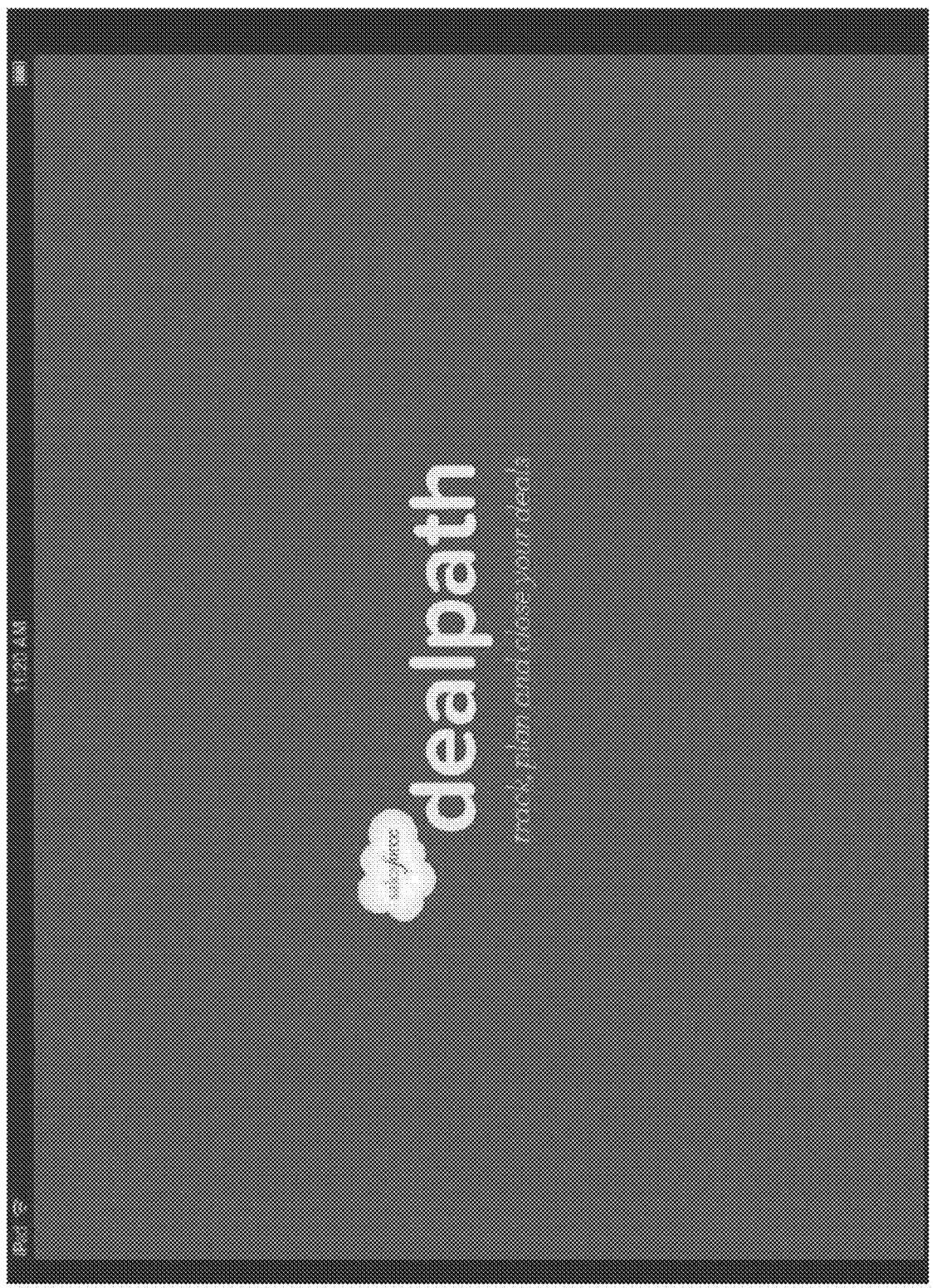

FIG. 24 shows an example of a screenshot of an embodiment of dealpath webpage 2400 that is shown to a user upon selecting the icon shown in FIG. 23. Dealpath webpage 2400 may include embodiments of title 2401, website icon 2405, and app explanation 2410. In other embodiments, app store webpage 2400 may not have all of the elements or components listed above and/or may have other elements or components instead of or in addition to those listed.

The app name 2401 conveys the name of the app as marketed (see dealpath). An icon associated with the app might also be included.

The website icon 2405 conveys the name of the website that the app is being used on (see Salesforce with the cloud surrounding it).

The app explanation 2410 conveys the purpose of the app (see "track, plan and close your deals").

Figure 27:
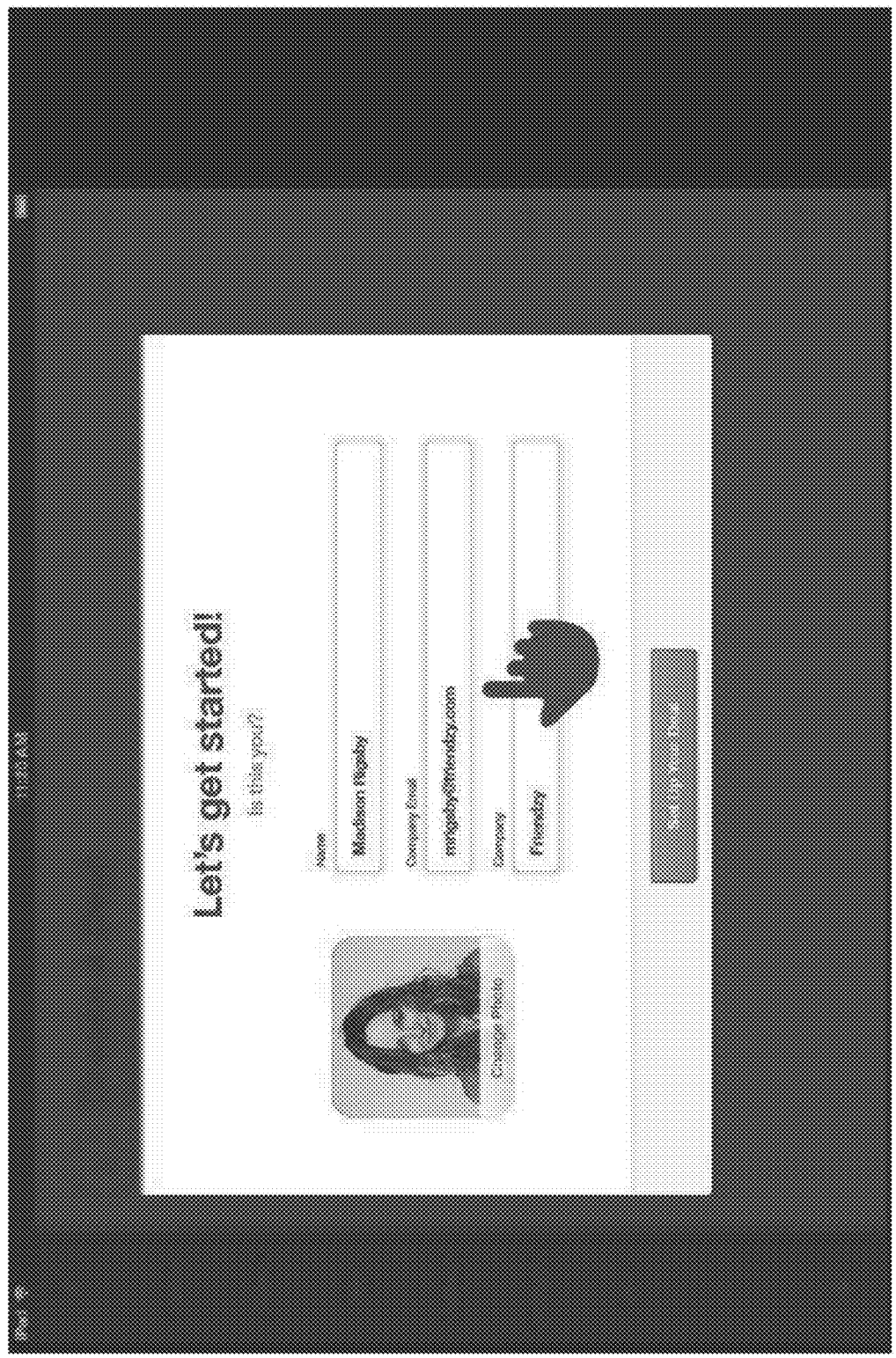

FIGS. 25-27 show examples of screenshots of embodiments of webpages that are shown to a user to set up dealpath. Webpages 2500-2700 may include embodiments of title 2501, screenshot explanation 2502, photo field 2510, name field 2520, company email field 2530, company field 2540, and activation button 2550. In other embodiments, webpages 2500-2700 may not have all of the elements or components listed above and/or may have other elements or components instead of or in addition to those listed.

By filling in the information fields (setting up dealpath), the user may begin to activate and populate the dealpath app to provide the user with functions and tools to track, plan, and close deals.

In an embodiment, the title 2501 provides a brief explanation of the purpose of the webpage.

The screenshot explanation 2502 may provide a textual explanation of the screenshot (see Tell us a little about yourself).

The photo field 2510 functions to provide the user with functions and tools to add a photograph of the user to the page. The photo may be taken from other sites (e.g., a social networking site, an email site). Alternatively, the photograph may be downloaded by the user from the user's computer.

In an embodiment, the name field 2520 may be automatically populated from accessing the user's contacts and calendar. Alternatively, the user may input the contact and/or calendar information using a keyboard.

In an embodiment, company email field 2530 may be automatically populated from accessing the user's contacts and calendar. Alternatively, the user may input the information using a keyboard.

In an embodiment, company field 2540 may be automatically populated from accessing the user's contacts and calendar. Alternatively, the user may input the information using a keyboard.

The activation button 2550 functions to submit the information once the information fields have been populated. The activation button 2550 may contain an explanation of the function (see "Set Up Your Deal"). Alternatively, the activation button 2550 might contain the text "submit my information" or other explanations.

FIG. 26 shows an example of a screenshot of an embodiment of an access field that is shown to a user upon entering information into any of the fields in FIG. 24. In the access field, the server asks the user to allow the app to access the user's contacts and calendar (see "Dealpath" Would Like To Access Your Contacts and Calendar). If the user agrees to this by activating the "OK" button, the dealpath app may fill in the fields using this information and asks the user if the information is correct (see FIG. 27 "Is this You?"). If the user clicks yes, the system may access the user's email contacts, social media contacts and calendar to set up a user's account. The information for the account includes the user's basic information (address, cell phone, email, etc.) in addition to adding contacts from email and/or social media, and adding events or tasks from the calendar. The user is asked if the user wants the system to access the user's contact and calendar (see FIG. 26 for an example of this step). If the user agrees to allow the system to access the user's calendar and/or contacts, the system accesses the contacts and calendar and adds the contacts to the contacts in dealpath and the meetings, events, and tasks in the calendar are added as posts. The user may then go through and delete, add or edit any of the contacts and posts if necessary. If the information is incorrect, the user may manually correct the information before submitting the information. Further, the user may change the photograph by selecting the "Change Photo" button below the photograph. Alternatively, the user may choose the "Don't Allow" button to populate the fields with the information by hand and may add a photo by selecting the photo icon and/or the "Add photo" button. After the field has been populated automatically or by hand, the user may select the "Set Up Your Deal" button to submit the information and continue the process.

In FIGS. 28 and 29, the user has decided to set up the user's first deal. FIGS. 28 and 29 show examples of screenshots of embodiments of Track webpages 2800 and 2900 shown to a user upon activating the "Set Up Your Deal" button in FIG. 27. Track webpage 2700 may include embodiments of track 2801, primary contact heading 2802, contact or account field 2803, list of contacts 2810a-g, size field 2820, stage field 2830, close field 2840, and close buttons 2845a-g. In other embodiments, app store webpage 2800 may not have all of the elements or components listed above and/or may have other elements or components instead of or in addition to those listed.

The track heading 2801 acts to send the user to the track page for the user to make changes to or view the tracking parts of a deal. The track heading 2801 may be chosen by selecting the track heading. Alternatively, the user may select the Plan or Invite heading to be sent to the plan or invite pages.

The primary contact heading 2802 functions to provide a listing of the names and photographs of contacts. When a contact is chosen by selecting the contact, the contact is indicated as the primary contact. In at least one embodiment, there may be more than one primary contact. In at least one embodiment, the indication that the person is the primary contact is by highlighting the primary contact's name and/or picture (e.g., a rectangular border that is filled in). The highlighting may be a colored in rectangle or a rectangle with a colored border. In the example of FIG. 28, the primary contact is Hillary Wilson from Universal Mobile.

The contact or account field 2803 functions to provides the user with functions and tools to input or search for the primary contact on an account or deal in a list of all contacts using a search word or words for the contact or the account (business).

List of contacts 2810a-g provides a list of the contacts that are associated with the deal. If no contacts are yet associated with the deal, the contacts may be listed alphabetically, or randomly. The user may enter a name or business into the contact or account field 2803 to find a contact. In at least one embodiment, the list may be reorganized to be alphabetical, by first name, by contact date, by business, etc. by typing into the search field.

The size field 2820 provides an indication of the size of the deal at that time. In the example of FIG. 28, the size is indicated as $1000. The size may be chosen by the placement of the sliding button on the money line. The chosen size may be indicated above the line next to the size heading (see "Size: $1,000). The size may be changed by moving the button on the money line to the right or left until the correct amount is chosen.

The stage field 2830 provides an indication of the status of the deal, by choosing from 1, 2, 3, 4, and 5. The earliest stage is 1 and is called "prospecting." As the deal continues, the stage may be changed by moving the button on the stage line to the right or left until the correct stage is chosen. In at least an embodiment, the stage is updated automatically, based on the information entered into the user interface. The stage will also be indicated next to the stage heading (see "Stage: 1—Prospecting." When the stage is changed, a lightening bolt icon with the information about the stage change may be shown in the posts.

The close field 2840 indicates a date for when the deal will close. The close date may be chosen by selecting one of the close buttons 2845a-g. The close buttons 2845a-g, as shown in FIG. 28, are "end of month, end of quarter, end of year, or choose date." If the indicated buttons do not provide the correct date, the user may select the "choose date" button and pick a date from a calendar, or input a specific date into a field.

FIG. 29 shows an example of a screenshot of an embodiment of the track webpage 2900 that is shown to a user upon choosing or changing one or more of the fields in FIG. 28. In the example of FIG. 29, the user selected contacts and set the size and stage for the deal. For example, the primary contact 2910 has been chosen as "Hillary Wilson, Universal Mobile," the size 2920 of the deal has been changed to $23,000, the stage 2930 has been changed to "3—Validating," and the close date 2940 has been chosen as "Aug. 31, 2012" by selecting the "End of the Month" button 2845. As shown in FIG. 28, the cursor may appear as a human hand with the index finger used to choose a field or button. The user may move to the plan or invite link by selecting the headings at the top (see 2898 and 2899) or by swiping across the screen of the device.

FIGS. 30 and 31 show examples of screenshots of embodiments of Plan webpages 3000 and 3100 shown to a user upon finishing the track information in FIG. 28, choosing the plan link, or swiping across the screen of the device. Using the plan webpage 3000, the user may add contacts based on the name of the company involved in the deal and/or meetings that were planned for the deal. Plan webpage 3000 may include embodiments of plan 3001, additional contacts field 3010, add all button 3015, meetings field 3020, add all button 3025, track 3098, and invite 3099. In other embodiments, app store webpage 3000 may not have all of the elements or components listed above and/or may have other elements or components instead of or in addition to those listed.

The plan page 3001 provides tools and functions for a user to plan meetings that are associated with a deal.

The additional contacts field 3010 provides a list of contacts that may be chosen to be associated with the deal. The Additional contacts heading (see Additional Contacts: 0) has an indication of the number of contacts that has been chosen next to the heading. The list of contacts may include a scroll to find contacts that are not being shown.

The additional contacts add all button 3015 may be clicked after the user has chosen the contacts the user wants associated with the deal in order to submit the information. The add all button associates the contacts that the user has chosen with the deal.

The meetings field 3020 functions to list the meetings associated with a deal. The meetings field 3020 contains a list of meetings under the heading "Meetings:" with the number of meetings associated with the deal enumerated next to the meetings heading. The meetings are listed with a calendar icon to the left, the date and name of the meeting with the time and explanation of the meeting underneath, and a checkmark to the right. The meetings field provides a list of meetings associated with the deal that may be accessed by selecting any part of the meeting. If the user clicks on a meeting, the meeting will be indicated as being a part of the deal. The indication may be with a rectangular border that is filled in, a bold (or highlighted) checkmark, a bold calendar and/or all of the above. The rectangular border may be colored in with a color or the border may be a colored border.

The meetings add all button 3025 may be clicked after the user has chosen the meetings the user wants to associate with the deal and functions to submit the information. The add all button associates the meetings that the user has chosen with the deal.

Track 3098 is explained with reference to FIGS. 28 and 29.

Invite 3099 is explained with reference to FIGS. 32 and 33.

FIG. 31 shows an example of a screenshot of an embodiment of the plan webpage 3100, which is shown to a user upon choosing or changing one or more of the fields in FIG. 29. For example, Jonathon Foster from Universal Mobile and Thomas Wilson from Universal Mobile have been selected in order to add Foster and Wilson as additional contacts. The number next to the additional contacts heading has changed to "2," a meeting has been chosen (see the Aug 23: managers meeting" thus changing the number next to the meetings heading to "1"). As shown in FIG. 28, the cursor may appear as a human hand with the index finger used to choose a field or button. The user may move to the invite link or back to the track link by selecting the headings at the top (see 2898 and 2899 in FIG. 28) or by swiping across the screen of the device.

FIGS. 32-33 shows examples of a screenshots of embodiments of invite webpages 3200 and 3300 shown to a user upon selecting the invite link at the top of any of FIGS. 28-31. Invite webpage 3200 may include embodiments of invite 3201, stage icon 3202, Deal name 3203, deal information 3204, Team member field 3220, primary contact 3230, track 3298 and plan 3299. In other embodiments, invite webpage 3200 may not have all of the elements or components listed above and/or may have other elements or components instead of or in addition to those listed.

Invite webpage 3200 allows the user to ask for help with the deal from inside of the user's company (to set up team members).

The invite link 3201 when indicated sends the user to the invite page 3200. The invite link may be seen on any of FIGS. 28-31. The invite screenshots function to add team members to a deal. In at least one embodiment, team members may be added by any of the team members. In at least one embodiment, team members may only be added by the manager.

The stage icon 3202 indicates the stage of the deal by the amount of the circle that is colored in and the number that is shown in the middle of the circle. The stage is chosen by indicating the track link (see FIGS. 28-29).

The deal name 3203 provides the name of the deal for which the user is choosing team members.

The deal information 3204 provides further information about the deal beyond the deal name. The information may include the size of the deal ($23,000), the company associated with the deal (Universal Mobile, USA), the primary contact on the deal (Hillary Wilson), and the stage of the deal (Validating).

The team member field 3220 provides a list of team members to choose from.

The list may come from the contacts list, from previous deals, or from previously chosen contacts for this deal. The number of team members that have been chosen is indicated next to the team members heading (see Team members: 0). The user may select the team member that the user wants to add to indicate the team member. The indication may be with a rectangular border that is filled in and/or an emboldened checkmark. The rectangular border may be colored in with a color or the border may be a colored border.

The primary contact 3230 is shown with the photograph, the contact's name and the company indicated. The primary contact 3230 was chosen on the track page (see FIGS. 28 and/or 29).

Track 3298 has been explained with reference to FIGS. 28 and 29.

Plan 3299 has been explained with reference to FIGS. 30 and 31.

FIG. 33 shows an example of a screenshot of an embodiment of the invite webpage 3300 that is shown to a user upon choosing or changing one or more of the fields in FIG. 32. For example, Mitch Richards and Victoria Laughridge have been indicated as team members and the number indication next to the team members heading has been changed to "2". In addition, the submission button and checkmark have appeared above the button for submitting the information 3350 (see "Start working this deal"). After the user has chosen the team members, the user clicks on the submission button 3350 and the team members are added. The user may move to back to the track or plan link by selecting the headings at the top (see 2898 and 2899 in FIG. 28) or by swiping across the screen of the device.

Figure 35:
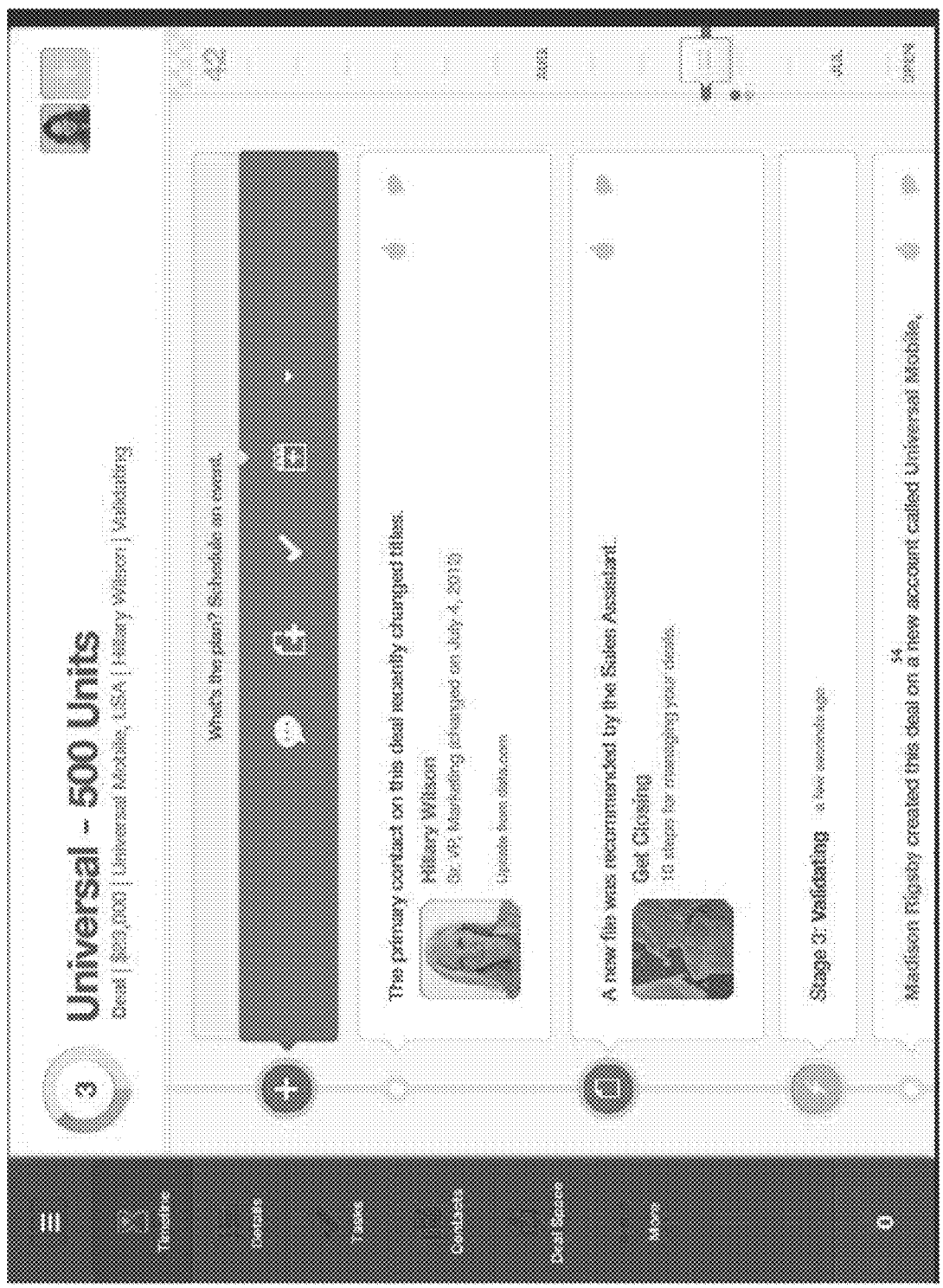
Figure 36:
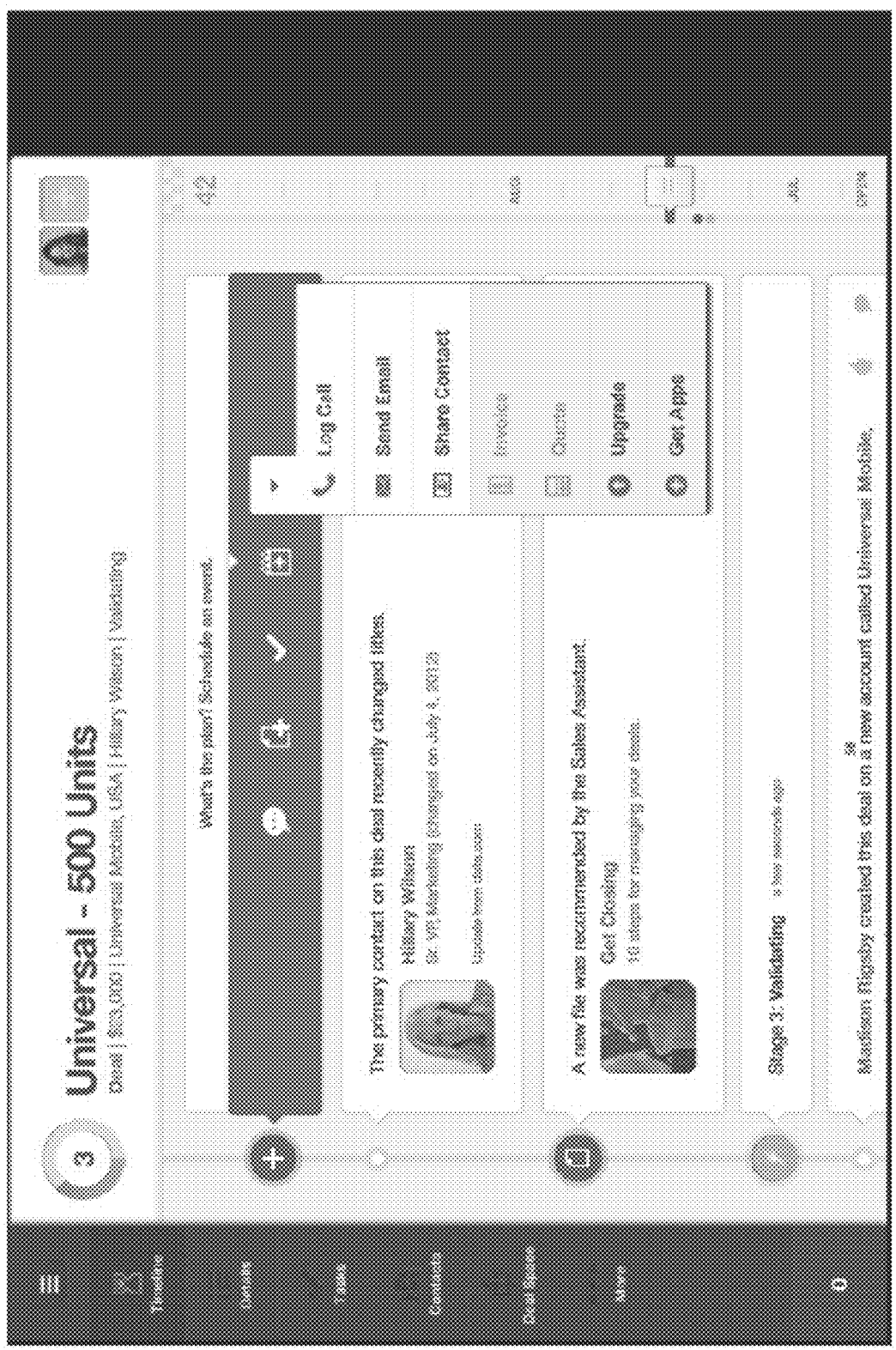
Figure 37:
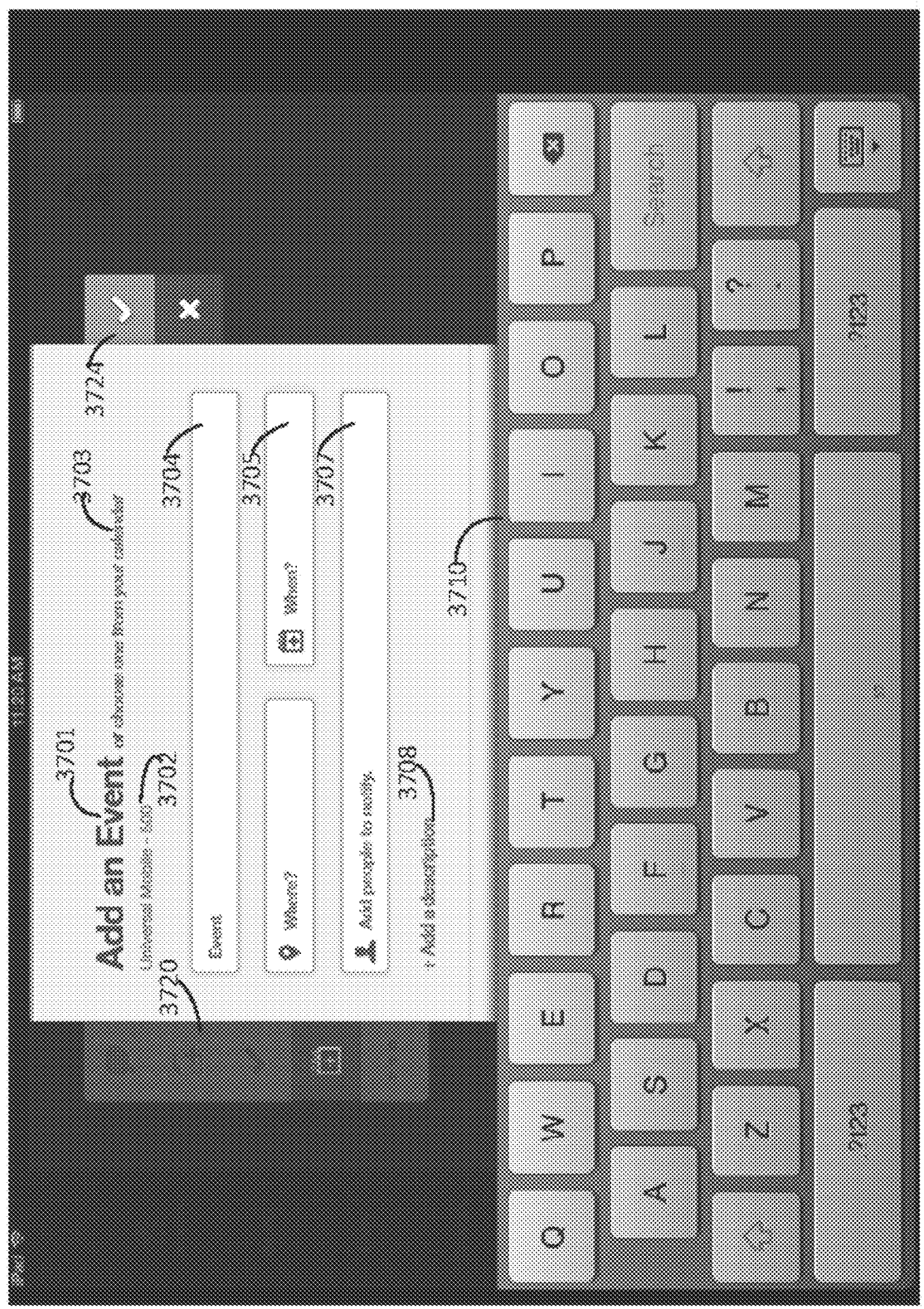

FIGS. 34-36 show examples of screenshots of embodiments of deal homepage (or timeline) screenshots shown to a user upon selecting the submit button on FIG. 33. Deal homepage webpage 3400 may include embodiments of stage icon 3402, deal name 3403, deal information 3404, primary contact 3405, cross navigation bar 3410 including comment 3411, files 3412, tasks 3413, events 3414, and other 3415, side navigation bar 3450 including my deals 3451, timeline 3452, details 3453, tasks 3454, contacts 3455, deal space 3456, and more 3457, vertical timeline 3460 and posts 3466a-g. In other embodiments, invite webpage 3400 may not have all of the elements or components listed above and/or may have other elements or components instead of or in addition to those listed.

The deal homepage (timeline page) provides the user with functions and tools to set up and work a deal. The deal homepage may also be accessed by selecting any link on a page entitled "timeline." The user may also access this page by selecting any timeline link on any page (e.g., the timeline link on the side navigation bar 3452). The deal (or timeline) homepage provides a timeline view that allows activity feeds with a history, showing what has been done on the deal so far and for scheduling what is going to happen on the deal in the future. The vertical timeline gives a magnified view of this.

The stage icon 3402 indicates the stage of the deal by the amount of the circle that is colored in and the number that is shown in the middle of the circle. The stage is chosen by indicating the track link (see FIGS. 28-29).

The deal name 3403 provides the name of the deal for which the user is choosing team members. The deal name 3403 typically includes the name of the company or companies involved in the deal and may include the number of units.

The deal information 3404 provides further information about the deal beyond the deal name. The information may include the size of the deal ($23,000), the company associated with the deal (Universal Mobile, USA), the primary contact on the deal (Hillary Wilson), and the stage of the deal (Validating).

The primary contact 3405 is shown with the photograph, the contact's name and the company indicated. The primary contact 3230 was chosen on the track page (see FIGS. 28 and/or 29).

Cross navigation bar 3410 including comment 3411, files 3412, tasks 3413, events 3414, and other 3415 are discussed in detail in the discussion of FIG. 8.

Side navigation bar 3450 including my deals 3451, timeline 3451, details 3453, tasks 3454, contacts 3455, deal space 3456, and more 3457, and vertical timeline 3460 are discussed in detail in the discussion of FIGS. 6 and 10.

Vertical timeline 3460 on the right side of the page provides a magnified view of the timeline of the deal. The vertical timeline 3460 is shown as a vertical bar starting with the start of the deal and ending with the closing of the deal (or the expected close date). The blue bar on the timeline corresponds to the blue cross navigation bar 3410 and the posts or actions that occur above the blue bar in either place are future activities. The posts and activities that occur below the blue bar are past activities. The timeline contains dots of various colors that tell the user what type of action the dot corresponds to. For example, the blue dot corresponds with the file icon on the left vertical line paralleling the timeline (see the blue dot with the image of a piece of paper with a corner folded). The yellow dot corresponds to the lightening bolt icon on the left line and corresponds to the stage of the deal at that time. The lightening bolt is posted when there is a change in the stage of the deal. The posts are shown in the middle of the page between the vertical timeline and the left vertical line containing the function icons.

Posts 3466a-g are any type of communication, tasks, events, files, and comments that occur in relation to a deal. The posts are listed below the cross navigation bar 3410 and show an icon explaining the type of post on the left paralleling the vertical timeline 3460 on the right. The newest post typically gets inserted under the cross navigation bar 3410.

FIG. 35 shows an example of a screenshot of an embodiment of the deal homepage with an autosuggest of what to do next. A yellow bar appears above the cross navigation bar stating "What's the plan? Schedule an event." Thus, dealpath provides online assistance to the user. If the user clicks on the Schedule an event, the user is sent to the add an event page (see FIG. 37). Alternatively, the user may get to the add an event page by selecting the events icon (see 3414 in FIG. 34) on the cross navigation bar 3410.

FIG. 36 shows an example of a screenshot of an embodiment of the deal homepage after the user has clicked on the other icon (a down arrow). The icon is a pull down which opens up into a list of other functions, including log call, send email, share contact, invoice, quote, upgrade, and get apps. The user may choose one of the functions which will navigate to the page that provides the user with functions and tools to perform the function. For example, if the user chooses send email, the user will be given a page that provides the user with functions and tools to send an email.

FIGS. 37-41 show examples of screenshots of embodiments of webpages shown to a user upon choosing to add an event (see events button on cross navigation bar in FIG. 34). Add an event webpage 3700 may include embodiments of screenshot title 3701, deal name 3702, edit event button 3703, event field 3704, when field 3705, where field 3706, add people field 3707, add a description button 3708, keyboard 3710, submit button 3724, and delete/exit button 3725. In other embodiments, add and event webpage 3700 may not have all of the elements or components listed above and/or may have other elements or components instead of or in addition to those listed.

Screenshot title 3701 functions to explain to the user what the function of the screenshot is (see "Add an Event").

Deal name 3702 functions to remind a user which deal the event is associated with (see Universal Mobile-500).

If the user would like to edit an event that was previously set up, the user may select the edit event button 3703. The edit event button 3703 may be a button or a textual explanatory sentence (see "choose one from your calendar"). When the user clicks on the edit event button 3703, the user navigates to a page containing a list of events that the user may choose to edit.

To schedule a new event, the event field 3704 is used to name the event. The user may name the event any name other than one that is already being used. If the user names the event a previously used name, the user will receive a message asking the user if the user would like to replace the previous event with the new event.

The when field 3705 is used to input the date and time that the event will take place. In at least one embodiment, when the user clicks on the icon (a calendar with a plus sign), a calendar appears and the user may use the calendar to choose a date and/or time.

The where field 3706 is used to input the place that the event will take place. In at least one embodiment, when the user clicks on the where icon (teardrop), a list of places that have been previously used appears for the user to choose from. Alternatively, the user may input a new place. If the event is a telephonic meeting, the where field may be left blank.

The add people field 3707 is used to add people to the notification of the event who should attend. In at least one embodiment, when the user clicks on the people icon (the human bust), a list of contacts appears for the user to choose from. Alternatively, the user may input a new contact to attend the event.

The add a description button 3708 functions to send provide an optional field for the user to add a description of the event.

The keyboard 3710 may be any keyboard on an electronic device and provides the user with keys to input the information into the desired fields. Alternatively, the keyboard may be provided on a screen or webpage.

The cross navigation bar 3720 shown here as a side navigation bar is the same as that shown in FIG. 34 and functions as described.

The submit button 3724 functions to submit the event information when the fields have been finished. The submit button looks like a checkmark and is colored green in FIG. 37.

The delete/exit button 3725 functions to cancel the event and exit the add an event page. The delete/exit button 3725 has an "x" and is colored dark blue in FIG. 37.

Figure 38:
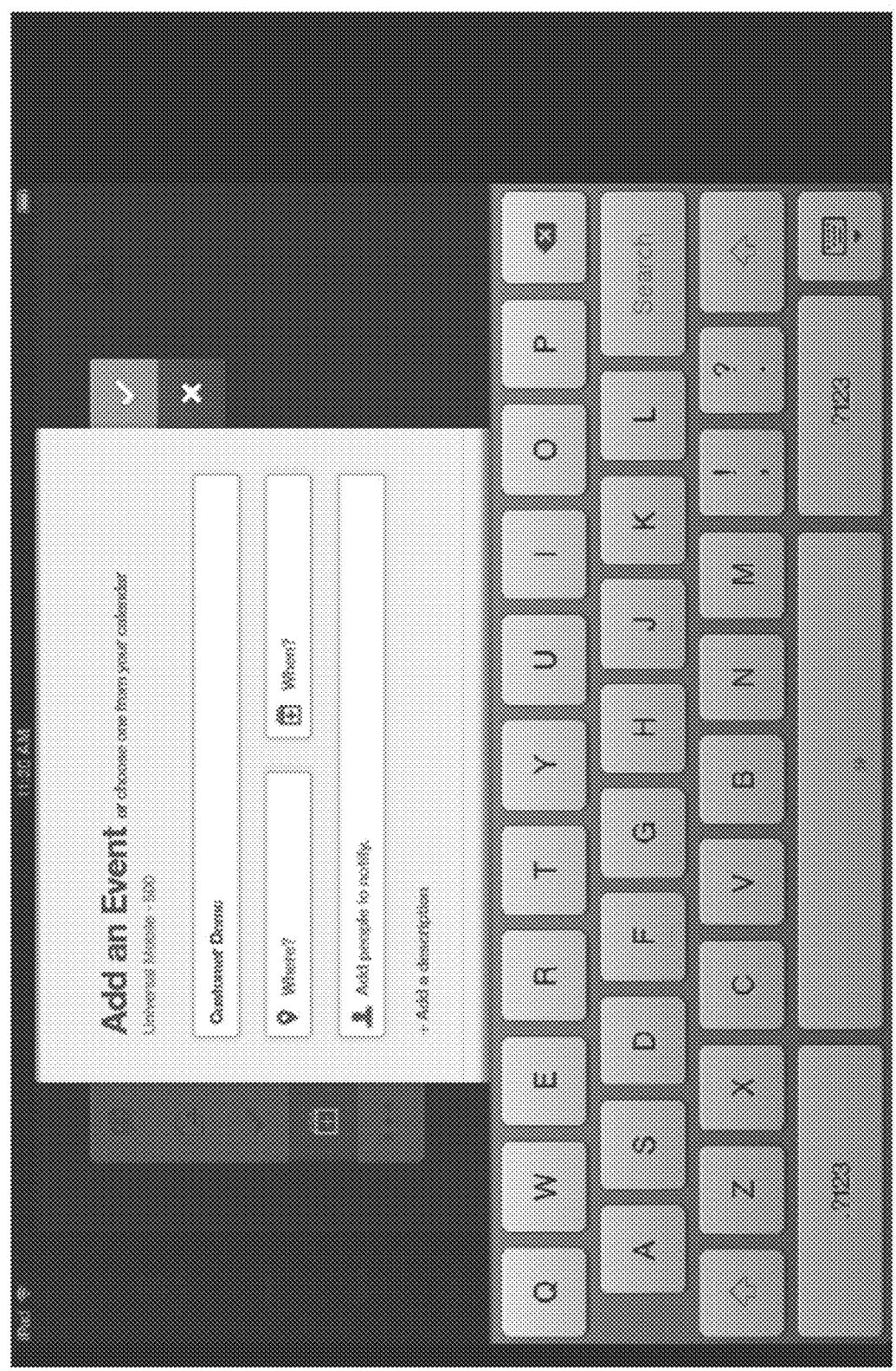
Figure 39:
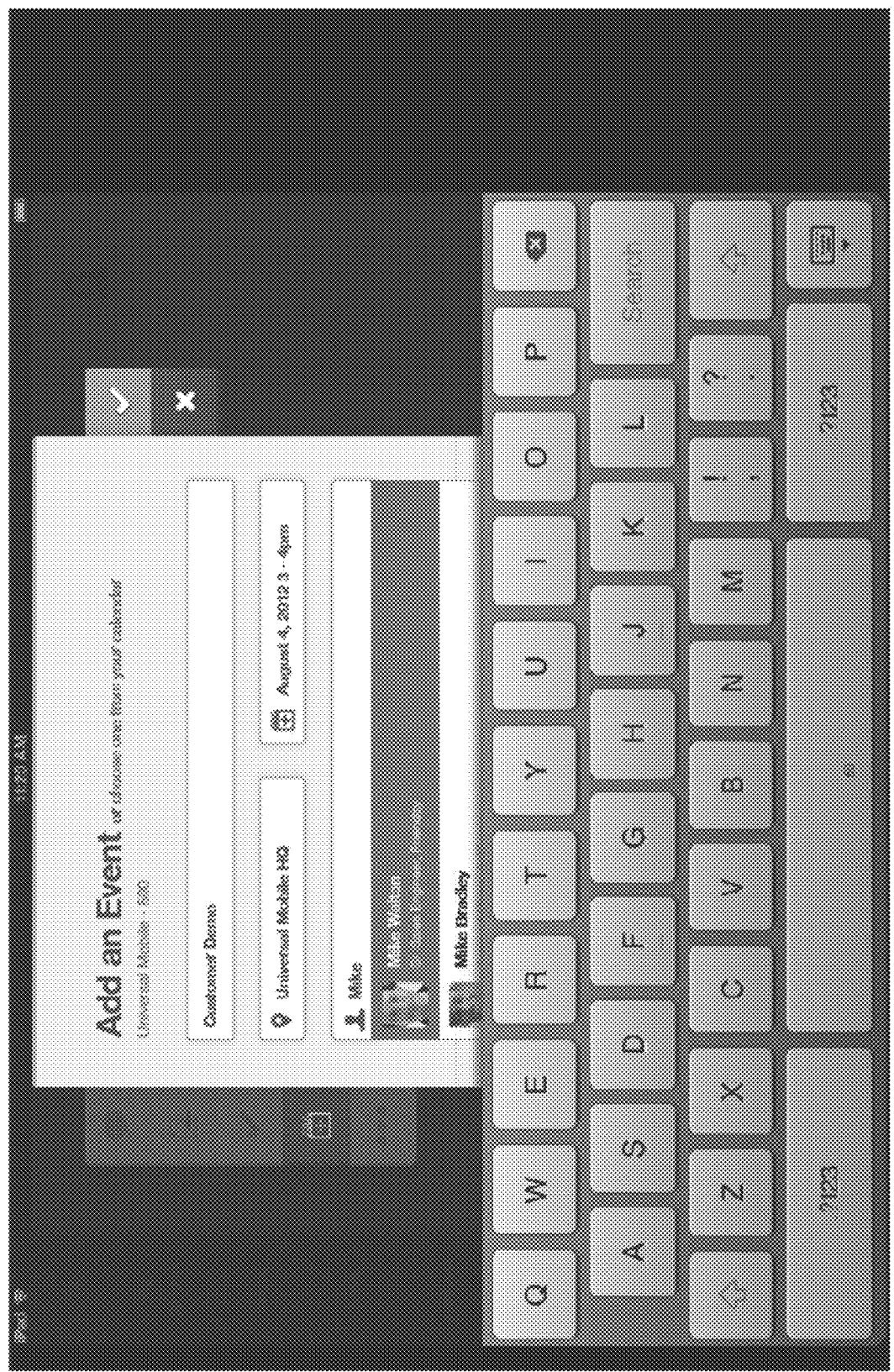
Figure 40:
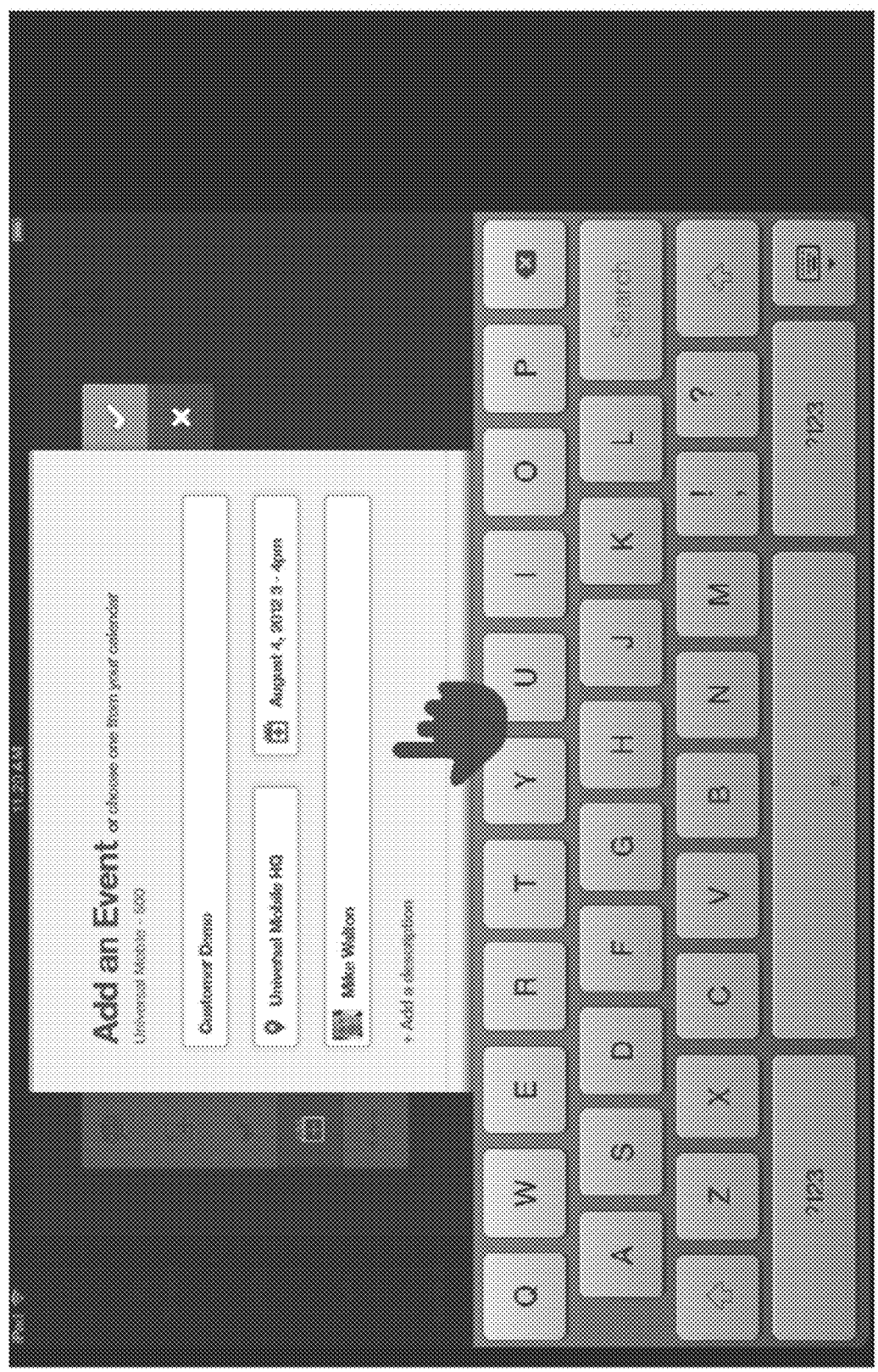

In FIG. 38, the event field 3704 has been populated with the name "customer demo." In FIG. 39, The where field 3706 has been populated with "Universal Mobile HQ" and the when field 3705 has been selected to be Aug. 4, 2012 3-4 pm. Further, the human bust icon has been clicked in the add people field 3707 and the contact "Mike Walton" has been chosen. In FIG. 40, the add people field 3707 has been populated.

Figure 41:
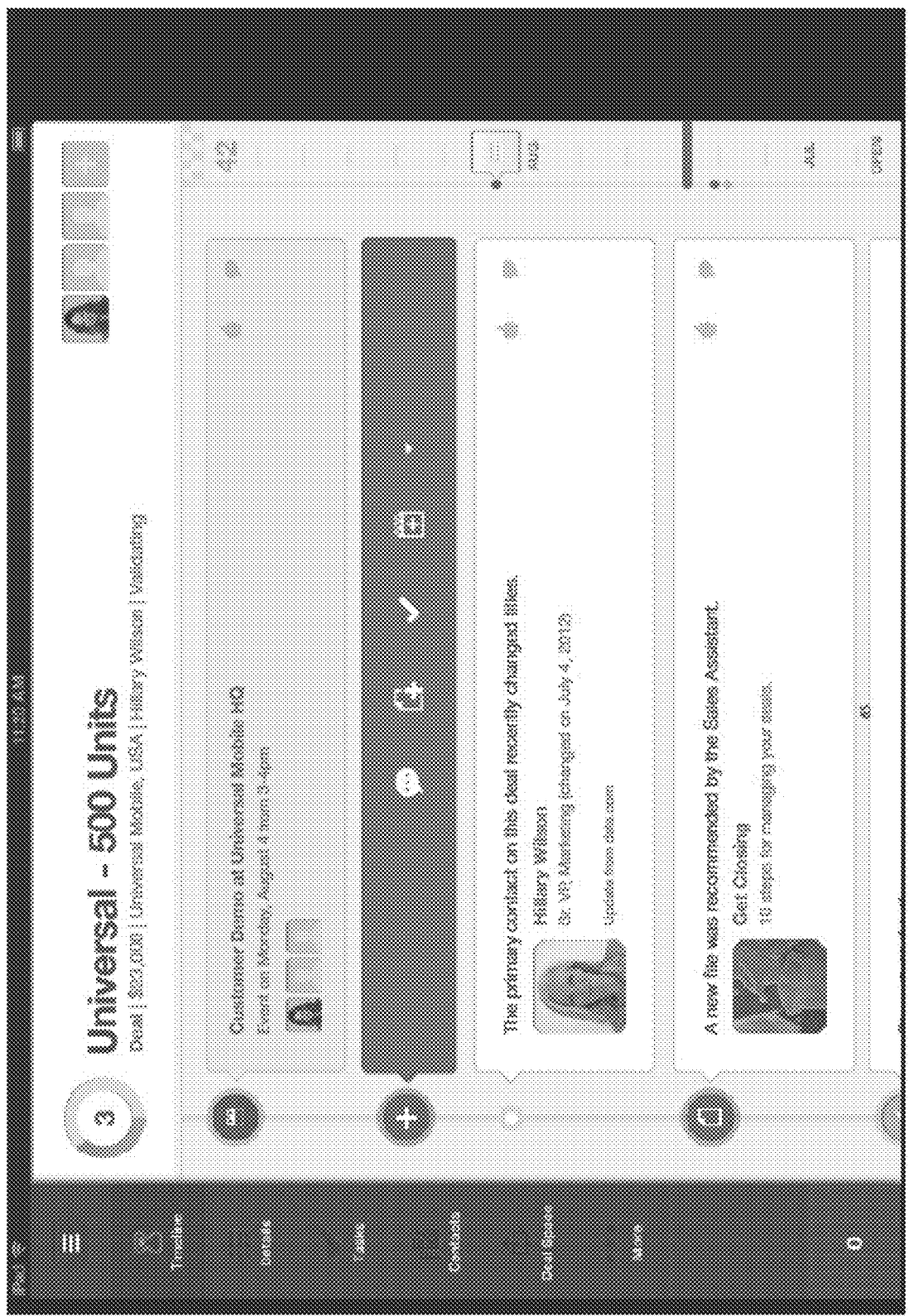
Figure 42:
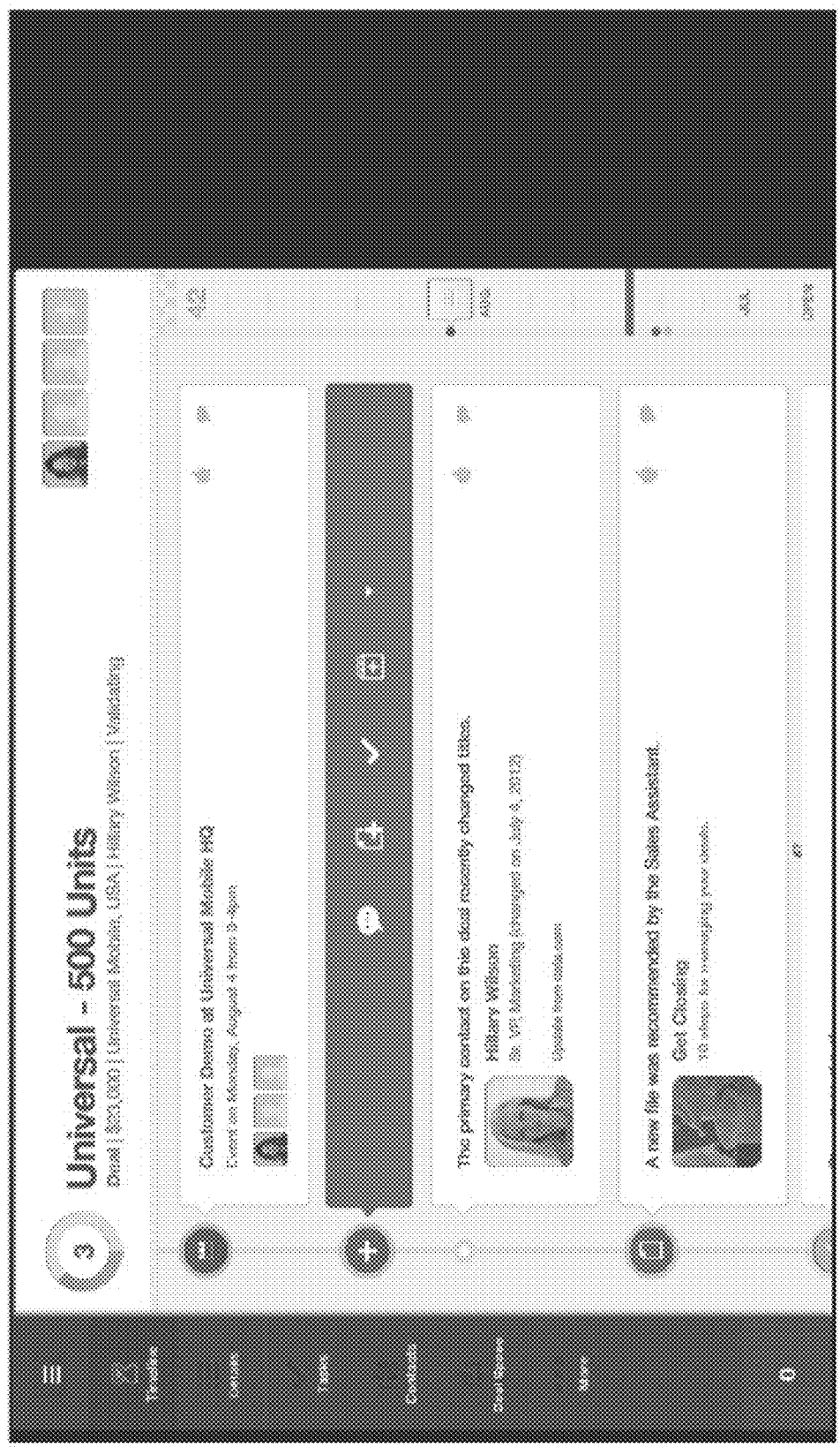

FIGS. 41-44 shows examples of screenshots of embodiments of the set-up webpages (see FIG. 34) that is shown to a user after adding an event. FIG. 41 shows an example of a screenshot of an embodiment of the deal homepage showing that an event has been added. The event gets published in the posts above the cross navigation bar (after today). The event is shown in a yellow box and contains all of the information from FIG. 40. The event is also shown on the timeline on the right as a dark purple dot on the August 4 date. In FIG. 42, the yellow box has been replaced by a white box. This occurs after the new event (highlighted in yellow) has been posted for a specific amount of time or after the new event has been acknowledged by one or more team members or contacts.

Figure 43:
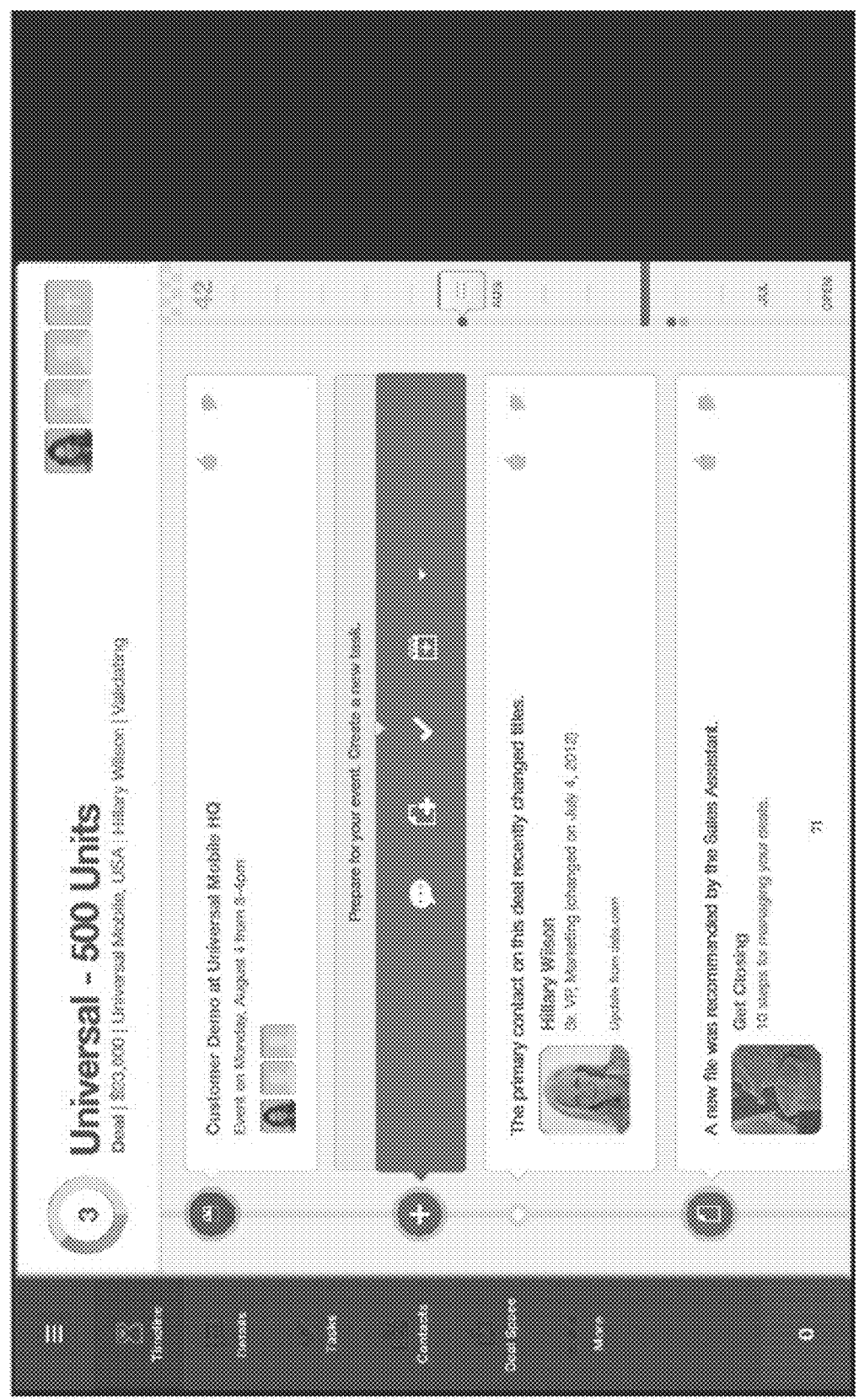
FIGS. 43-48 are screenshots illustrating an example user interface screen for adding a task for a method of managing business deals in an embodiment.
Figure 44:
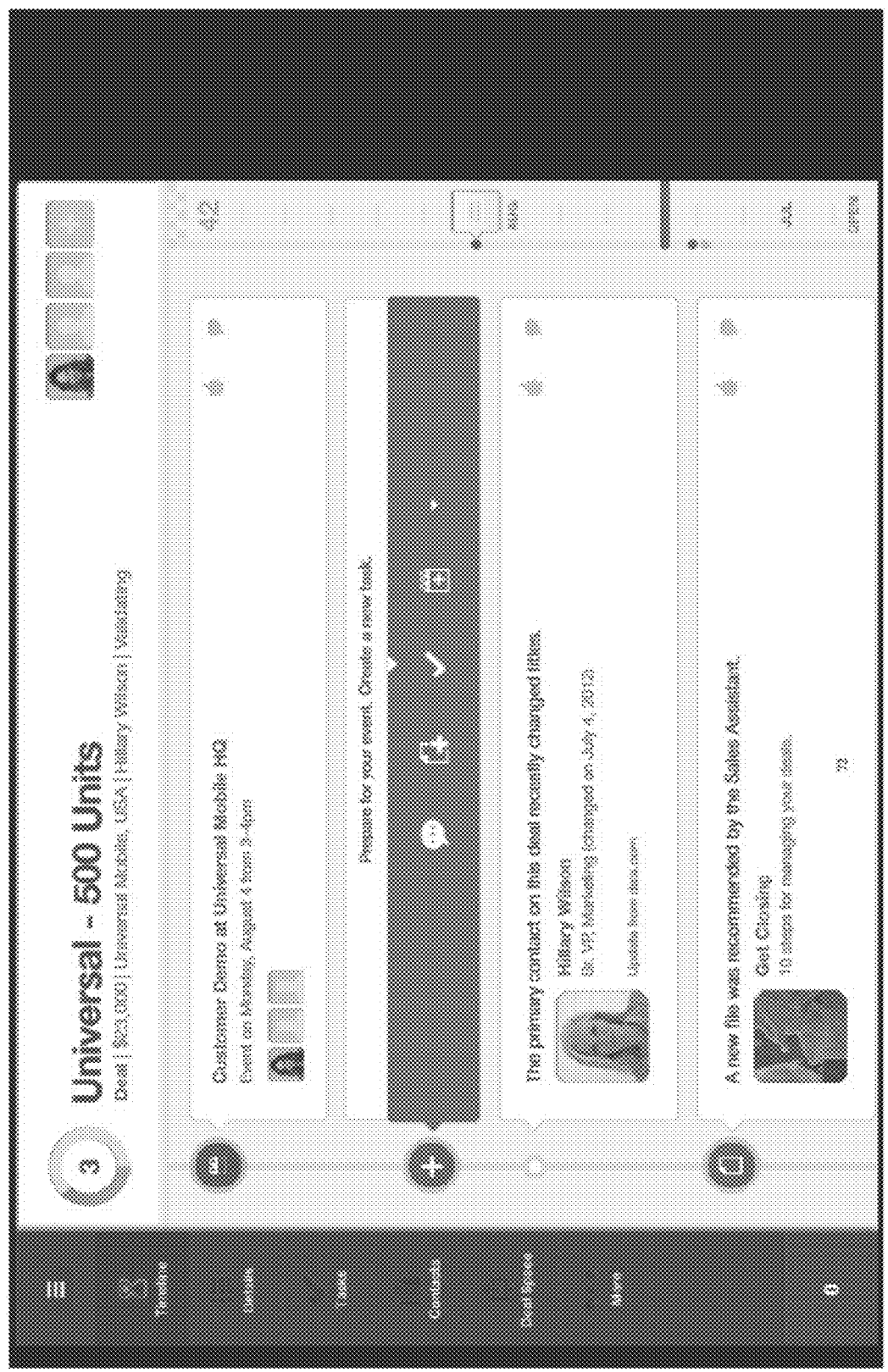

FIG. 43 shows an example of a screenshot of an embodiment of how a task may be added from the set-up webpage (see FIG. 34), the checkmark icon in the cross navigation bar has been selected and the phrase "prepare for your event. Create a new task." appears above the cross navigation bar. The checkmark icon is the task link. If the user clicks on the "create a new task" button the user will navigate to the create a new task page (see FIG. 45). In FIG. 44, the create a new task button is no longer highlighted.

Figure 45:
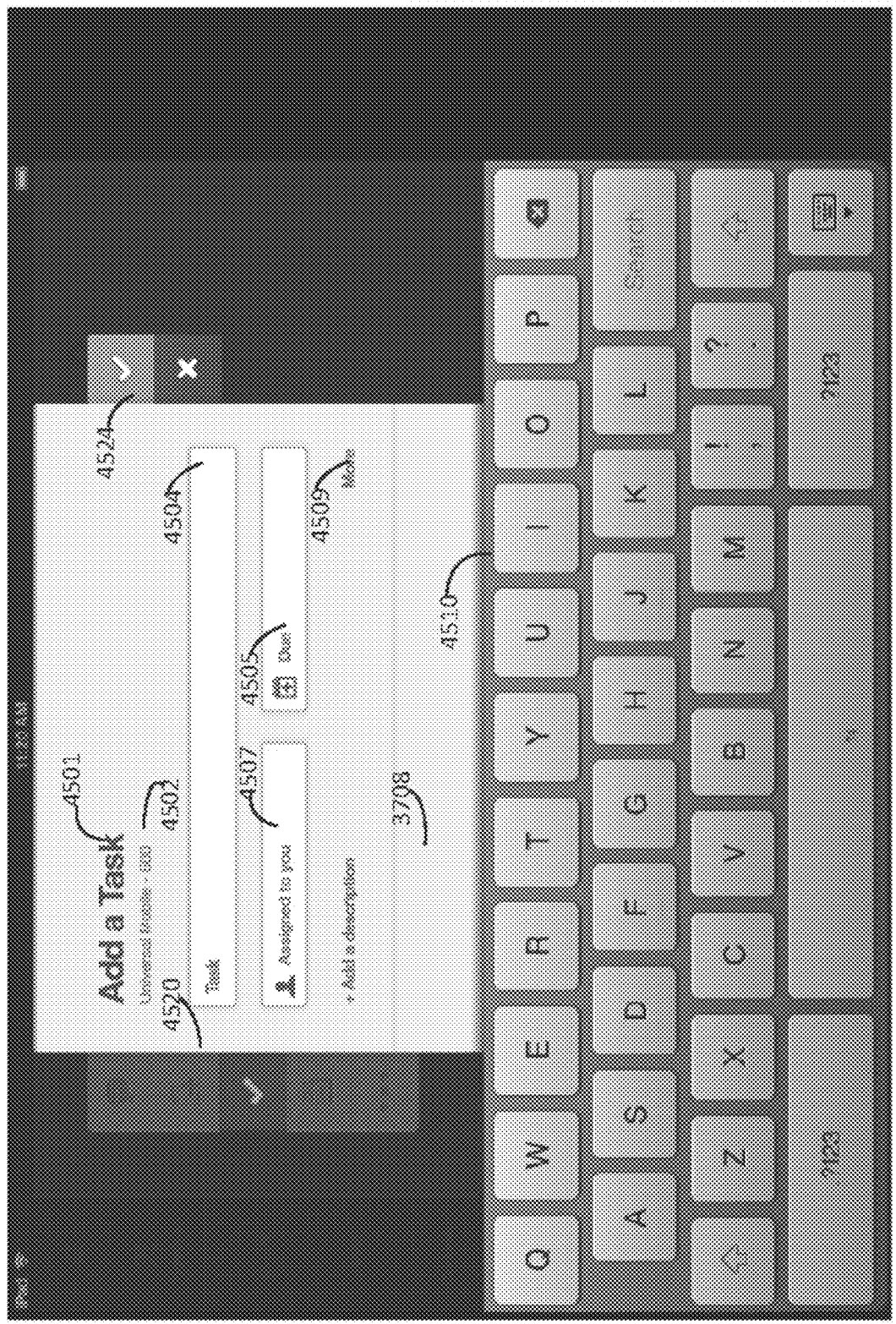
Figure 46:
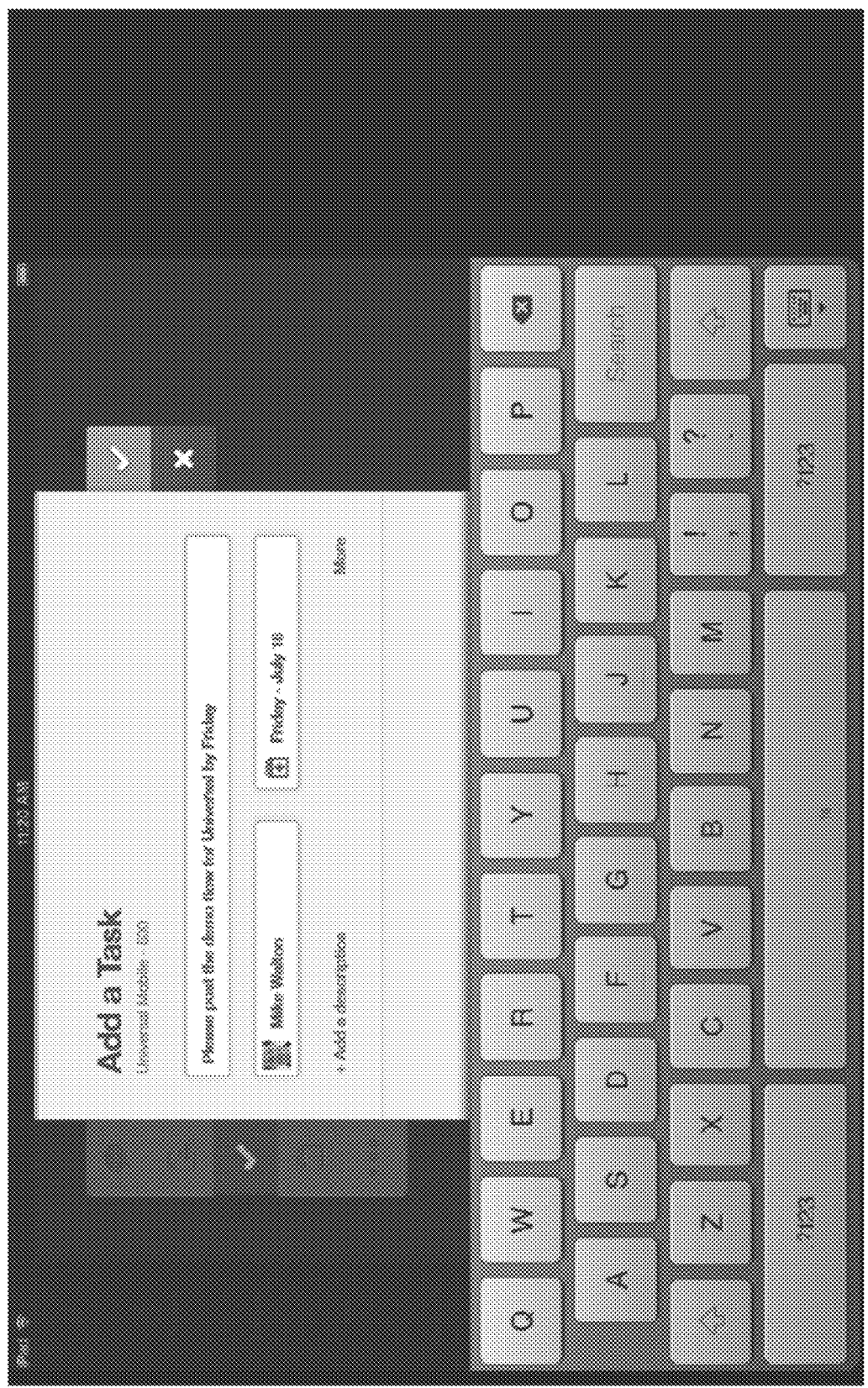

FIGS. 45-46 show examples of a screenshots of embodiments of webpages shown to a user upon choosing to add or create a task (see tasks button—checkmark icon—on cross navigation bar in FIG. 34). Add a task webpage 4500 may include embodiments of screenshot title 4501, deal name 4502, task field 4504, due field 4505, assigned to you field 4507, add a description button 4508, more 4509, keyboard 4510, and cross navigation bar 4520, submit button 4524, and delete/exit button 4525. In other embodiments, add a task webpage 4500 may not have all of the elements or components listed above and/or may have other elements or components instead of or in addition to those listed.

Screenshot title 4501 functions to explain to the user what the function of the screenshot is (see "Add a task").

Deal name 4502 functions to remind a user which deal the event is associated with (see Universal Mobile-500).

In at least one embodiment, there is an edit task button. If the user would like to edit a task that was previously set up, the user may select the edit task button. The edit task button may be a button or a textual explanatory sentence (see "choose one from your calendar"). When the user clicks on the edit task button, the user navigates to a page containing a list of tasks that the user may choose to edit.

To schedule a new task, the task field 4504 is used to name the task. The user may name the task any name other than one that is already being used. If the user names the task a previously used name, the user will receive a message asking the user if the user would like to do so.

The due field 4505 is used to input the due date (date and time) that the task needs to be finished by. In at least one embodiment, when the user clicks on the icon (a calendar with a plus sign), a calendar appears and the user may use the calendar to choose a date and/or time.

The assigned to you field 4507 is used to input or find in a list your name.

The add a description button 4508 functions to send provide an optional field for the user to add a description of the task.

The more field 4509 functions to provide the user with functions and tools to include more in the add a task page.

The keyboard 4510 may be any keyboard on an electronic device that the user may use to input the information into the desired fields. Alternatively, the keyboard may be provided on a webpage or screenshot.

The cross navigation bar 4520 shown here as a side navigation bar is the same as that shown in FIG. 34 and functions as described.

The submit button 4524 functions to submit the event information when the fields have been finished. The submit button looks like a checkmark and is colored green in FIG. 45.

The delete/exit button 4525 functions to cancel the event and exit the add an event page. The delete/exit button 4525 has an "x" and is colored dark blue in FIG. 45.

In FIG. 46 the task field 4504, due field 4505, and the assigned to you field 4507 have been populated as follows: task: Please post the demo flow for Universal by Friday, assigned to: "Mike Walton", and due by: Friday-July 18.

Figure 47:
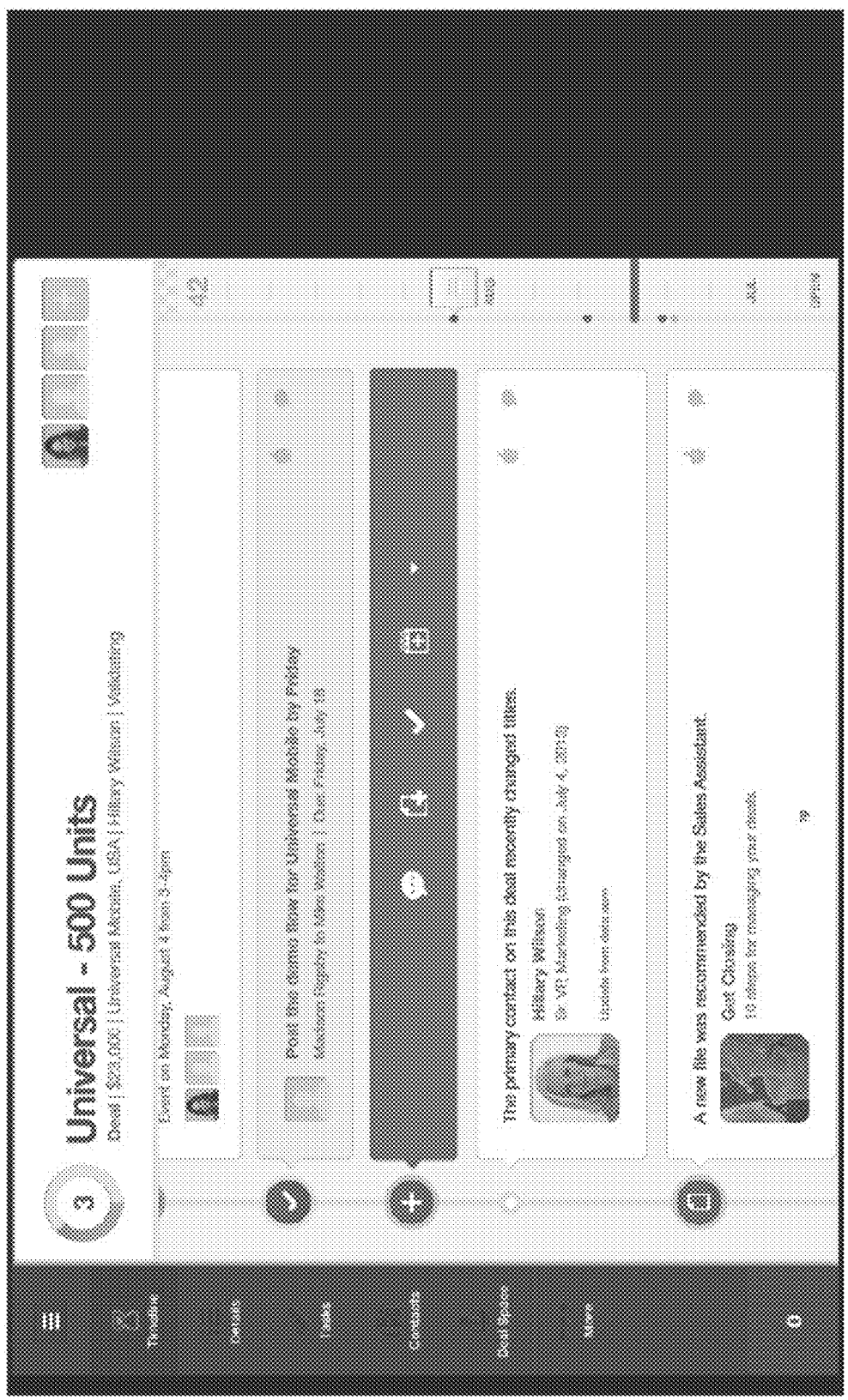
Figure 48:
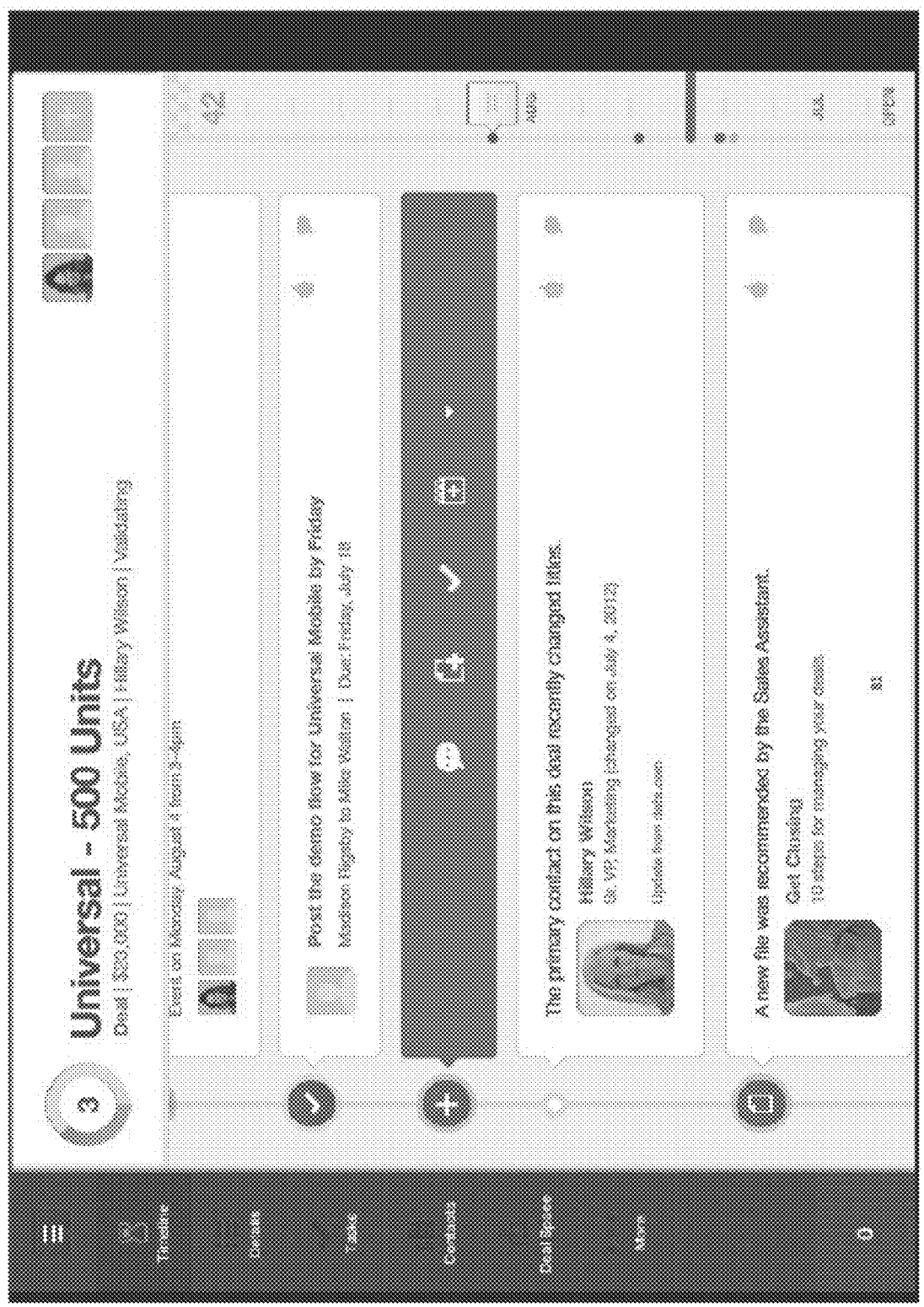
Figure 49:
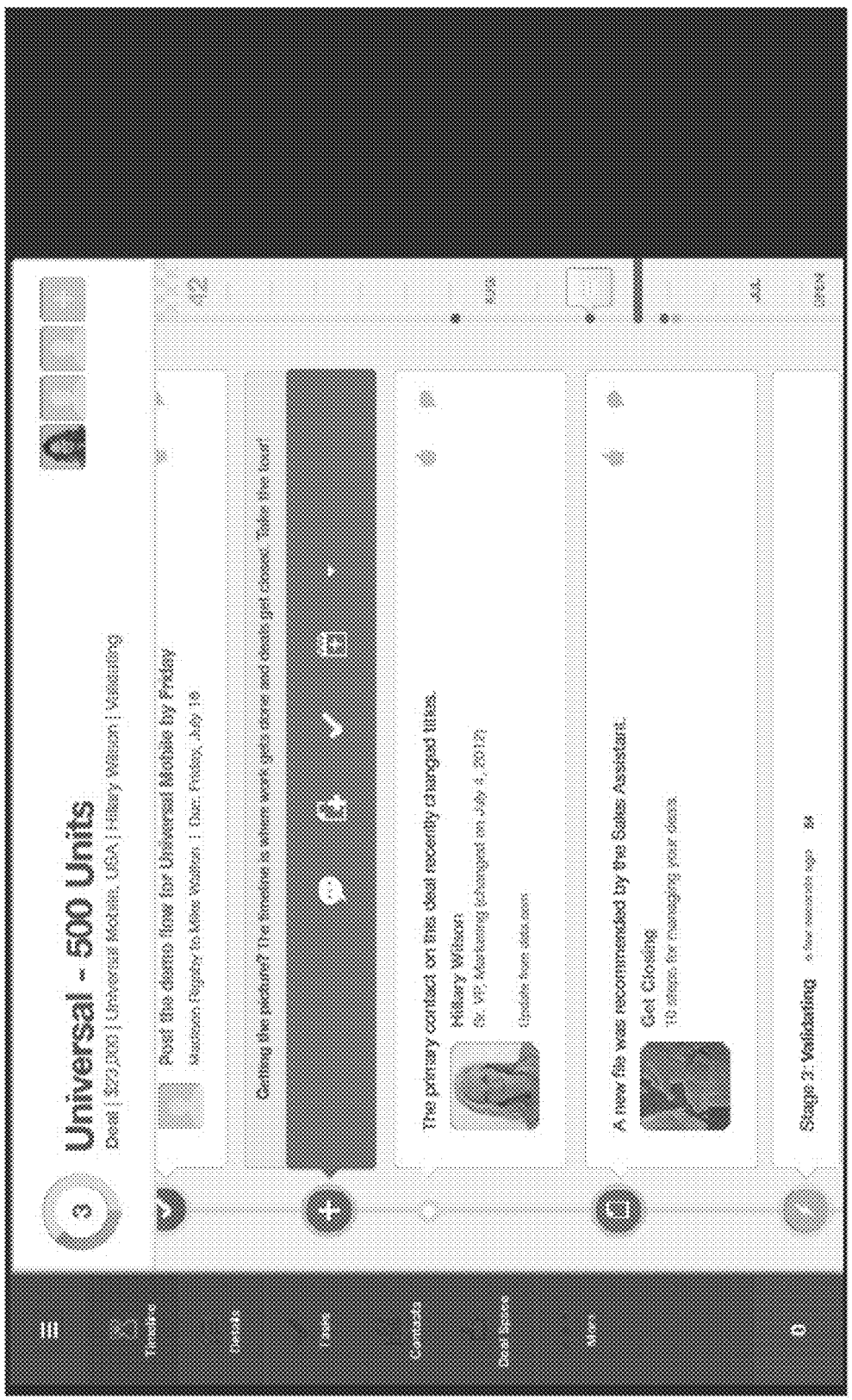
FIGS. 49-61 are screenshots illustrating an example user interface screen for taking a tour of a method of managing business deals in an embodiment.

FIGS. 47-48 show examples of screenshots of embodiments of webpages for the deal homepage shown to a user after adding a task. FIG. 47 shows that a task has been added. The task is shown highlighted in a yellow box and contains all of the information from FIG. 45. The task is also shown on the timeline on the right as a light purple dot on the July 18 date. In FIG. 48, the yellow box has been replaced by a white box after a specified amount of time has occurred (after posting the new task). In other words, the highlighting disappears. In at least one embodiment, the highlighting (signifying new) disappears when the task has been acknowledged by one or more team members or contacts, when the task has been completed, or when a newer post appears FIGS. 49-62 show examples of screenshots of embodiments of webpages that are shown to a user after a recommendation is given to the user to take a tour of the timeline. Most of the features of FIG. 49 have been discussed with reference to FIG. 34. When the user begins using the deal path app, reminders will periodically appear reminding the user to learn more about various functions associated with the app, and/or to take tours of parts of the app. In FIG. 49, a reminder has been created to teach the user more about the cross navigation bar. A yellow bar appears saying "Getting the picture? The timeline is where work gets done and deals get closed. Take the tour!" The part of the sentence stating "Take the tour!" functions as a link to the webpages that constitute a summary tour of how the timeline works, including what the icons mean, what the dots mean and how to use timeline functions.

Figure 50:
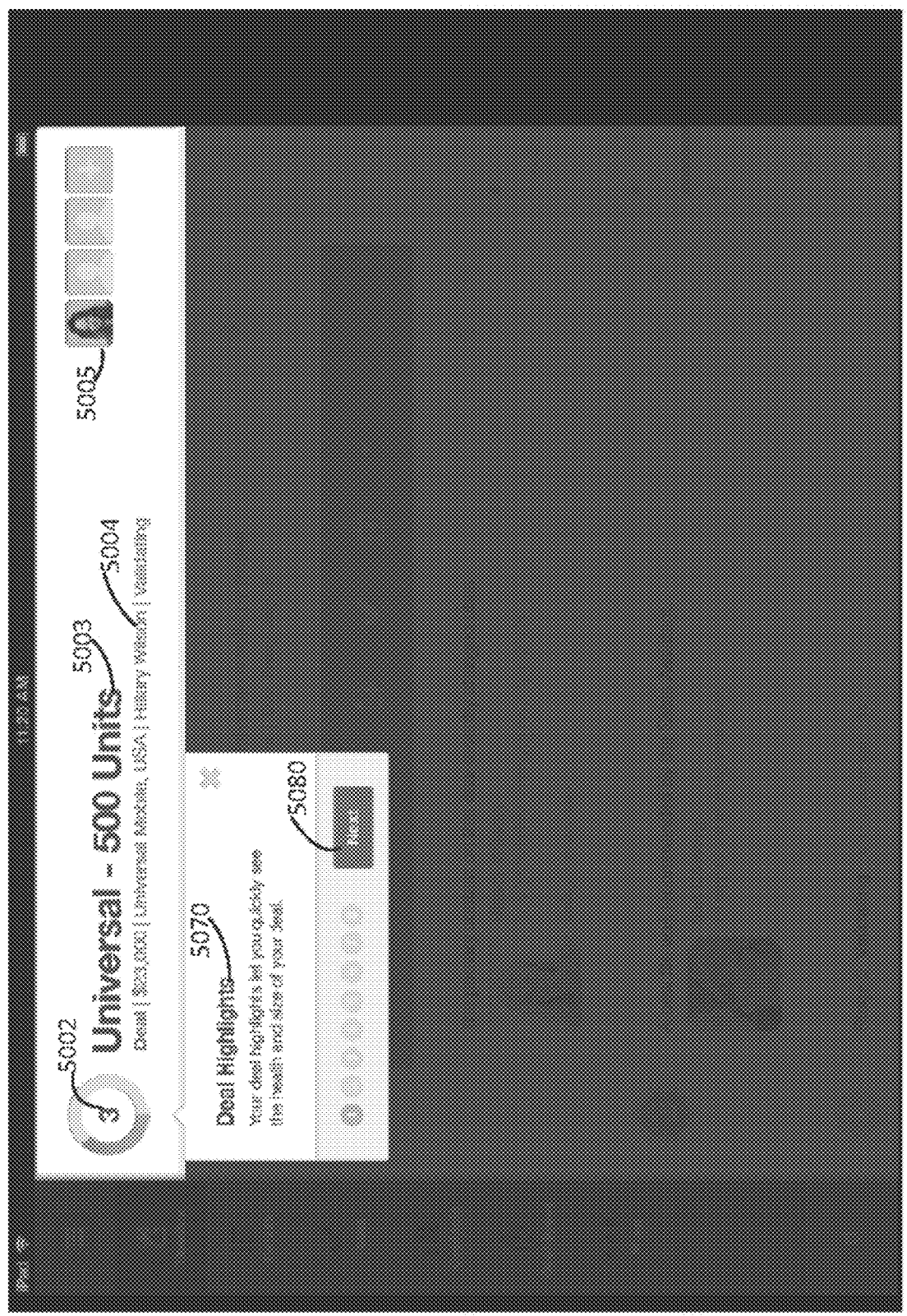

FIG. 50 shows an example of a screenshot of an embodiment of a webpage 5000 shown to a user when the user chooses to take the tour in FIG. 49. Webpage 5000 may include embodiments of stage icon 5002, deal name 5003, deal information 5004, primary contact 5005, deal highlights 5070 and next button 5080. In other embodiments, add a task webpage 5000 may not have all of the elements or components listed above and/or may have other elements or components instead of or in addition to those listed.

The stage icon 5002 indicates the stage of the deal by the amount of the circle that is colored in and the number that is shown in the middle of the circle. The stage is chosen by indicating the track link (see FIGS. 28-29).

The deal name 5003 provides the name of the deal for which the user is choosing team members.

The deal information 5004 provides further information about the deal beyond the deal name. The information may include the size of the deal ($23,000), the company associated with the deal (Universal Mobile, USA), the primary contact on the deal (Hillary Wilson), and the stage of the deal (Validating).

The primary contact 5005 is shown with the photograph, the contact's name and the company indicated. The primary contact 5030 was chosen on the track page (see FIGS. 28 and/or 29).

Deal highlights 5070 are provided when the user clicks on the icon. A pull down appears that explains about the "Deal Highlights" stating "Your deal highlights let you quickly see the health and size of your deal." If the user decides to find out about the deal highlights, the user clicks on the next button 5080 and is sent to a page providing the user with the information about the health and size of the user's deal.

Figure 51:
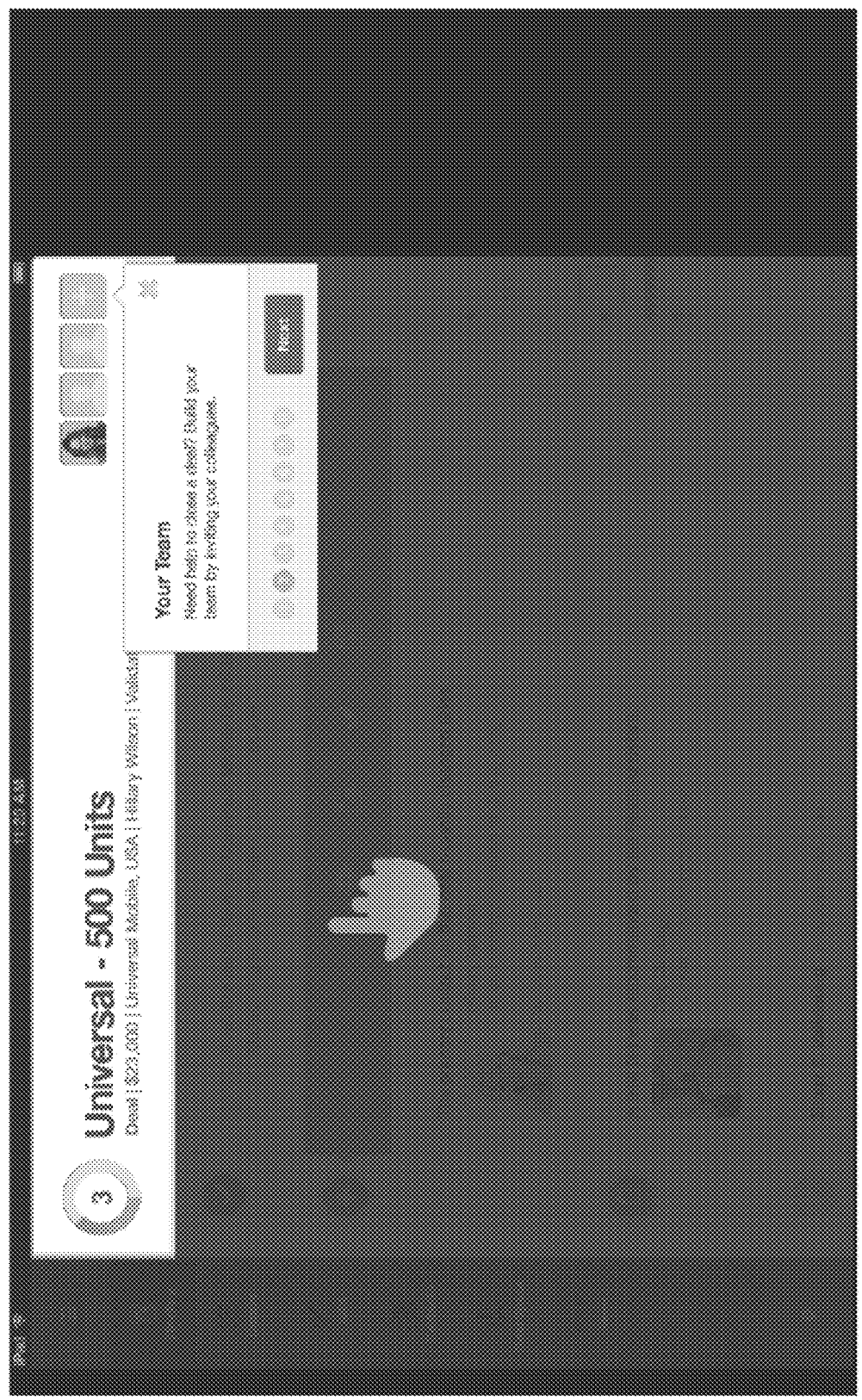
Figure 52:
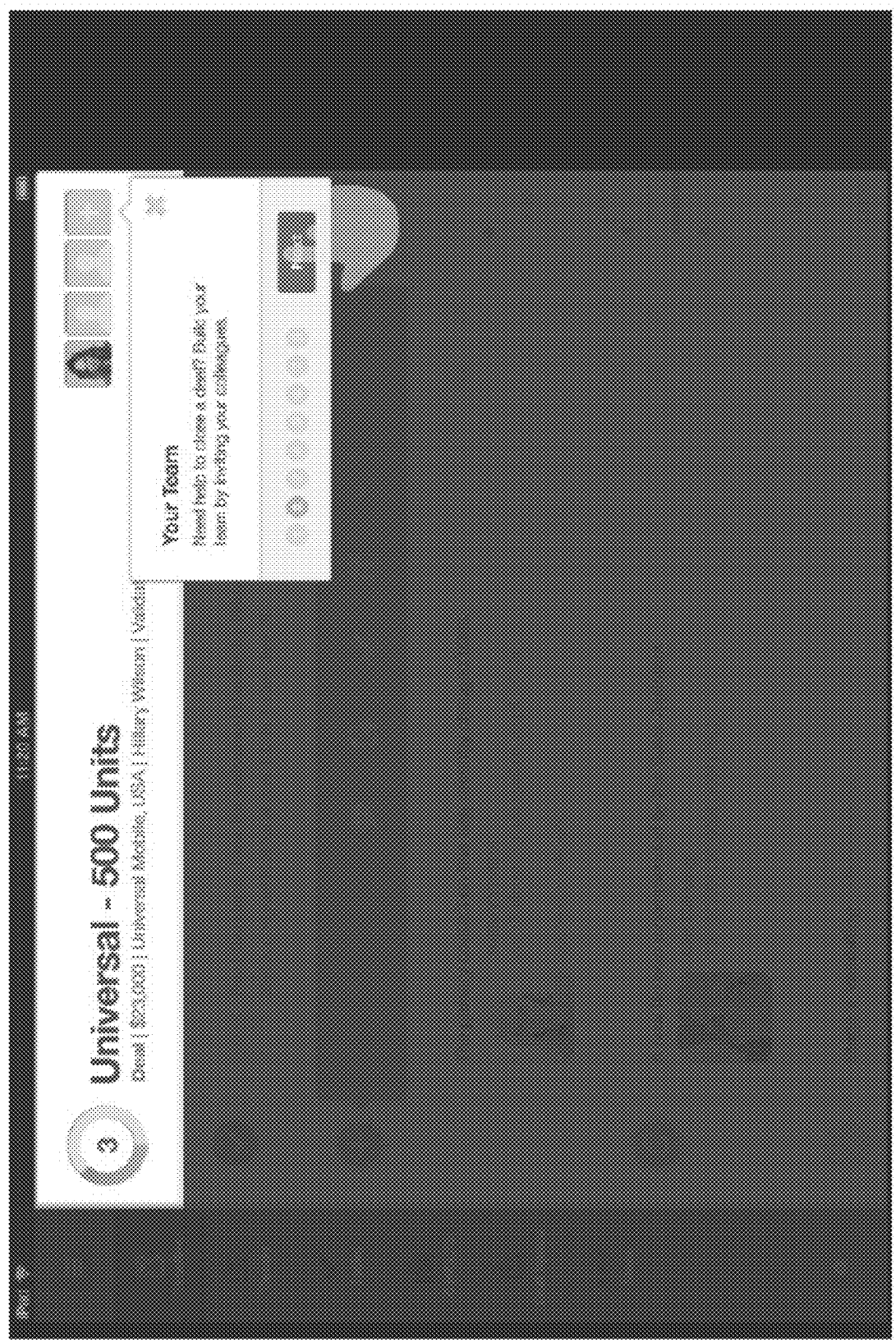

FIG. 51 shows an example of a screenshot of an embodiment of a webpage that includes an explanation of what the "your team" button's function is. The your team button states "Need help to close a deal? Build your team by inviting your colleagues." If the user wants to learn about how to invite colleagues to become a team, the user clicks on the next button and is sent to a page that provides the user with functions and tools to invite colleagues (contacts) to become a team. In FIG. 52, the user clicks on the "next" button.

Figure 53:
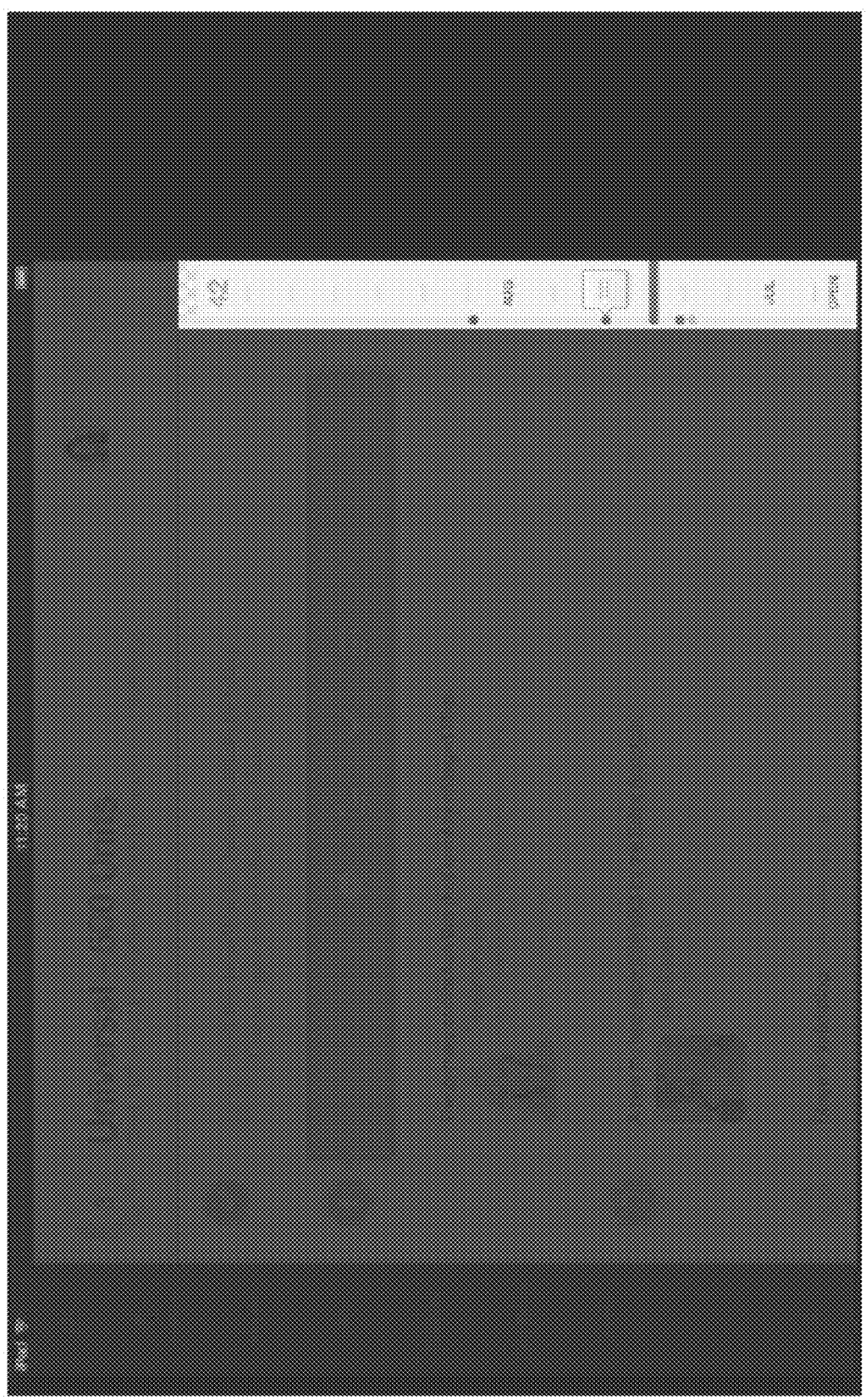
Figure 54:
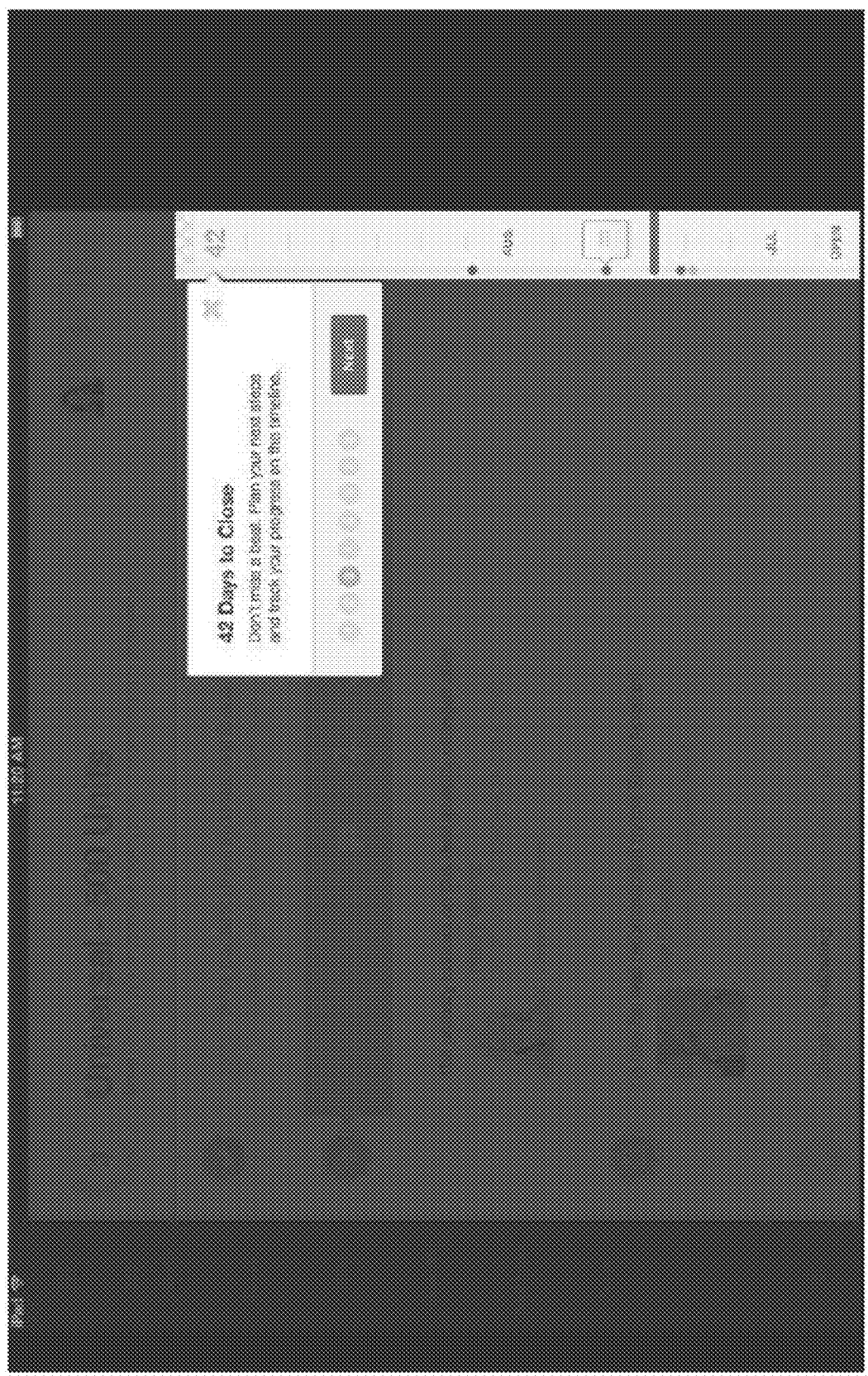

In FIG. 53, the timeline is highlighted to show the user how the timeline works. In FIG. 54, the number at the top of timeline is explained as follows: "42 days to close" and "Don't miss a beat. Plan your next steps and track your progress on the timeline."

Figure 55:
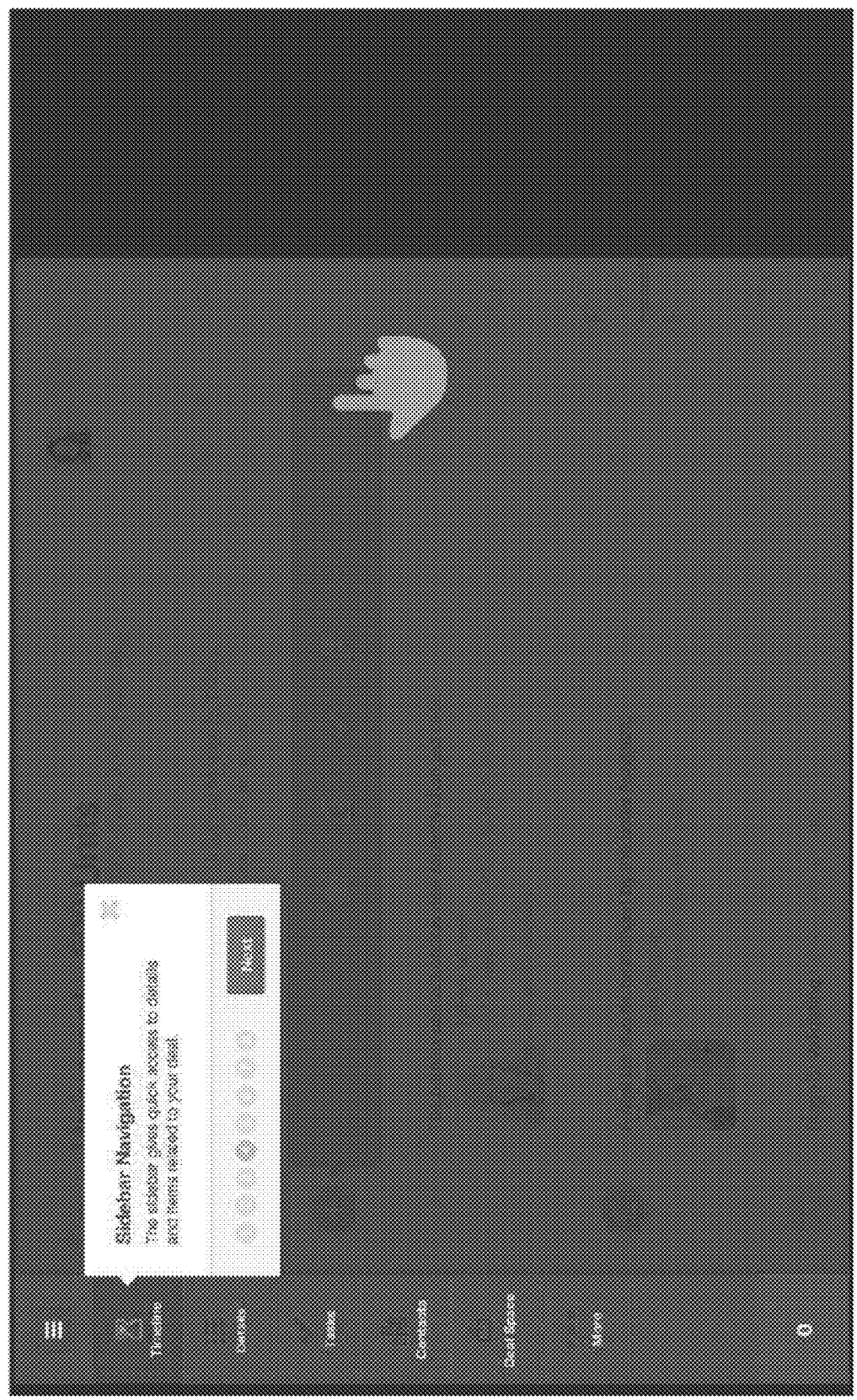

FIG. 55 provides an explanation of the Sidebar Navigation: "The sidebar gives quick access to details and items related to your deal."

Figure 56:
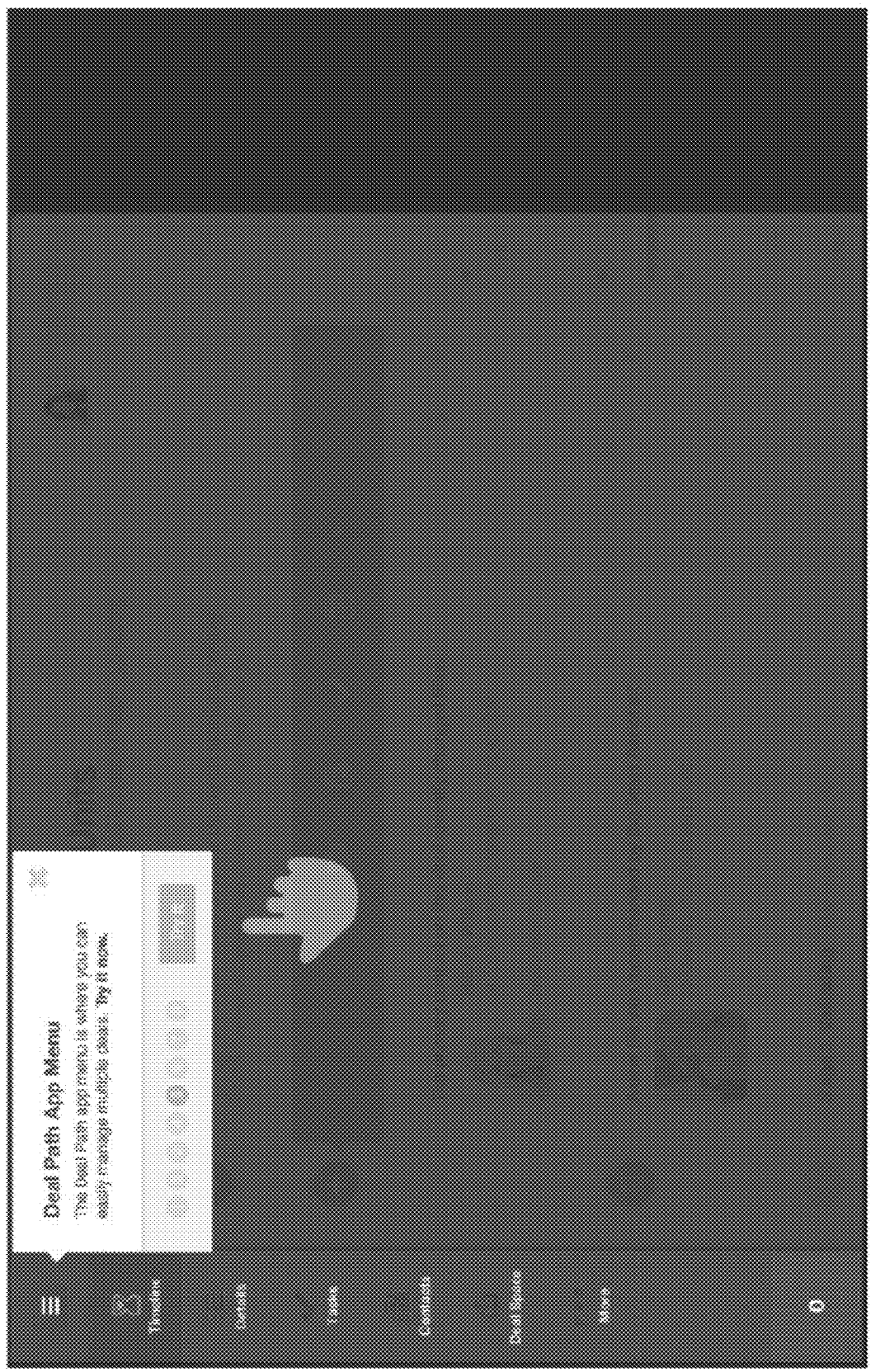

FIG. 56 provides an explanation of the dealpath app menu on the Sidebar navigation bar "Dealpath App Menu" and states "The Dealpath app menu is where you may easily manage multiple deals. Try it now." The try it now is highlighted (bolded) because the phrase may function as a link for the user to try the dealpath app menu. Alternatively, the user may select the Try It button in the pop up.

Figure 57:
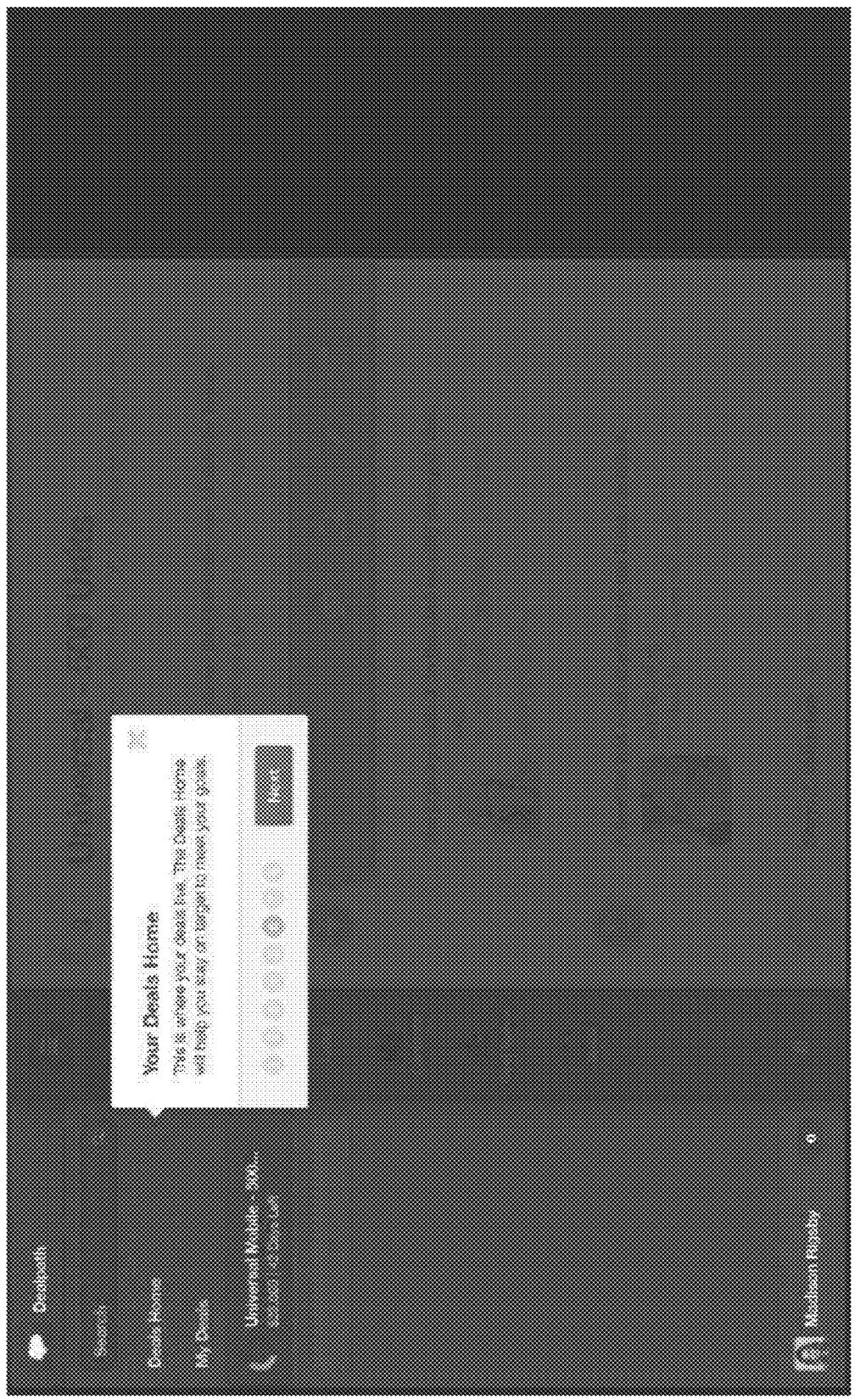

FIG. 57 results when the user clicks on the Try it now button or the Try it button in FIG. 56. A panel appears to the left of the side navigation bar showing links that provide the user with a summary of all of the deals the user is involved in. The links include Search, Deals Home, and My Deals. Note that the user has only one deal pending at this time (Universal Mobile). The panel also provides the user with a thumbnail sketch of the deal with a stage icon and information about the deal "Universal Mobile 500." In at least one embodiment, if the user has more than one deal, the user may be presented with a list of deals to choose from. The screenshot also provides the explanation "Your Deals Home" and explains "This is where your deals live. The Deals Home will help you stay on target to meet your goals." The user may select the next button to move on to the next part of the tour.

Figure 58:
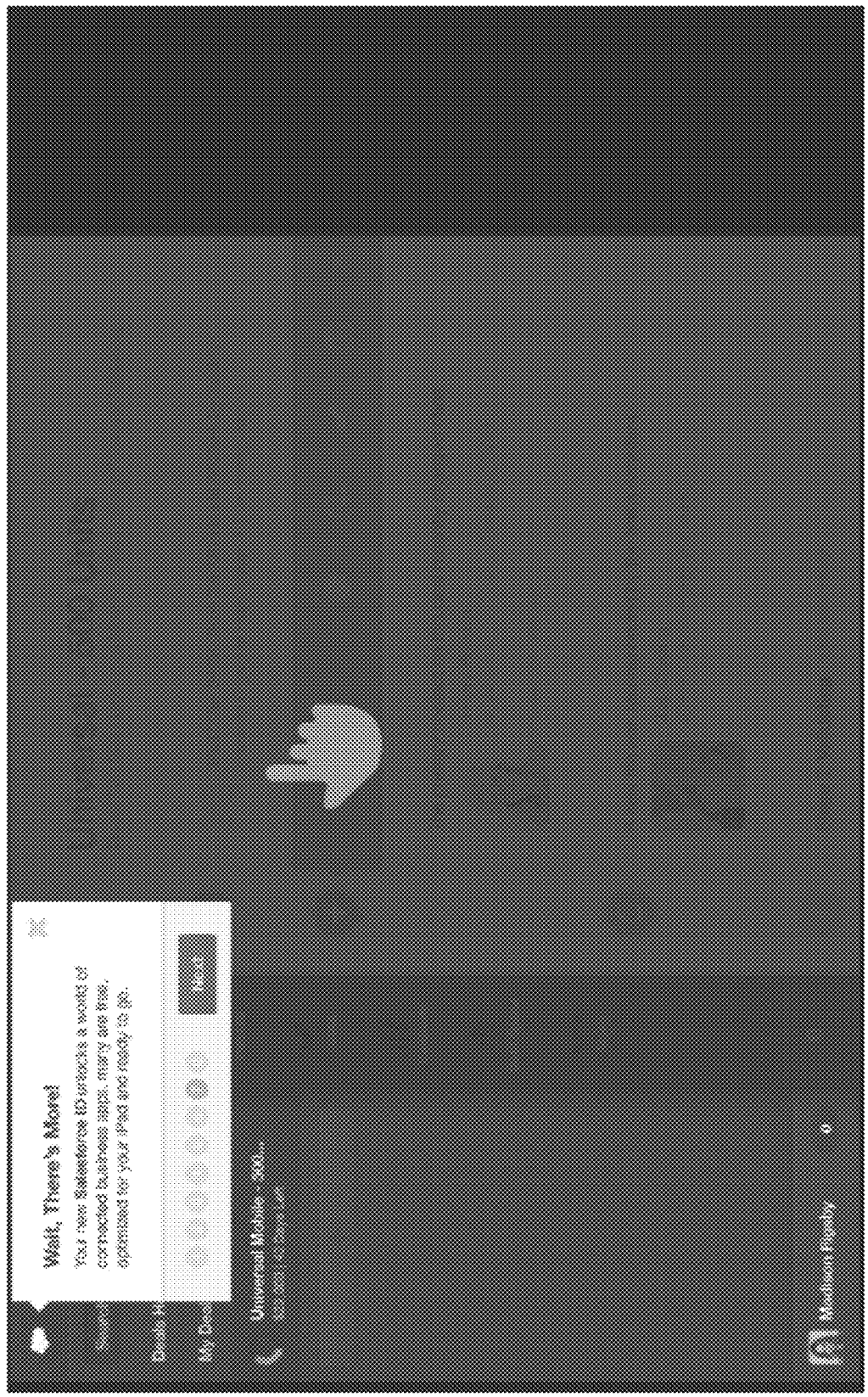

In FIG. 58, the user may be shown that the user has access to all Salesforce and results when the user clicks on the "next" button in FIG. 57. A balloon opens up next to the Salesforce icon stating, "Wait, There's More! Your new Salesforce ID unlocks a world of connected business apps. Many are free, optimized for your iPad and ready to go." The user may select the "next" button to continue the tour. The user may also get this information by selecting the white cloud icon.

Figure 59:
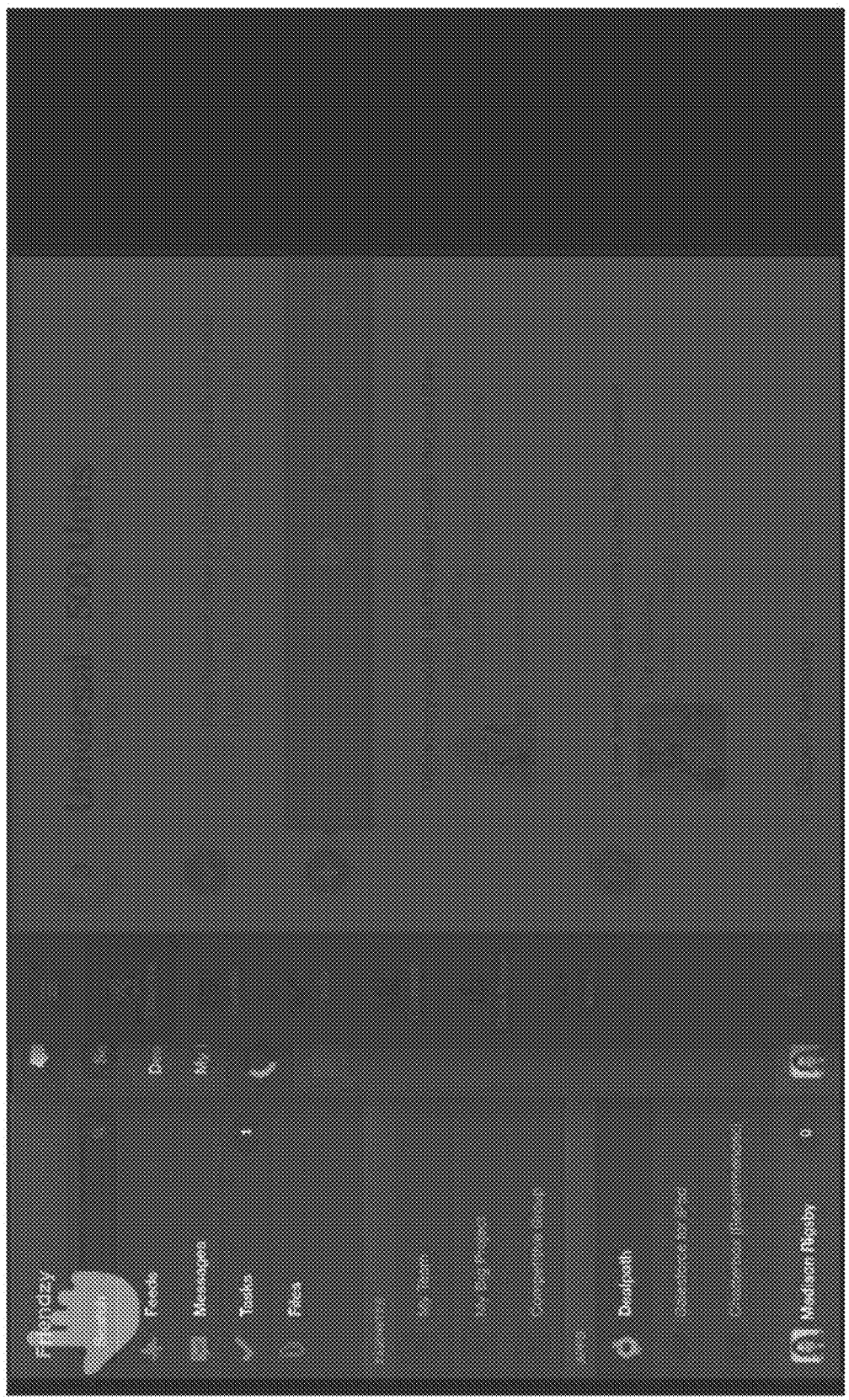
Figure 60:
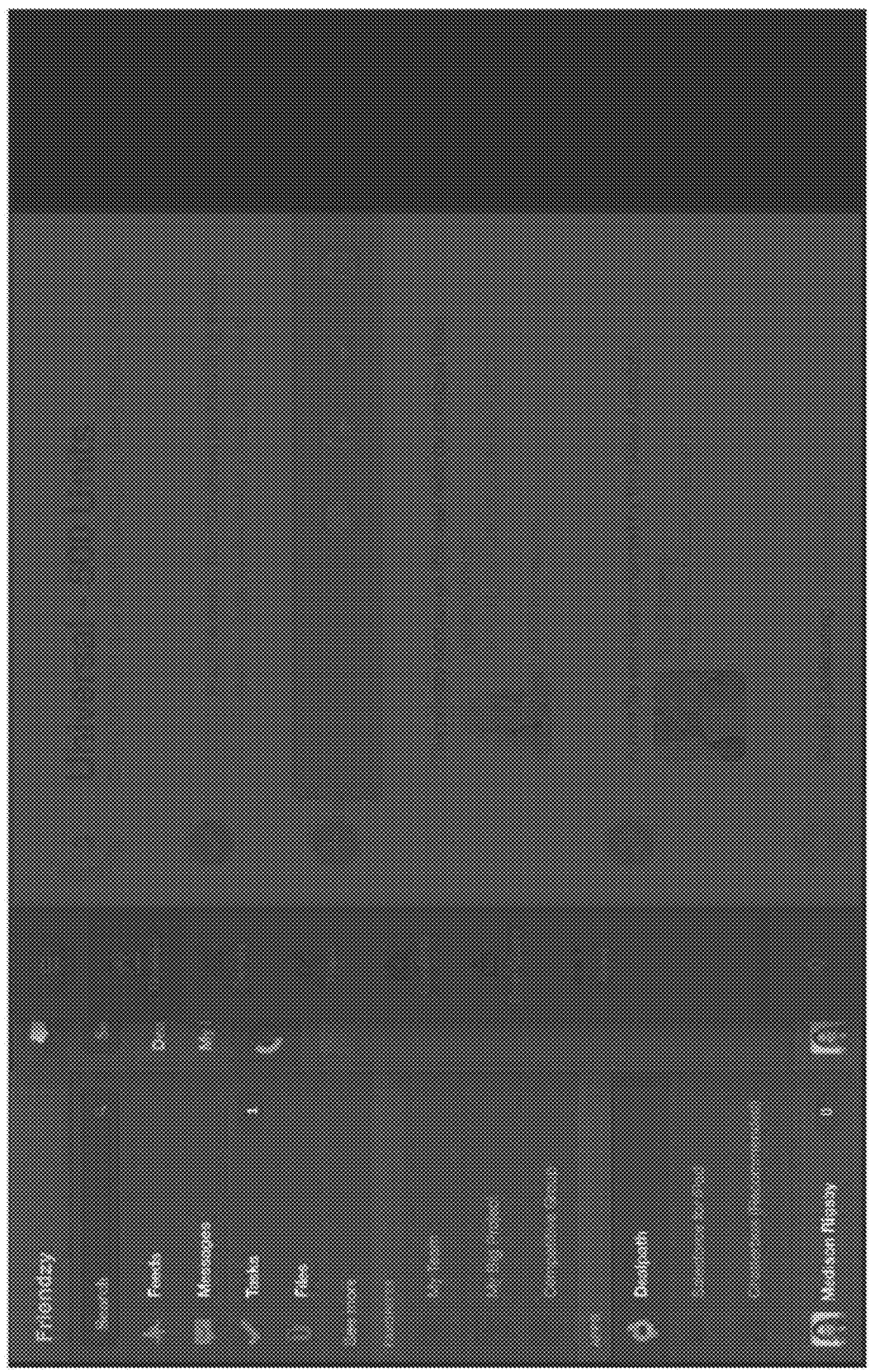
Figure 61:
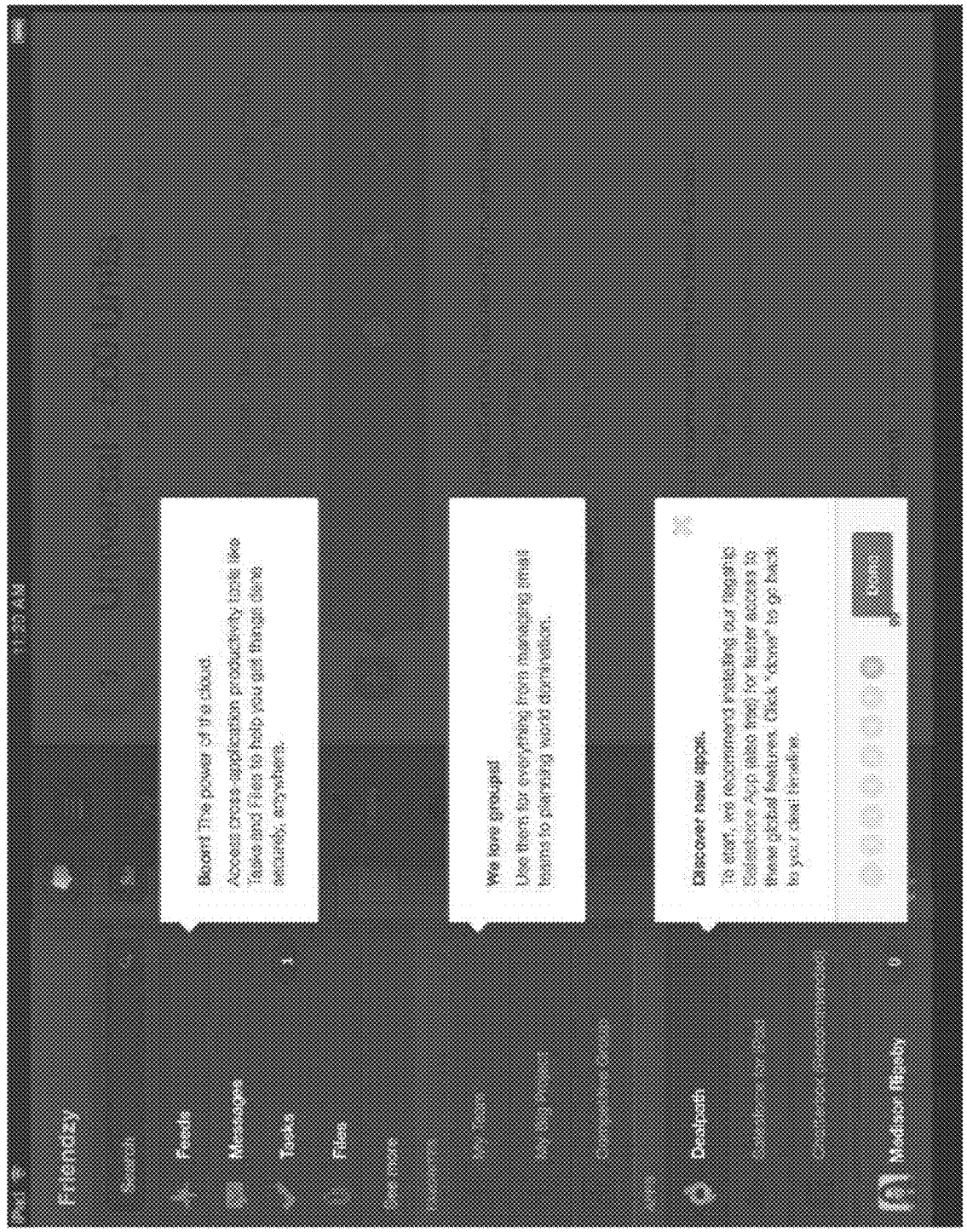
Figure 62:
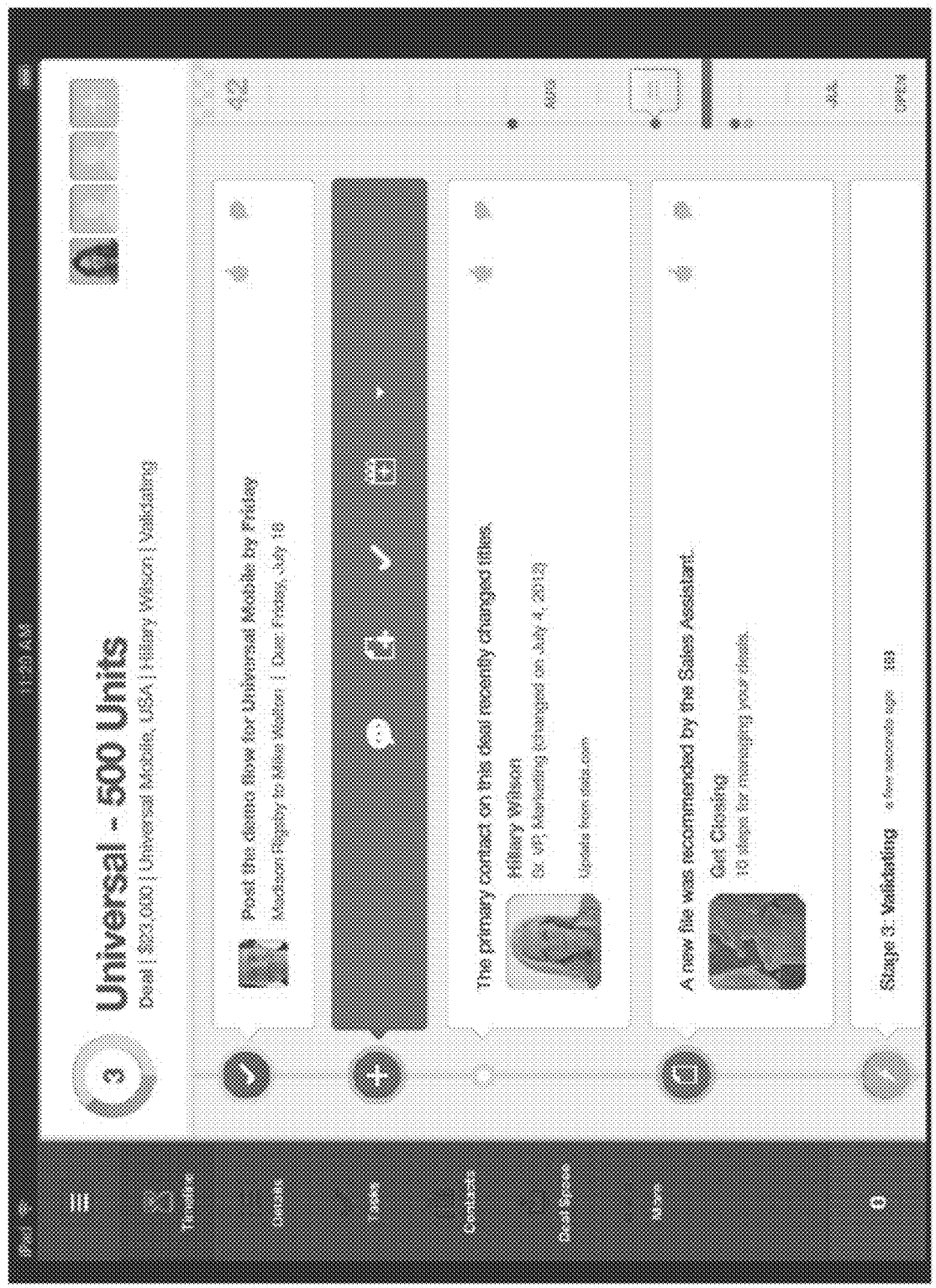
FIGS. 62-73 are screenshots illustrating an example user interface screen for sharing posts in a method of managing business deals in an embodiment.

FIGS. 59-61 show examples of screenshots of embodiments of webpages having the cloud menu, a global menu for salesforce services. The user may have only installed the dealpath app, but the user is also granted access to other productivity tools (such as tasks, groups, and messages) from salesforce automatically. In FIG. 61, an explanation of some of the functions in the cloud menu is shown. For example, Feeds is explained as "Boom! The power of the cloud. Access cross-application productivity tools like Tasks and Files to help you get things done securely, anywhere." My Team is explained as "We love groups! Use them for everything from managing small teams to planning world domination" and dealpath is explained as "Discover new apps. To start, we recommend installing our flagship Salesforce app (also free) for faster access to these global features. Tap "done" to go back to your deal timeline." The user may tap the done button to go back to the deal timeline and end the tour. Alternatively, the user may select the see more button to continue the tour.

In FIGS. 62-66, after the tour is ended, the user is sent back to the dealpath (or timeline) page (see also FIGS. 34 and 48). The timeline page may also be the default page for the dealpath app. The user sees that the person she has assigned the task to (Mike Walton) has completed the task. Therefore, the task moves below the side navigation bar and/or the blue bar in the timeline.

Figure 63:
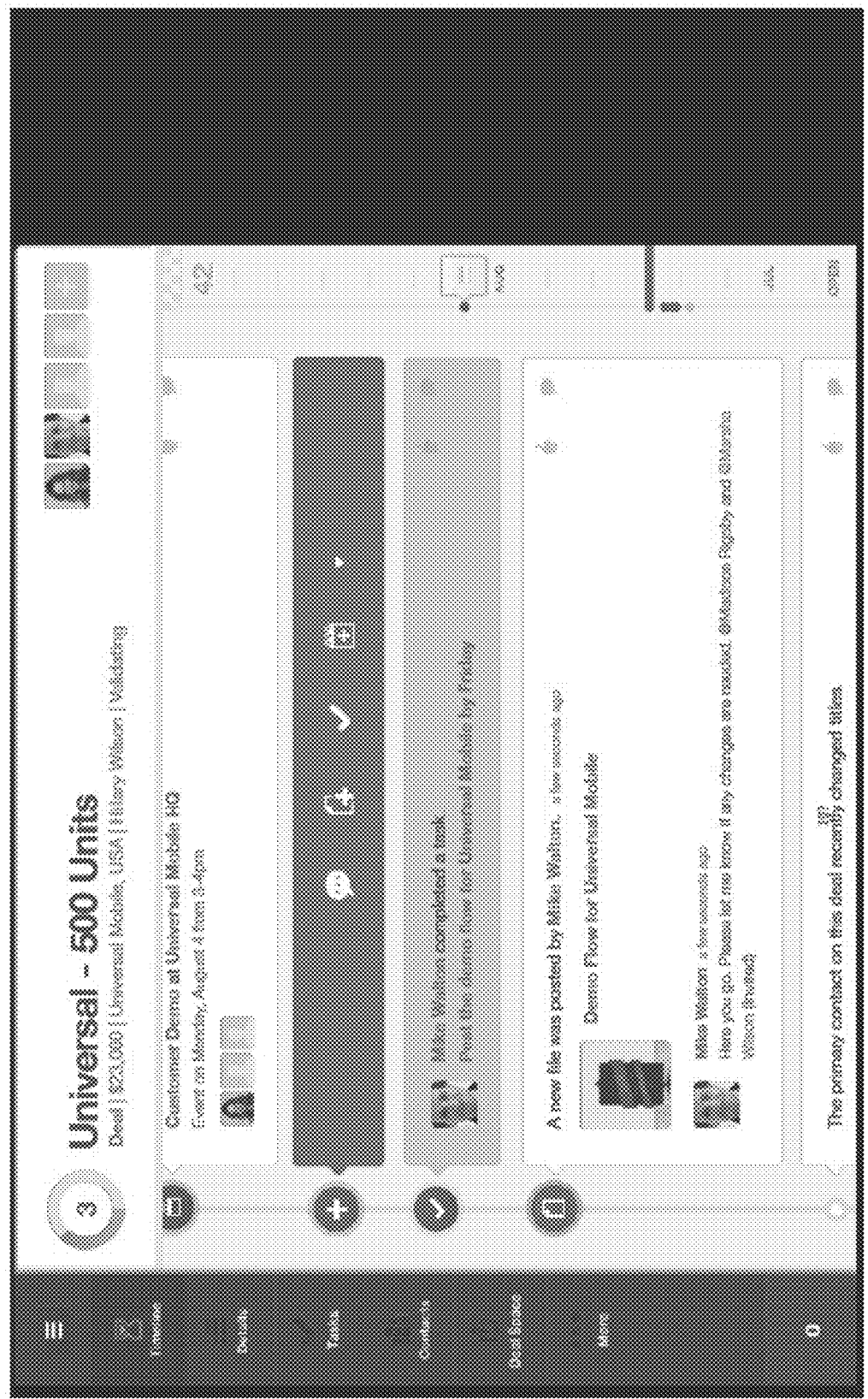

In the example of FIG. 63, a new file is posted for the Universal deal. The new file shows up initially highlighted as a yellow box containing the file and information about who posted the file, when the file was posted, and any information from the person who posted the file. The person who posts the file may invite others to read or view the file. The highlighted box is included next to a file icon. In at least one embodiment, the file icon is a blue circle with an image of a piece of paper with the top left corner folded over. The file is included on the timeline on the right as a blue dot on the day the file was posted.

Figure 64:
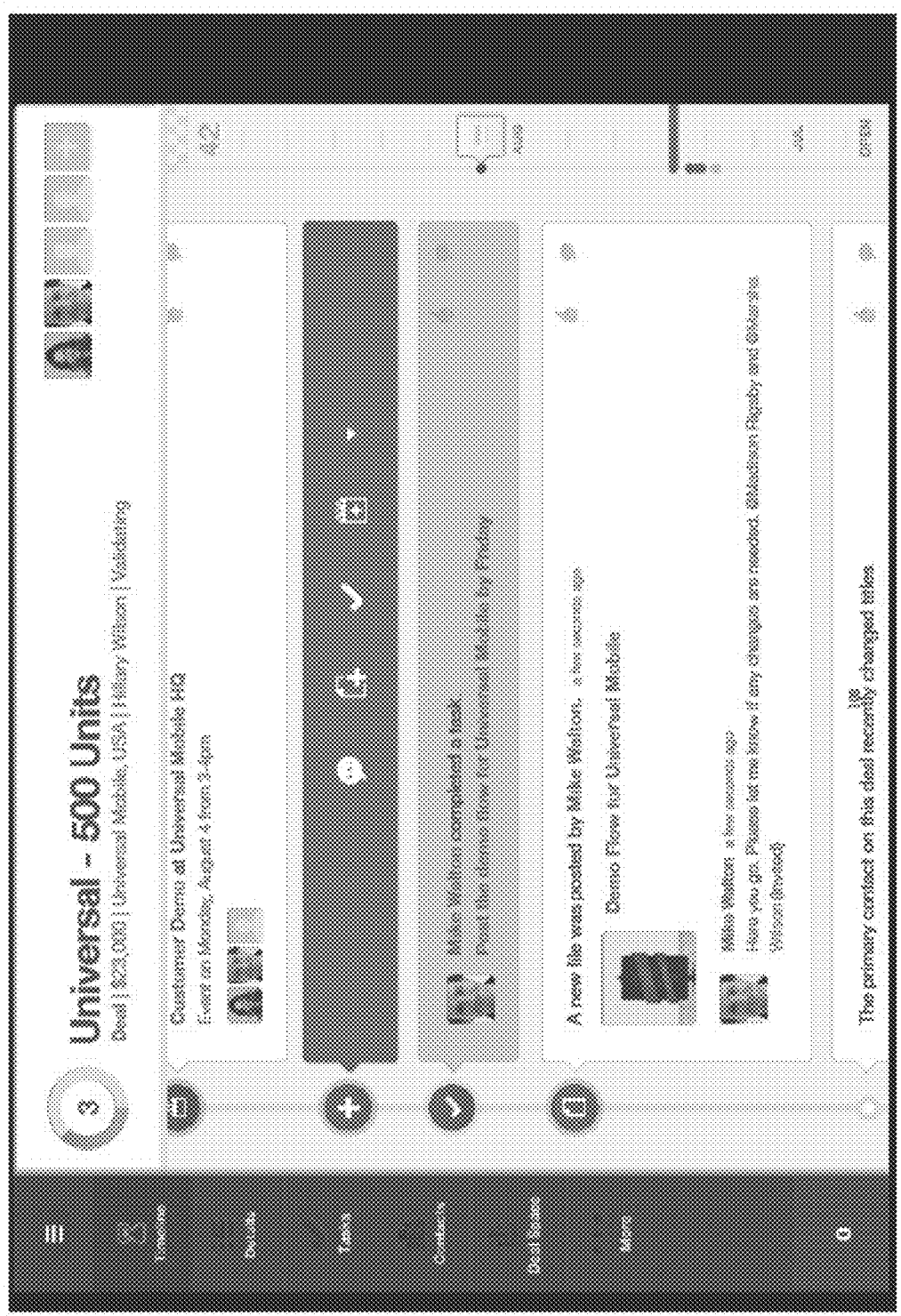
Figure 65:
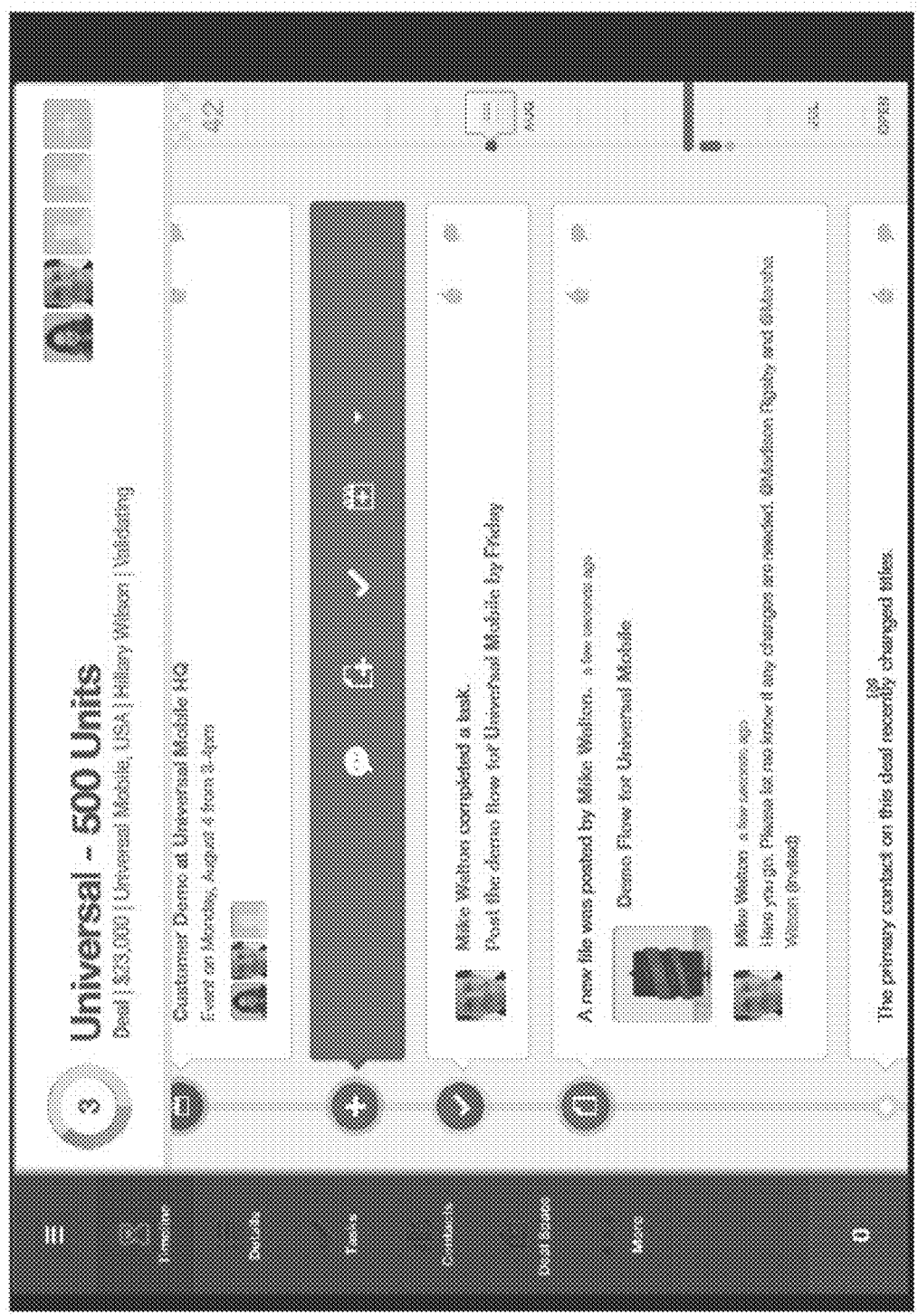
Figure 66:
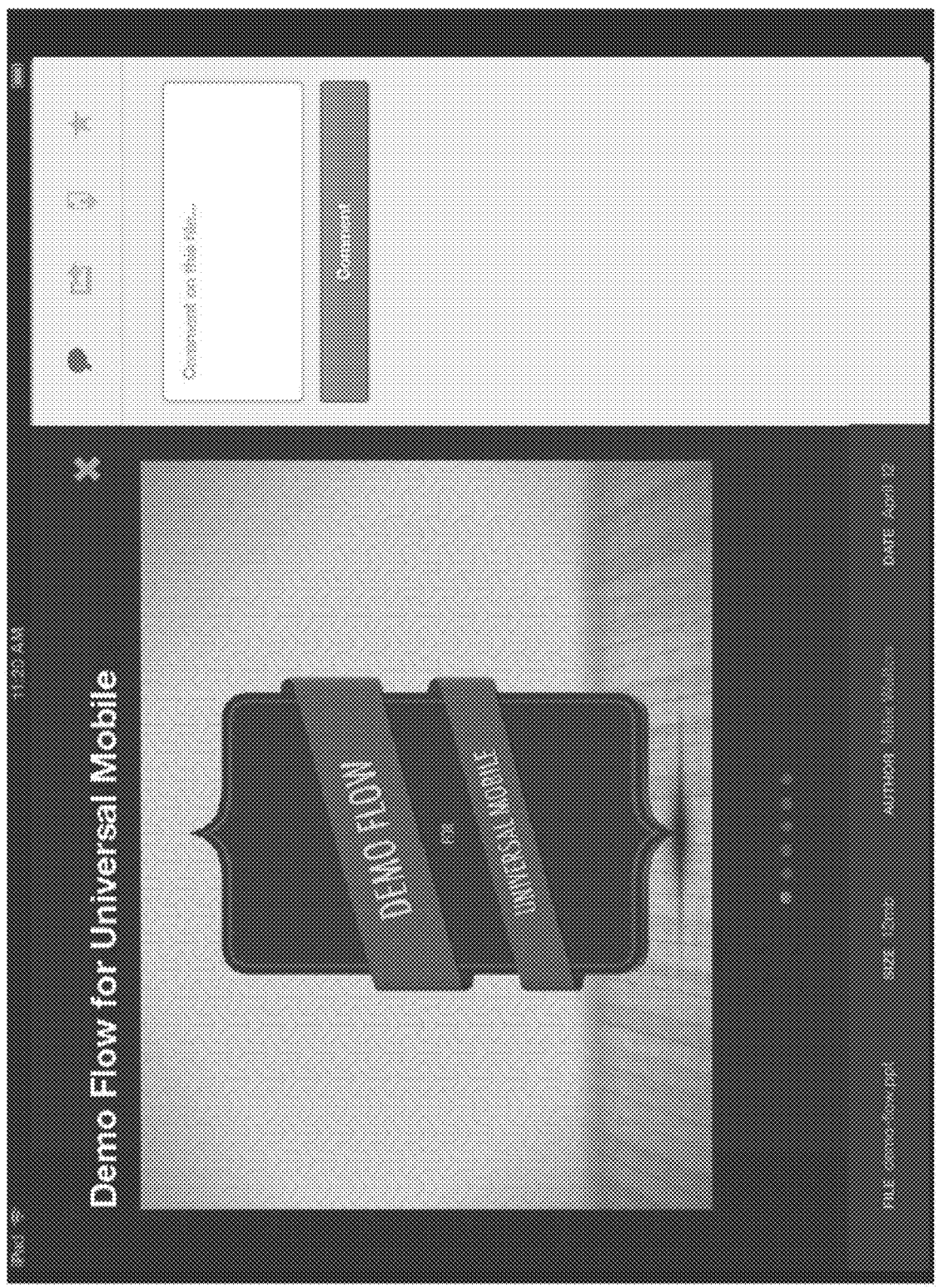

FIG. 64 shows an example of a screenshot of an embodiment of the dealpath webpage after a task is completed. Next to the task icon (purple checkmark), a green box appears containing the photo and name of the person who completed the task with and explanation of the task that was completed and the due date for completion. In FIG. 64, the highlighted new file box from FIG. 63 has returned to the background white color (is no longer highlighted). In the example of FIG. 65, Mike Walton's picture was added to the Customer demo event next to Madison Rigsby's photo. Since the demo flow was posted, Mike Walton was invited to the event. In FIG. 66, the green box for the task completion has returned to the background white color.

Figure 67:
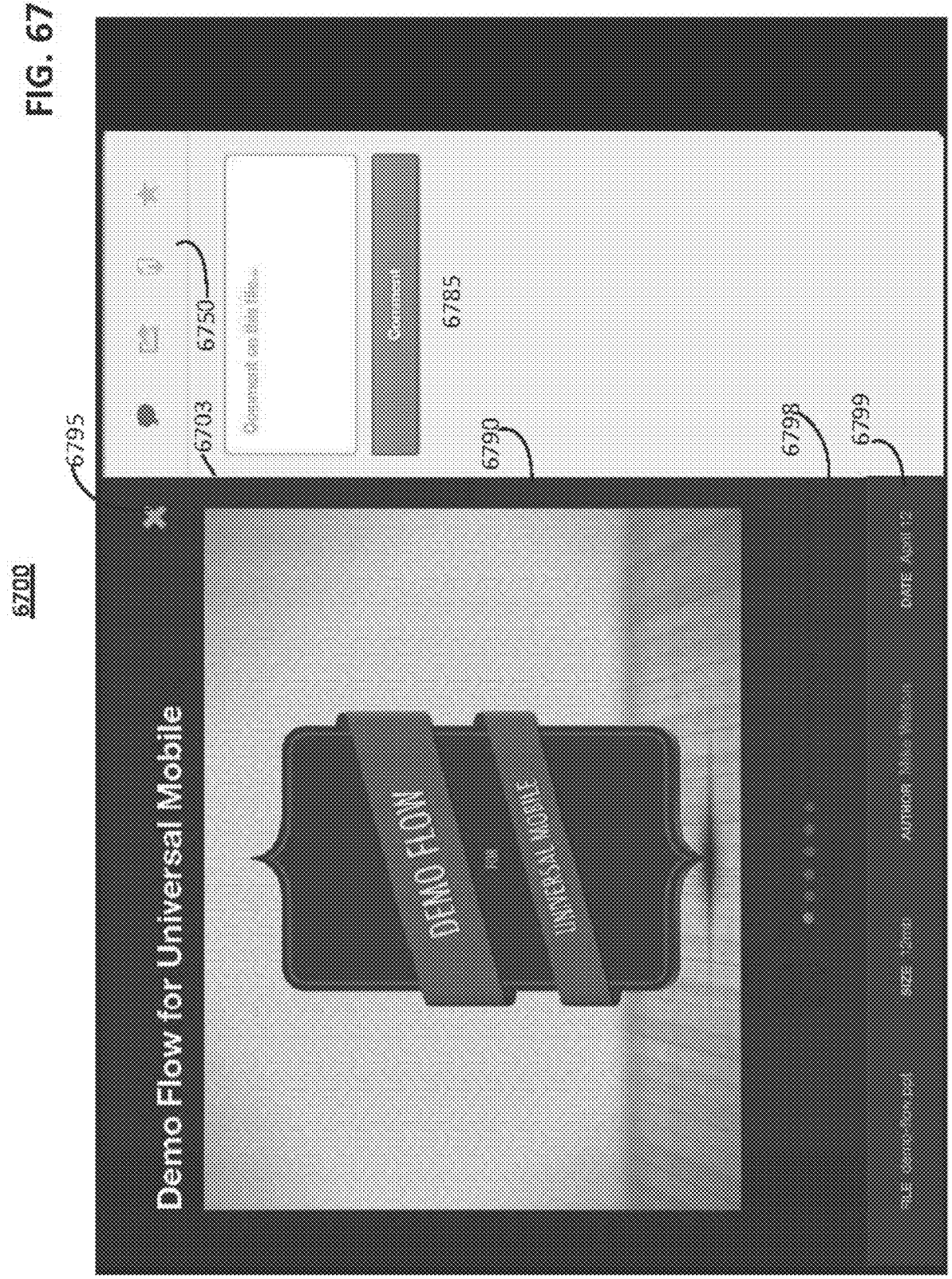

FIG. 67 shows an example of a screenshot of an embodiment of webpage 6700 shown to a user when the user opens a file posted on the timeline. Webpage 6700 may include embodiments of deal name 6703, comment navigation bar 6750 including comment command 6752, share file command 6754, send command 6756, and star 6758, comment field 6785, file 6790, close 6795, upload progress 6798, and file information 6799. In other embodiments, add a task webpage 6700 may not have all of the elements or components listed above and/or may have other elements or components instead of or in addition to those listed.

The user may "like" the file by selecting the thumbs up icon and then views the file either by selecting the file itself or the user is automatically sent to the file view by choosing the "like" icon.

Deal name 6703 has been discussed in conjunction with FIGS. 34-36.

Comment navigation bar 6750 functions to provide the user with functions and tools to post a comment and decide with whom to share the comment. Comment navigation bar 6750 may have the following commands: comment command 6752 shown by a conversation balloon icon, share file command 6754 shown by an envelope with an active arrow inside, file command 6756 shown by an image of a piece of paper with the right corner folded down, and star 6758 shown by a five cornered star icon. The user may activate the commands by selecting each icon.

The comment field 6785 provides the user with functions and tools to input a comment on the file using the electronic device's keyboard.

File 6790 provides the user with functions and tools to include a file in the user's comment(s).

The close icon 6795 is shown as a white X in a black background and functions to close the file.

The upload progress 6798 may be followed by viewing the 6 gray dots situated below the file. In this way, if the file is a video or powerpoint, the user will know when the file has downloaded enough to be viewed as a complete file.

The file information 6799 provides the name and type of file (demo-flow.ppt), the size (12 mb), the author (Mike Walton), and the date (April 12).

Figure 68:
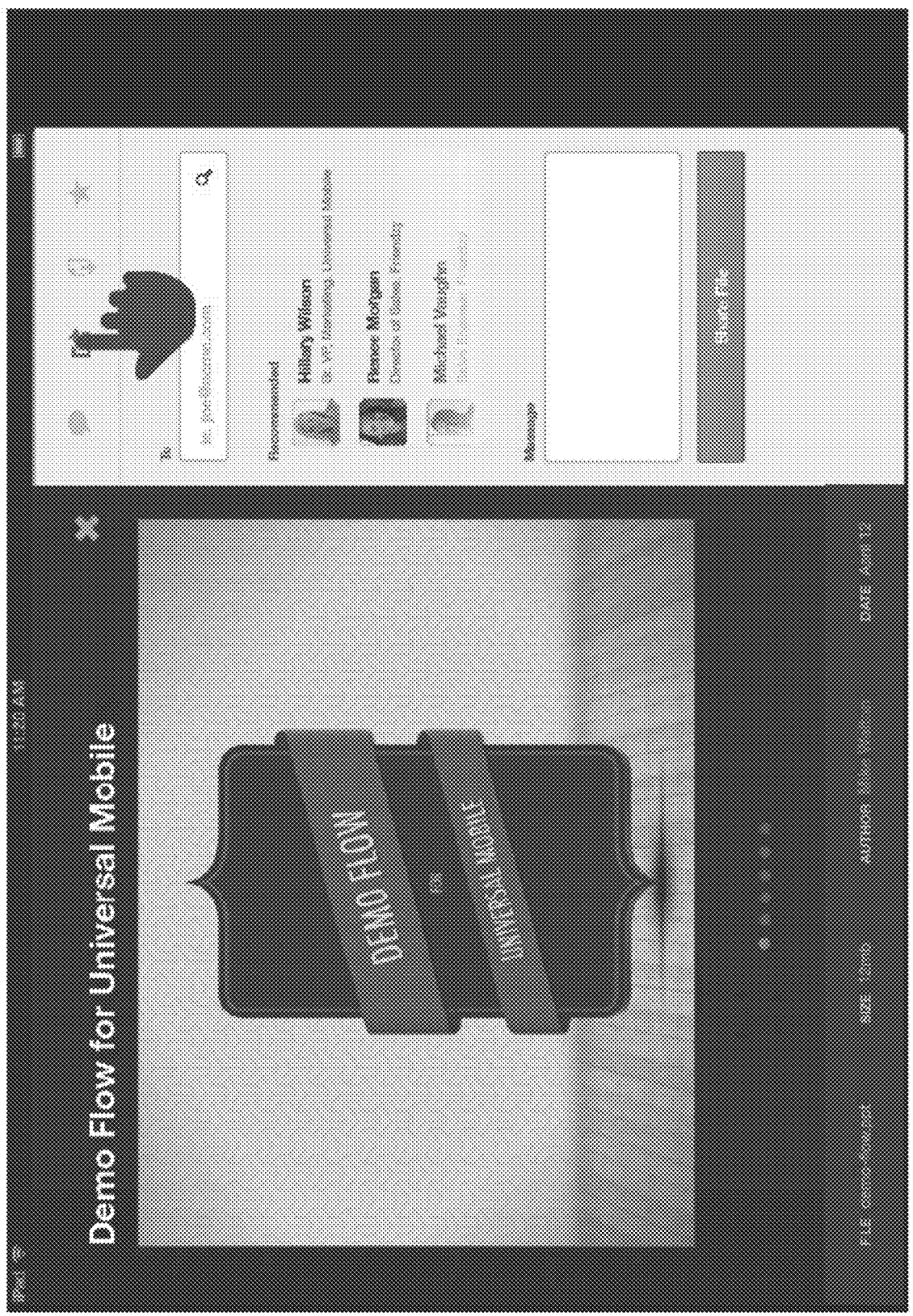

FIG. 68 shows what happens when a user clicks on the share icon 6754. A list of recommended team members, contacts, or recipients is provided for the user to choose from. Alternatively, the user may input the email address of the contact the user would like to share with in the to-field.

After the user inputs the email address, the email address will be added to the list below the recommended heading. The user clicks on each of the recipients, and optionally includes a message and clicks on the share file bar to send the file and/or comments to the other recipients.

Figure 69:

In the example of FIG. 69, the user has chosen to share the file with Hillary Wilson with the message "Hi Hillary, please take a look at this following flow for our meeting and let me know if you think this will meet the team's needs." In at least one embodiment, an explanatory reminder may appear (see blue box) providing the user with information about the security of the process the explanation "Sharing with an external contact. A secure, branded customer deal space will be created providing links, functions, and tools assisting the user to track the user's customer interactions" appears and a link is provided to allow the customer to preview the file and comment before the file is sent (see preview button).

FIG. 70 shows an example of a screenshot of an embodiment of a webpage 7000 shown to a user when the user clicks on the preview button to preview the deal space page before sending the deal space page to the customer. The user may preview the file before the file associated with the deal space page is sent. Webpage 7000 may include embodiments of page explanation 6702, deal name 6703, spoked icon 7004, exit 7005, name of deal 7006, photo and information about sender 7007, file and comment 7020, field for thoughts 7025, share bar 7030, and share button 7040. In other embodiments, preview file and comment webpage 7000 may not have all of the elements or components listed above and/or may have other elements or components instead of or in addition to those listed.

The secure space provides a preview of the email and/or posts containing the file. The deal space page is automatically generated by sharing the file with the customer. In at least one embodiment, after the deal space page is generated, the space may be altered by the user to fit the user's needs. FIG. 70 shows a deal space page that is shown to a customer to share a file. In FIG. 70, the user may review the deal space page and/or edit the deal space page before sending the deal space page to the customer. Even if the customer does not have the dealpath app, the customer may still view the page via the customer's device or computer.

The page explanation 7002 functions to remind the user what the page's function is (see e.g., "Previewing new customer group for Universal Mobile). The page explanation may include the deal name.

The deal name 7003 reminds the user which deal the file is associated with (see "Universal Mobile").

The spoked icon 7004 when activated provides the user with tools related to setup settings.

The exit 7005 is shown as an "x". The exit, when activated, cancels the act of sharing the file and sends the user back to the previous page.

The name of deal 7006 provides the user with information about which companies are working together on the deal (see "Friendzy & Universal Mobile). The number of companies may depend on the type of deal. For example, there may be deals that include more than two companies.

The photo and information about sender 7007 provides the user with information about the sender. The information may include the sender's photograph, the sender's job title, the sender's email, and the sender's telephone number.

The file and comment 7020 provides the file and a comment from the sender. For example, the photograph of Madison Rigsby, the information that "Madison Rigsby shared a new file," the information about when she shared the file (see "Right Now"), and a message from the sender ("Hi Hillary, please take a look at the following flow for our meeting and let me know if you think this will meet the team's needs") is provided. In addition, in a separate field, the file is provided with information about the file (see "Demo Flow for Universal Mobile.ppt Strategic presentation flow for the Universal Mobile Sales presentation that is coming up soon"). The file is shown on the left as a photograph of a mobile device with a red ribbon around it. A button for "Like" is shown and, when activated, the recipient may "like" the flow on a social networking site. An arrow for a scrolldown is provided within the post box to.

The field for thoughts 7025 provides a place for the recipient to easily provide thoughts, comments, other files, etc. directly associated with the shared file. The sentence "Add your thoughts here" provides the user with a clear idea of what the space is provided for.

The share bar 7030 provides other links that provides the user with functions and tools to further change the file and comments that the users share. The comment icon functions to send the user back to the comment to amend, add, or remove the comment. The task (checkmark) link functions to send the user to an add a task page, the paperclip icon is one of the "publisher" links and functions to allow a user to post updates, links, files, etc. The more pulldown provides a user with other links that the user might want to access from the page (e.g., the events link, the file link, etc.).

The share button 7040 functions to send the file and comments to the chosen recipient(s). When the share button 7040 is activated, the server sends the file.

Figure 71:
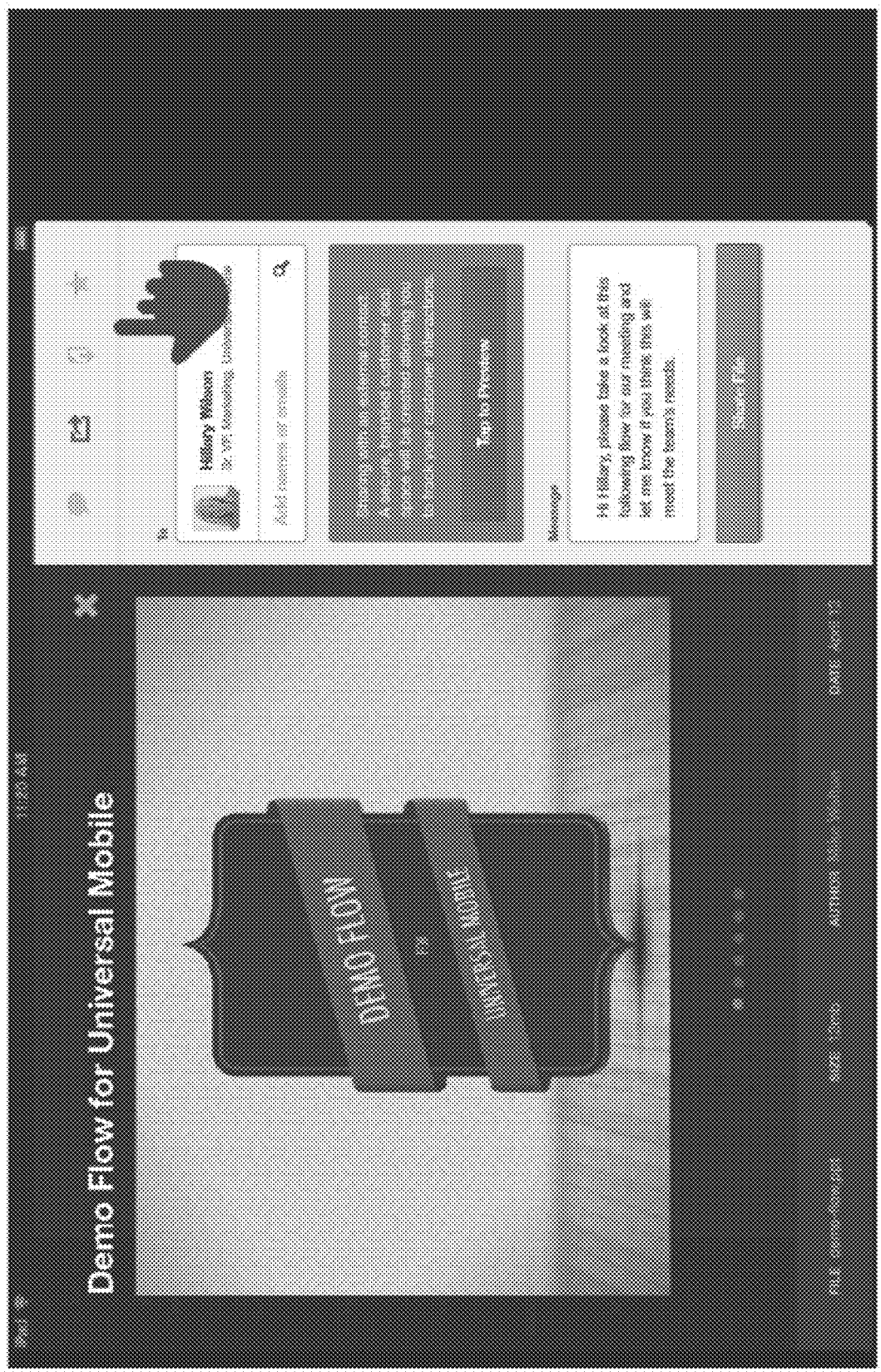

In the example of FIG. 71, the user previewed the file and comments and decided to send the file without changes. The user is taken back to the file and comment page (see FIG. 69) and the user may tap the share file button to share the file and comment.

Figure 72:
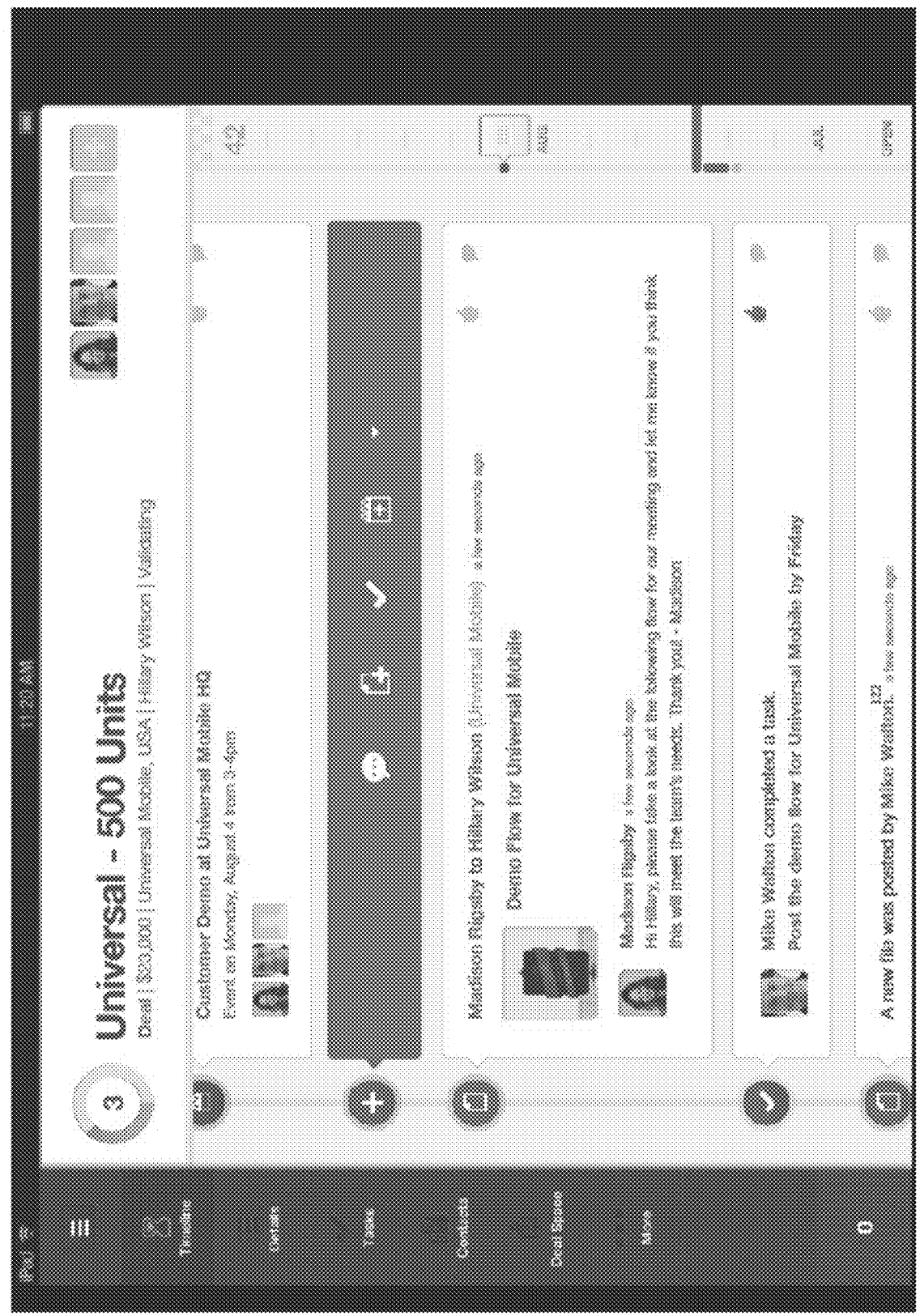

In FIG. 72, the user gets a history of the file that was shared. In FIG. 72, the shared file from FIGS. 70 and 71 posts to the deal homepage (see FIG. 34). The shared file posts as a file (see file icon on the right). The post provides the demo flow and the message to Hillary from Madison Rigsby.

Figure 73:
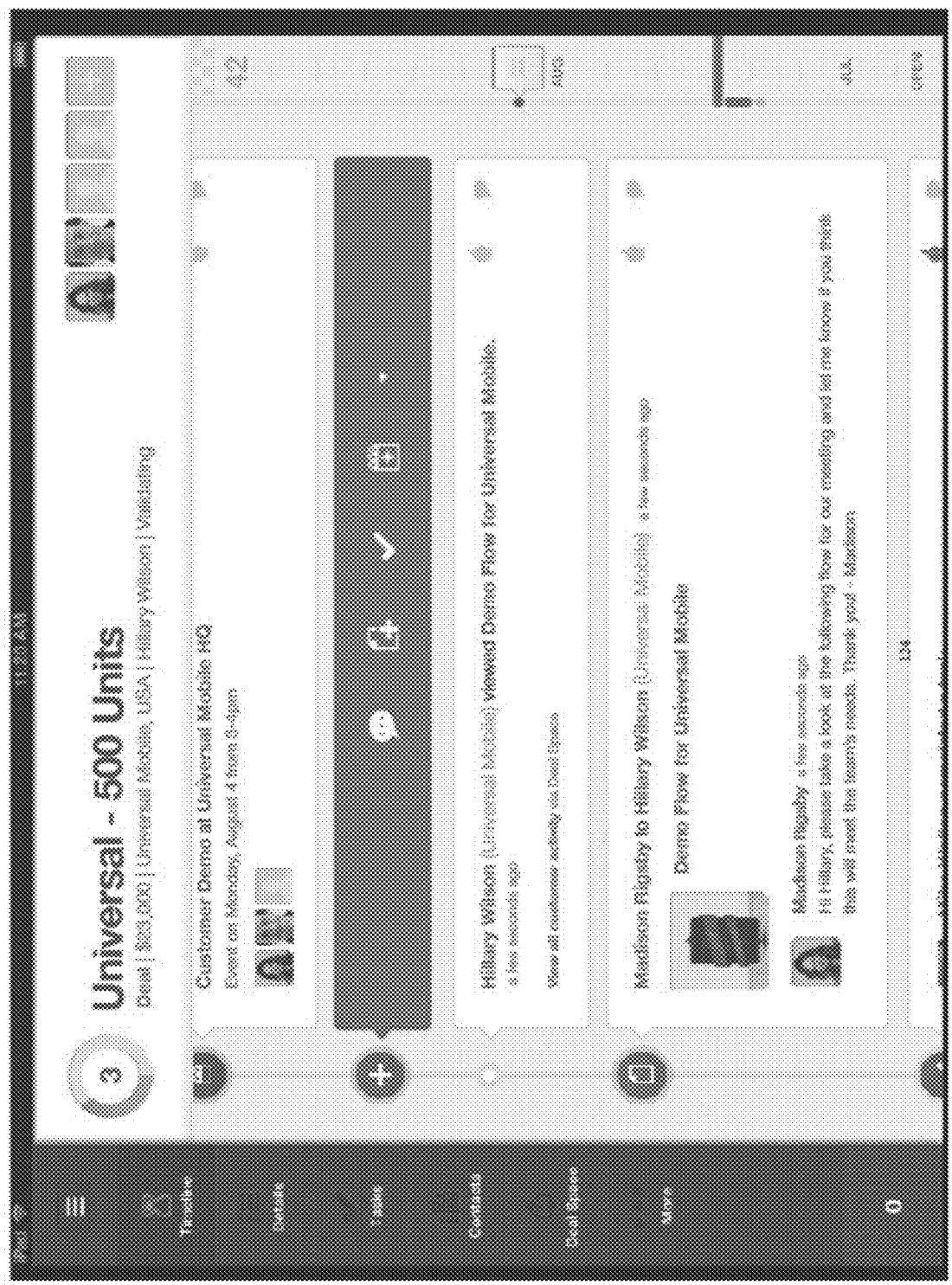

In FIG. 73, the user gets an alert that the customer she shared the file with has viewed the file (Hillary Wilson (Universal Mobile) viewed Demo flow for Universal Mobile.). The fact that she views the file is provided on the deal homepage as a post. The post also provides a link that provides the user with functions and tools to "view all customer activity via Deal Space." The user may select any part of the post to get more detailed information about the part of the post the user has selected (e.g., select Demo Flow to view the file).

Figure 74:
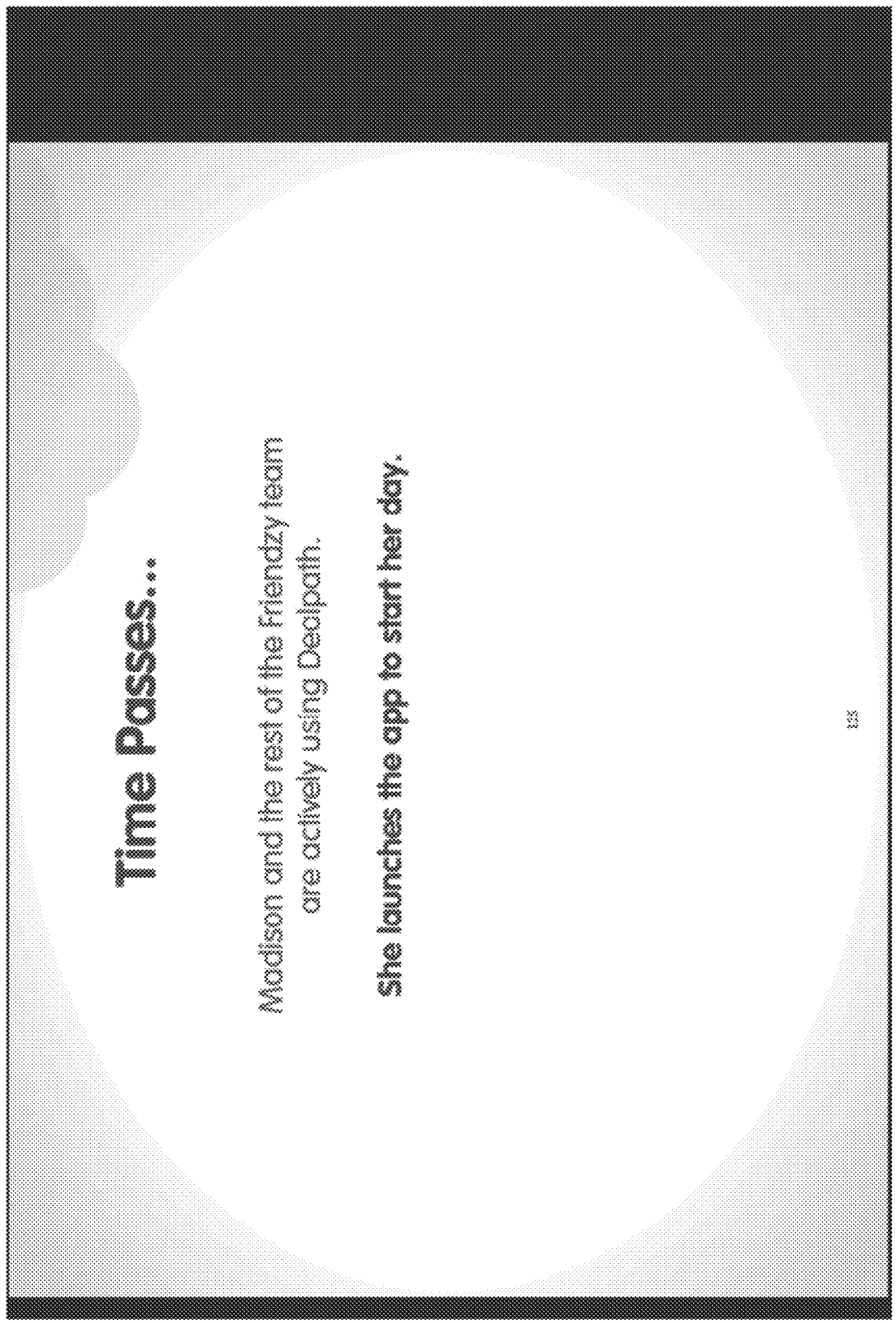

FIG. 74 shows an example of a screenshot of an embodiment of a webpage 7400 indicating that the process of setting up a deal has been accomplished and now the screenshots will illustrate how the user uses the dealpath app during a normal day. FIG. 74 reads "Time Passes . . . Madison and the rest of the Friendzy team are actively using Dealpath. She launches the app to start her day."

Figure 75:
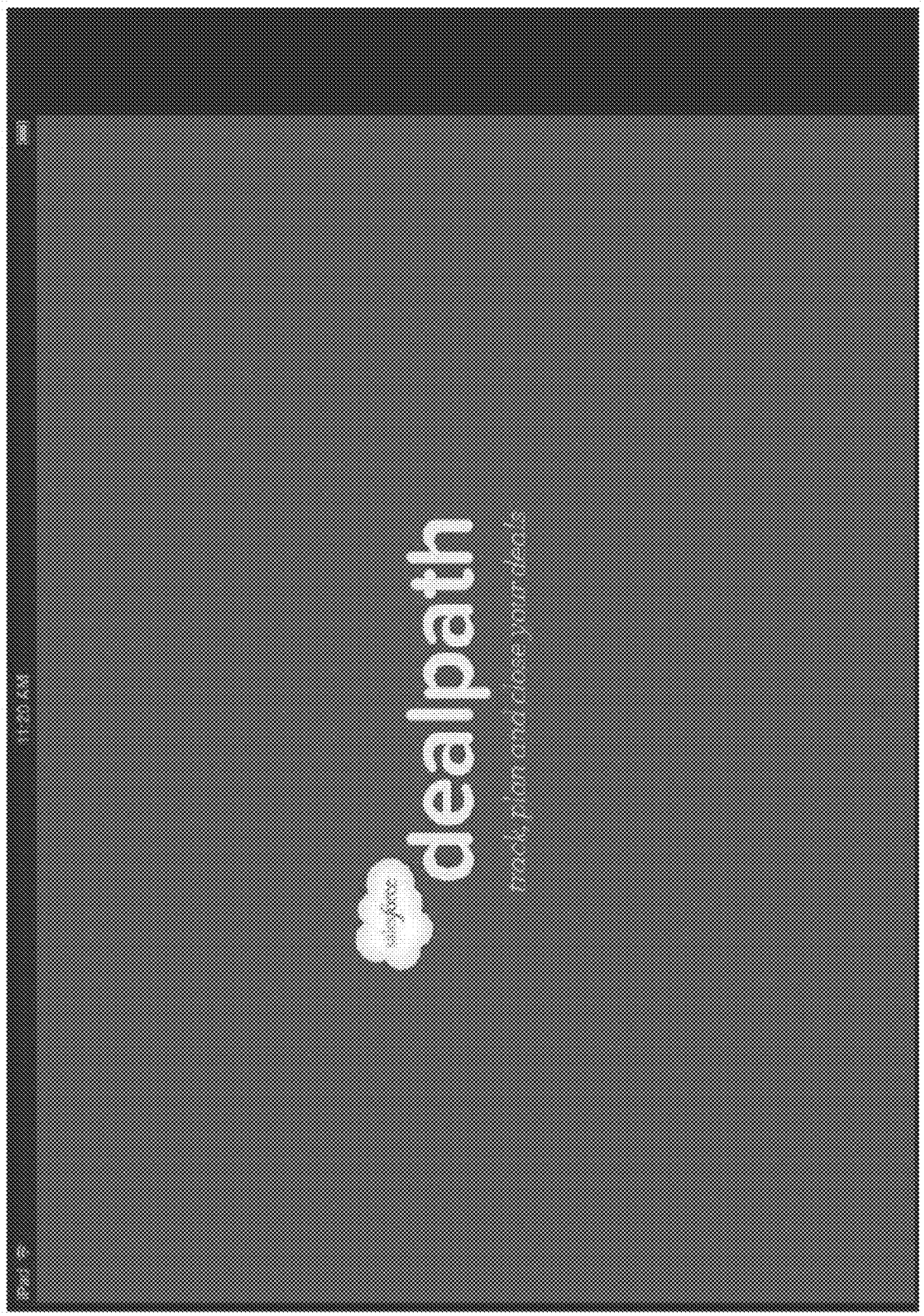

FIGS. 75-120 show examples of screenshots of embodiments of webpages that illustrate the process of using dealpath and the related apps after a deal and the user set up. FIG. 75 provides a screenshot that is shown to the user when the user turns on the user's electronic device and then clicks on the dealpath app. The page shows the salesforce icon above and to the left of the word "dealpath" and provides an explanation below of "track, plan and close your deals."

FIGS. 76-83 shows examples of screenshots of embodiments of webpages shown to a user when the user clicks on the my deals link in the side navigation bar (see FIG. 34 for example). Webpage 7600 may include embodiments of my deals button 7601, my deals icon 7602, webpage name 7603, leaderboard link 7604, calendar heading 7605, deal chart 7610, activity field 7620, and tasks field 7630. In other embodiments, preview file and comment webpage 7600 may not have all of the elements or components listed above and/or may have other elements or components instead of or in addition to those listed.

Figure 76:
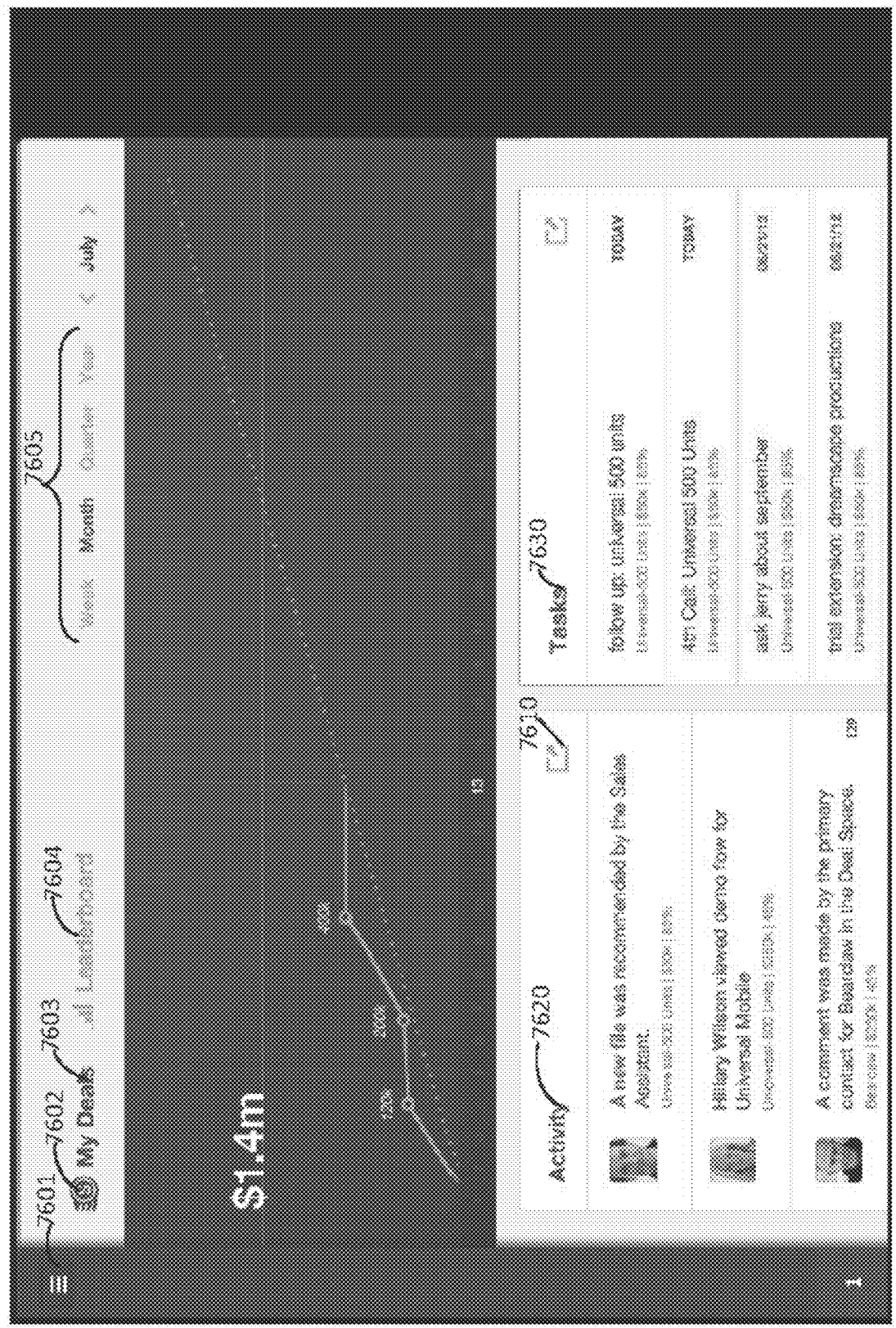

My deals button 7601 functions to send a user to the my deals page containing information about one or more deals. In the case of FIG. 76, the my deals button 7601 has been activated and the screen shown is the my deals screen.

The my deals icon 7602 provides an image that is associated with my deals. In at least one embodiment, the icon is a dollar sign within a circle and having fins attached to indicate movement.

The webpage name 7603 serves to identify the page the user is on as "My Deals."

The leaderboard link 7604 functions to send the user to a leaderboard page. The leaderboard page provides the leader with a way to see the monetary progress of each team member.

The calendar heading 7605 provides an indication of the range that is being looked at (see "Month") chosen from week, month, quarter, or year and the specific month (see "July").

The deal chart 7610 provides a chart or graph showing the progression of the deal monetarily with respect to the number of weeks. The X axis is the number of weeks since the start of the deal. The number of weeks may start with the start date and end with the projected end date of the deal. The y-axis may be the amount of revenue expected to be earned by the team. In an embodiment a horizontal line, which may be orange provides the projected or desired revenue or earnings ($1.4m). The dots provide the actual revenue obtained each week (see 120 k on week 4, $200K on week 7, and 400k on week 10). The dotted line is a projection of how the revenue is increasing each week and may continue to increase assuming the revenues do not plateau.

The activity field 7620 provides a list of posts under the heading "Posts" related to activities that have occurred during the chosen month (e.g., July)

The tasks field 7630 provides a list of tasks under the heading "Tasks" that had deadlines in the chosen month and indicates the deadline or due date for the task (see "Today" and "06/21/12").

Figure 77:
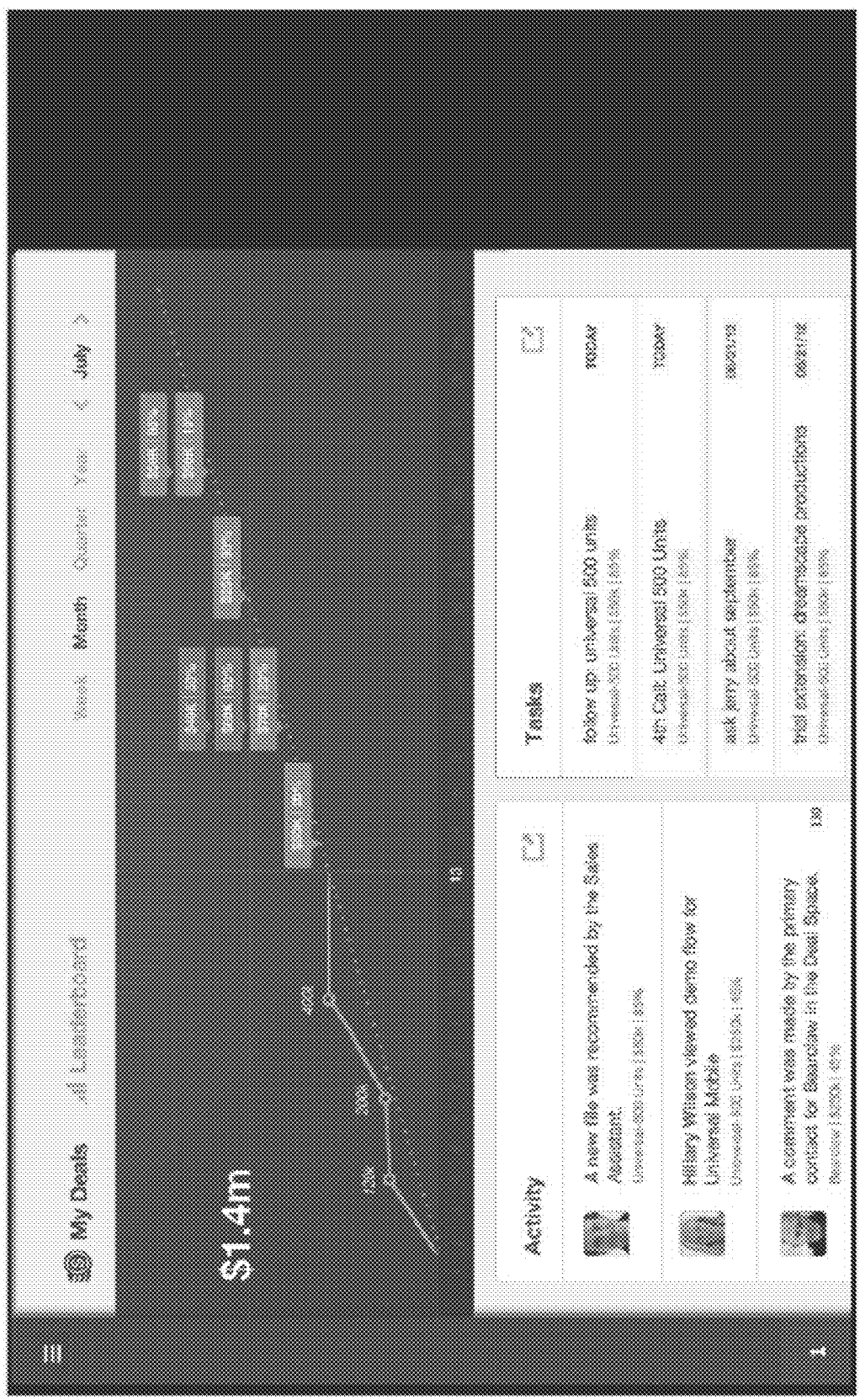

In FIG. 77, the deal chart 7110 shows a summary of the pipeline, including the quota ($1.4m), what will help the user move toward the user's goal, activities associated with the deal, and the user may manage the user's tasks. In FIG. 77, the user may select any of the dots in the projected line (the dotted line) to see projected earnings for dots above or below the projected line. Flags of various colors or types (e.g., orange, blue and green flags) provide the user with an indication of what the user needs to do in order to meet the user's goal, based on the projected timeline.

Figure 78:
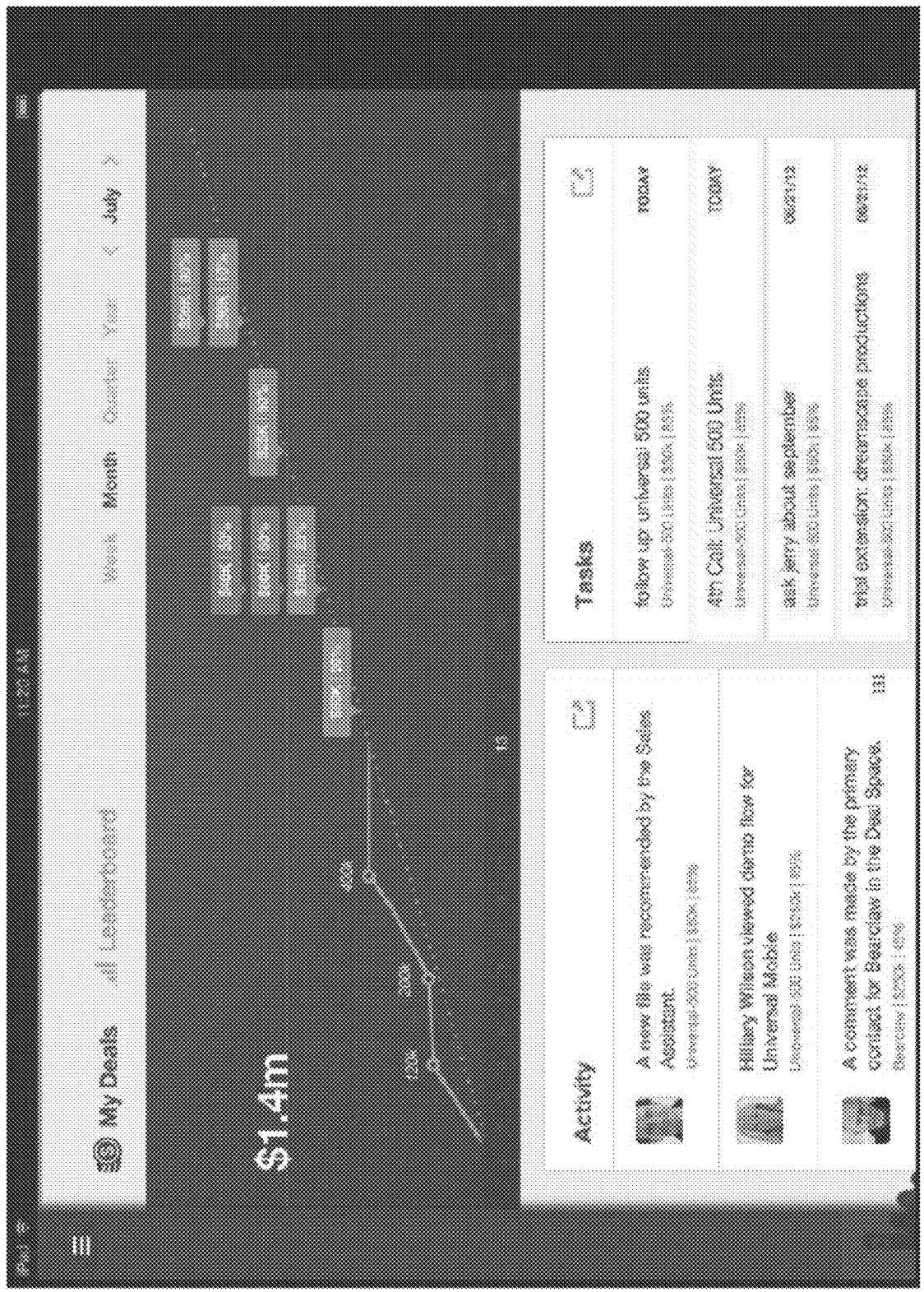
Figure 79:
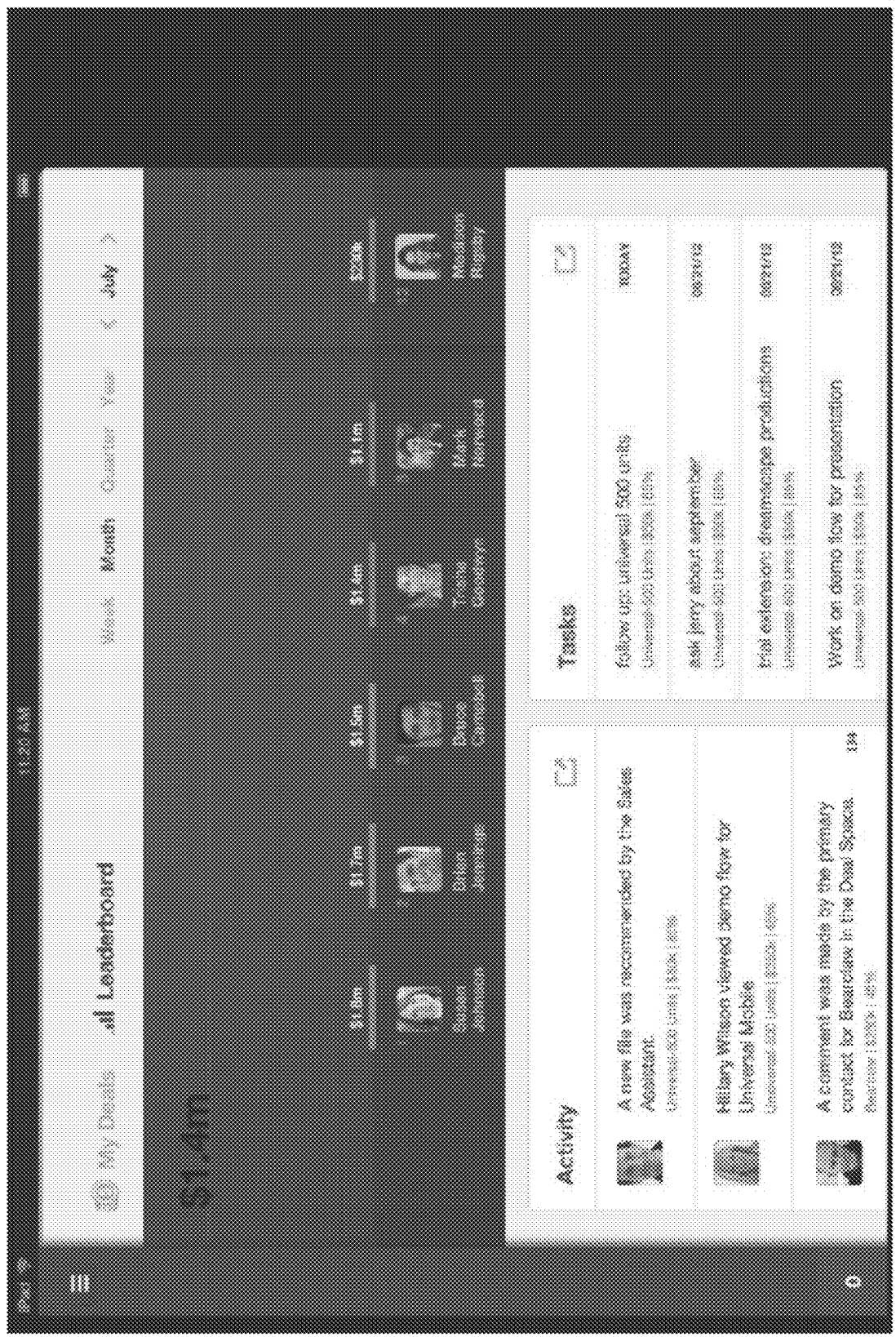
Figure 80:
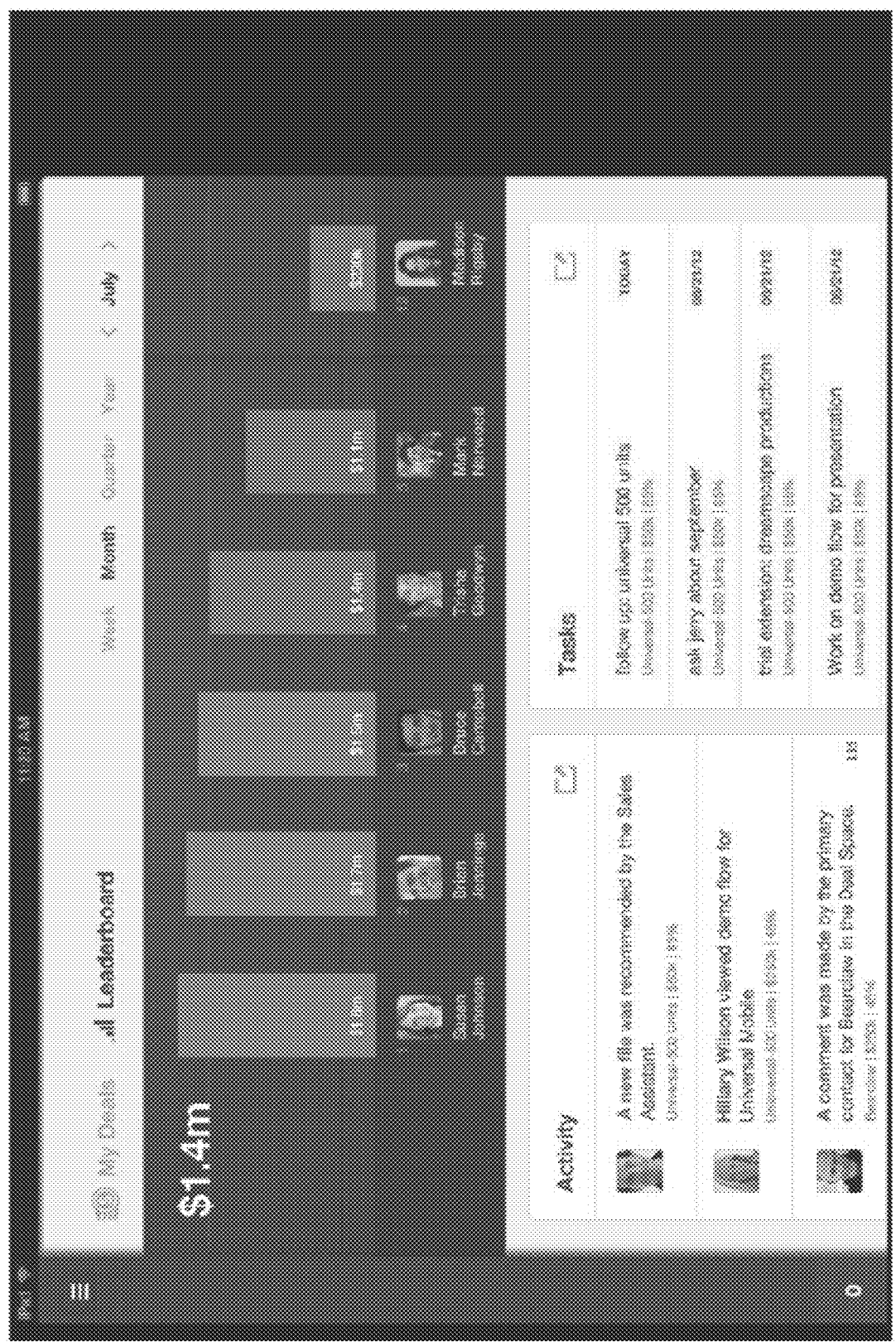
Figure 81:
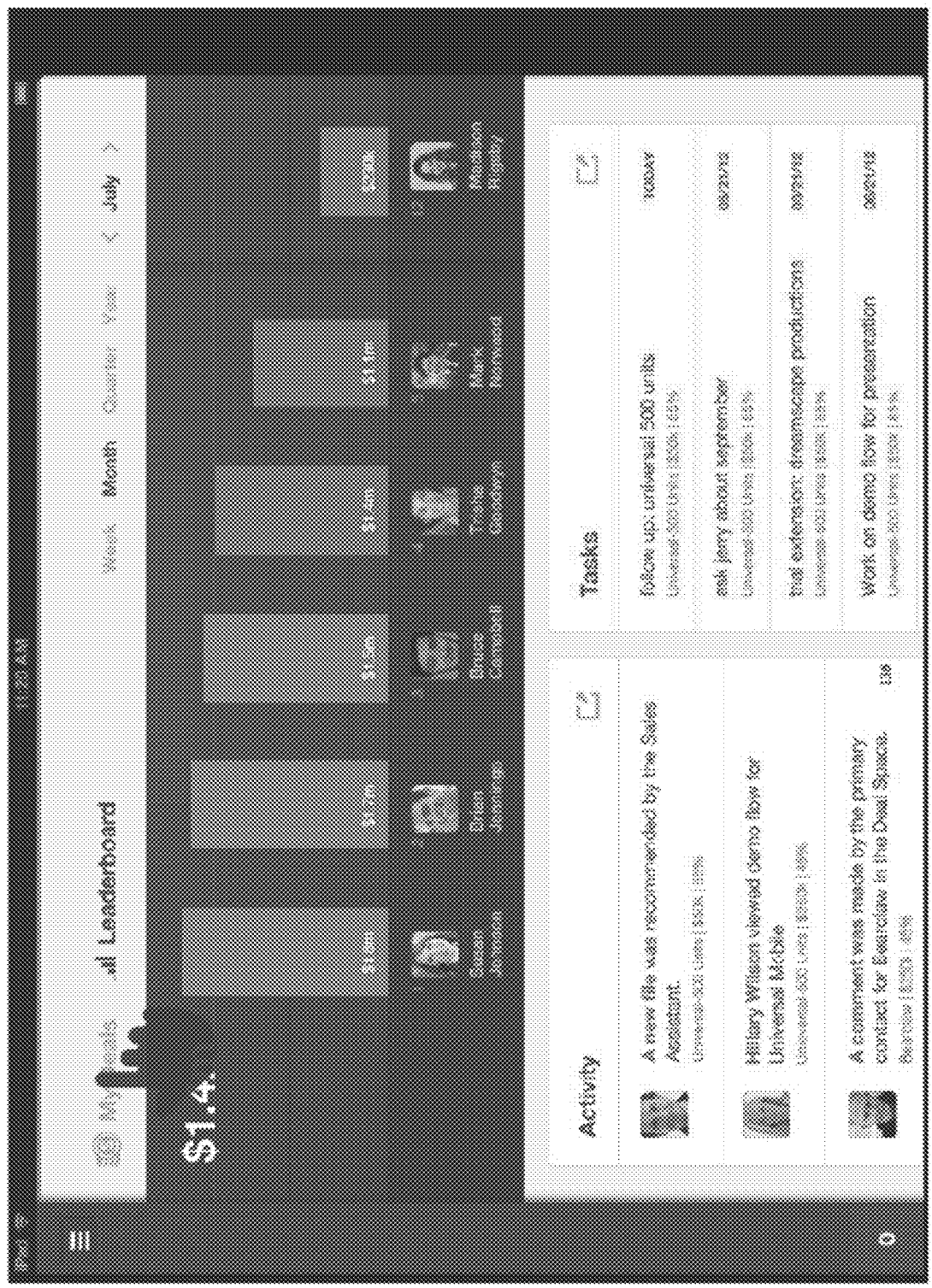
Figure 82:
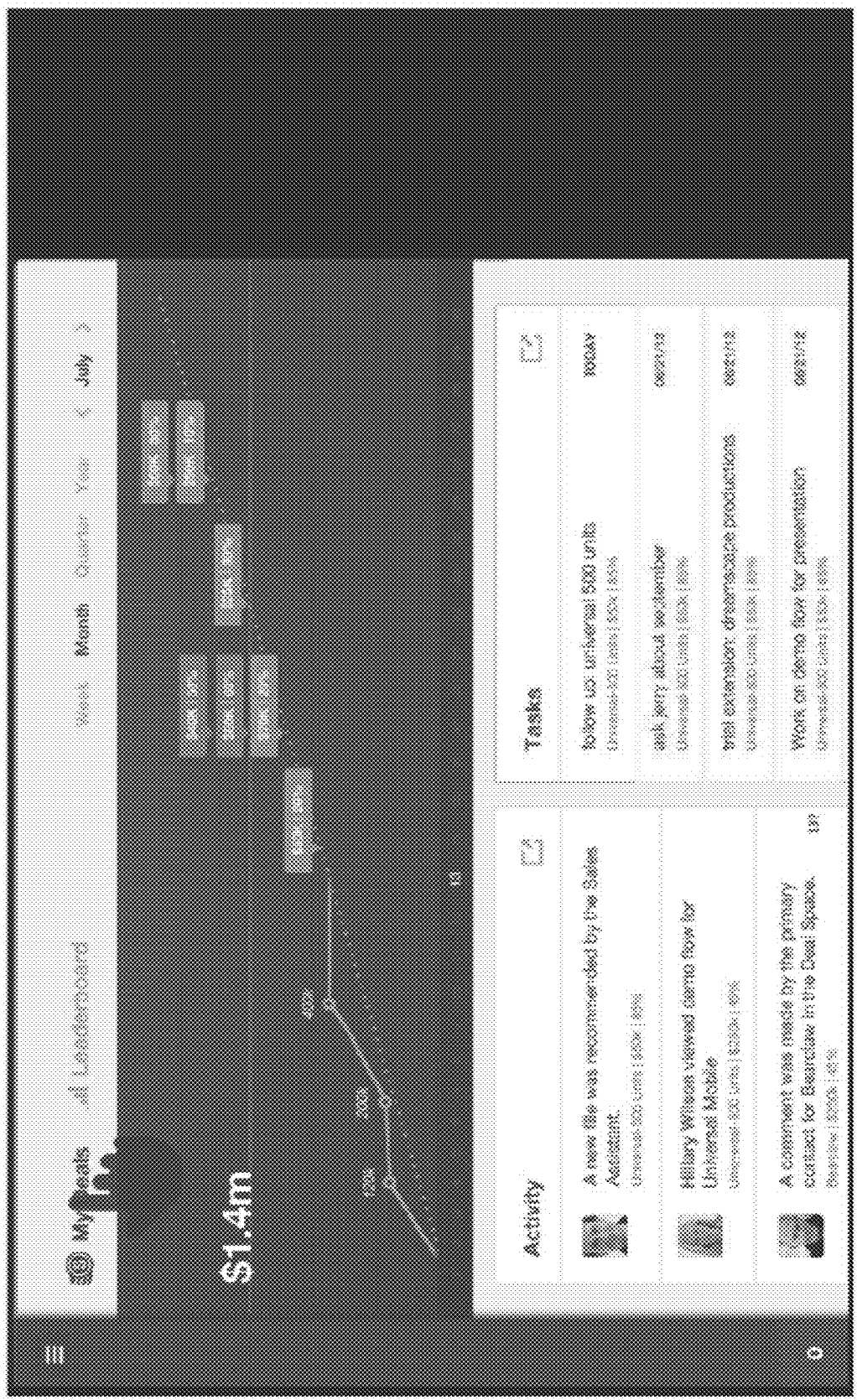
Figure 83:
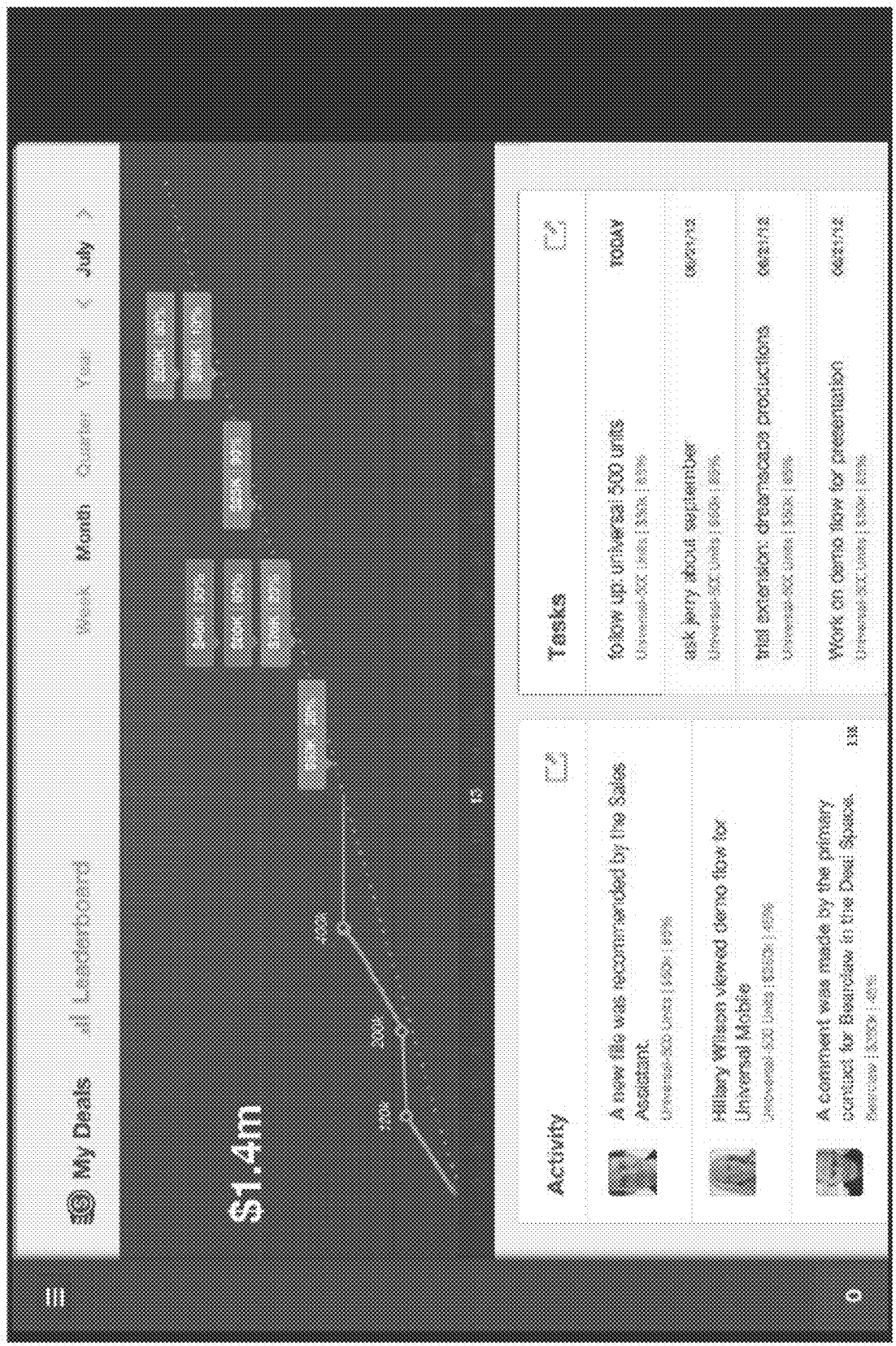

In FIG. 78, the user has chosen to find out the amount of revenue each team member contributed by selecting the leaderboard link at the top of the page. In FIG. 79, a graphical representation of the amount of revenue for week X is shown for each teach member with the team member's name and picture underneath as the leaderboard. Madison Rigsby is shown separately, because she is the team captain. In FIG. 80, the graphical representation shows the amount for each team member as a bar graph and compares the amount of revenue each team member brought in, in comparison to the projected and/or desired amount of the deal (see the horizontal orange line for $1.4m. In FIG. 81, the user may select the My Deals heading to activate the link. In FIG. 82, the my deals link has been activated and the user may select the my deals link to send the user to back to the my deals page in FIG. 83.

Figure 84:
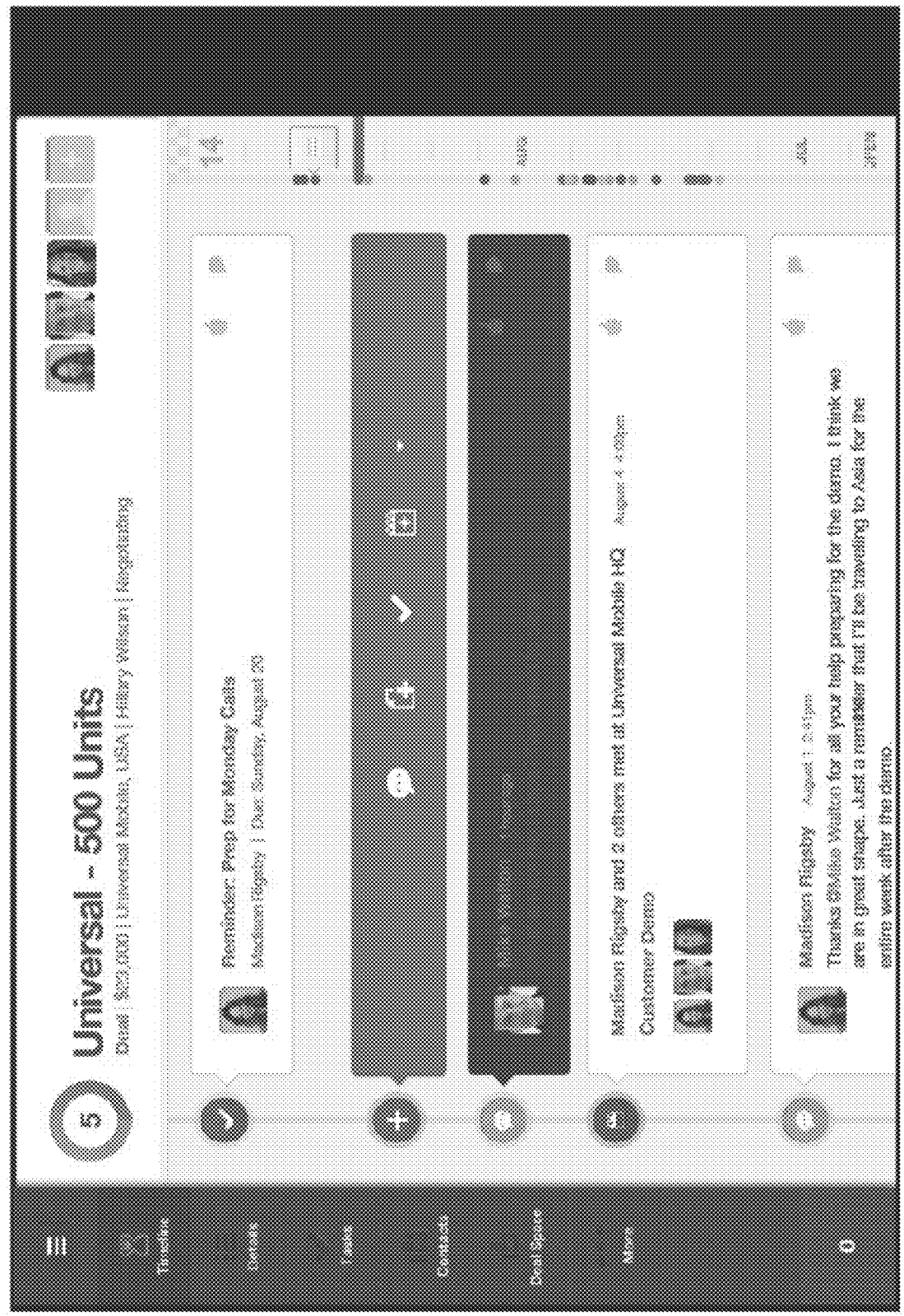

FIG. 84 shows an example of a screenshot of an embodiment of the deal homepage (see also FIG. 34) that the user gets to by swiping to the right. In the deal homepage (also called the timeline page), the user may see information associated with the deal's past and future. For example, the user may be able to see that the deal has almost closed as shown by the almost completely orange stage icon (see also FIGS. 34 and 50 for explanation of the stage icon). The vertical timeline on the right contains dots of different colors showing different aspects of the deal that may be reviewed by selecting the dots: dark purple dots may represent events, light purple dots may represent tasks, yellow dots may represent, orange dots may represent the stage, blue dots may represent files, etc. Selecting the dot pulls up the posts associated with each aspect of the deal for that time period and/or for that aspect of the deal (e.g., a task, an event, etc.).

Figure 85:
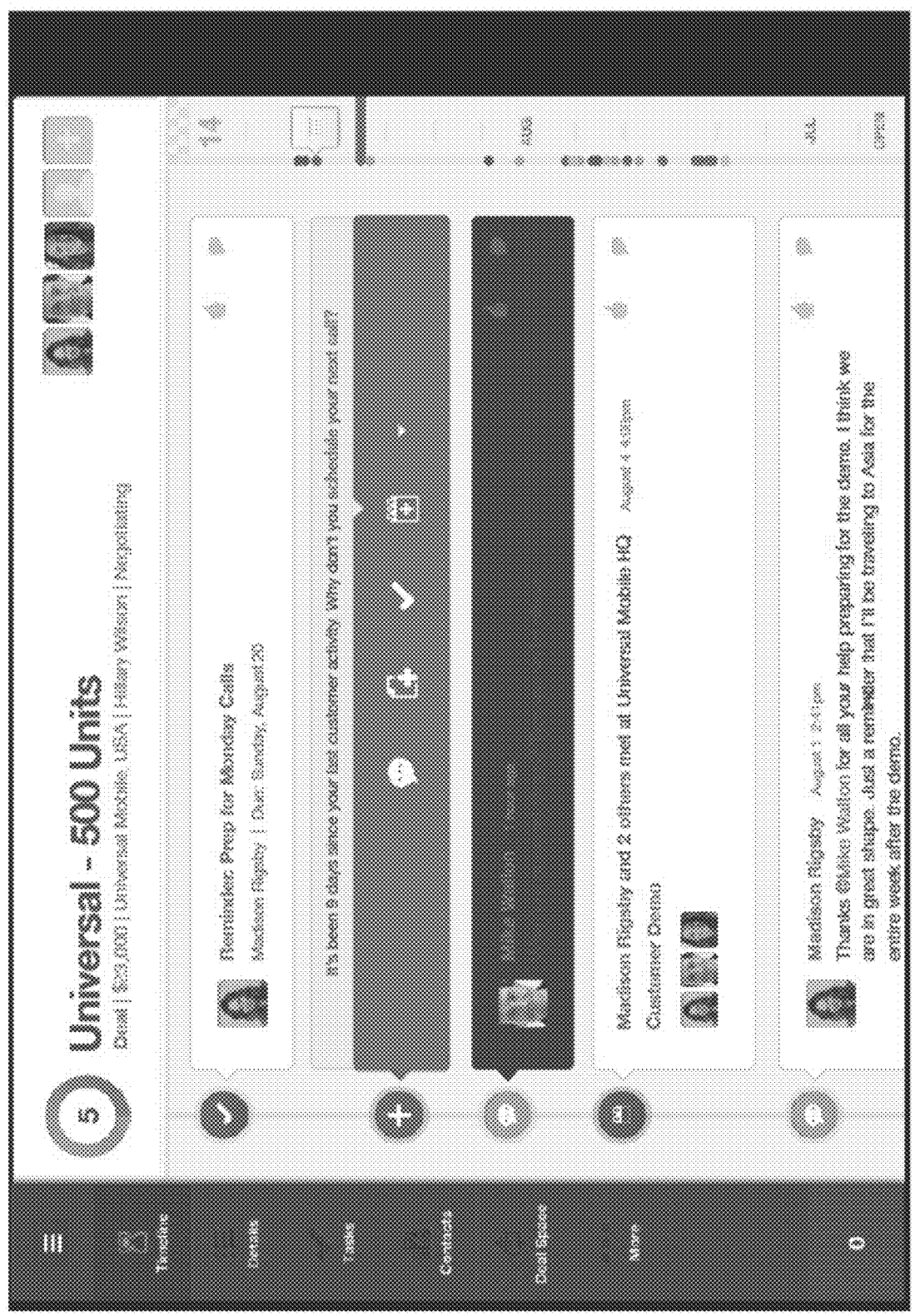
Figure 86:
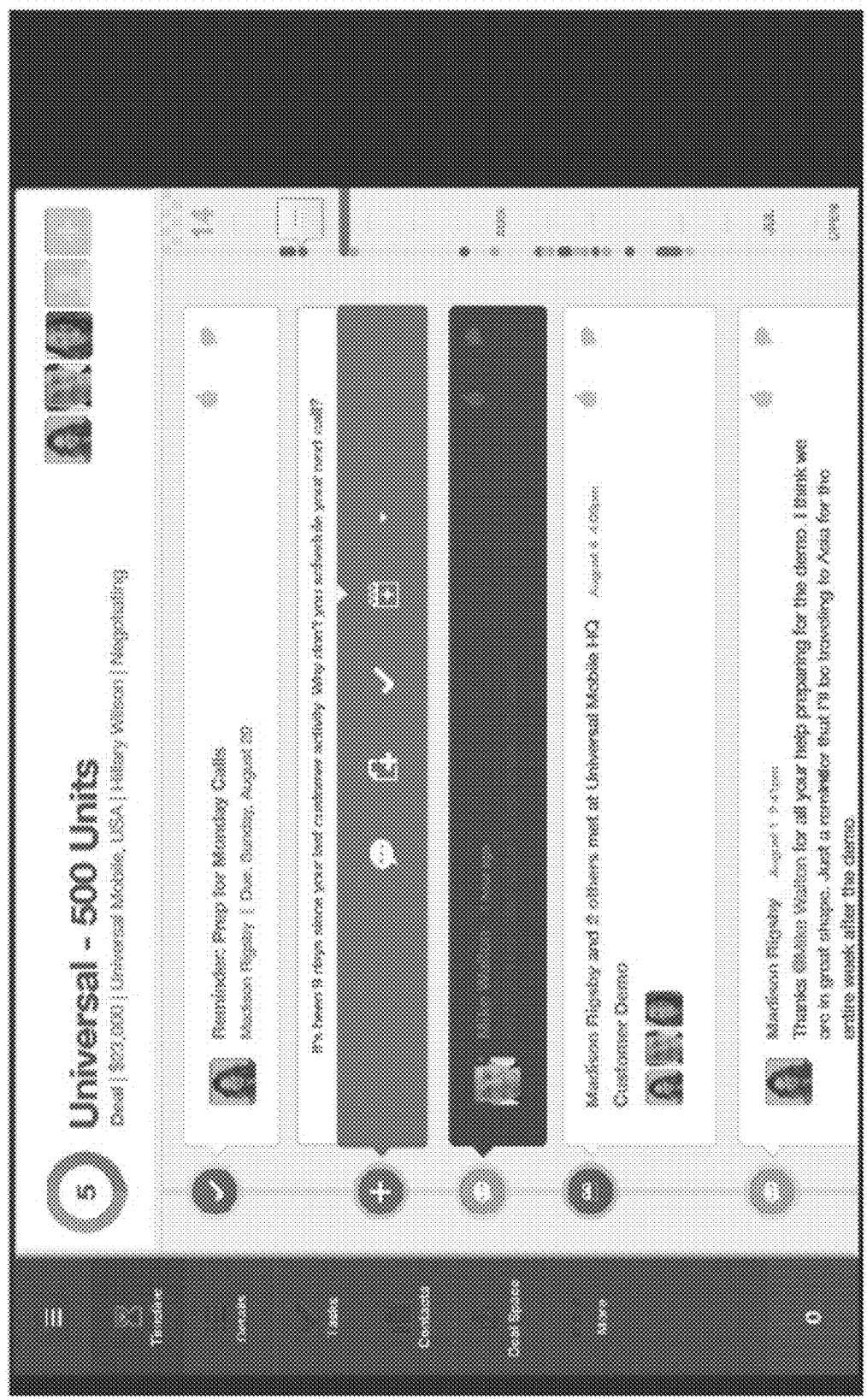

FIG. 85 shows an example of a screenshot of an embodiment of a webpage 8500 that is shown to the user to remind the user to schedule an event. In at least one embodiment, the app provides reminders of various aspects of dealmaking. For example, in FIG. 85 the app may be programmed to send a reminder to the user to "schedule your next sales call" if nothing has occurred for a set period of time (e.g., 9 days). In the example of FIG. 85, the reminder shows up as a yellow box associated with the event link. The reminder states, "It's been 9 days since your last customer activity. Why don't you schedule your next call?" The part of the sentence that reads, "schedule your next call" is a link that may send the user to a call page to schedule one or more calls. Reminders may be set up for any aspect of the deal. For example, a task reminder may also be set up. In at least one embodiment, the set period of time may be any set period less than the deadline of the deal and may be measured in minutes, hours, days, weeks, or months. After a period of time, or if the link is clicked on, the yellow background disappears (see FIG. 86).

Figure 87:
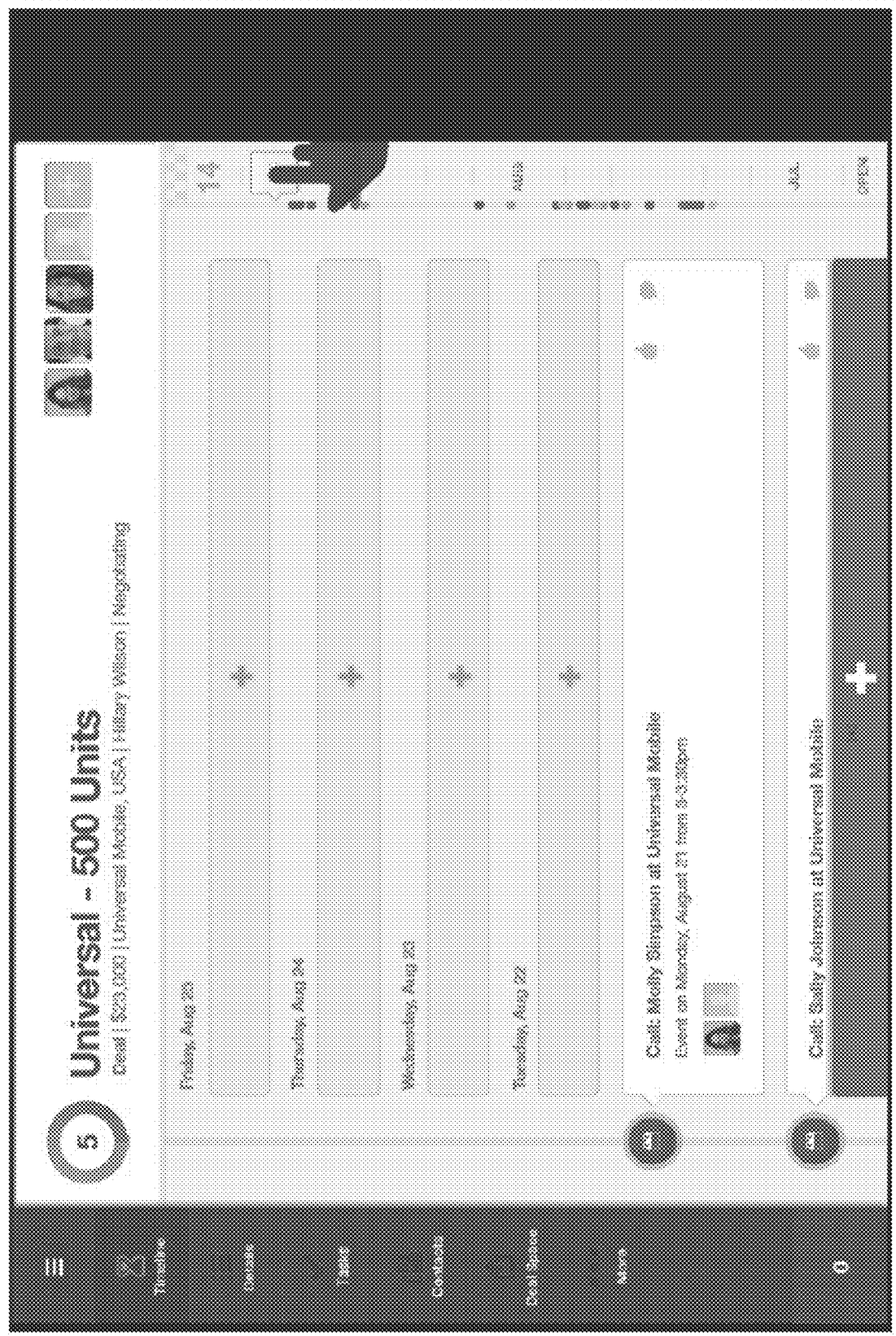

In FIG. 87 the user has selected and dragged the timeline into the future to schedule activity for the future. Dragging the timeline into the future is one way to quickly schedule events, tasks, etc. For example, in FIG. 87 a user may quickly and efficiently set up one or more calls. The page may be provided in response to selecting the "schedule your next call" link in FIG. 85. The page allows the user to set up a call for a series of days around the day in the future that the user dragged the timeline to. The calls may show up as events on the timeline. The calls may show up as purple dots on the vertical timeline on the right side of the page.

Figure 88:
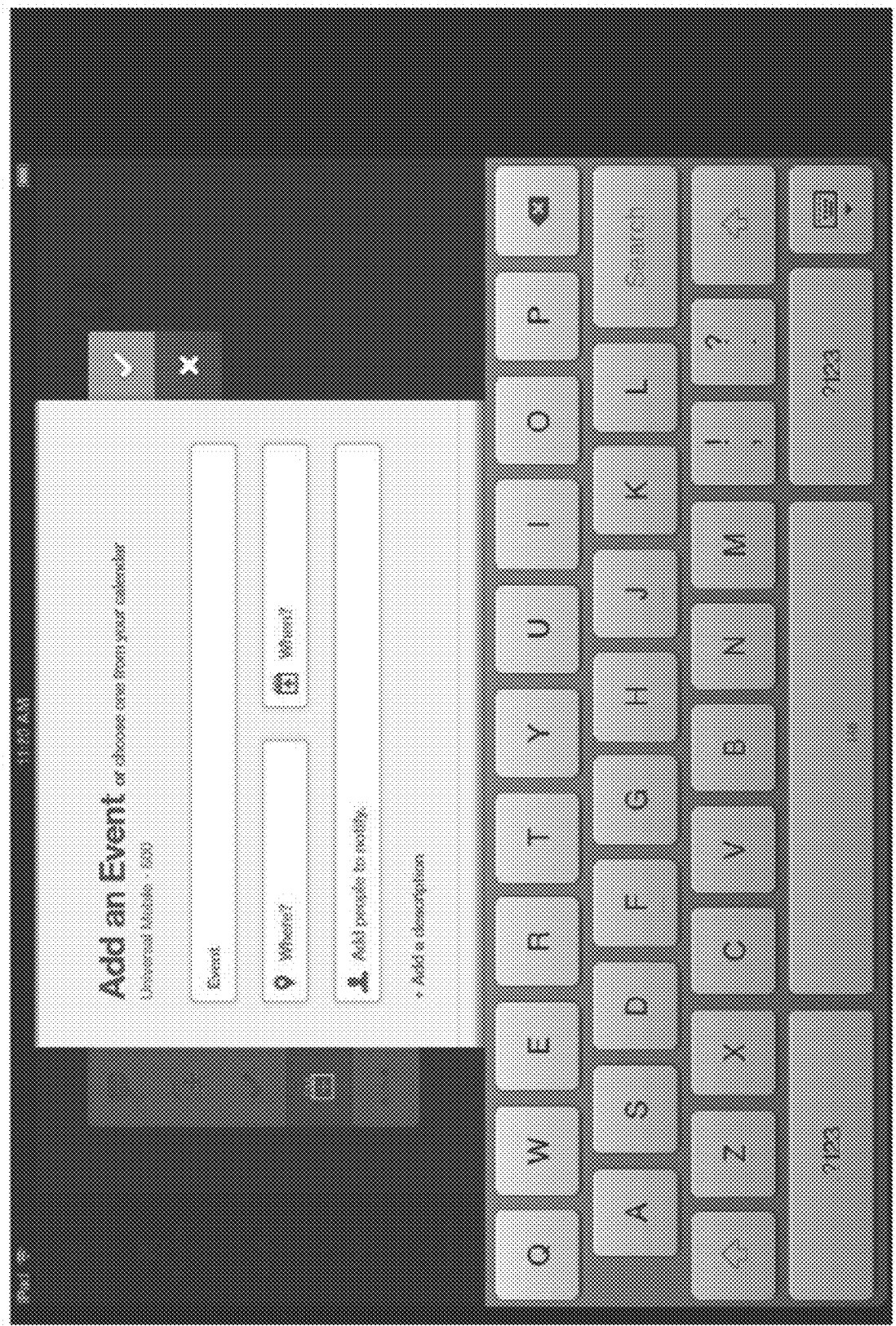
Figure 89:
Figure 90:
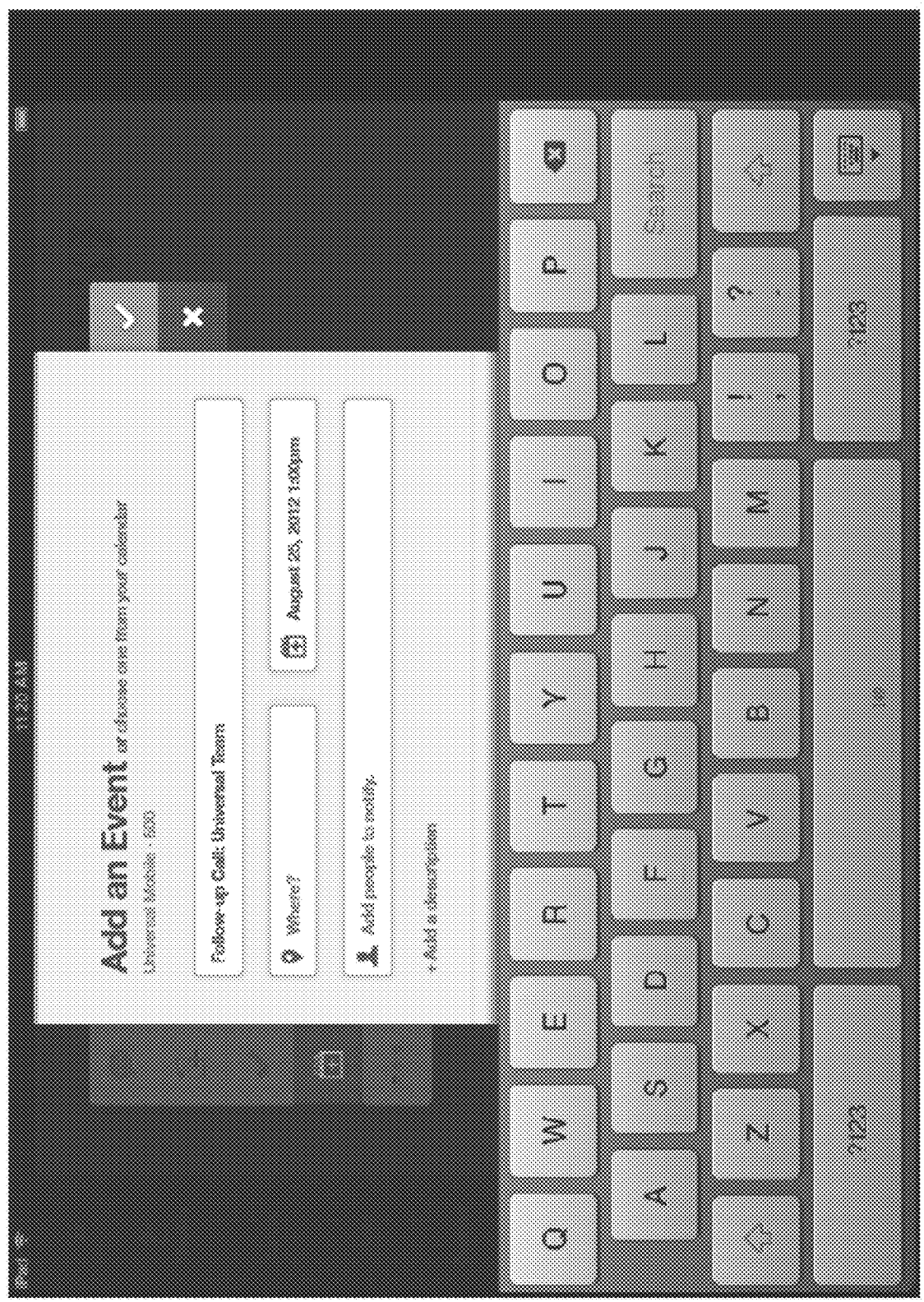

FIGS. 88-90 shows an example of a screenshot of an embodiment of webpages for implementing the process of setting up a call as an event. The user is provided with an event page in FIG. 88 (see also FIG. 37 for more details about the add an event page). The user populates the fields as desired with information about the event (see FIGS. 89 and 90). The event is a "Follow-Up Call: Universal Team," the date is "Aug. 24, 2012 1:00 pm," etc. The user clicks on the green checkmark button to set up the event and the event icon appears on the vertical timeline on the date on which the event was scheduled.

Figure 91:
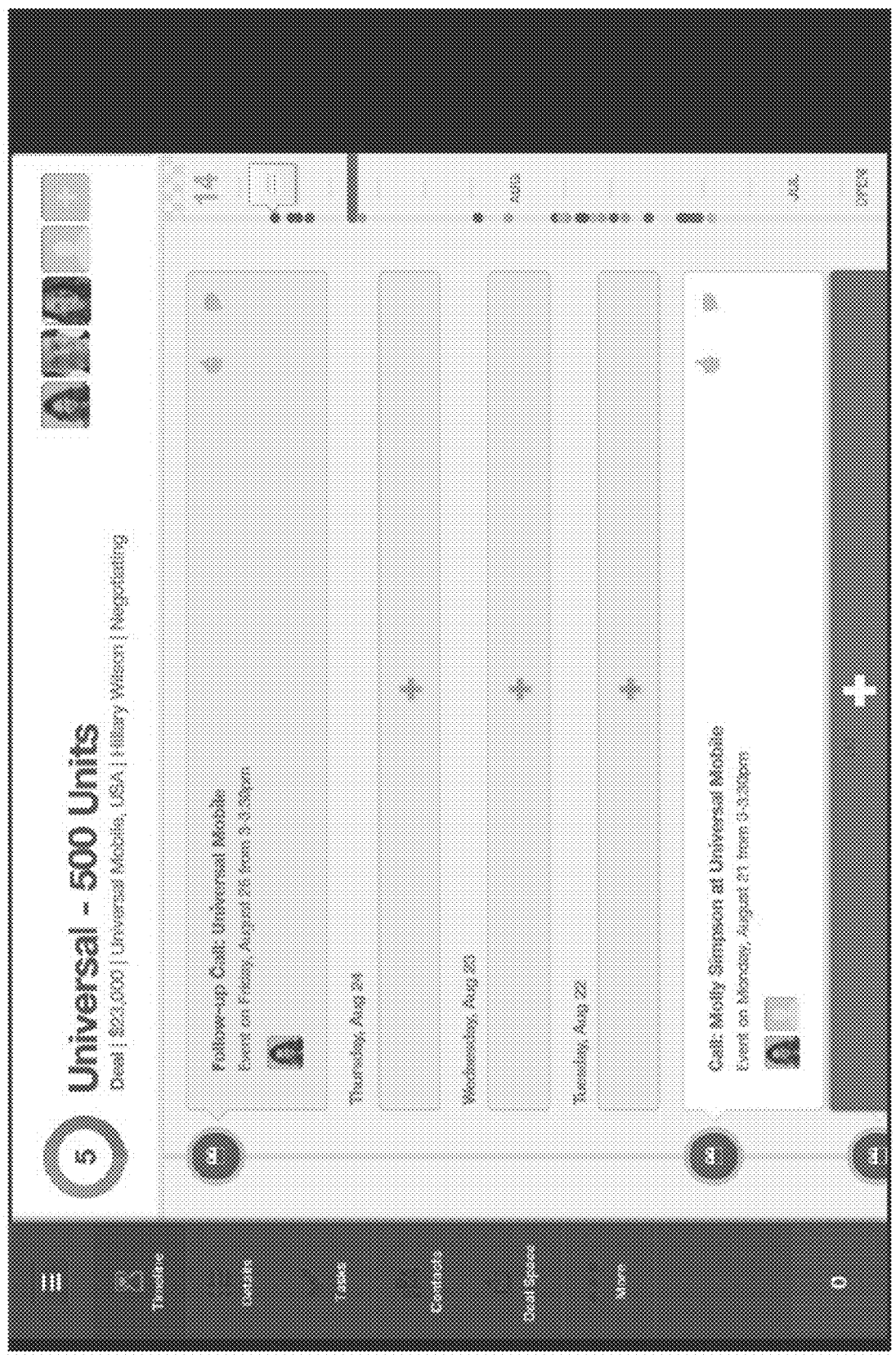
Figure 92:
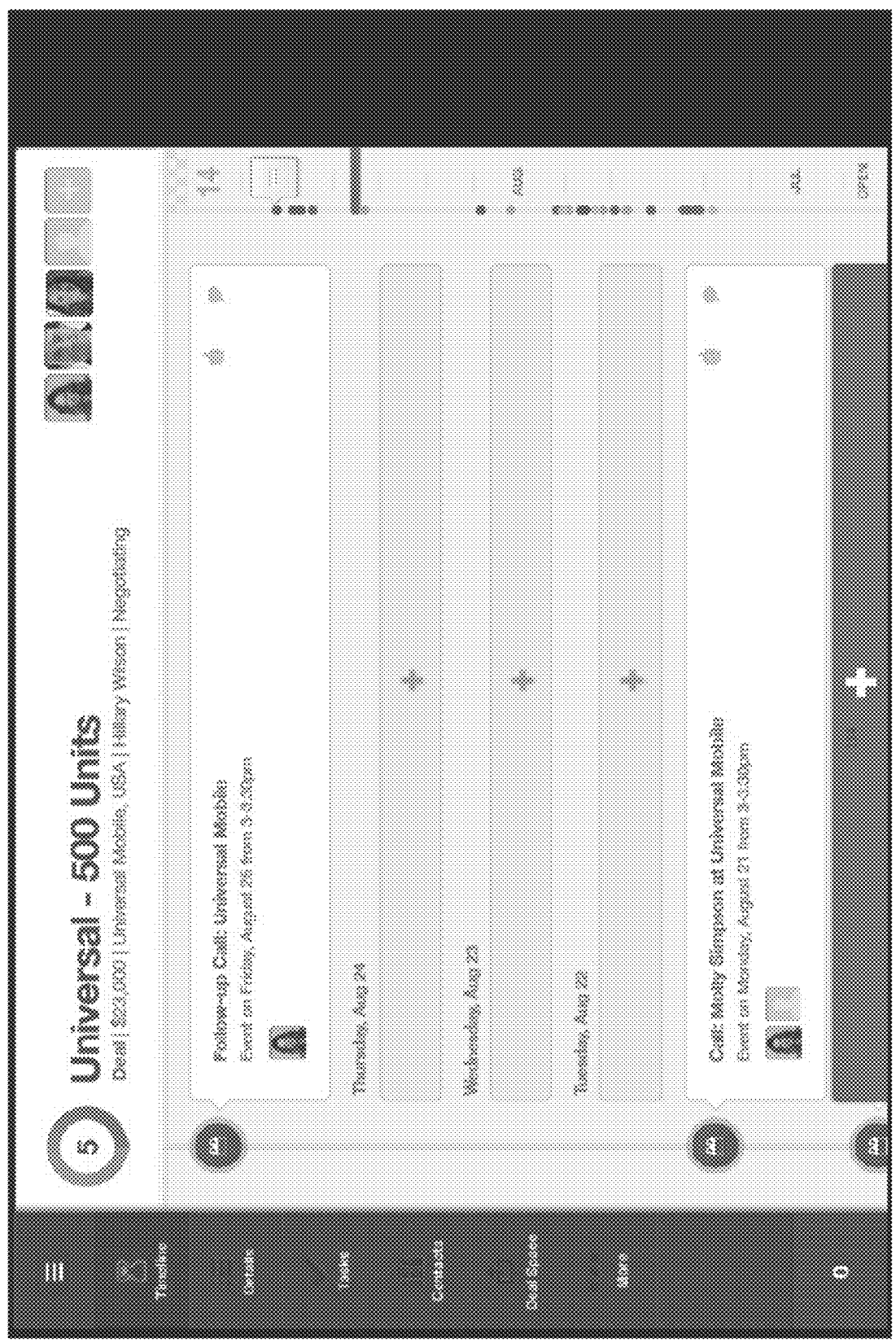

In FIG. 91, the event (follow-up call: Universal Team) posts on the timeline highlighted (see yellow rectangle). In FIG. 92, the yellow background disappears.

FIGS. 93-96 shows examples of screenshots of embodiments of a webpage showing different aspects of the side navigation bar (see FIG. 34 for example). Webpage 9300 may include embodiments of my deals link 9301, stage icon 9302, deal name 9303, deal information 9304, timeline link 9305, details link 9307, tasks link 9309, contacts link 9311, deal space link 9313, more links 9321, deal details information 9330, and team photographs 9390. In other embodiments, webpage 9300 may not have all of the elements or components listed above and/or may have other elements or components instead of or in addition to those listed.

My deals link 9301 is part of the side navigation bar (see FIG. 34 for example) and, when activated, sends the user to a page that provides the user with functions and tools to track deals. My deals link is discussed in more detail in FIGS. 76-83.

Stage icon 9302 shows that the deal is finished or close to finished (see that the orange has completed the circle compared to the stage icon in FIG. 44).

Deal name 9303 confirms to the user that the user is on the correct page for the deal the user is interested in (see Universal-500 Units).

The deal information 9304 provides the user with a summary of some important information with respect to the deal. Deal information may include the revenue, the company, the main contact, and the stage (see "Negotiating").

The timeline link 9305 is part of the side navigation bar (see FIG. 34 for example) and, when activated sends the user to a page that provides the user with functions and tools to view the timeline. Timeline link is discussed in more detail in FIGS. 84-92.

The details link 9307 is part of the side navigation bar (see FIG. 34 for example) and, when activated sends the user to a page that provides the user with functions and tools to view the details of the deal. Details link has been activated in FIG. 93.

The tasks link 9309 is part of the side navigation bar (see FIG. 34 for example) and, when activated, sends the user to a page that provides the user with functions and tools to view the tasks associated with the deal. The tasks link is discussed in more detail in FIG. 94.

The contacts link 9311 is part of the side navigation bar (see FIG. 34 for example) and, when activated sends the user to a page that provides the user with functions and tools to view the contacts associated with a deal. Contacts link is discussed in more detail in FIG. 95.

Deal space link 9313 is part of the side navigation bar (see FIG. 34 for example) and, when activated, sends the user to a page that provides the user with functions and tools to view the customer deal space to track the user's customer interactions.

The timeline link 9305 is discussed in more detail in FIGS. 34, and 84-92, but functions to send the user back to the dealpath homepage (also called the timeline page).

The more links 9321 is part of the side navigation bar (see FIG. 34 for example) and, includes any links that are not specified on the side navigation bar. More links 9321 is discussed in more detail with respect to FIG. 96.

The deal details information 9330 is shown to a user when the user activates the details link 9307. The deal details information is shown under the heading "Deal Details." The deal details information may include the owner, the name of the company, the stage, the website, the previous sales total, the name, the owner phone number, the primary contact, the primary contact email, the primary contact phone number, the last sale, and the primary contact. In at least one embodiment, the deal details do not include all of the elements listed and/or may have other elements or components in addition to those listed.

The team photographs 9390 may be shown in the top right-hand corner of the page and shows the photographs of the three team members that are involved with the deal.

Tasks webpage 9400 may include embodiments of my deals link 9401, stage icon 9402, deal name 9403, deal information 9404, timeline link 9405, details link 9407, tasks link 9409, contacts link 9411, deal space link 9413, more links 9421, all tasks pulldown 9330, add a task field 9435, List of tasks 9438*a-g*, by due date pulldown 9450, in progress pulldown 9440, date field 9445, details field 9448, related to 9460, discussion 9465, update 9468, and team photographs 9490. In other embodiments, webpage 9300 may not have all of the elements or components listed above and/or may have other elements or components instead of or in addition to those listed.

My deals link 9401, stage icon 9402, deal name 9403, deal information 9404, timeline link 9405, details link 9407, tasks link 9409, contacts link 9411, deal space link 9413, more links 9421, and team photographs 9490 are the same as deals link 9301, stage icon 9302, deal name 9303, deal information 9304, timeline link 9305, details link 9307, tasks link 9309, contacts link 9311, deal space link 9313, more links 9321, and team photographs 9390, respectively, which were discussed in conjunction with FIG. 93 above.

The all tasks pulldown 9330 functions to find a specific task the user is looking for. The tasks are arranged by due date. Therefore, if the task the user is searching for is a great distance from the present date, the user may want to use the by due date pull down to find the task.

The add a task field 9435 functions to send the user to a page that provides the user with functions and tools to the add a task page. The add a task page then provides fields to fill out to add a task.

The list of tasks 9438*a-g* provides a list of all of the tasks that have been scheduled ordered based on due date.

The by due date pulldown 9450 functions to provides the user with functions and tools to find a task related to the deal by its due date. Finding a task by the task's due date is particularly useful if the user does not remember the title of the task, but does remember the date or range of dates around which the task fell.

The in progress pulldown 9440 provides a list of all of the tasks related to the deal that are still in progress—that have not been completed. The tasks are ordered based on due date.

The date field 9445 functions to find tasks related to a specific deal by entering the date the task may have occurred or the date of the deadline for the task. The tasks that are shown to the user may be tasks that occurred (or with a deadline) on or within a few days of the date (before or after the date). On page 94, the date field has the default of "today" or if there are no tasks on the "today" date, the default date may be "tomorrow." The task that is associated with the date is shown selected (grayed in).

The details field 9448 may provide to the user or be used to enter details about the deal that is selected.

The related to field 9460 may contain the photograph and information about the contact or team member that has been assigned the task.

The discussion field 9465 provides the user with functions and tools to enter a comment or other discussion information about the selected task.

The update field 9468 shows the newest contact or team member to add a comment and or provide an update about the selected task.

Tasks webpage 9500 may include embodiments of my deals link 9501, stage icon 9502, deal name 9503, deal information 9504, timeline link 9505, details link 9507, tasks link 9509, contacts link 9511, deal space link 9513, more links 9521, contacts list 9530*a-g*, sort by name pulldown 9550, add contacts bar 9560 and team photographs 9490. In other embodiments, webpage 9500 may not have all of the elements or components listed above and/or may have other elements or components instead of or in addition to those listed.

My deals link 9501, stage icon 9502, deal name 9503, deal information 9504, timeline link 9505, details link 9507, tasks link 9509, contacts link 9511, deal space link 9513, more links 9521, and team photographs 9590 are the same as deals link 9301, stage icon 9302, deal name 9303, deal information 9304, timeline link 9305, details link 9307, tasks link 9309, contacts link 9311, deal space link 9313, more links 9321, and team photographs 9390, respectively, which were discussed in conjunction with FIG. 93 above.

The contacts list 9530*a-g* includes all of the contacts related to the deal with the photograph, the name, the job description or title, whether the user is a member of twitter and facebook, and how many connections the user has, how many interactions the user has had and when the last interaction occurred, the due date for the deal, and the telephone number of the contact. The user may also find out more information about the contacts (email, etc.) by selecting the name or photograph.

The sort by pulldown 9550 functions to sort the contacts based on different aspects (e.g., name, due date, alphabetical, company, twitter follower, facebook follower, etc.). By sorting the contacts, the user may find a contact based on a different characteristic. For example, if the user may not remember the name, the user might use the company to find the contact.

The add contacts bar 9560 functions as a link to send the user to a page where the user may add one or more new contacts based on email, social media, or by manually inputting the contact information.

FIG. 96 shows an example of a screenshot of an embodiment of a webpage that shows what happens when a user activates the more links 9521 on the side navigation bar. A choice of files, quotes, invoices and upgrade is given. If there are no quotes or invoices, the link is shown in the background and unclickable. If the user chooses the files link, the user may be navigated to a page showing the files associated with the deal. If the user chooses the upgrade link, the user may be sent to a upgrade page (see FIG. 111) where the user may review the different packages and/or contact the user's sales rep.

Figure 97:
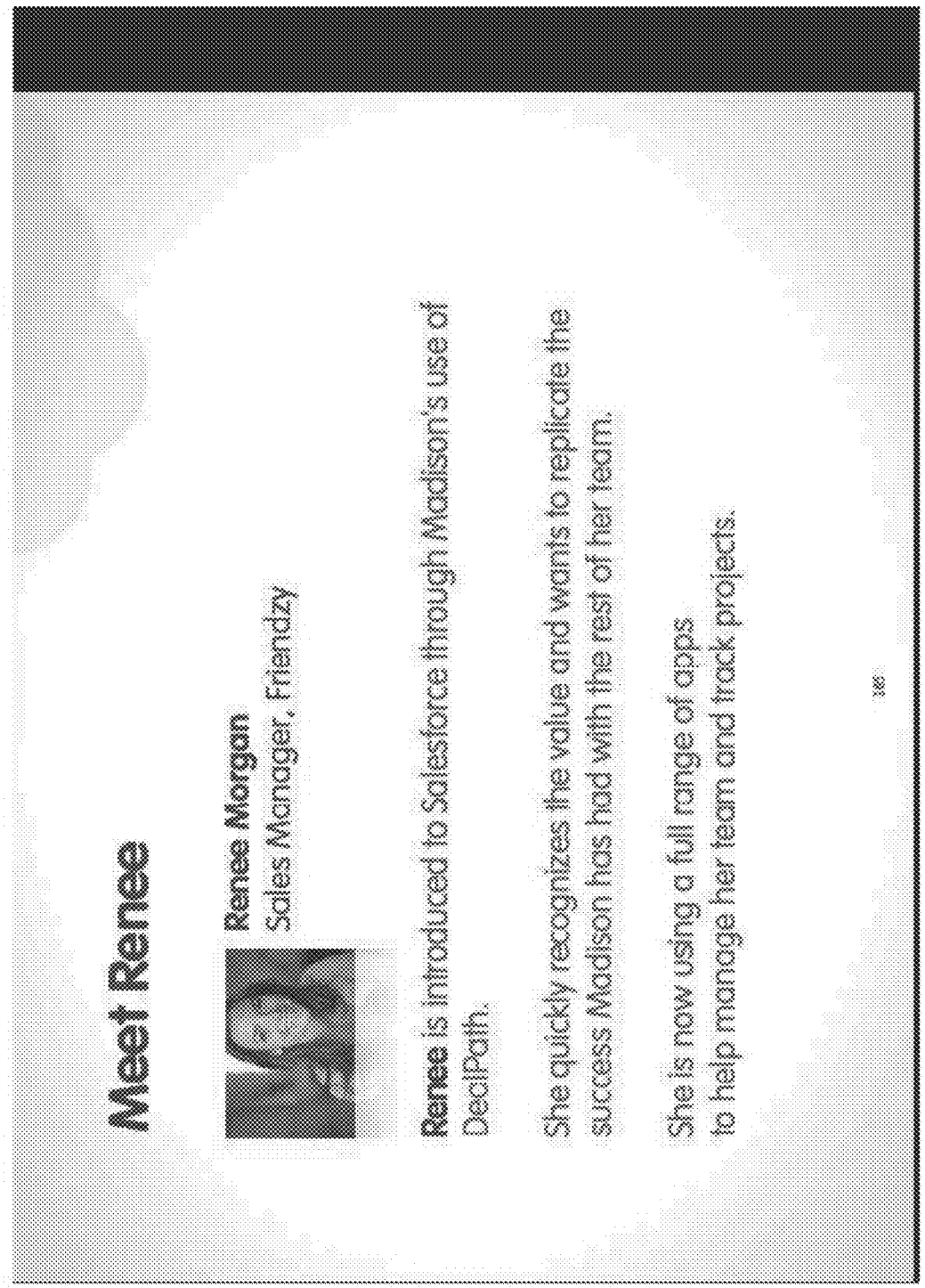
FIGS. 97-111 are screenshots illustrating an example user interface screen for purchasing a method of managing business deals in an embodiment when a customer requests a discount.

FIGS. 97-111 show examples of screenshots of embodiments of webpages for the manager's experience using salesforce and dealpath, as an example, when a customer requests a discount. The manager (Renee Morgan) may navigate to the dealpath app when using Salesforce. In FIG. 97, the manager is introduced to Salesforce through Madison's use of dealpath. The manager quickly realizes the value and wants to replicate the success Madison has had with the rest of her team. In FIGS. 98-111, the manager is now using a full range of apps to help manage her team and track projects.

Figure 98:
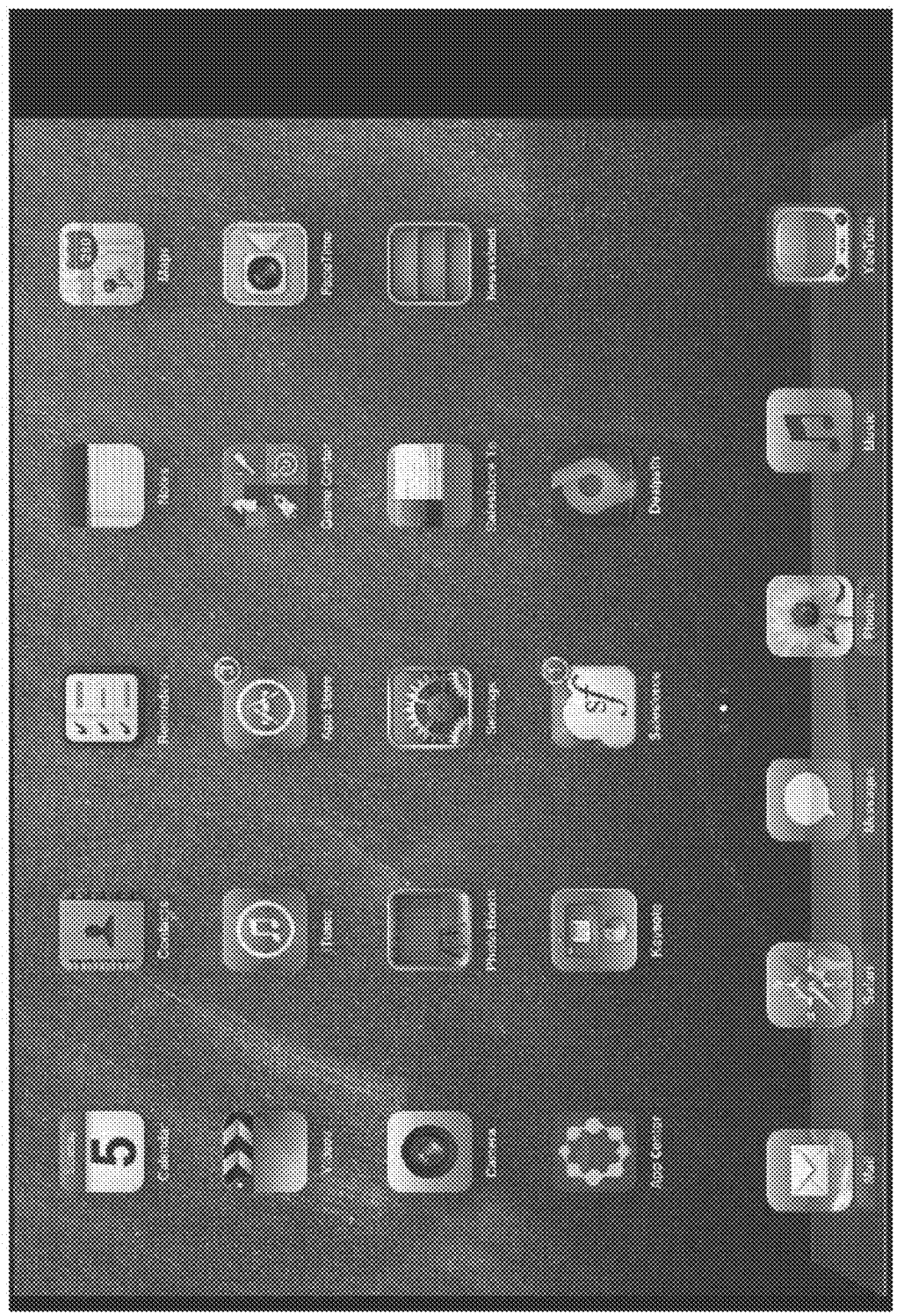

FIGS. 98-99 shows examples of screenshots of embodiments of the user interface on the manager's (Renee's) electronic device. The figures show that Renee has already downloaded Salesforce. In FIG. 98, Renee taps on the Salesforce app hub and aggregates across all applications. The manager also has dealpath, so she gets updates on Madison's deal.

In FIG. 99, Renee gets a message from Madison Rigsby at Salesforce that "Madison Rigsby requested approval for a discount lm ago". The message is shown to Renee as a reminder.

Figure 100:
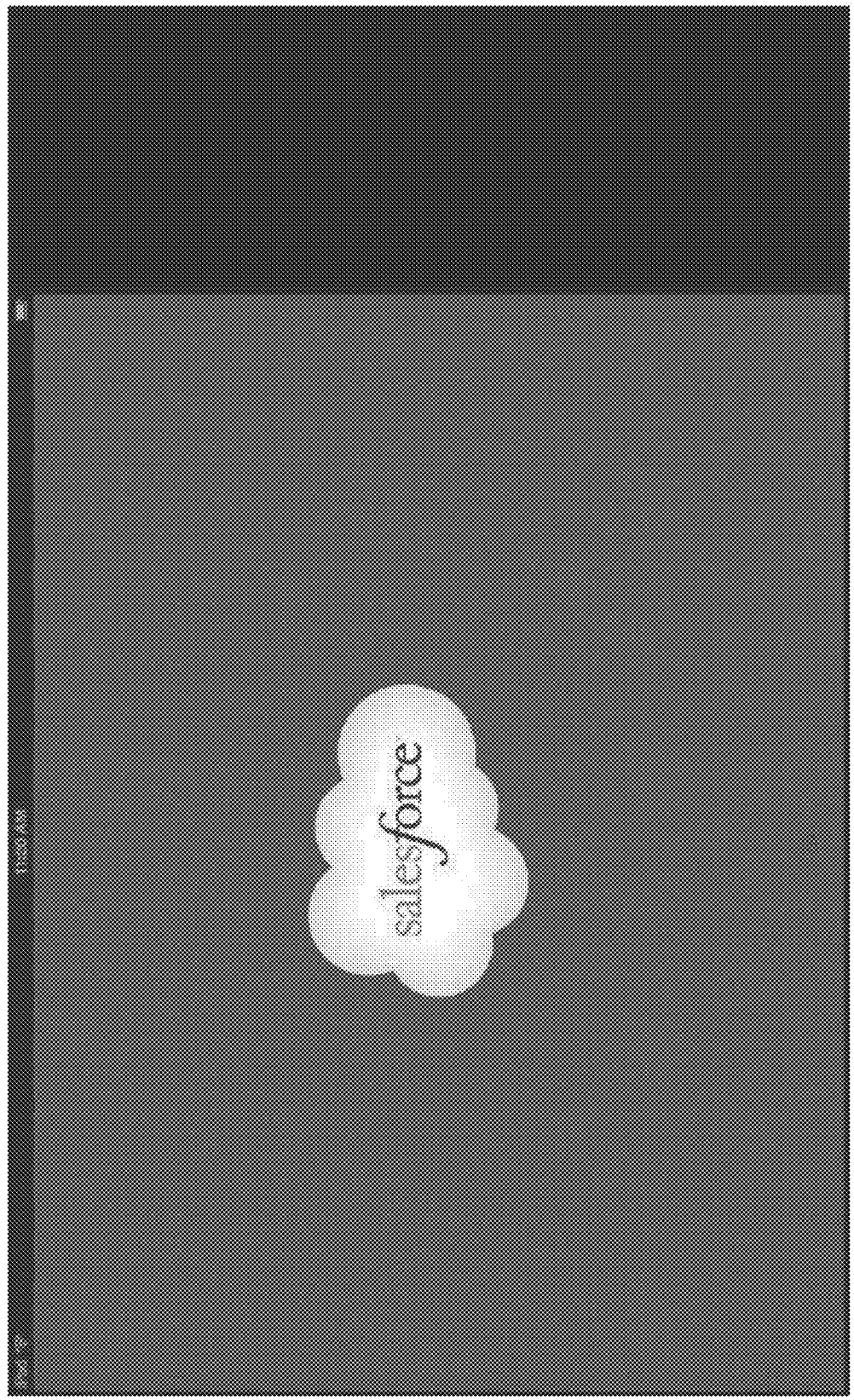
Figure 101:
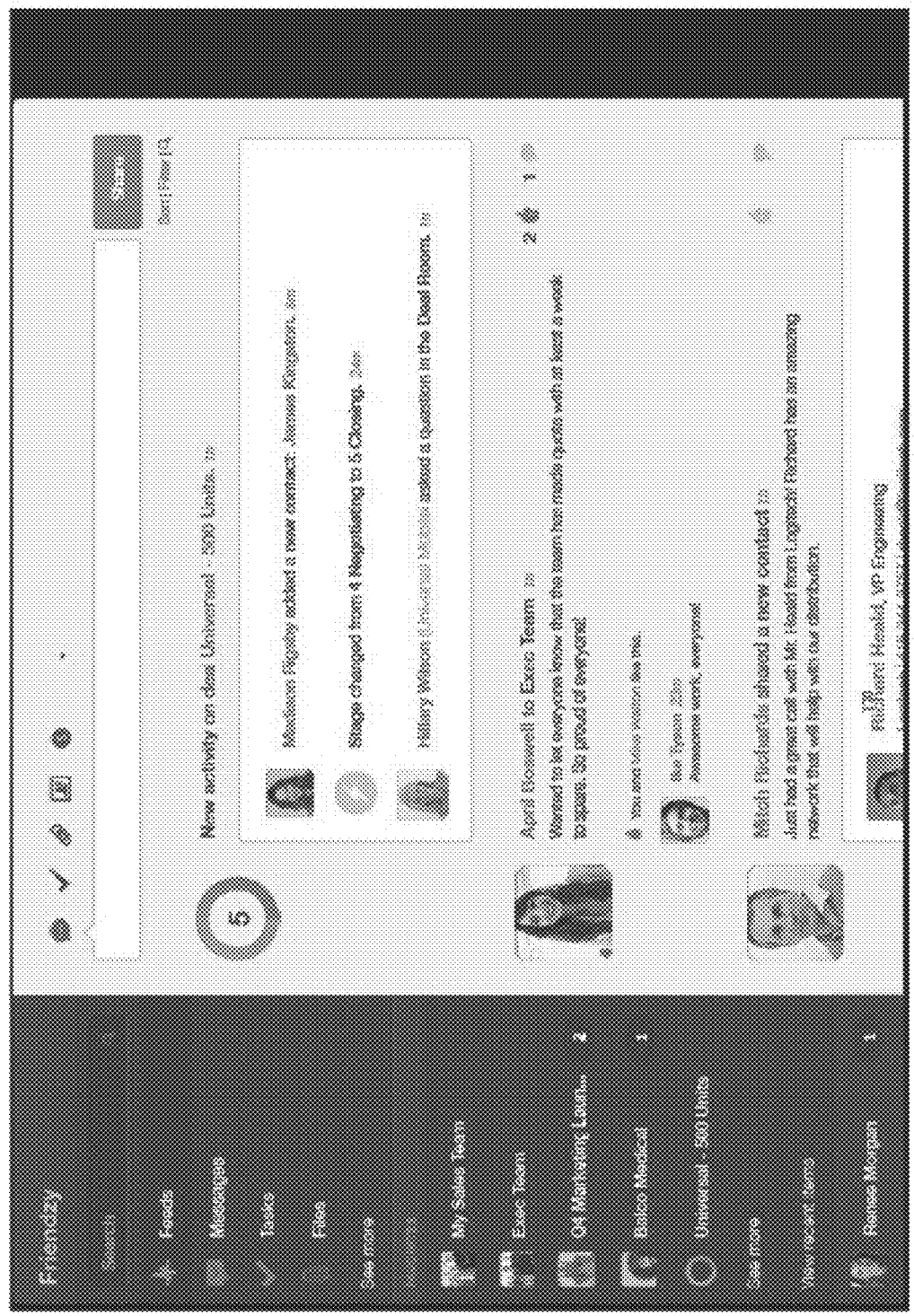

FIG. 100 shows an example of a screenshot of an embodiment of a webpage that is shown to Renee upon selecting the Salesforce icon on the electronic device showing the cloud icon with the Salesforce name inside on a blue background. FIG. 101 shows how the salesforce app aggregates updates and navigation across apps and is centered around the shared "cloud menu" (see the panel on the left side of the page). The cloud menu (see FIG. 101 left panel) gives the user a way to jump between apps without using the device home screen. For example, the user may get to the deal homepage (the timeline page) by selecting the specific deal (see Universal-500 Units).

Figure 102:
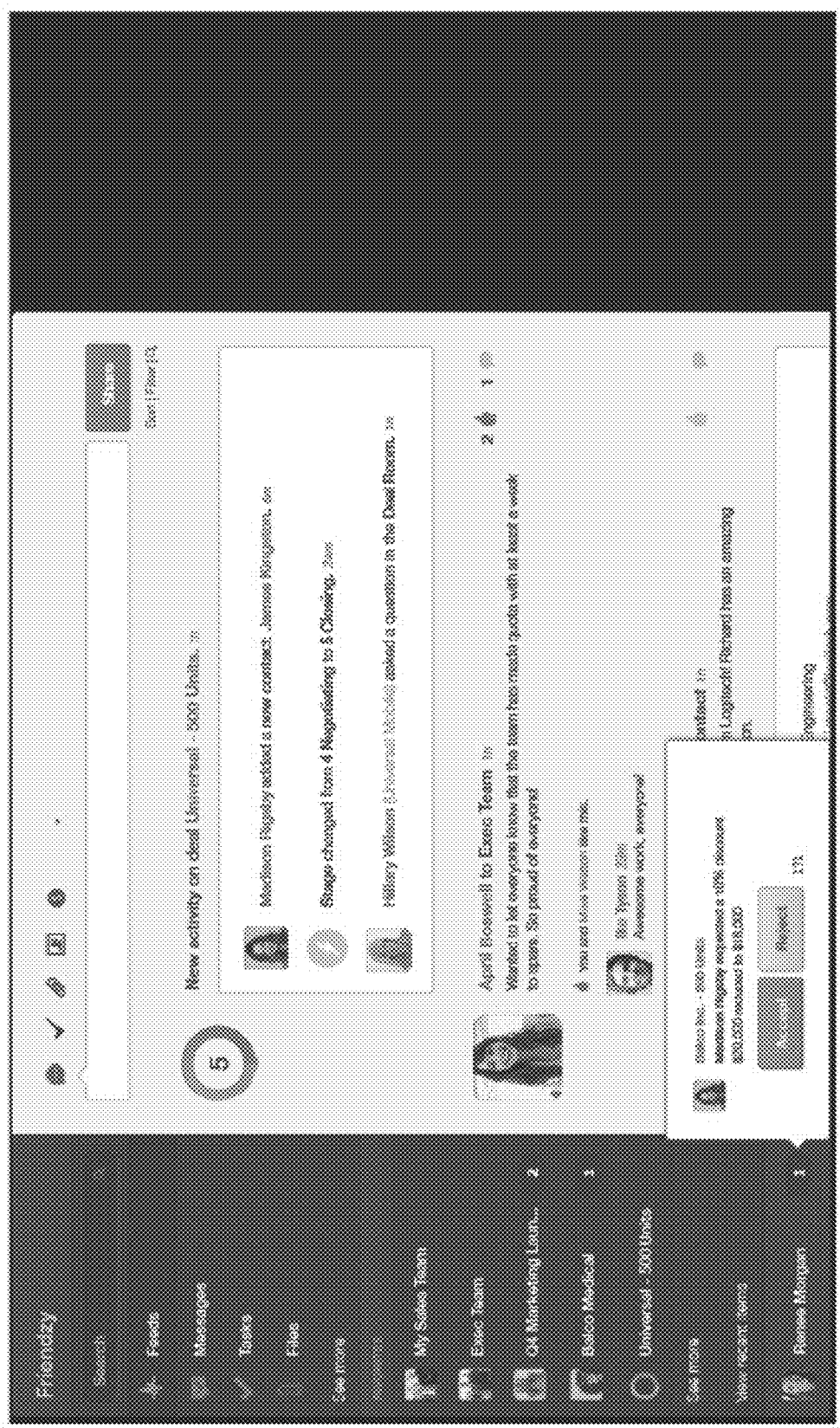

FIG. 102 shows how the message from FIG. 99 shows up in Renee's personal message center showing how the dealpath app interacts with the personal message center. At the bottom of the left panel, next to the photograph of Renee Morgan, a message appears showing Madison Rigsby's photograph, the deal (Balco Inc. —200 units), and a message that "Madison Rigsby requested a 10% discount $20,000 reduced to $18,000" and allows Renee to accept or reject the discount by activating either button.

Figure 103:
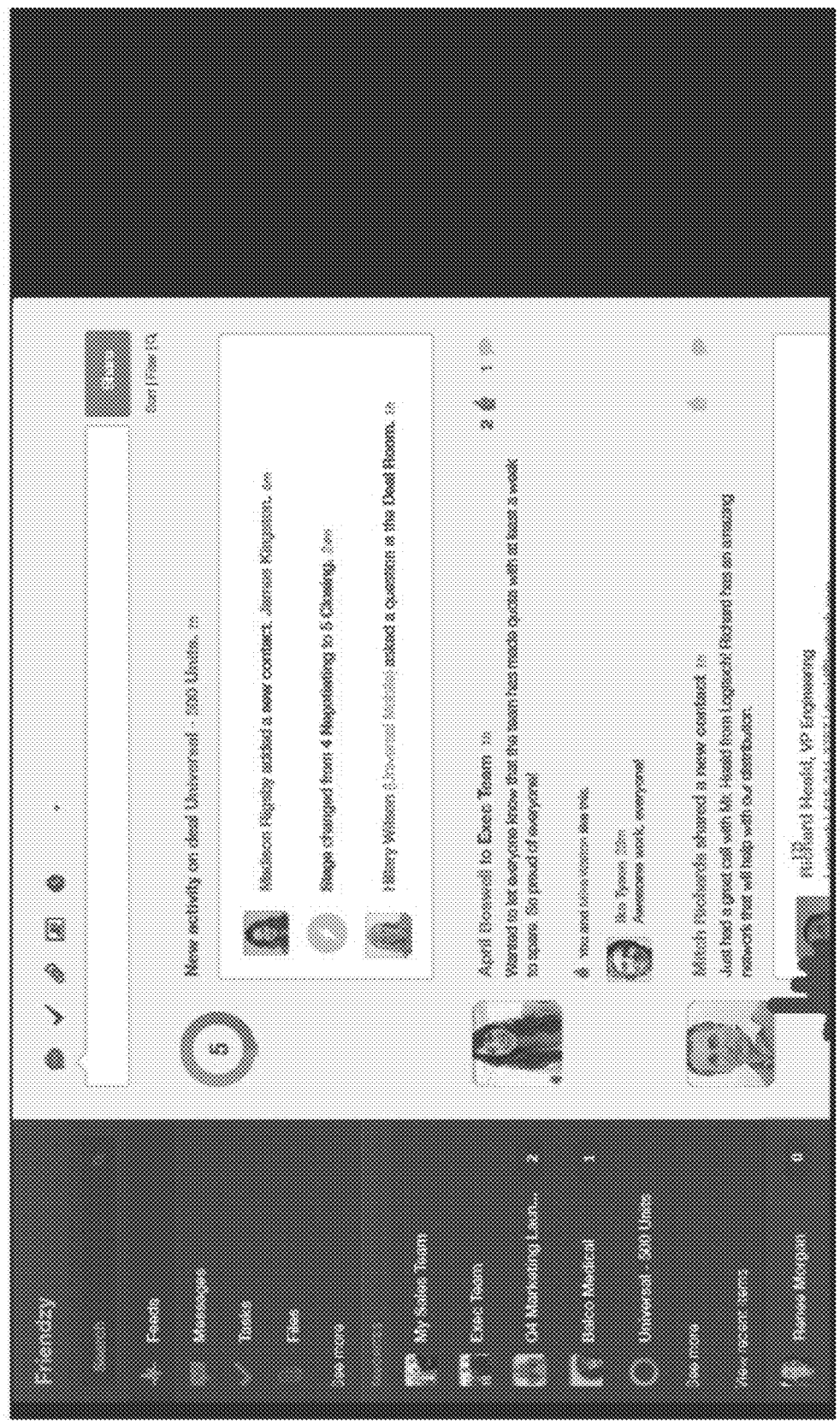
Figure 104:
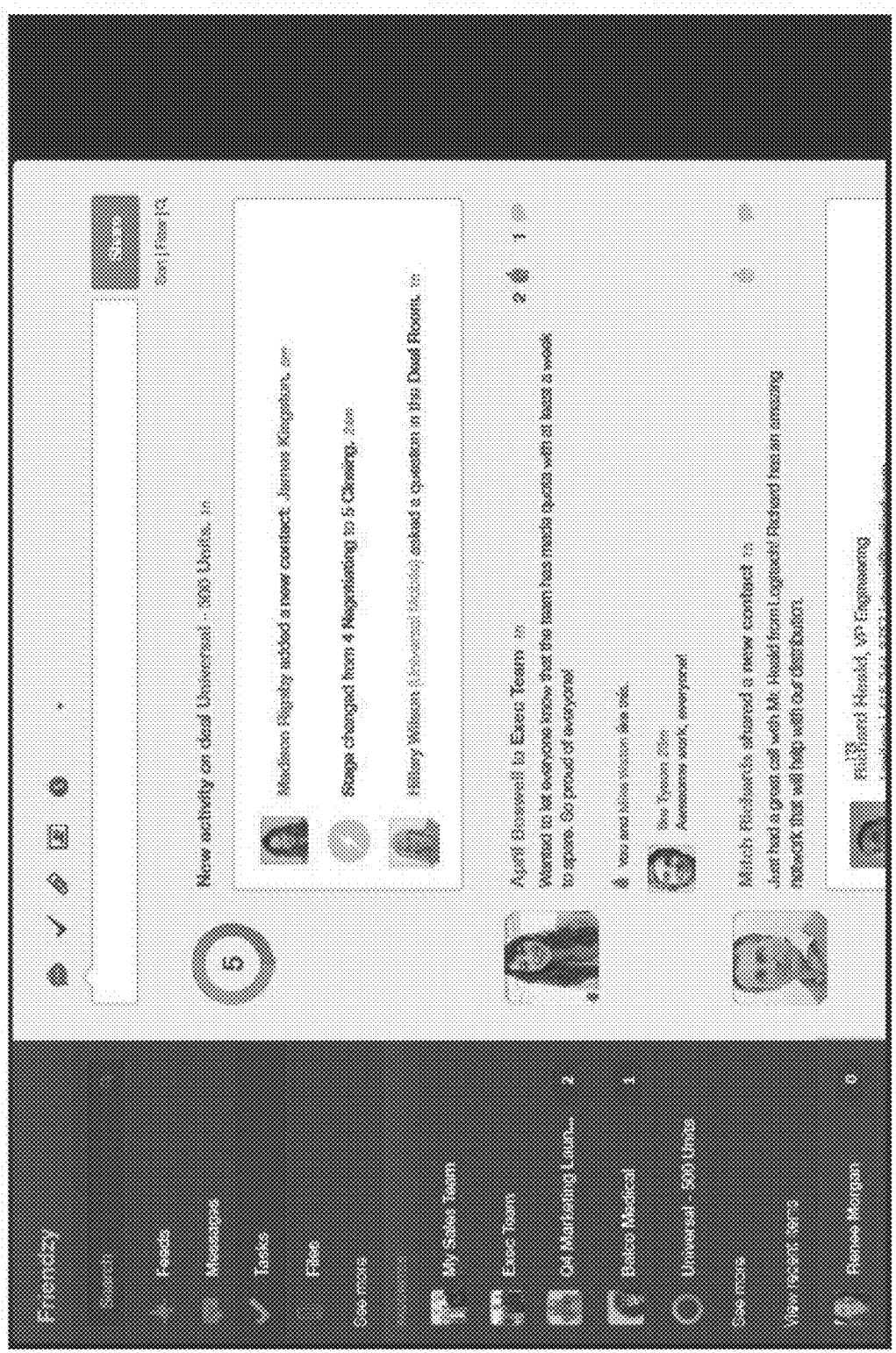

FIGS. 103 and 104 show that the number "1" next to Renee's photograph disappears when Renee select either accept or reject in FIG. 102.

Figure 105:
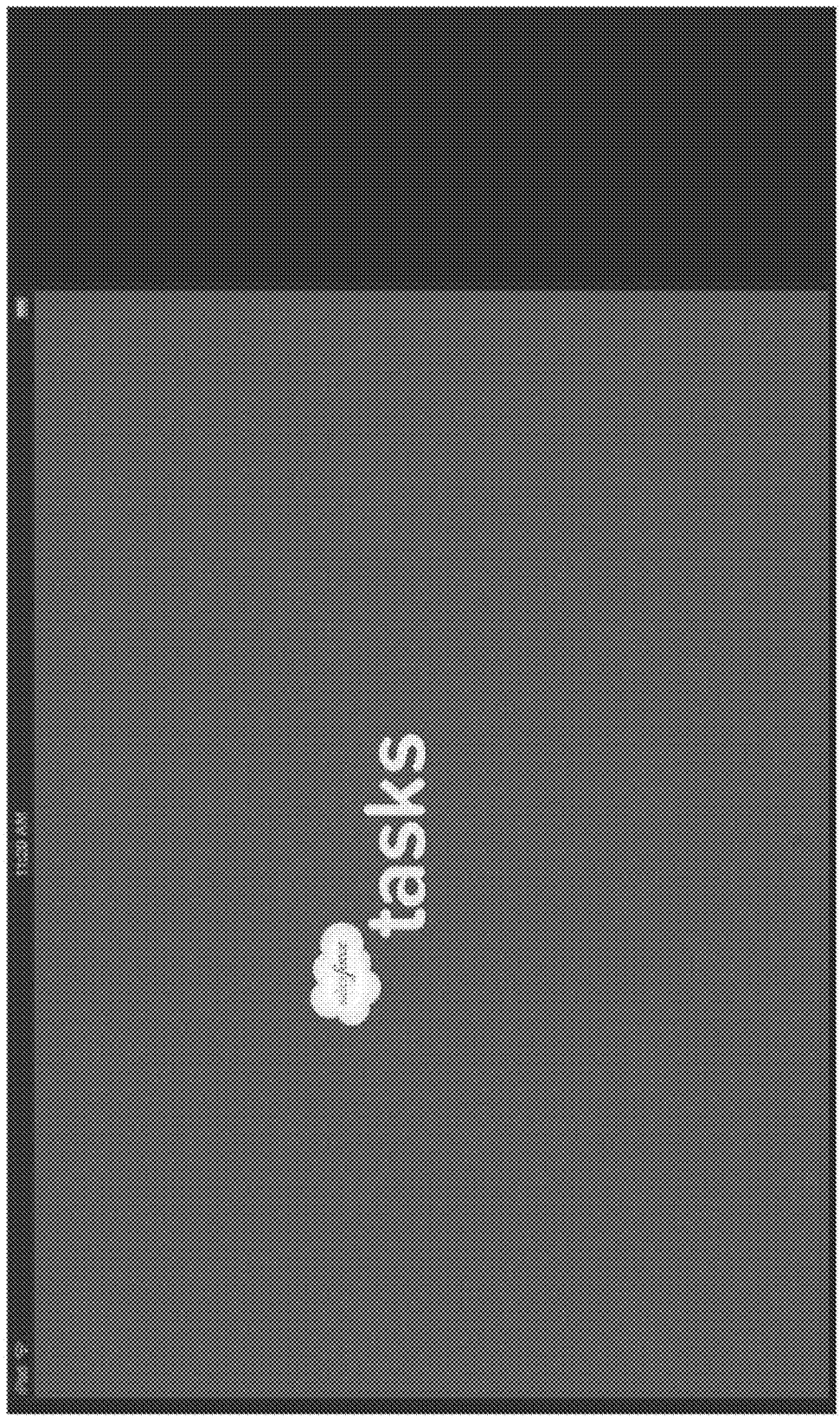

FIGS. 105-110 show examples of embodiments of webpages for how the manager of a deal may work with dealpath in working the deal. FIGS. 105-110 shows examples of what the manager sees when the manager activates the tasks link. The manager sees any tasks that were created in dealpath. In FIG. 105, Renee, the manager, has selected the tasks link in the dealpath app and is shown the tasks opening page.

Figure 106:
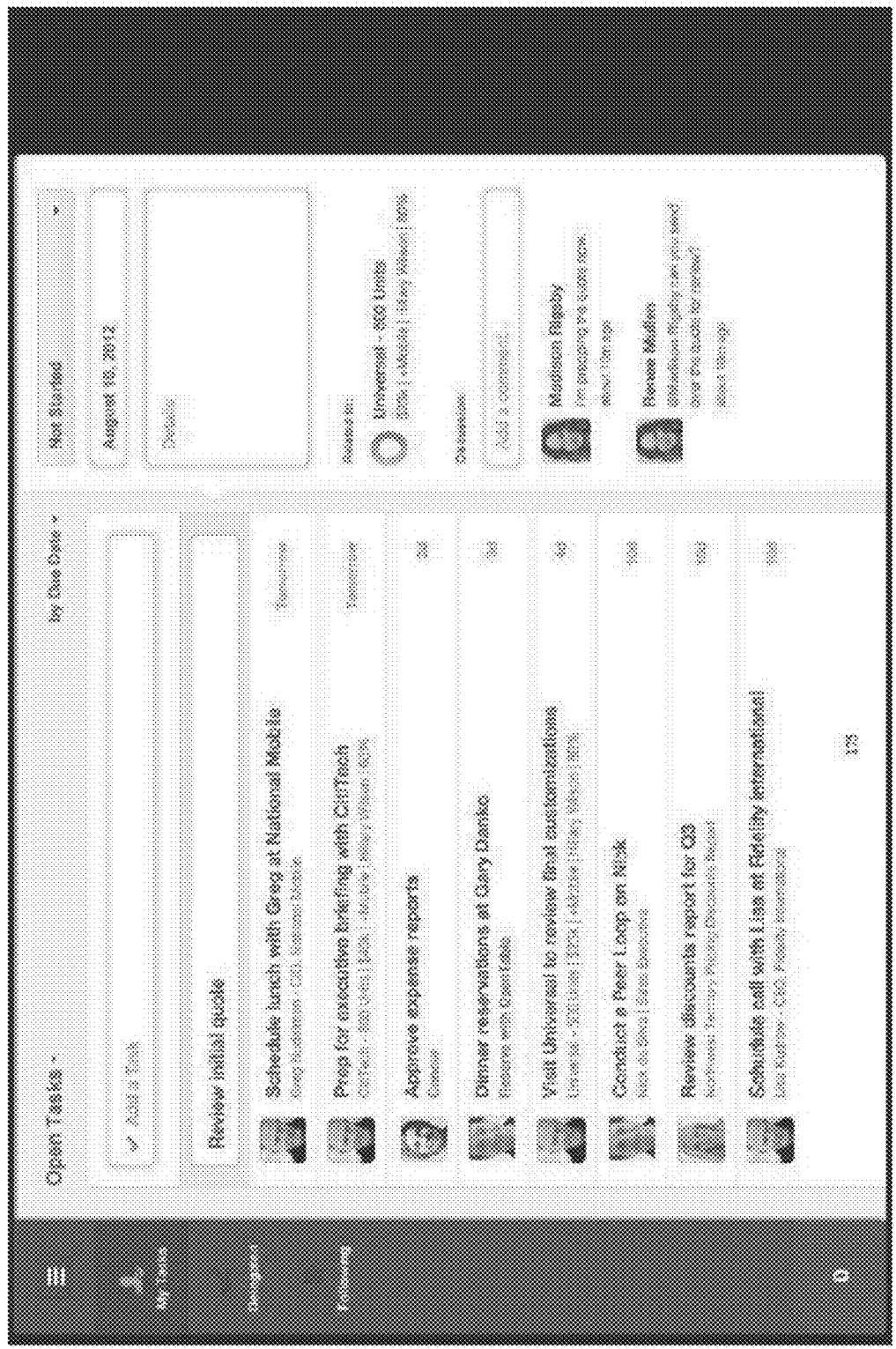

In FIG. 106, the manager is given a page that allows the manager to look at all of the tasks by selecting the my tasks link on the side navigation bar. The page provides functions fro the manager to find a task by the task's title (see the pulldown giving a list of tasks), find a task by the task's due date (see the due date pulldown), add a task by inputting the task into the add a task field, choose a task from the list of tasks below the "review initial quote" heading, find a task that has not yet been started by using the not started pulldown, enter a date into the field (see "Aug. 10, 2012") to find a task, add details to a task in the details field, and add a comment in the add a comment field. The manager may select a task and the information about the task will be included in the fields on the page. After the task is selected, the manager may make changes, additions, deletions, and/or add comments to the task. The changes will be posted in the posts on the timeline page in dealpath with reference to the specific deal and/or will be provided via the deal space page to the appropriate contacts.

The manager may also select the other two links provided on the left side navigation bar, delegated or following.

Figure 107:
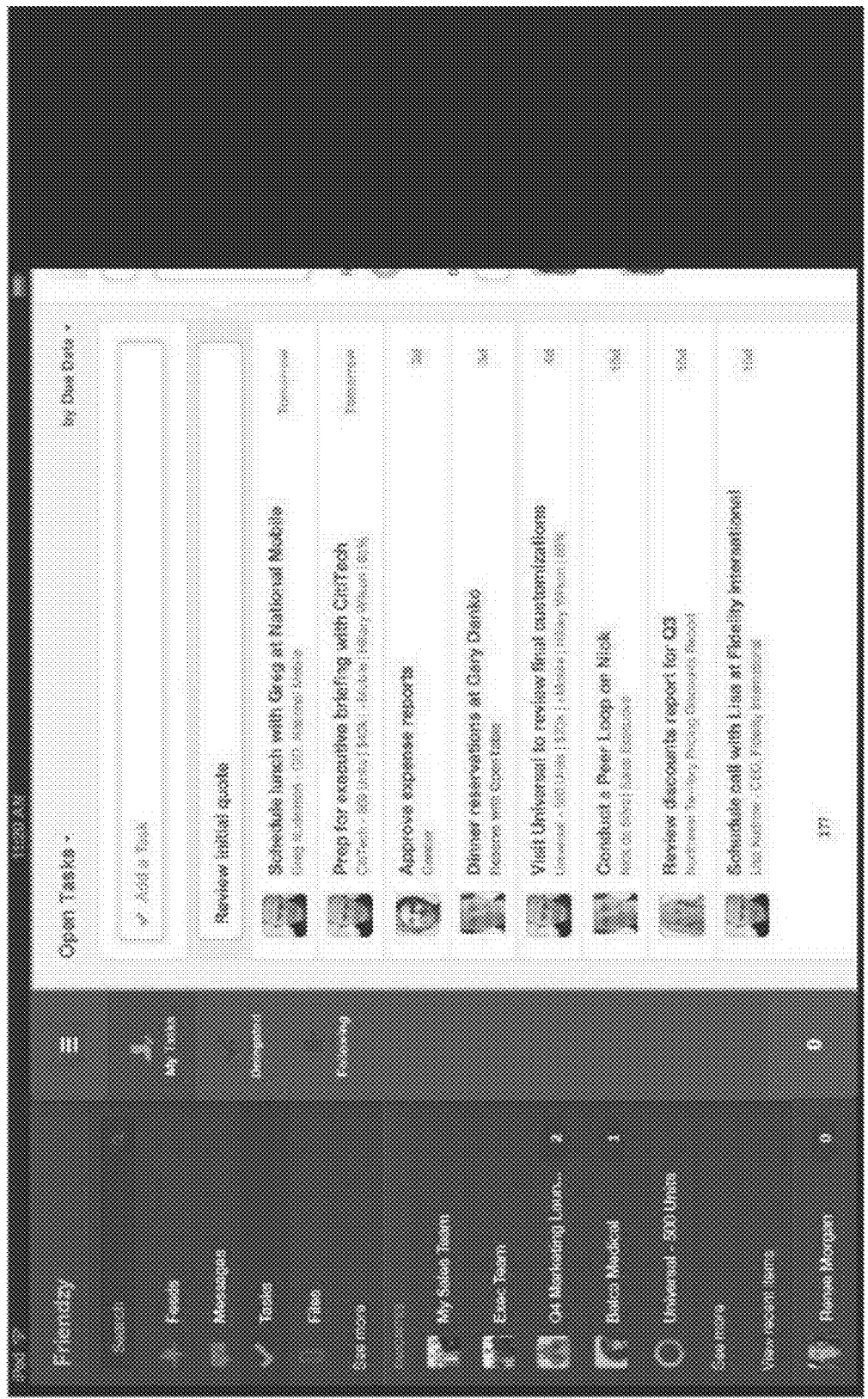
Figure 108:
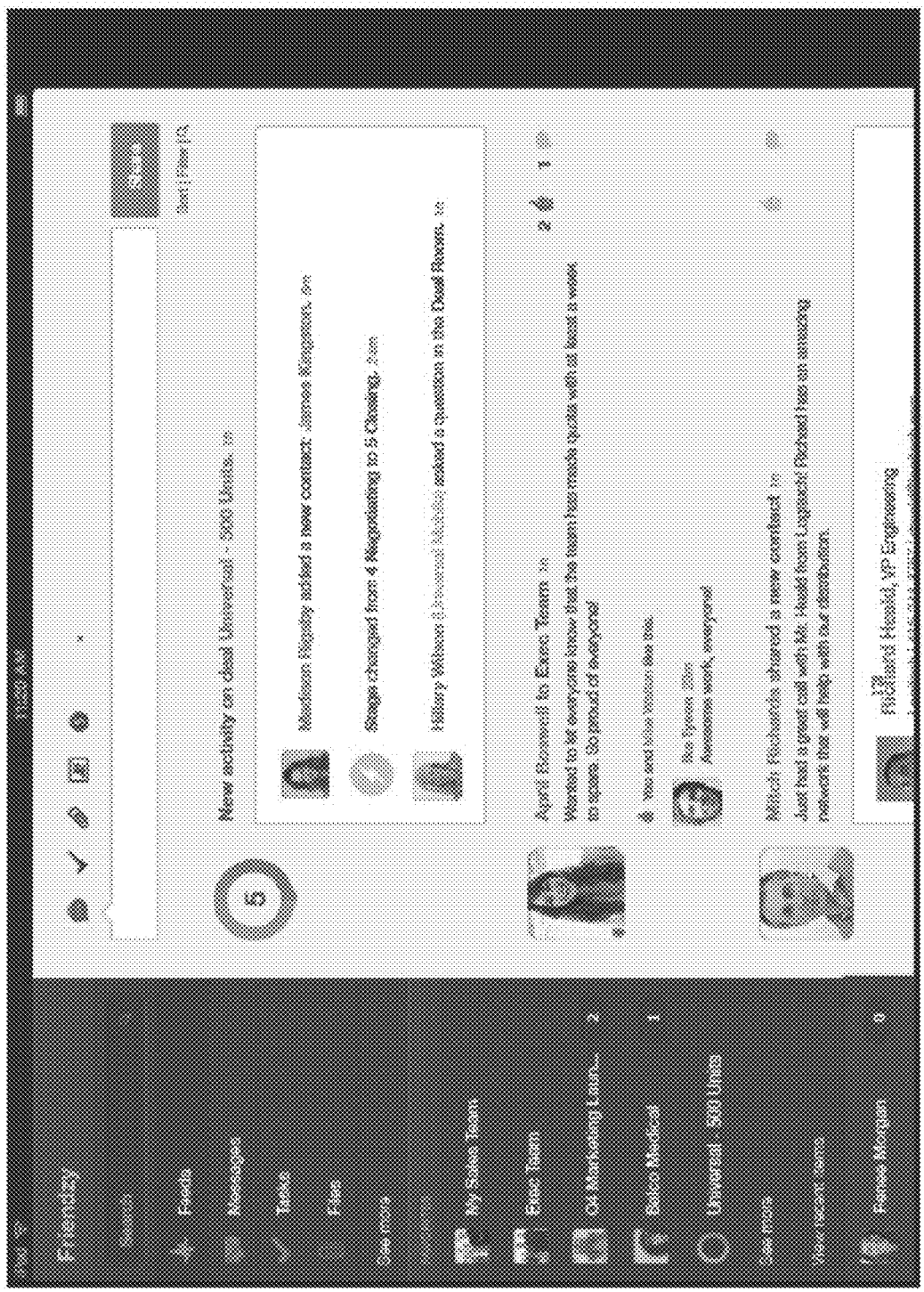
Figure 109:
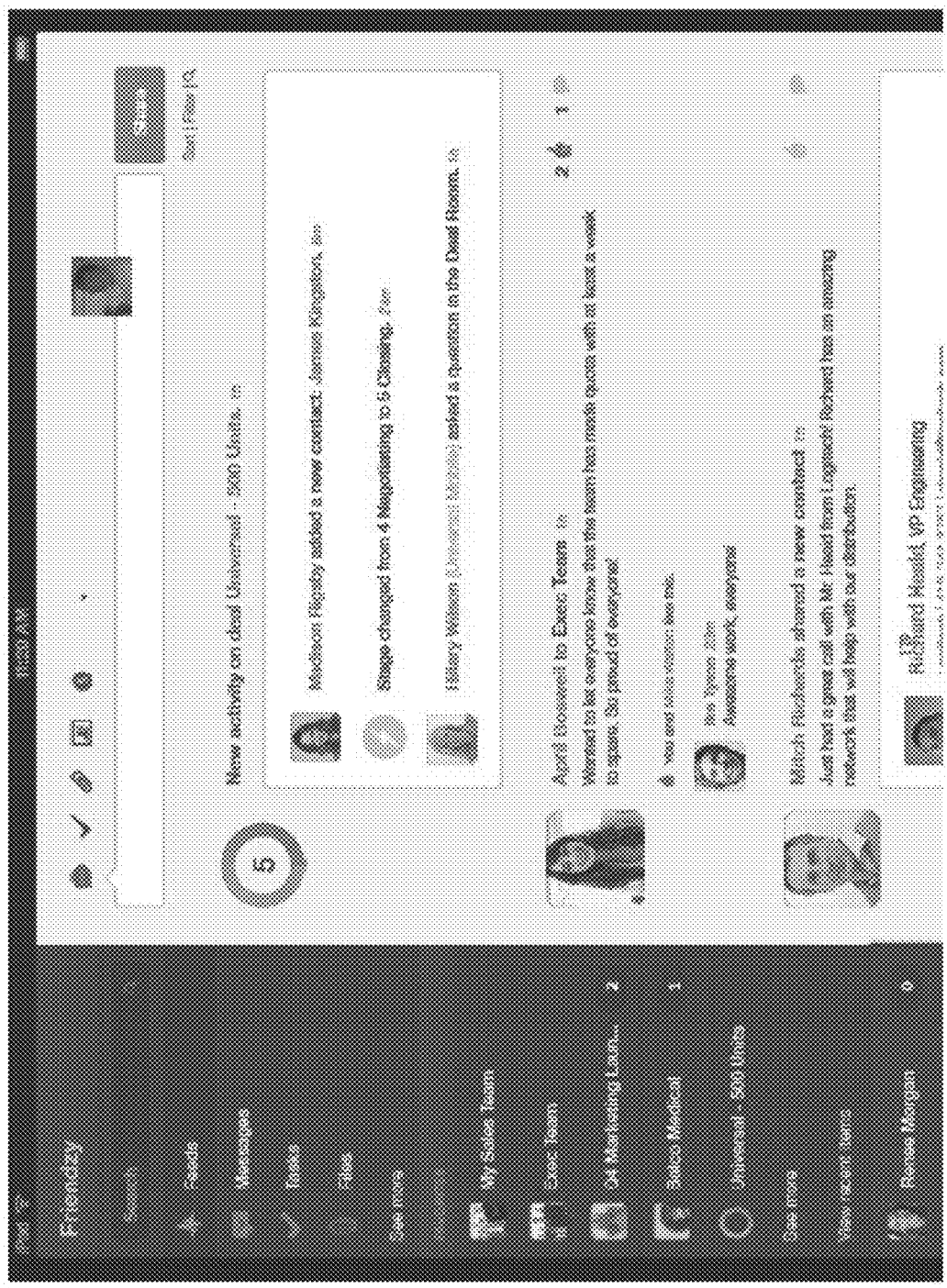

FIG. 107 shows how the cloud menu may function with the deal path app when a manager is reviewing tasks. The manager may navigate to other parts of the deal path app using the cloud menu (see also FIG. 101 left panel) giving the manager a way to jump between apps without using the manager's device home screen. FIGS. 108-109 show what the manager sees when the manager selects the feeds link in the cloud menu. The feeds (also called "posts") are provided for the date that the link was selected (e.g., today). The manager may move to earlier or later dated feeds by swiping up or down in the feeds area. In at least one embodiment, the feeds are a subscription that informs the manager if there is a change. The manager may choose which deals, tasks, events, etc. to subscribe to for updates.

Figure 110:
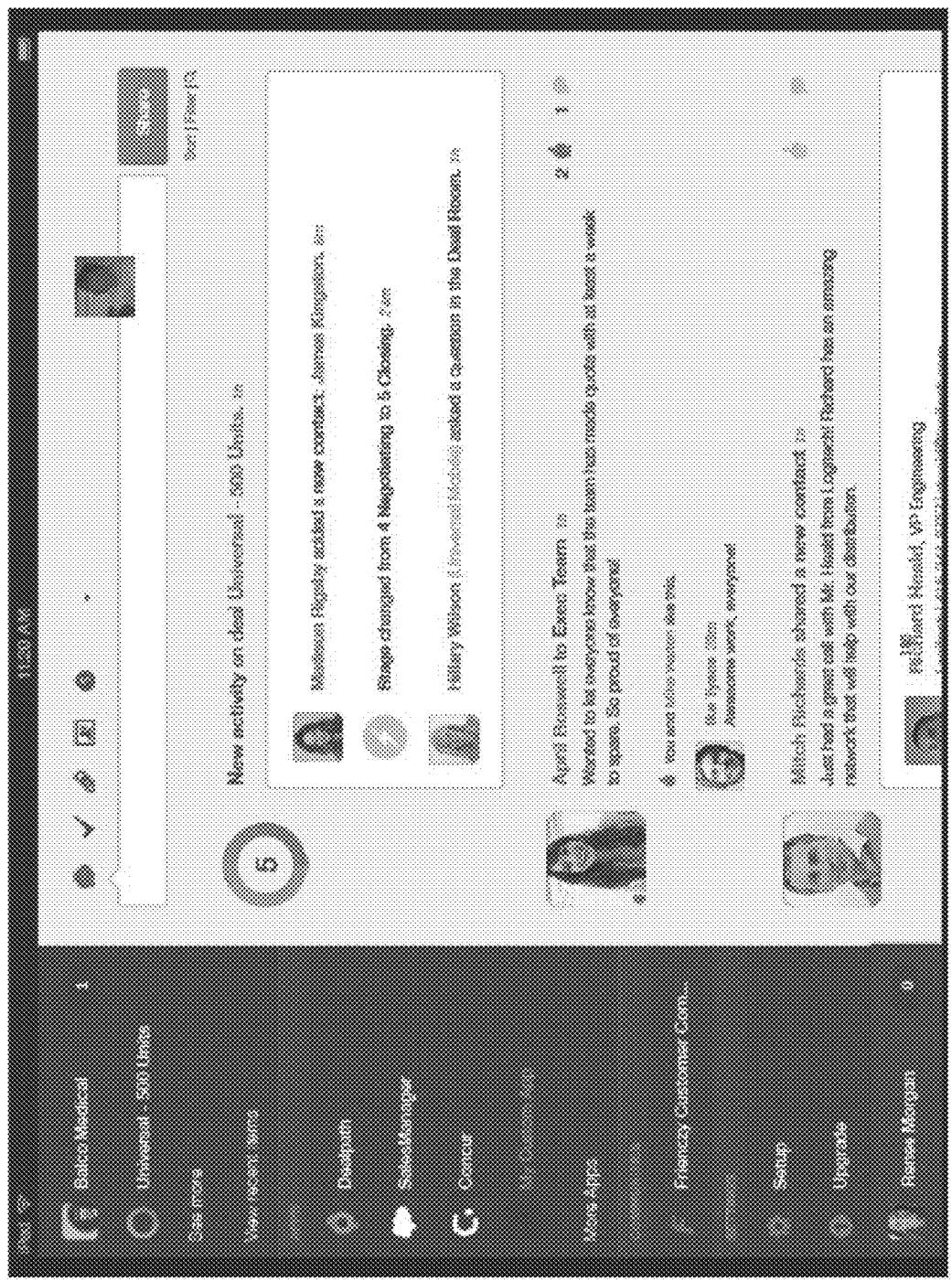

FIG. 110 shows other links and/or options provided by the cloud menu if the manager chooses to swipe down on the cloud menu, including specific deals, apps, communities, and settings.

Figure 111:

FIG. 111 shows an example of a screenshot of an embodiment of a package screenshot 111000 that is shown to a user upon activating any of the upgrade links showing the different packages available for the dealpath app. Package Webpage 11100 may include embodiments of webpage title 11101, webpage information 11102, contact my rep button 11103, my deals link 11104, personal link 11105, apps link 11106, security link 11107, notifications link 11108, upgrade link 11109, free package 11110, professional package 11120, professional package button 11125, enterprise package 11130, enterprise package button 11135, unlimited package 11140, unlimited package button 11145, social media integration information 11150, insights and analytics information 11160, and number O 11190. In other embodiments, webpage 9500 may not have all of the elements or components listed above and/or may have other elements or components instead of or in addition to those listed.

My deals link 11101, stage icon 11102, deal name 11103, deal information 11104, timeline link 11105, details link 11107, tasks link 11109, contacts link 11111, deal space link 11113, more links 11121, and team photographs 11190 are the same as deals link 9301, stage icon 9302, deal name 9303, deal information 9304, timeline link 9305, details link 9307, tasks link 9309, contacts link 9311, deal space link 9313, more links 9321, and team photographs 9390, respectively, which were discussed in conjunction with FIG. 93 above.

System Overview

Figure 112:
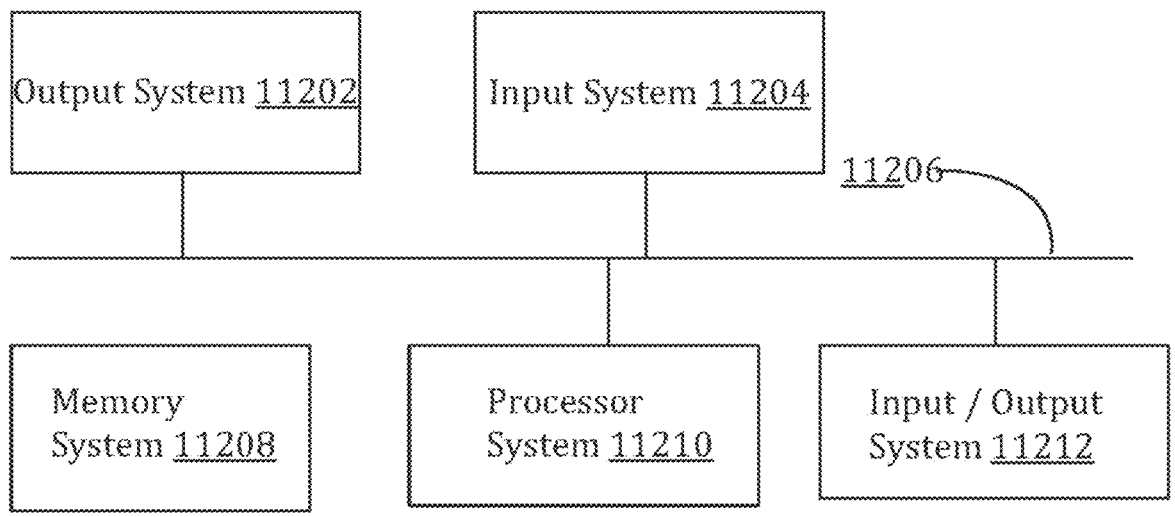
FIG. 112 illustrates a block diagram of a server for a method and system of managing business deals in an embodiment.
Figure 113:
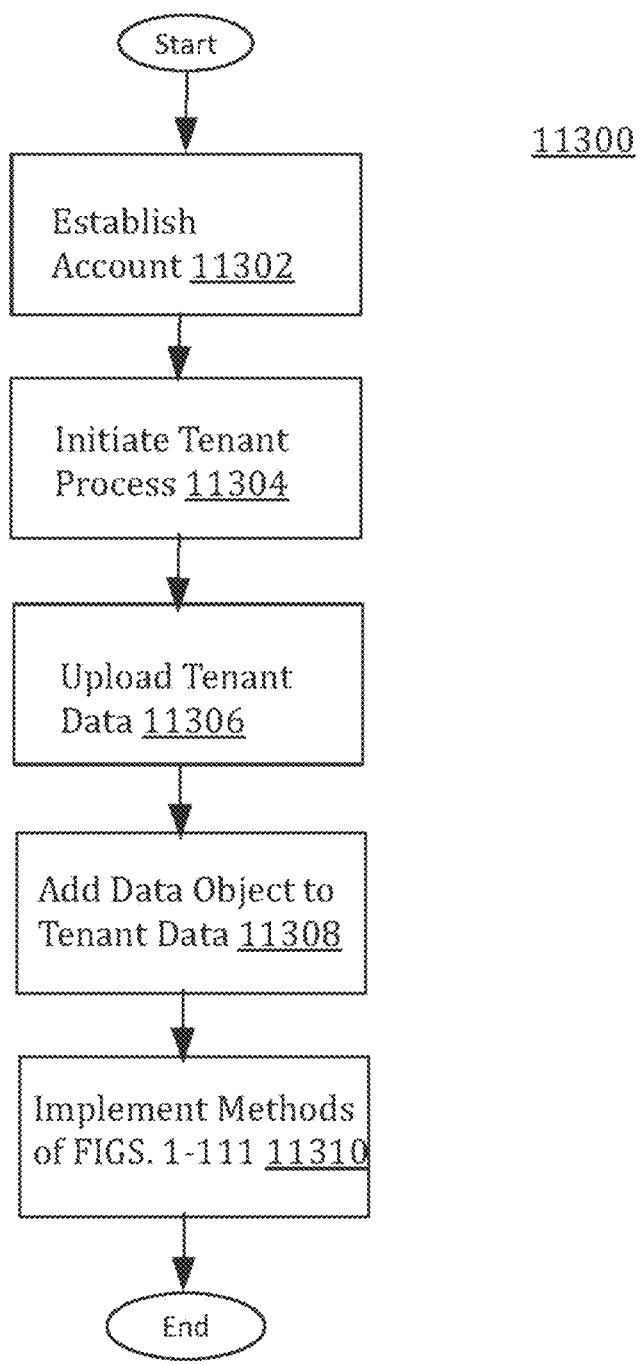
FIG. 113 illustrates a block diagram of a system in which an on-demand database service may be used.

FIG. 112 illustrates an example of a block diagram of a computer system for use with a system and methods for managing business deals (see also 11312A-D with reference to FIG. 113). Computer system 11200 may include embodiments of output system 11202, input system 11204, communications system 11206, memory system 11208, processor system 11210, and input/output system 11212. In other embodiments, computer system 11200 may not have all of the elements or components listed above and/or may have other elements or components instead of or in addition to those listed. Computer system 11200 is an example of a computer that may be used as computer in any of FIGS. 1-111 and 113-114.

Output system 11202 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example.

Input system 11204 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Communications system 11206 communicatively links output system 11202, input system 11204, memory system 11208, processor system 11210, and/or input/output system 11212 to each other. Communications system 11206 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Memory system 11208 may include, for example, any one of, some of, any combination of, or all of a long term storage system, such as a hard drive; a short term storage system, such as random access memory; a removable storage system, such as a floppy drive or a removable drive; and/or flash memory. Memory system 11208 may include one or more machine-readable mediums that may store a variety of different types of information. The term machine-readable medium is used to refer to any nontransitory machine readable medium capable carrying information that is readable by a machine. One example of a machine-readable medium is a computer-readable medium. Memory system 11208 may include control instructions for sending to controllers for controlling presentation panels.

Processor system 11210 may include any one of, some of, any combination of, or all of multiple parallel processors, a single processor, a system of processors having one or more central processors and/or one or more specialized processors dedicated to specific tasks. Processor carries out the machine instructions stored in memory system 11208.

Input/output system 11212 may include devices that have the dual function as input and output devices. For example, input/output system 11212 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 11212 is optional, and may be used in addition to or in place of output system 11202 and/or input system 11204.

FIG. 113 illustrates a block diagram of an environment 11310 wherein an on-demand database service might be used. Environment 11310 may include user systems 11312, network 11314, system 11316, processor system 11317, application platform 11318, network interface 11320, tenant data storage 11322, system data storage 11324, program code 11326, and process space 11328. In other embodiments, environment 11310 may not have all of the components listed and/or may have other elements instead of, or in addition to, those listed above.

Environment 11310 is an environment in which an on-demand database service exists. User system 11312 may be any machine or system that is used by a user to access a database user system. For example, any of user systems 11312 may be a handheld computing device, a mobile phone, a laptop computer, a work station, and/or a network of computing devices. As illustrated in FIG. 113 (and in more detail in FIG. 114) user systems 11312 might interact via a network 11314 with an on-demand database service, which is system 11316.

An on-demand database service, such as system 11316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 11316" and "system 11316" will be used interchangeably herein. A database image may include one or more database objects. A relational database management system (RDMS) or the equivalent may execute storage and retrieval of information against the database object(s). Application platform 11318 may be a framework that allows the applications of system 11316 to run, such as the hardware and/or software, e.g., the operating system. In an embodiment, on-demand database service 11316 may include an application platform 11318 that enables creation, managing and executing one or more applications developed by the provider of the on-demand database service, users accessing the on-demand database service via user systems 11312, or third party application developers accessing the on-demand database service via user systems 11312.

The users of user systems 11312 may differ in their respective capacities, and the capacity of a particular user system 11312 might be entirely determined by permissions (permission levels) for the current user. For example, where a salesperson is using a particular user system 11312 to interact with system 11316, that user system has the capacities allotted to that salesperson. However, while an administrator is using that user system to interact with system 11316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 11314 is any network or combination of networks of devices that communicate with one another. For example, network 11314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 11312 might communicate with system 11316 using TCP/IP and, at a higher network level, use other common Internet protocols to communicate, such as HTTP, FTP, AFS, WAP, etc. In an example where HTTP is used, user system 11312 might include an HTTP client commonly referred to as a "browser" for sending and receiving HTTP messages to and from an HTTP server at system 11316. Such an HTTP server might be implemented as the sole network interface between system 11316 and network 11314, but other techniques might be used as well or instead. In some implementations, the interface between system 11316 and network 11314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 11316, shown in FIG. 113, implements a web-based customer relationship management (CRM) system. For example, in one embodiment, system 11316 includes application servers configured to implement and execute CRM software applications as well as provide related data, code, forms, webpages and other information to and from user systems 11312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain at least one embodiment, system 11316 implements applications other than, or in addition to, a CRM application. For example, system 11316 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 11316.

One arrangement for elements of system 11316 is shown in FIG. 113, including a network interface 11320, application platform 11318, tenant data storage 11322 for tenant data 11423, system data storage 11324 for system data 11425 accessible to system 11316 and possibly multiple tenants, program code 11326 for implementing various functions of system 11316, and a process space 11328 for executing MTS system processes and tenant-specific processes, such as running applications as part of an application hosting service. Additional processes that may execute on system 11316 include database indexing processes.

Several elements in the system shown in FIG. 113 include conventional, well-known elements that are explained only briefly here. For example, each user system 11312 could include a desktop personal computer, workstation, laptop, PDA, cell phone, or any wireless access protocol (WAP) enabled device or any other computing device capable of interfacing directly or indirectly to the Internet or other network connection. User system 11312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 11312 to access, process and view information, pages and applications available to it from system 11316 over network 11314. Each user system 11312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 11316 or other systems or servers. For example, the user interface device may be used to access data and applications hosted by system 11316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each user system 11312 and all of its components are operator configurable using applications, such as a browser, including computer code run using a central processing unit such as an Intel Pentium® processor or the like. Similarly, system 11316 (and additional instances of an MTS, where more than one is present) and all of their components might be operator configurable using application(s) including computer code to run using a central processing unit such as processor system 11317, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring system 11316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 11316 is configured to provide webpages, forms, applications, data and media content to user (client) systems 11312 to support the access by user systems 11312 as tenants of system 11316. As such, system 11316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 114:
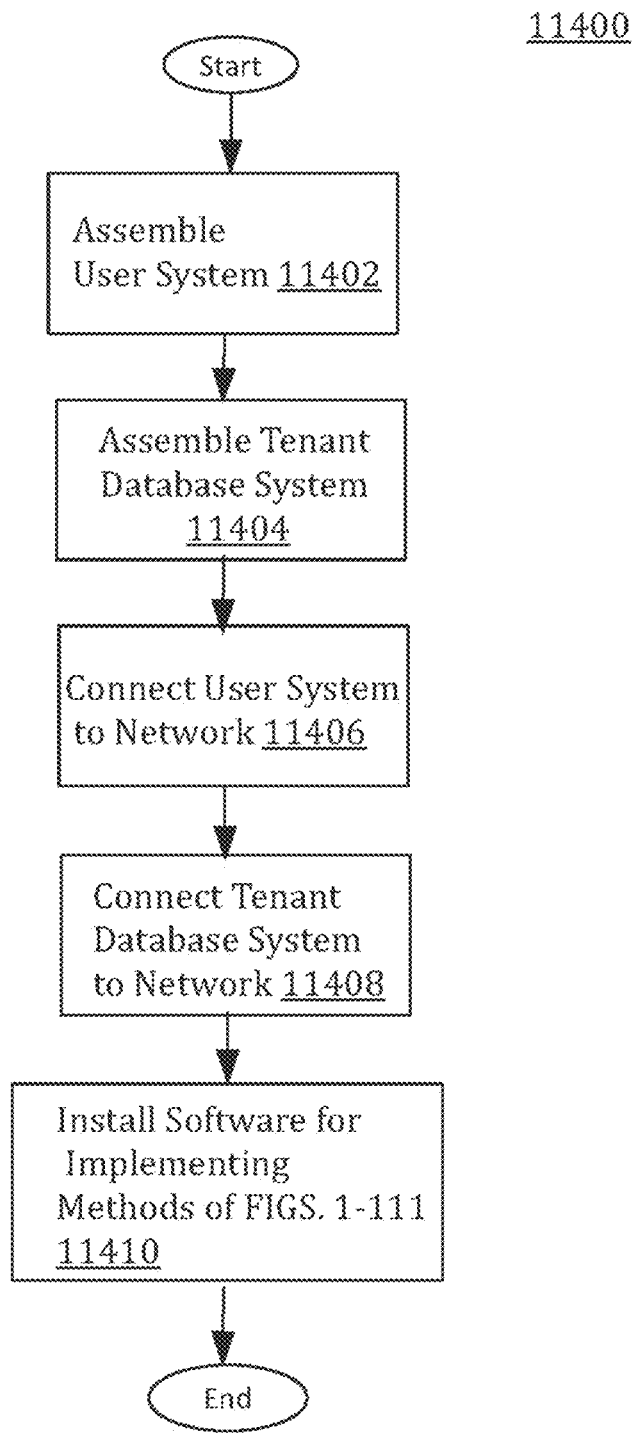
FIG. 114 illustrates an embodiment of the environment of FIG. 113 and various possible interconnections between these elements.

FIG. 114 also illustrates environment 11310. However, in FIG. 114 elements of system 11316 and various interconnections in an embodiment are further illustrated. FIG. 114 shows that user system 11312 may include processor system 11312A, memory system 11312B, input system 11312C, and output system 11312D. FIG. 113 shows network 11314 and system 11316. FIG. 114 also shows that system 11316 may include tenant data storage 11322, tenant data 11423, system data storage 11324, system data 11425, User Interface (UI) 11430, Application Program Interface (API) 11432, PL/SOQL 11434, save routines 11436, application setup mechanism 11438, applications servers 114001-11400N, system process space 11142, tenant process spaces 11144, tenant management process space 11310, tenant storage area 11312, user storage 11314, and application metadata 11316. In other embodiments, environment 11310 may not have the same elements as those listed above and/or may have other elements instead of, or in addition to, those listed above.

User system 11312, network 11314, system 11316, tenant data storage 11322, and system data storage 11324 were discussed above in FIG. 113. Regarding user system 11312, processor system 11312A may be any combination of one or more processors. Memory system 11312B may be any combination of one or more memory devices, short term, and/or long term memory. Input system 11312C may be any combination of input devices, such as one or more keyboards, mice, trackballs, scanners, cameras, and/or interfaces to networks. Output system 11312D may be any combination of output devices, such as one or more monitors, printers, and/or interfaces to networks. As shown by FIG. 113, system 11316 may include a network interface 11320 (of FIG. 113) implemented as a set of HTTP application servers 11400, an application platform 11318, tenant data storage 11322, and system data storage 11324. Also shown is system process space 11302, including individual tenant process spaces 11304 and a tenant management process space 11310. Each application server 11400 may be configured to tenant data storage 11322 and the tenant data 11423 therein, and system data storage 11324 and the system data 11425 therein to serve requests of user systems 11312. The tenant data 11423 might be divided into individual tenant storage areas 11312, which may be either a physical arrangement and/or a logical arrangement of data. Within each tenant storage area 11312, user storage 11314 and application metadata 11316 might be similarly allocated for each user. For example, a copy of a user's most recently used (MRU) items might be stored to user storage 11314. Similarly, a copy of MRU items for an entire organization that is a tenant might be stored to tenant storage area 11312. A UI 11430 provides a user interface and an API 11432 provides an application programmer interface to system 11316 resident processes to users and/or developers at user systems 11312. The tenant data and the system data may be stored in various databases, such as one or more Oracle™ databases.

Application platform 11318 includes an application setup mechanism 11438 that supports application developers' creation and management of applications, which may be saved as metadata into tenant data storage 11322 by save routines 11436 for execution by subscribers as one or more tenant process spaces 11304 managed by tenant management process 11310 for example. Invocations to such applications may be coded using PL/SOQL 11434 that provides a programming language style interface extension to API 11432. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 11316 for the subscriber making the invocation and executing the metadata as an application in a virtual machine.

Each application server 11400 may be communicably coupled to database systems, e.g., having access to system data 11425 and tenant data 11423, via a different network connection. For example, one application server 114001 might be coupled via the network 11314 (e.g., the Internet), another application server 11400N-1 might be coupled via a direct network link, and another application server 11400N might be coupled by yet a different network connection. Transfer Control Protocol and Internet Protocol (TCP/IP) are typical protocols for communicating between application servers 11400 and the database system. However, it will be apparent to one skilled in the art that other transport protocols may be used to optimize the system depending on the network interconnect used.

In certain at least one embodiment, each application server 11400 is configured to handle requests for any user associated with any organization that is a tenant. Because it is desirable to be able to add and remove application servers from the server pool at any time for any reason, there is preferably no server affinity for a user and/or organization to a specific application server 11400. In one embodiment, therefore, an interface system implementing a load balancing function (e.g., an F5 Big-IP load balancer) is communicably coupled between the application servers 11400 and the user systems 11312 to distribute requests to the application servers 11400. In one embodiment, the load balancer uses a least connections algorithm to route user requests to the application servers 11400. Other examples of load balancing algorithms, such as round robin and observed response time, also may be used. For example, in certain at least one embodiment, three consecutive requests from the same user could hit three different application servers 11400, and three requests from different users could hit the same application server 11400. In this manner, system 11316 is multi-tenant, wherein system 11316 handles storage of, and access to, different objects, data and applications across disparate users and organizations.

As an example of storage, one tenant might be a company that employs a sales force where each salesperson uses system 11316 to manage their sales process. Thus, a user might maintain contact data, leads data, customer follow-up data, performance data, goals and progress data, etc., all applicable to that user's personal sales process (e.g., in tenant data storage 11322). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 11316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 11316 might also maintain system level data usable by multiple tenants or other data. Such system level data might include industry reports, news, postings, and the like that are sharable among tenants.

In certain at least one embodiment, user systems 11312 (which may be client systems) communicate with application servers 11400 to request and update system-level and tenant-level data from system 11316 that may require sending one or more queries to tenant data storage 11322 and/or system data storage 11324. System 11316 (e.g., an application server 11400 in system 11316) automatically generates one or more SQL statements (e.g., one or more SQL queries) that are designed to access the desired information. System data storage 11324 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/81131,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain at least one embodiment, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 115:
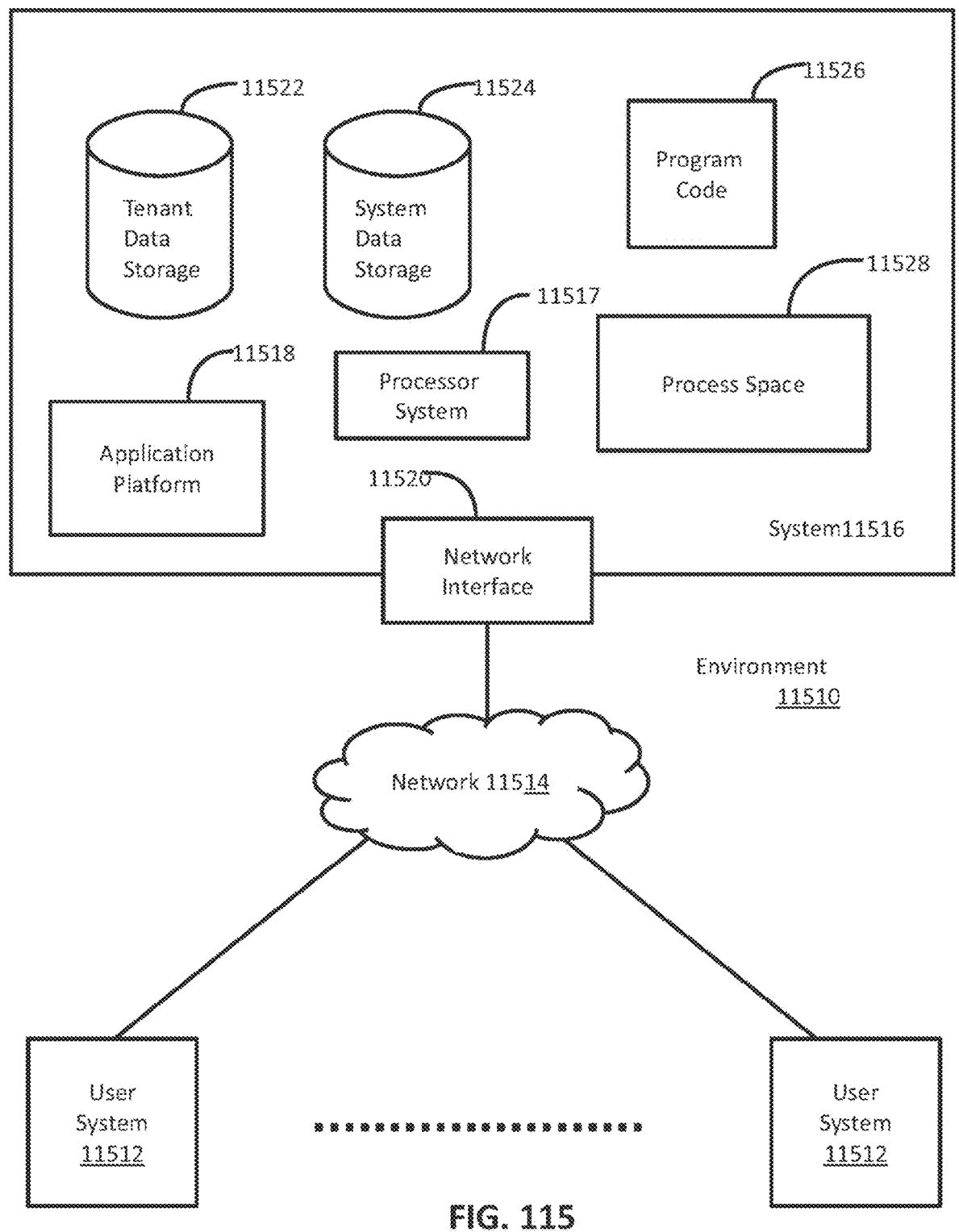
FIG. 115 illustrates a flow diagram of an example of a method of using the environment of FIG. 113.

Method for Using the Environment (FIG. 115)

FIG. 115 shows a flowchart of an example of a method 11500 of using environment 11310. In step 11510, user system 11312 (FIGS. 113 and 114) establishes an account. In step 11512, one or more tenant process spaces 11404 (FIG. 114) are initiated on behalf of user system 11312, which may also involve setting aside space in tenant space 11412 (FIG. 114) and tenant data 11414 (FIG. 114) for user system 11312. Step 11512 may also involve modifying application metadata to accommodate user system 11312. In step 11514, user system 11312 uploads data. In step 11516, one or more data objects are added to tenant data 11414 where the data uploaded is stored. In step 11518, the methods associated with FIGS. 1-111 may be implemented. In another embodiment, although depicted as distinct steps in FIG. 115, steps 11502-11518 may not be distinct steps. In other embodiments, method 11500 may not have all of the above steps and/or may have other steps in addition to, or instead of, those listed above. The steps of method 11500 may be performed in another order. Subsets of the steps listed above as part of method 11500 may be used to form their own method.

Figure 116:
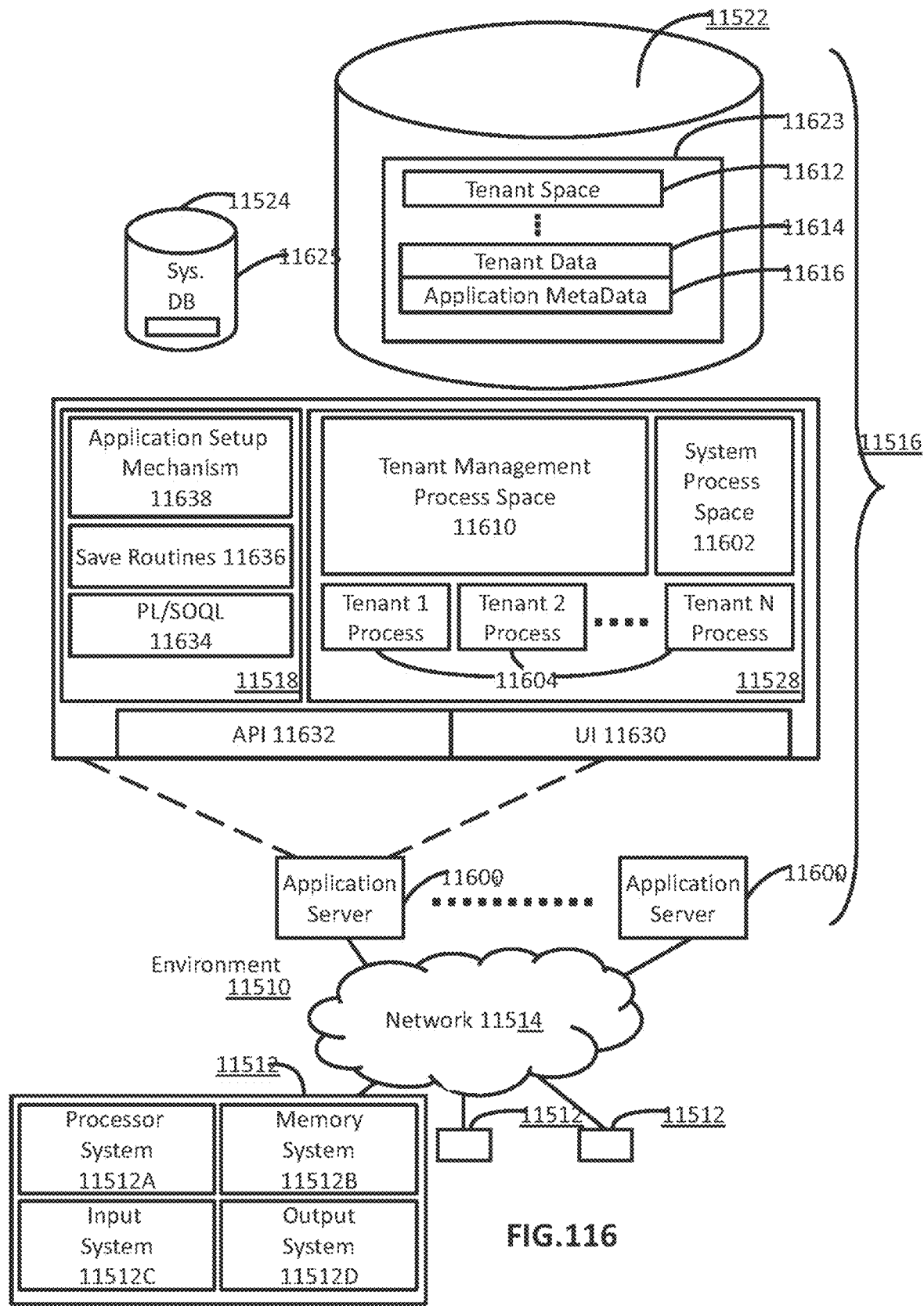
FIG. 116 illustrates a flow diagram of an example of a method of making the environment of FIG. 113.

Method for Creating the Environment (FIG. 116)

FIG. 116 is a method of making environment 11610, in step 11602, user system 11312 (FIGS. 113 and 114) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 11604, system 11316 (FIGS. 113 and 114) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 11316 may include installing application platform 11318, network interface 11320, tenant data storage 11322, system data storage 11324, system data 11425, program code 11326, process space 11328, UI 11430, API 11432, PL/SOQL 11434, save routine 11436, application setup mechanism 11438, applications servers 100$_1$-IOON, system process space 102, tenant process spaces 11404, tenant management process space 110, tenant space 11412, tenant data 11414, and application metadata 116 (FIG. 114).

In step 11606, user system 11312 is communicatively coupled to network 11404. In step 13208, system 11316 is communicatively coupled to network 11404 allowing user system 11312 and system 11316 to communicate with one another (FIG. 114). In step 13210, one or more instructions may be installed in system 11316 (e.g., the instructions may be installed on one or more machine readable media, such as computer readable media, therein) and/or system 11316 is otherwise configured for performing the steps of methods associated with FIGS. 1-111. In an embodiment, each of the steps of method 11600 is a distinct step. In another embodiment, although depicted as distinct steps in FIG. 116, steps 11602-11610 may not be distinct steps. In other embodiments, method 11600 may not have all of the above steps and/or may have other steps in addition to, or instead of, those listed above. The steps of method 11600 may be performed in another order. Subsets of the steps listed above as part of method 11600 may be used to form their own method.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. For example, any of the GUI's, functions, navigation bars, and webpages could be customized for a particular customer or business to have functions more specific to the type of business (e.g., law firm, bank, grocery store, investment bank, advertising agency, etc.

The invention claimed is:

1. A system comprising:
 a database system implemented using a server system comprising one or more hardware processors, the database system configurable to cause:
  obtaining lead information from a lead stored as a database record in a database;
  displaying, on a display:
   the lead information in one or more sections comprising communications, activities, meetings and tasks associated with the lead,
   work information identifying work assigned to a user in a dynamic sales environment, the work comprising following up on a communication associated with the lead and/or attending a meeting associated with the lead, and
   relationship information providing a reminder and/or a notification about one or more items related to the lead; and
  processing data indicating a user selection of a graphical element for lead activity information, the processing of the data comprising:
   retrieving lead activity information from one or more database records, and
   displaying the lead activity information on the display.

2. The system of claim 1, wherein a meeting associated with the lead is selectable to cause display of details comprising of one or more of: a meeting title, a link to a database record associated with the meeting, a meeting description, a meeting location, a meeting start time, meeting participants, meeting attendees, a link to a list of attendees, or a map of a meeting location.

3. The system of claim 1, the database system further configurable to cause:
 generating the work information based on work data stored in one or more of: a sales database, an email inbox, or a calendar.

4. The system of claim 1, the database system further configurable to cause:
 displaying a plurality of feed items associated with the lead, the feed items comprising one or more past feed items representing one or more past events and one or more future feed items representing one or more future events.

5. The system of claim 4, wherein a feed item identifies one or more of: a task associated with the lead, a file associated with the lead, or a sale associated with the lead.

6. The system of claim 4, wherein a feed item identifies one or more of: a contact, an account, an opportunity, a report, a dashboard, an instant messenger, an email service, workability on a device, mobile access, private messaging, lead management, a mass email template, social media monitoring, role-based sharing, role-based security or storage.

7. The system of claim 1, wherein the lead information is displayed in a user interface configured to allow a user to select, view, add or change a timeline, the work information, and the relationship information.

8. A non-transitory computer-readable medium storing computer-readable program code capable of being executed by one or more processors when retrieved from the non-transitory computer-readable medium, the program code comprising instructions configurable to cause:
 obtaining lead information from a lead stored as a database record in a database;
 displaying, on a display:
  the lead information in one or more sections comprising communications, activities, meetings and tasks associated with the lead,
  work information identifying work assigned to a user in a dynamic sales environment, the work comprising following up on a communication associated with the lead and/or attending a meeting associated with the lead, and
  relationship information providing a reminder and/or a notification about one or more items related to the lead; and
 processing data indicating a user selection of a graphical element for lead activity information, the processing of the data comprising:
  retrieving lead activity information from one or more database records, and
  displaying the lead activity information on the display.

9. The non-transitory computer-readable medium of claim 8, wherein a meeting associated with the lead is selectable to cause display of details comprising of one or more of: a meeting title, a link to a database record associated with the meeting, a meeting description, a meeting location, a meeting start time, meeting participants, meeting attendees, a link to a list of attendees, or a map of a meeting location.

10. The non-transitory computer-readable medium of claim 8, the instructions further configurable to cause:
 generating the work information based on work data stored in one or more of: a sales database, an email inbox, or a calendar.

11. The non-transitory computer-readable medium of claim 8, the instructions further configurable to cause:
 displaying a plurality of feed items associated with the lead, the feed items comprising one or more past feed items representing one or more past events and one or more future feed items representing one or more future events.

12. The non-transitory computer-readable medium of claim 11, wherein a feed item identifies one or more of: a task associated with the lead, a file associated with the lead, or a sale associated with the lead.

13. The non-transitory computer-readable medium of claim 11, wherein a feed item identifies one or more of: a contact, an account, an opportunity, a report, a dashboard, an instant messenger, an email service, workability on a device, mobile access, private messaging, lead management, a mass email template, social media monitoring, role-based sharing, role-based security or storage.

14. The non-transitory computer-readable medium of claim 8, wherein the lead information is displayed in a user interface configured to allow a user to select, view, add or change a timeline, the work information, and the relationship information.

15. A method comprising:
    obtaining lead information from a lead stored as a database record in a database;
    causing display, on a display, of:
        the lead information in one or more sections comprising communications, activities, meetings and tasks associated with the lead,
        work information identifying work assigned to a user in a dynamic sales environment, the work comprising following up on a communication associated with the lead and/or attending a meeting associated with the lead, and
        relationship information providing a reminder and/or a notification about one or more items related to the lead; and
    processing data indicating a user selection of a graphical element for lead activity information, the processing of the data comprising:
        retrieving lead activity information from one or more database records, and
        displaying the lead activity information on the display.

16. The method of claim 15, wherein a meeting associated with the lead is selectable to cause display of details comprising of one or more of: a meeting title, a link to a database record associated with the meeting, a meeting description, a meeting location, a meeting start time, meeting participants, meeting attendees, a link to a list of attendees, or a map of a meeting location.

17. The method of claim 15, further comprising:
    generating the work information based on work data stored in one or more of: a sales database, an email inbox, or a calendar.

18. The method of claim 15, further comprising:
    causing display of a plurality of feed items associated with the lead, the feed items comprising one or more past feed items representing one or more past events and one or more future feed items representing one or more future events.

19. The method of claim 18, wherein a feed item identifies one or more of: a task associated with the lead, a file associated with the lead, or a sale associated with the lead.

20. The method of claim 18, wherein a feed item identifies one or more of: a contact, an account, an opportunity, a report, a dashboard, an instant messenger, an email service, workability on a device, mobile access, private messaging, lead management, a mass email template, social media monitoring, role-based sharing, role-based security or storage.

* * * * *